US012663907B2

(12) United States Patent　　　(10) Patent No.: US 12,663,907 B2
Pla I Conesa et al.　　　　　　　　(45) Date of Patent: Jun. 23, 2026

(54) DEVICES, METHODS, AND GRAPHICAL USER INTERFACES FOR GAZE-BASED NAVIGATION

(71) Applicant: Apple Inc., Cupertino, CA (US)

(72) Inventors: Pol Pla I Conesa, San Francisco, CA (US); Bas Ording, San Francisco, CA (US); Stephen O. Lemay, Palo Alto, CA (US); Evgenii Krivoruchko, San Francisco, CA (US); Peter D. Anton, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/202,034

(22) Filed: Mar. 15, 2021

(65) Prior Publication Data

US 2021/0303107 A1　　　Sep. 30, 2021

Related U.S. Application Data

(60) Provisional application No. 63/131,754, filed on Dec. 29, 2020, provisional application No. 63/001,210, filed on Mar. 27, 2020.

(51) Int. Cl.
*G06F 3/0481*　　　(2022.01)
*G06F 3/01*　　　　(2006.01)

(52) U.S. Cl.
CPC ............ *G06F 3/0481* (2013.01); *G06F 3/012* (2013.01); *G06F 3/013* (2013.01)

(58) Field of Classification Search
CPC ........ G06F 3/0481; G06F 3/012; G06F 3/013; G06F 2203/04804; G06F 2203/04806;
(Continued)

(56) References Cited

U.S. PATENT DOCUMENTS 1,173,824 A　　2/1916　Mckee
5,015,188 A　　5/1991　Pellosie et al.
(Continued)

FOREIGN PATENT DOCUMENTS

CA　　　3033344 A1　　2/2018
CN　　102298493 A　　12/2011
(Continued)

OTHER PUBLICATIONS

Final Office Action received for U.S. Appl. No. 14/531,874, mailed on Nov. 4, 2016, 10 pages.
(Continued)

*Primary Examiner* — Matthew Ell
*Assistant Examiner* — Blaine T Basom
(74) *Attorney, Agent, or Firm* — Kubota & Basol LLP

(57)　　　　　ABSTRACT

In some embodiments, an electronic device expands an item of content in accordance with detection of a user's gaze. In some embodiments, an electronic device scrolls text of a content item in accordance with a determination that the user is reading the content item. In some embodiments, an electronic device navigates between user interfaces in accordance with detection of movement of the user's head and detection of the user's gaze. In some embodiments, an electronic device displays augmented content related to a portion of content in accordance with detection of movement of the user's head and detection of the user's gaze in accordance with some embodiments.

20 Claims, 53 Drawing Sheets

(58) Field of Classification Search
   CPC .. G06F 3/017; G06F 3/04842; G06F 3/04845;
   G06F 3/0485
   See application file for complete search history.

(56) References Cited

U.S. PATENT DOCUMENTS

| | | | |
|---|---|---|---|
| 5,422,812 A | 6/1995 | Knoll et al. | |
| 5,483,261 A | 1/1996 | Yasutake | |
| 5,488,204 A | 1/1996 | Mead et al. | |
| 5,515,488 A | 5/1996 | Hoppe et al. | |
| 5,524,195 A | 6/1996 | Clanton et al. | |
| 5,610,828 A | 3/1997 | Kodosky et al. | |
| 5,731,805 A * | 3/1998 | Tognazzini | G06F 3/0485 |
| | | | 382/117 |
| 5,737,553 A | 4/1998 | Bartok | |
| 5,740,440 A | 4/1998 | West | |
| 5,751,287 A | 5/1998 | Hahn et al. | |
| 5,758,122 A | 5/1998 | Corda et al. | |
| 5,794,178 A | 8/1998 | Caid et al. | |
| 5,809,267 A | 9/1998 | Moran et al. | |
| 5,825,352 A | 10/1998 | Bisset et al. | |
| 5,835,079 A | 11/1998 | Shieh | |
| 5,877,766 A | 3/1999 | Bates et al. | |
| 5,880,411 A | 3/1999 | Gillespie et al. | |
| 5,900,849 A | 5/1999 | Gallery | |
| 5,933,143 A | 8/1999 | Kobayashi | |
| 5,990,886 A | 11/1999 | Serdy et al. | |
| 6,061,060 A | 5/2000 | Berry et al. | |
| 6,078,310 A * | 6/2000 | Tognazzini | G06F 3/013 |
| | | | 345/158 |
| 6,108,004 A | 8/2000 | Medl | |
| 6,112,015 A | 8/2000 | Planas et al. | |
| 6,154,559 A | 11/2000 | Beardsley | |
| 6,167,433 A | 12/2000 | Maples et al. | |
| 6,188,391 B1 | 2/2001 | Seely et al. | |
| 6,295,069 B1 | 9/2001 | Shirur | |
| 6,310,610 B1 | 10/2001 | Beaton et al. | |
| 6,323,846 B1 | 11/2001 | Westerman et al. | |
| 6,426,745 B1 | 7/2002 | Isaacs et al. | |
| 6,456,296 B1 | 9/2002 | Cataudella et al. | |
| 6,570,557 B1 | 5/2003 | Westerman et al. | |
| 6,584,465 B1 | 6/2003 | Zhu et al. | |
| 6,677,932 B1 | 1/2004 | Westerman | |
| 6,690,387 B2 | 2/2004 | Zimmerman et al. | |
| 6,714,201 B1 | 3/2004 | Grinstein et al. | |
| 6,750,873 B1 | 6/2004 | Bernardini et al. | |
| 6,756,997 B1 | 6/2004 | Ward et al. | |
| 7,015,894 B2 | 3/2006 | Morohoshi | |
| 7,035,903 B1 | 4/2006 | Baldonado | |
| 7,096,120 B2 | 8/2006 | Hull | |
| 7,134,130 B1 | 11/2006 | Thomas | |
| 7,137,074 B1 | 11/2006 | Newton et al. | |
| 7,184,064 B2 | 2/2007 | Zimmerman et al. | |
| 7,230,629 B2 | 6/2007 | Reynolds et al. | |
| 7,298,370 B1 | 11/2007 | Middler et al. | |
| 7,580,576 B2 | 8/2009 | Wang et al. | |
| 7,614,008 B2 | 11/2009 | Ording | |
| 7,633,076 B2 | 12/2009 | Huppi et al. | |
| 7,634,718 B2 | 12/2009 | Nakajima | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,706,579 B2 | 4/2010 | Oijer | |
| 7,721,226 B2 | 5/2010 | Barabe et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,341,541 B2 * | 12/2012 | Holecek | G06F 16/904 |
| | | | 715/767 |
| 8,381,135 B2 | 2/2013 | Hotelling et al. | |
| 8,436,872 B2 | 5/2013 | Wright et al. | |
| 8,479,122 B2 | 7/2013 | Hotelling et al. | |
| 8,593,558 B2 | 11/2013 | Gardiner et al. | |
| 8,724,856 B1 | 5/2014 | King | |
| 8,730,156 B2 | 5/2014 | Weising et al. | |
| 8,767,045 B2 | 7/2014 | Kitazato et al. | |
| 8,793,620 B2 | 7/2014 | Stafford | |
| 8,793,729 B2 | 7/2014 | Adimatyam et al. | |
| 8,803,873 B2 | 8/2014 | Yoo et al. | |
| 8,866,880 B2 | 10/2014 | Tan et al. | |
| 8,896,632 B2 | 11/2014 | Macdougall et al. | |
| 8,947,323 B1 | 2/2015 | Raffle et al. | |
| 8,970,478 B2 | 3/2015 | Johansson | |
| 8,970,629 B2 | 3/2015 | Kim et al. | |
| 8,994,718 B2 | 3/2015 | Latta et al. | |
| 9,007,301 B1 | 4/2015 | Raffle et al. | |
| 9,108,109 B2 | 8/2015 | Pare et al. | |
| 9,158,115 B1 | 10/2015 | Worley et al. | |
| 9,164,975 B2 | 10/2015 | Milewski et al. | |
| 9,183,672 B1 | 11/2015 | Hickman et al. | |
| 9,185,062 B1 | 11/2015 | Yang et al. | |
| 9,189,611 B2 | 11/2015 | Wssingbo | |
| 9,196,072 B2 | 11/2015 | Oh et al. | |
| 9,201,500 B2 | 12/2015 | Srinivasan et al. | |
| 9,214,137 B2 | 12/2015 | Bala et al. | |
| 9,230,368 B2 | 1/2016 | Keane et al. | |
| 9,237,334 B2 | 1/2016 | Cheng et al. | |
| 9,241,149 B2 | 1/2016 | Redmann | |
| 9,245,388 B2 | 1/2016 | Poulos et al. | |
| 9,256,785 B2 | 2/2016 | Qvarfordt | |
| 9,293,118 B2 | 3/2016 | Matsui | |
| 9,294,757 B1 | 3/2016 | Lewis et al. | |
| 9,298,334 B1 | 3/2016 | Zimmerman et al. | |
| 9,316,827 B2 * | 4/2016 | Lindley | G06F 3/167 |
| 9,348,458 B2 | 5/2016 | Hotelling et al. | |
| 9,383,189 B2 | 7/2016 | Bridges et al. | |
| 9,384,594 B2 | 7/2016 | Maciocci et al. | |
| 9,396,580 B1 | 7/2016 | Nowrouzezahrai et al. | |
| 9,400,559 B2 | 7/2016 | Latta et al. | |
| 9,426,193 B2 | 8/2016 | Goodman | |
| 9,436,357 B2 | 9/2016 | Pallakoff et al. | |
| 9,437,047 B2 | 9/2016 | Chang et al. | |
| 9,448,635 B2 | 9/2016 | Macdougall et al. | |
| 9,448,687 B1 | 9/2016 | Mckenzie et al. | |
| 9,465,479 B2 | 10/2016 | Cho et al. | |
| 9,519,371 B2 | 12/2016 | Nishida | |
| 9,526,127 B1 | 12/2016 | Taubman et al. | |
| 9,544,257 B2 | 1/2017 | Ogundokun et al. | |
| 9,563,331 B2 | 2/2017 | Poulos et al. | |
| 9,575,559 B2 | 2/2017 | Andrysco | |
| 9,588,651 B1 | 3/2017 | Buchanan et al. | |
| 9,612,722 B2 | 4/2017 | Miller et al. | |
| 9,619,105 B1 | 4/2017 | Dal Mutto | |
| 9,619,519 B1 | 4/2017 | Dorner | |
| 9,672,588 B1 | 6/2017 | Doucette et al. | |
| 9,681,112 B2 | 6/2017 | Son | |
| 9,684,372 B2 | 6/2017 | Xun et al. | |
| 9,704,230 B2 | 7/2017 | Hofmann et al. | |
| 9,734,402 B2 | 8/2017 | Jang et al. | |
| 9,778,814 B2 | 10/2017 | Ambrus et al. | |
| 9,779,512 B2 | 10/2017 | Tomlin et al. | |
| 9,829,708 B1 * | 11/2017 | Asada | G06F 1/163 |
| 9,851,866 B2 | 12/2017 | Goossens et al. | |
| 9,864,498 B2 * | 1/2018 | Olsson | G06F 3/013 |
| 9,870,130 B2 | 1/2018 | Schubert et al. | |
| 9,886,087 B1 | 2/2018 | Wald et al. | |
| 9,911,232 B2 | 3/2018 | Shapira et al. | |
| 9,933,833 B2 | 4/2018 | Tu et al. | |
| 9,933,937 B2 | 4/2018 | Lemay et al. | |
| 9,934,614 B2 | 4/2018 | Ramsby et al. | |
| 9,952,042 B2 | 4/2018 | Abovitz et al. | |
| 10,026,209 B1 | 7/2018 | Dagley et al. | |
| 10,049,460 B2 | 8/2018 | Romano et al. | |
| 10,101,803 B2 | 10/2018 | Faaborg et al. | |
| 10,175,483 B2 | 1/2019 | Salter et al. | |
| 10,192,347 B2 | 1/2019 | Bui et al. | |
| 10,203,764 B2 | 2/2019 | Katz et al. | |
| 10,210,664 B1 | 2/2019 | Chaturvedi | |
| 10,303,427 B2 | 5/2019 | Shintani et al. | |
| 10,307,671 B2 | 6/2019 | Barney et al. | |
| 10,318,034 B1 | 6/2019 | Hauenstein et al. | |
| 10,339,721 B1 | 7/2019 | Dascola et al. | |

(56)　　　　References Cited

U.S. PATENT DOCUMENTS

| | | | |
|---|---|---|---|
| 10,353,532 B1 | 7/2019 | Holz et al. | |
| 10,373,381 B2 | 8/2019 | Nuernberger et al. | |
| 10,394,320 B2 | 8/2019 | George-svahn et al. | |
| 10,401,958 B2 | 9/2019 | Peana et al. | |
| 10,424,124 B2 | 9/2019 | Takahashi | |
| 10,448,189 B2 | 10/2019 | Link | |
| 10,484,641 B2 | 11/2019 | Zhou et al. | |
| 10,488,941 B2 | 11/2019 | Lam et al. | |
| 10,499,044 B1 | 12/2019 | Giokaris et al. | |
| 10,534,439 B2 | 1/2020 | Raffa et al. | |
| 10,545,584 B2 | 1/2020 | Tome et al. | |
| 10,564,714 B2 | 2/2020 | Marggraff et al. | |
| 10,565,448 B2 * | 2/2020 | Bell | G06V 40/193 |
| 10,573,067 B1 | 2/2020 | Naik et al. | |
| 10,642,368 B2 | 5/2020 | Chen | |
| 10,645,332 B2 | 5/2020 | Zhang | |
| 10,664,043 B2 | 5/2020 | Ikuta et al. | |
| 10,664,048 B2 | 5/2020 | Cieplinski et al. | |
| 10,664,050 B2 | 5/2020 | Alcaide et al. | |
| 10,671,241 B1 | 6/2020 | Jia et al. | |
| 10,678,403 B2 * | 6/2020 | Duarte | G06F 3/0482 |
| 10,691,216 B2 | 6/2020 | Geisner et al. | |
| 10,698,562 B1 | 6/2020 | Zhou et al. | |
| 10,699,488 B1 | 6/2020 | Terrano | |
| 10,708,965 B1 | 7/2020 | Subramanian et al. | |
| 10,712,900 B2 | 7/2020 | Osman et al. | |
| 10,732,721 B1 | 8/2020 | Clements | |
| 10,754,434 B2 | 8/2020 | Hall et al. | |
| 10,762,716 B1 | 9/2020 | Paul et al. | |
| 10,768,421 B1 | 9/2020 | Rosenberg et al. | |
| 10,768,693 B2 | 9/2020 | Powderly et al. | |
| 10,776,933 B2 | 9/2020 | Faulkner | |
| 10,846,864 B2 | 11/2020 | Kim et al. | |
| 10,852,814 B1 | 12/2020 | Caron et al. | |
| 10,861,242 B2 | 12/2020 | Lacey et al. | |
| 10,885,701 B1 | 1/2021 | Patel | |
| 10,890,967 B2 | 1/2021 | Stellmach et al. | |
| 10,922,744 B1 | 2/2021 | Mahajan | |
| 10,929,099 B2 | 2/2021 | Querze et al. | |
| 10,936,148 B1 | 3/2021 | Merkl et al. | |
| 10,956,724 B1 | 3/2021 | Terrano | |
| 10,983,663 B2 | 4/2021 | Iglesias | |
| 11,003,308 B1 | 5/2021 | Dryer et al. | |
| 11,017,611 B1 | 5/2021 | Mount et al. | |
| 11,023,035 B1 | 6/2021 | Atlas et al. | |
| 11,055,920 B1 | 7/2021 | Bramwell et al. | |
| 11,079,995 B1 | 8/2021 | Hulbert et al. | |
| 11,082,463 B2 | 8/2021 | Felman | |
| 11,095,857 B1 | 8/2021 | Krol et al. | |
| 11,112,875 B1 | 9/2021 | Zhou et al. | |
| 11,126,850 B1 | 9/2021 | Ichim et al. | |
| 11,138,798 B2 | 10/2021 | Paul et al. | |
| 11,146,909 B1 | 10/2021 | Pinto et al. | |
| 11,175,791 B1 | 11/2021 | Patnaikuni et al. | |
| 11,176,755 B1 | 11/2021 | Tichenor et al. | |
| 11,199,898 B2 | 12/2021 | Blume et al. | |
| 11,200,742 B1 | 12/2021 | Post et al. | |
| 11,204,678 B1 | 12/2021 | Baker et al. | |
| 11,232,643 B1 | 1/2022 | Stevens et al. | |
| 11,243,734 B2 | 2/2022 | Boissière et al. | |
| 11,249,556 B1 | 2/2022 | Schwarz et al. | |
| 11,262,885 B1 | 3/2022 | Burckel | |
| 11,266,919 B2 | 3/2022 | Bear et al. | |
| 11,294,472 B2 | 4/2022 | Tang et al. | |
| 11,294,475 B1 | 4/2022 | Pinchon et al. | |
| 11,307,653 B1 | 4/2022 | Qian et al. | |
| 11,340,756 B2 | 5/2022 | Faulkner et al. | |
| 11,343,420 B1 | 5/2022 | Herz et al. | |
| 11,347,319 B2 | 5/2022 | Goel et al. | |
| 11,348,300 B2 | 5/2022 | Zimmermann et al. | |
| 11,379,033 B2 | 7/2022 | O'hern et al. | |
| 11,380,323 B2 | 7/2022 | Shin et al. | |
| 11,406,896 B1 | 8/2022 | Cheung et al. | |
| 11,409,363 B2 | 8/2022 | Chen et al. | |
| 11,416,080 B2 | 8/2022 | Heo et al. | |
| 11,432,095 B1 | 8/2022 | Satongar et al. | |
| 11,461,973 B2 | 10/2022 | Pinchon | |
| 11,496,571 B2 | 11/2022 | Berliner et al. | |
| 11,531,402 B1 | 12/2022 | Stolzenberg | |
| 11,531,459 B2 | 12/2022 | Poupyrev et al. | |
| 11,557,102 B2 | 1/2023 | Palangie et al. | |
| 11,567,625 B2 | 1/2023 | Faulkner et al. | |
| 11,573,363 B2 | 2/2023 | Zou et al. | |
| 11,574,452 B2 | 2/2023 | Berliner et al. | |
| 11,599,239 B2 | 3/2023 | Rockel et al. | |
| 11,615,596 B2 | 3/2023 | Faulkner et al. | |
| 11,641,460 B1 | 5/2023 | Geusz et al. | |
| 11,669,155 B2 | 6/2023 | Bowman et al. | |
| 11,720,171 B2 | 8/2023 | Pastrana Vicente et al. | |
| 11,726,577 B2 | 8/2023 | Katz | |
| 11,730,226 B2 | 8/2023 | Stolarz et al. | |
| 11,733,824 B2 | 8/2023 | Iskandar et al. | |
| 11,743,215 B1 | 8/2023 | Murillo et al. | |
| 11,762,457 B1 | 9/2023 | Ikkai et al. | |
| 11,762,473 B2 | 9/2023 | Cipoletta et al. | |
| 11,768,544 B2 | 9/2023 | Schwarz et al. | |
| 11,847,748 B2 | 12/2023 | Liu et al. | |
| 11,861,136 B1 | 1/2024 | Faulkner et al. | |
| 11,875,013 B2 | 1/2024 | Lemay et al. | |
| 11,886,643 B2 | 1/2024 | Irie et al. | |
| 11,899,845 B2 | 2/2024 | Chung et al. | |
| 11,909,453 B2 | 2/2024 | Javaudin et al. | |
| 11,914,759 B2 | 2/2024 | Klein et al. | |
| 11,922,588 B2 | 3/2024 | Fillhardt et al. | |
| 11,928,263 B2 | 3/2024 | Jung et al. | |
| 11,934,569 B2 | 3/2024 | Pastrana Vicente et al. | |
| 11,954,242 B2 | 4/2024 | Dascola et al. | |
| 11,983,326 B2 | 5/2024 | Lacey | |
| 11,988,832 B2 | 5/2024 | Singh et al. | |
| 11,989,965 B2 | 5/2024 | Tarighat Mehrabani | |
| 11,995,301 B2 | 5/2024 | Hylak et al. | |
| 12,032,803 B2 | 7/2024 | Pastrana Vicente et al. | |
| 12,062,127 B2 | 8/2024 | Park et al. | |
| 12,099,653 B2 | 9/2024 | Chawda et al. | |
| 12,099,695 B1 | 9/2024 | Smith et al. | |
| 12,112,011 B2 | 10/2024 | Smith et al. | |
| 12,113,948 B1 | 10/2024 | Smith et al. | |
| 12,118,200 B1 | 10/2024 | Shutzberg et al. | |
| 12,154,236 B1 | 11/2024 | Herman et al. | |
| 12,236,546 B1 | 2/2025 | Lipton | |
| 12,394,167 B1 | 8/2025 | Scully et al. | |
| 2001/0047250 A1 | 11/2001 | Schuller et al. | |
| 2002/0015024 A1 | 2/2002 | Westerman et al. | |
| 2002/0024675 A1 | 2/2002 | Foxlin | |
| 2002/0030692 A1 | 3/2002 | Griesert | |
| 2002/0044152 A1 | 4/2002 | Abbott et al. | |
| 2002/0065778 A1 | 5/2002 | Bouet et al. | |
| 2003/0038754 A1 | 2/2003 | Goldstein et al. | |
| 2003/0151611 A1 | 8/2003 | Turpin et al. | |
| 2003/0222924 A1 | 12/2003 | Baron | |
| 2004/0059784 A1 | 3/2004 | Caughey | |
| 2004/0104806 A1 | 6/2004 | Yui et al. | |
| 2004/0230912 A1 | 11/2004 | Clow et al. | |
| 2004/0243926 A1 | 12/2004 | Trenbeath et al. | |
| 2005/0044510 A1 | 2/2005 | Yi | |
| 2005/0062738 A1 | 3/2005 | Handley et al. | |
| 2005/0100210 A1 | 5/2005 | Rice et al. | |
| 2005/0138572 A1 | 6/2005 | Good et al. | |
| 2005/0144570 A1 | 6/2005 | Loverin et al. | |
| 2005/0144571 A1 | 6/2005 | Loverin et al. | |
| 2005/0175218 A1 | 8/2005 | Vertegaal et al. | |
| 2005/0190059 A1 | 9/2005 | Wehrenberg | |
| 2005/0198143 A1 | 9/2005 | Moody et al. | |
| 2005/0216866 A1 | 9/2005 | Rosen et al. | |
| 2005/0231532 A1 | 10/2005 | Suzuki et al. | |
| 2005/0248299 A1 | 11/2005 | Chemel et al. | |
| 2006/0017692 A1 | 1/2006 | Wehrenberg et al. | |
| 2006/0028400 A1 | 2/2006 | Lapstun et al. | |
| 2006/0033724 A1 | 2/2006 | Chaudhri et al. | |
| 2006/0034590 A1 | 2/2006 | Teramoto | |
| 2006/0080702 A1 | 4/2006 | Diez et al. | |
| 2006/0156228 A1 | 7/2006 | Gallo et al. | |
| 2006/0197753 A1 | 9/2006 | Hotelling | |
| 2006/0256083 A1 | 11/2006 | Rosenberg | |

(56)  References Cited

U.S. PATENT DOCUMENTS

| | | |
|---|---|---|
| 2006/0283214 A1 | 12/2006 | Donadon et al. |
| 2007/0172112 A1 | 7/2007 | Paley et al. |
| 2007/0259716 A1 | 11/2007 | Mattice et al. |
| 2008/0181502 A1 | 7/2008 | Yang |
| 2008/0186255 A1 | 8/2008 | Cohen et al. |
| 2008/0211771 A1 | 9/2008 | Richardson |
| 2008/0222710 A1 | 9/2008 | Blagsvedt et al. |
| 2008/0310707 A1 | 12/2008 | Kansal et al. |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0146779 A1 | 6/2009 | Kumar et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2010/0097375 A1 | 4/2010 | Tadaishi et al. |
| 2010/0115459 A1 | 5/2010 | Kinnunen et al. |
| 2010/0177049 A1 | 7/2010 | Levy et al. |
| 2010/0185949 A1 | 7/2010 | Jaeger |
| 2010/0188503 A1 | 7/2010 | Tsai et al. |
| 2010/0188572 A1 | 7/2010 | Card, II |
| 2010/0269145 A1 | 10/2010 | Ingrassia et al. |
| 2010/0293504 A1 | 11/2010 | Hachiya |
| 2010/0302245 A1 | 12/2010 | Best |
| 2010/0328432 A1 | 12/2010 | Tanaka |
| 2010/0332196 A1 | 12/2010 | Fisker et al. |
| 2011/0018895 A1 | 1/2011 | Buzyn et al. |
| 2011/0018896 A1 | 1/2011 | Buzyn et al. |
| 2011/0029185 A1 | 2/2011 | Aoki et al. |
| 2011/0032365 A1 | 2/2011 | Yett |
| 2011/0098029 A1 | 4/2011 | Rhoads et al. |
| 2011/0142321 A1 | 6/2011 | Huffman |
| 2011/0156879 A1 | 6/2011 | Matsushita et al. |
| 2011/0164163 A1 | 7/2011 | Bilbrey et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | Laflèche et al. |
| 2011/0304557 A1 | 12/2011 | Wilburn et al. |
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0124525 A1 | 5/2012 | Kang |
| 2012/0131631 A1 | 5/2012 | Bhogal et al. |
| 2012/0170089 A1 | 7/2012 | Kim et al. |
| 2012/0170840 A1 | 7/2012 | Caruso et al. |
| 2012/0184372 A1 | 7/2012 | Laarakkers et al. |
| 2012/0194547 A1 | 8/2012 | Johnson et al. |
| 2012/0223885 A1 | 9/2012 | Perez |
| 2012/0249416 A1 | 10/2012 | Maciocci et al. |
| 2012/0249741 A1 | 10/2012 | Maciocci et al. |
| 2012/0256956 A1 | 10/2012 | Kasahara |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0304087 A1 | 11/2012 | Walkin et al. |
| 2013/0010062 A1 | 1/2013 | Redmann |
| 2013/0027860 A1 | 1/2013 | Masaki et al. |
| 2013/0088516 A1 | 4/2013 | Ota et al. |
| 2013/0093727 A1 | 4/2013 | Eriksson et al. |
| 2013/0127850 A1 | 5/2013 | Bindon |
| 2013/0148850 A1 | 6/2013 | Matsuda et al. |
| 2013/0169533 A1 | 7/2013 | Jahnke |
| 2013/0190044 A1 | 7/2013 | Kulas |
| 2013/0211843 A1 | 8/2013 | Clarkson |
| 2013/0212470 A1 | 8/2013 | Karunamuni et al. |
| 2013/0222227 A1 | 8/2013 | Johansson et al. |
| 2013/0229345 A1 | 9/2013 | Day et al. |
| 2013/0232430 A1 | 9/2013 | Reitan |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0300648 A1 | 11/2013 | Kim et al. |
| 2013/0300654 A1 | 11/2013 | Seki |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0028548 A1 | 1/2014 | Bychkov et al. |
| 2014/0040832 A1 | 2/2014 | Regelous |
| 2014/0049462 A1* | 2/2014 | Weinberger ............. G06F 3/013 |
| | | 345/156 |
| 2014/0063058 A1 | 3/2014 | Fialho et al. |
| 2014/0068692 A1 | 3/2014 | Archibong et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0092018 A1 | 4/2014 | Geithner |
| 2014/0104206 A1 | 4/2014 | Anderson |
| 2014/0108942 A1 | 4/2014 | Freeman et al. |
| 2014/0114845 A1 | 4/2014 | Rogers et al. |
| 2014/0125584 A1 | 5/2014 | Xun et al. |
| 2014/0126782 A1 | 5/2014 | Takai et al. |
| 2014/0129990 A1 | 5/2014 | Xin et al. |
| 2014/0132499 A1 | 5/2014 | Schwesinger et al. |
| 2014/0132633 A1 | 5/2014 | Fekete et al. |
| 2014/0139426 A1 | 5/2014 | Kryze et al. |
| 2014/0164928 A1 | 6/2014 | Kim |
| 2014/0168453 A1 | 6/2014 | Shoemake et al. |
| 2014/0198017 A1 | 7/2014 | Lamb et al. |
| 2014/0232639 A1* | 8/2014 | Hayashi .................. G06F 3/048 |
| | | 345/156 |
| 2014/0237366 A1 | 8/2014 | Poulos et al. |
| 2014/0247210 A1 | 9/2014 | Henderek et al. |
| 2014/0258942 A1 | 9/2014 | Kutliroff et al. |
| 2014/0267046 A1 | 9/2014 | Ellsworth et al. |
| 2014/0267400 A1 | 9/2014 | Mabbutt et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |

(56) References Cited

U.S. PATENT DOCUMENTS

| | | |
|---|---|---|
| 2015/0135108 A1 | 5/2015 | Pope et al. |
| 2015/0145887 A1 | 5/2015 | Forutanpour et al. |
| 2015/0149929 A1 | 5/2015 | Shepherd et al. |
| 2015/0149961 A1 | 5/2015 | Karakotsios |
| 2015/0153833 A1 | 6/2015 | Pinault et al. |
| 2015/0177937 A1 | 6/2015 | Poletto et al. |
| 2015/0193982 A1 | 7/2015 | Mihelich et al. |
| 2015/0199081 A1 | 7/2015 | Wheeler |
| 2015/0205106 A1 | 7/2015 | Norden |
| 2015/0212576 A1* | 7/2015 | Ambrus .............. G06F 3/0482 |
| | | 345/156 |
| 2015/0220152 A1 | 8/2015 | Tait et al. |
| 2015/0221132 A1 | 8/2015 | Kruglick |
| 2015/0242095 A1 | 8/2015 | Sonnenberg |
| 2015/0254905 A1 | 9/2015 | Ramsby et al. |
| 2015/0262428 A1 | 9/2015 | Tatzgern et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2015/0370404 A1 | 12/2015 | Hu et al. |
| 2015/0381974 A1 | 12/2015 | Hoffman et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0028961 A1 | 1/2016 | Thurairatnam |
| 2016/0050642 A1 | 2/2016 | Brown et al. |
| 2016/0062636 A1 | 3/2016 | Jung et al. |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0189426 A1 | 6/2016 | Thomas et al. |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0291922 A1 | 10/2016 | Montgomerie et al. |
| 2016/0306434 A1 | 10/2016 | Ferrin |
| 2016/0313890 A1 | 10/2016 | Walline et al. |
| 2016/0334940 A1 | 11/2016 | Kandadai et al. |
| 2016/0350973 A1 | 12/2016 | Shapira et al. |
| 2016/0357266 A1* | 12/2016 | Patel .................... G06F 3/0482 |
| 2016/0370858 A1 | 12/2016 | LeppÄnen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0052393 A1 | 2/2017 | Kweon |
| 2017/0052595 A1 | 2/2017 | Poulos et al. |
| 2017/0053383 A1 | 2/2017 | Heo |

| | | |
|---|---|---|
| 2017/0060230 A1 | 3/2017 | Faaborg et al. |
| 2017/0061694 A1 | 3/2017 | Giraldi et al. |
| 2017/0090566 A1 | 3/2017 | George-svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0147180 A1 | 5/2017 | Yoon et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0045963 A1 | 2/2018 | Hoover et al. |
| 2018/0046363 A1 | 2/2018 | Miller et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095634 A1 | 4/2018 | Alexander |
| 2018/0095636 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1* | 6/2018 | Nie ........................ G06F 3/012 |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0188802 A1* | 7/2018 | Okumura ............ G06F 3/04847 |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |

(56) References Cited

U.S. PATENT DOCUMENTS

| | | |
|---|---|---|
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | McHugh et al. |
| 2019/0180504 A1 | 6/2019 | Pomerantz et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332244 A1* | 10/2019 | Beszteri .............. G06F 3/04815 |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097077 A1 | 3/2020 | Nguyen et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0117213 A1 | 4/2020 | Tian et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-Zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0267326 A1 | 8/2020 | Yim |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0318955 A1 | 10/2020 | Sharapov et al. |
| 2020/0319704 A1 | 10/2020 | Kathuria et al. |
| 2020/0328913 A1 | 10/2020 | Wyas et al. |
| 2020/0356221 A1 | 11/2020 | Behzadi et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0401687 A1 | 12/2020 | Mak |
| 2021/0011556 A1 | 1/2021 | Atlas et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0132687 A1 | 5/2021 | Luo et al. |
| 2021/0134248 A1 | 5/2021 | Wan et al. |
| 2021/0142552 A1 | 5/2021 | Kimura et al. |
| 2021/0158624 A1 | 5/2021 | Moon et al. |
| 2021/0165484 A1 | 6/2021 | Sugihara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |
| 2021/0225043 A1 | 7/2021 | Tang et al. |
| 2021/0227601 A1 | 7/2021 | Eom et al. |
| 2021/0241483 A1 | 8/2021 | Dryer et al. |

(56) References Cited

U.S. PATENT DOCUMENTS

| | | |
|---|---|---|
| 2021/0248674 A1 | 8/2021 | Ogunbunmi |
| 2021/0272367 A1 | 9/2021 | Richter |
| 2021/0272537 A1 | 9/2021 | Mak |
| 2021/0279967 A1 | 9/2021 | Gernoth et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0358294 A1 | 11/2021 | Parashar et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0027115 A1 | 1/2022 | Haapoja et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0086203 A1 | 3/2022 | Morris et al. |
| 2022/0091722 A1 | 3/2022 | Vicente et al. |
| 2022/0091723 A1 | 3/2022 | Faulkner et al. |
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121344 A1 | 4/2022 | Pastrana Vicente et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155863 A1 | 5/2022 | Wang et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0207840 A1 | 6/2022 | Cansizoglu et al. |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0236801 A1 | 7/2022 | Serbanati et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0253125 A1 | 8/2022 | Wallen et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0319134 A1 | 10/2022 | Rodrigues et al. |
| 2022/0326837 A1 | 10/2022 | Dessero et al. |
| 2022/0335697 A1 | 10/2022 | Harding et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0392169 A1 | 12/2022 | Simpson et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0092282 A1 | 3/2023 | Boesel et al. |
| 2023/0092874 A1 | 3/2023 | Krivoruchko et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0314801 A1 | 10/2023 | Bove et al. |
| 2023/0316634 A1 | 10/2023 | Chiu et al. |
| 2023/0325004 A1 | 10/2023 | Burns et al. |

(56) References Cited

U.S. PATENT DOCUMENTS

| | | |
|---|---|---|
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2024/0012530 A1 | 1/2024 | Lin et al. |
| 2024/0037886 A1 | 2/2024 | Chiu et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0119682 A1 | 4/2024 | Rudman et al. |
| 2024/0135612 A1 | 4/2024 | Hold-geoffroy et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0265656 A1 | 8/2024 | Victor-Faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0297919 A1 | 9/2024 | Berliner et al. |
| 2024/0310971 A1 | 9/2024 | Kawashima et al. |
| 2024/0329797 A1 | 10/2024 | Hylak et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |
| 2025/0199656 A1 | 6/2025 | Lipton et al. |
| 2025/0200901 A1 | 6/2025 | Ren et al. |
| 2025/0209744 A1 | 6/2025 | Piemonte et al. |
| 2025/0209753 A1 | 6/2025 | Piemonte et al. |
| 2025/0224811 A1 | 7/2025 | Lindmeier et al. |
| 2025/0232541 A1 | 7/2025 | Chand et al. |
| 2025/0258577 A1 | 8/2025 | Palangie et al. |

FOREIGN PATENT DOCUMENTS

| | | |
|---|---|---|
| CN | 104714771 A | 6/2015 |
| CN | 104981681 A | 10/2015 |
| CN | 105264461 A | 1/2016 |
| CN | 105264478 A | 1/2016 |
| CN | 106990838 A | 7/2017 |
| CN | 108519818 A | 9/2018 |
| CN | 108633307 A | 10/2018 |
| CN | 110413171 A | 11/2019 |
| CN | 110476142 A | 11/2019 |
| CN | 110673718 A | 1/2020 |
| CN | 110830786 A | 2/2020 |
| CN | 111033572 A | 4/2020 |
| CN | 111213183 A | 5/2020 |
| CN | 111580652 A | 8/2020 |
| CN | 111913565 A | 11/2020 |
| CN | 112068757 A | 12/2020 |
| CN | 113168737 A | 7/2021 |
| CN | 109491508 B | 8/2022 |
| CN | 115309271 A | 11/2022 |
| CN | 116132905 A | 5/2023 |
| CN | 117043722 A | 11/2023 |

(56) References Cited

FOREIGN PATENT DOCUMENTS

| | | | |
|---|---|---|---|
| CN | 117857981 A | 4/2024 |
| CN | 118102204 A | 5/2024 |
| DE | 102016125811 A1 | 11/2017 |
| DE | 102020128536 A1 | 5/2021 |
| EP | 0816983 A2 | 1/1998 |
| EP | 1530115 A2 | 5/2005 |
| EP | 1562021 A1 | 8/2005 |
| EP | 2393056 A1 | 12/2011 |
| EP | 2458486 A1 | 5/2012 |
| EP | 2551763 A1 | 1/2013 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3306444 A1 | 4/2018 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |
| EP | 3654147 A1 | 5/2020 |
| EP | 4155867 A1 | 3/2023 |
| EP | 3688726 B1 | 8/2023 |
| GB | 2540791 A | 2/2017 |
| JP | H06-4596 A | 1/1994 |
| JP | H10-51711 A | 2/1998 |
| JP | H10-78845 A | 3/1998 |
| JP | H11289555 A | 10/1999 |
| JP | 2000-163031 A | 6/2000 |
| JP | 2002-342033 A | 11/2002 |
| JP | 2004-510239 A | 4/2004 |
| JP | 2005-215144 A | 8/2005 |
| JP | 2005-333524 A | 12/2005 |
| JP | 2006004093 A | 1/2006 |
| JP | 2006-107048 A | 4/2006 |
| JP | 2006-146803 A | 6/2006 |
| JP | 2006-295236 A | 10/2006 |
| JP | 2011-203880 A | 10/2011 |
| JP | 2012-234550 A | 11/2012 |
| JP | 2013-196158 A | 9/2013 |
| JP | 2013178639 A | 9/2013 |
| JP | 2013-254358 A | 12/2013 |
| JP | 2013-257716 A | 12/2013 |
| JP | 2014-021565 A | 2/2014 |
| JP | 2014-059840 A | 4/2014 |
| JP | 2014-71663 A | 4/2014 |
| JP | 2014-099184 A | 5/2014 |
| JP | 2014-514652 A | 6/2014 |
| JP | 2014-514653 A | 6/2014 |
| JP | 2015-056173 A | 3/2015 |
| JP | 2015-515040 A | 5/2015 |
| JP | 2015-118332 A | 6/2015 |
| JP | 2015-222565 A | 12/2015 |
| JP | 2016-096513 A | 5/2016 |
| JP | 2016-194744 A | 11/2016 |
| JP | 2017-27206 A | 2/2017 |
| JP | 2017-58528 A | 3/2017 |
| JP | 2017-126009 A | 7/2017 |
| JP | 2017-525002 A | 8/2017 |
| JP | 2017531221 A | 10/2017 |
| JP | 2018-5516 A | 1/2018 |
| JP | 2018-5517 A | 1/2018 |
| JP | 2018-041477 A | 3/2018 |
| JP | 2018514005 A | 5/2018 |
| JP | 2018-088118 A | 6/2018 |
| JP | 2018101019 A | 6/2018 |
| JP | 2018-106499 A | 7/2018 |
| JP | 2019-040333 A | 3/2019 |
| JP | 2019-515361 A | 6/2019 |
| JP | 2019-169154 A | 10/2019 |
| JP | 2019-175449 A | 10/2019 |
| JP | 2019-527881 A | 10/2019 |
| JP | 2019-532382 A | 11/2019 |
| JP | 2019-536131 A | 12/2019 |
| JP | 202503595 A | 1/2020 |
| JP | 2020-086913 A | 6/2020 |
| JP | 2022-53334 A | 4/2022 |
| JP | 2022175629 A | 11/2022 |
| JP | 2023052278 A | 4/2023 |
| KR | 10-2011-0017236 A | 2/2011 |
| KR | 10-2011-0128487 A | 11/2011 |
| KR | 20140097654 A | 8/2014 |
| KR | 10-2016-0012139 A | 2/2016 |
| KR | 20170027240 A | 3/2017 |
| KR | 20180102171 A | 9/2018 |
| KR | 10-2019-0100957 A | 8/2019 |
| KR | 20200010296 | 1/2020 |
| KR | 20200035103 | 4/2020 |
| KR | 20200110788 A | 9/2020 |
| KR | 20200135496 A | 12/2020 |
| KR | 10-2021-0083016 A | 7/2021 |
| KR | 10-2021-0123530 A | 10/2021 |
| WO | 2010/026519 A1 | 3/2010 |
| WO | 2011/008638 A1 | 1/2011 |
| WO | 2012/145180 A1 | 10/2012 |
| WO | 2013/169849 A2 | 11/2013 |
| WO | 2013/184447 A2 | 12/2013 |
| WO | 2014/105276 A1 | 7/2014 |
| WO | 2014/190106 A1 | 11/2014 |
| WO | 2014/203301 A1 | 12/2014 |
| WO | 2015/195216 A1 | 12/2015 |
| WO | 2016/014877 A1 | 1/2016 |
| WO | 2016118344 A1 | 7/2016 |
| WO | 2016/126522 A1 | 8/2016 |
| WO | 2017/024142 A1 | 2/2017 |
| WO | 2017/088487 A1 | 6/2017 |
| WO | 2018/005557 A1 | 1/2018 |
| WO | 2018046957 A2 | 3/2018 |
| WO | 2018090060 A1 | 5/2018 |
| WO | 2018/106299 A1 | 6/2018 |
| WO | 2018/116556 A1 | 6/2018 |
| WO | 2018/125428 A1 | 7/2018 |
| WO | 2018/175735 A1 | 9/2018 |
| WO | 2018/213801 A1 | 11/2018 |
| WO | 2019/074771 A1 | 4/2019 |
| WO | 2019/142560 A1 | 7/2019 |
| WO | 2019/152286 A2 | 8/2019 |
| WO | 2019172678 A1 | 9/2019 |
| WO | 2019/217163 A1 | 11/2019 |
| WO | 2019213111 A1 | 11/2019 |
| WO | 2020/066682 A1 | 4/2020 |
| WO | 2020/105349 A1 | 5/2020 |
| WO | 2020/121483 A1 | 6/2020 |
| WO | 2020/179027 A1 | 9/2020 |
| WO | 2021061349 A1 | 4/2021 |
| WO | 2021061351 A1 | 4/2021 |
| WO | 2021133053 A1 | 7/2021 |
| WO | 2021/173839 A1 | 9/2021 |
| WO | 2021/202783 A1 | 10/2021 |
| WO | 2022/046340 A1 | 3/2022 |
| WO | 2022/055822 A1 | 3/2022 |
| WO | 2022/066399 A1 | 3/2022 |
| WO | 2022/066535 A2 | 3/2022 |
| WO | 2022/067075 A1 | 3/2022 |
| WO | 2022055821 A1 | 3/2022 |
| WO | 2022067343 A2 | 3/2022 |
| WO | 2022072187 A2 | 4/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2022/204664 A1 | 9/2022 |
| WO | 2022192040 A1 | 9/2022 |
| WO | 2022208797 A1 | 10/2022 |
| WO | 2023043646 A1 | 3/2023 |
| WO | 2023/096940 A2 | 6/2023 |
| WO | 2023/141535 A1 | 7/2023 |

(56)                    References Cited

OTHER PUBLICATIONS

Final Office Action received for U.S. Appl. No. 15/644,639, mailed on Sep. 19, 2019, 12 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Supplemental Notice of Allowance received for U.S. Appl. No. 14/531,874, mailed on Jul. 26, 2017, 6 pages.
Bohn, Dieter, "Rebooting WebOS: How LG Rethought the Smart TV", The Verge, Available online at: <http://www.theverge.com/2014/1/6/5279220/rebooting-webos-how-lg-rethought-the-smart-tv>, Jan. 6, 2014, 5 pages.
Fatima et al., "Eye Movement Based Human Computer Interaction", 3rd International Conference on Recent Advances in Information Technology (RAIT), Mar. 3, 2016, pp. 489-494.
Grey, Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Notice of Allowance received for U.S. Appl. No. 17/123,000, mailed on May 27, 2022, 8 pages.
Final Office Action received for U.S. Appl. No. 17/816,314, mailed on Jan. 20, 2023, 11 pages.
International Search Report received for PCT Patent Application No. PCT/US2021/071518, mailed on Feb. 25, 2022, 7 pages.
Non-Final Office Action received for U.S. Appl. No. 17/479,791, mailed on May 11, 2022, 18 pages.
Non-Final Office Action received for U.S. Appl. No. 17/816,314, mailed on Sep. 23, 2022, 10 pages.
Notice of Allowance received for U.S. Appl. No. 17/123,000, mailed on Sep. 19, 2022, 7 pages.
Notice of Allowance received for U.S. Appl. No. 17/479,791, mailed on Nov. 17, 2022, 9 pages.
Corrected Notice of Allowability received for U.S. Appl. No. 17/479,791, mailed on May 19, 2023, 2 pages.
Non-Final Office Action received for U.S. Appl. No. 17/816,314, mailed on Jul. 6, 2023, 10 pages.

Notice of Allowance received for U.S. Appl. No. 17/479,791, mailed on Mar. 13, 2023, 9 pages.
International Search Report received for PCT Application No. PCT/US2023/060052, mailed on May 24, 2023, 6 pages.
Non-Final Office Action received for U.S. Appl. No. 18/154,697, mailed on Nov. 24, 2023, 10 pages.
Non-Final Office Action received for U.S. Appl. No. 18/336,770, mailed on Jun. 5, 2024, 12 pages.
Notice of Allowance received for U.S. Appl. No. 17/816,314, mailed on Jan. 4, 2024, 6 pages.
Simple Modal Window With Background Blur Effect, Available online at: <http://web.archive.org/web/20160313233427/ https://www.cssscript.com/simple-modal-window-with-background-blur-effect/ > , Mar. 13, 2016, 5 pages.
Yamada, Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html > [Search Date Aug. 22, 2023], Sep. 20, 2021, 8 pages (1 page of English Abstract and 7 pages of Official Copy).
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/905,483, mailed on Mar. 27, 2024, 16 pages.
Non-Final Office Action received for U.S. Appl. No. 17/933,020, mailed on Jan. 30, 2025, 26 pages.
Non-Final Office Action received for U.S. Appl. No. 17/934,104, mailed on Mar. 25, 2024, 26 pages.
Non-Final Office Action received for U.S. Appl. No. 18/119,219, mailed on Mar. 28, 2024, 15 pages.
Non-Final Office Action received for U.S. Appl. No. 18/304,290, mailed on Mar. 5, 2025, 111 Pages (Official Copy Only).
Non-Final Office Action received for U.S. Appl. No. 18/317,893, mailed on Apr. 25, 2024, 18 pages.
Non-Final Office Action received for U.S. Appl. No. 18/327,844, mailed on May 17, 2024, 20 pages.
Non-Final Office Action received for U.S. Appl. No. 18/424,644, mailed on Jan. 29, 2025, 18 pages.
Non-Final Office Action received for U.S. Appl. No. 18/427,434, mailed on Nov. 21, 2024, 17 pages.
Non-Final Office Action received for U.S. Appl. No. 18/429,301, mailed on Jun. 12, 2024, 28 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/407,675, mailed on Aug. 20, 2024, 7 pages.
Notice of Allowance received for U.S. Appl. No. 17/407,675, mailed on Dec. 11, 2024, 8 pages.
Notice of Allowance received for U.S. Appl. No. 17/469,788, mailed on Feb. 5, 2025, 5 pages.
Notice of Allowance received for U.S. Appl. No. 17/469,788, mailed on Oct. 15, 2024, 7 pages.
Notice of Allowance received for U.S. Appl. No. 17/655,347, mailed on Feb. 20, 2025, 7 pages.
Notice of Allowance received for U.S. Appl. No. 17/655,347, mailed on Oct. 9, 2024, 7 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.

(56)                References Cited

OTHER PUBLICATIONS

Notice of Allowance received for U.S. Appl. No. 17/814,455, mailed on Oct. 7, 2024, 10 pages.
Notice of Allowance received for U.S. Appl. No. 17/814,462, mailed on Feb. 26, 2025, 8 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.
Notice of Allowance received for U.S. Appl. No. 18/317,893, mailed on Jan. 13, 2025, 11 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/473,180, mailed on Aug. 22, 2024, 13 pages.
Notice of Allowance received for U.S. Appl. No. 18/473,180, mailed on Jan. 2, 2025, 12 pages.
Notice of Allowance received for U.S. Appl. No. 18/668,032, mailed on Jan. 16, 2025, 9 pages.
Open Source Voxel Editor for Windows, Mac, Linux, iOS, and Android, GOXEL [online]. Goxel by Guillaume Chereau, Available Online at: <URL: https://goxel.xyz/>, [retrieved on Apr. 25, 2024], 2024, 3 pages.
POP 2 3D Scanner (Infrared Light I Precision 0.05mm), Revpoint [online]. Revopoint 3D,, <Url: https://global.revopoint3d.com/products/face-3d-scanner-pop2?_ga=2.182721893.277596832. 1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Reality Scan, Unreal Engine [online], [retrieved on Jun. 14, 2024]. Retrieved from the Internet: <URL: https://www. unrealengine.com/en-US/realityscan>, 11 pages.
RealityScan Available Now I Capture the World and Create Your Own, YouTube [online]. YouTube, Dec. 1, 2022 [retrieved on Jun. 14, 2024]. Retrieved from the Internet: <URL: https://www.youtube.com/watch?v=fXLOMOWWBJQ>, 2 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
ShareVOX, Phoria [online]. Phoria Pty Ltd, Available Online at: <URL: https://www.phoria.com.au/projects/sharevox/>, [retrieved on Apr. 25, 2024], 2024, 2 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.
VoxEdit Beta Tutorial—Introduction and How to Animate Voxel Creations, YouTube [online], Google LLC, Available Online at: <URL: https://www.youtube.com/watch?v=fqcArJWtyqM>, [retrieved on Apr. 25, 2024], 2024, 2 pages.
Corrected Notice of Allowability received for U.S. Appl. No. 18/146,234, mailed on Mar. 20, 2025, 2 Pages.
Non-Final Office Action received for U.S. Appl. No. 18/057,172, mailed on Mar. 14, 2025, 22 pages.

Non-Final Office Action received for U.S. Appl. No. 18/327,844, mailed on Mar. 24, 2025, 27 Pages.
Adding Environments, Available online at: https://manual.keyshot.com/manual/environments/adding-environments/, [retrieved on Jun. 9, 2023], 2 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/ portable-3d-scanners/artec-leo>, 39 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Corrected Notice of Allowability received for U.S. Appl. No. 17/469,788, mailed on Feb. 12, 2025, 2 pages.
Corrected Notice of Allowability received for U.S. Appl. No. 18/146,234, mailed on Feb. 6, 2025, 2 pages.
Corrected Notice of Allowance received for U.S. Appl. No. 17/407,675, mailed on Dec. 24, 2024, 2 pages.
Corrected Notice of Allowance received for U.S. Appl. No. 18/119,219, mailed on Sep. 11, 2024, 2 pages.
Corrected Notice of Allowance received for U.S. Appl. No. 18/152,656, mailed on Dec. 20, 2024, 5 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
Ex Parte Quayle Action received for U.S. Appl. No. 17/655,347, mailed on Jul. 8, 2024, 6 pages.
Extended European Search Report received for European Patent Application No. 24158036.4, mailed on Jul. 18, 2024, 12 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/407,675, mailed on May 22, 2024, 18 pages.
Final Office Action received for U.S. Appl. No. 17/469,788, mailed on Nov. 16, 2023, 24 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 18/327,844, mailed on Nov. 29, 2024, 25 pages.
How to Use Your Phone or Tablet in VR! I iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Patent Application No. PCT/US2021/020062, mailed on May 4, 2021, 4 pages.
International Search Report received for PCT Patent Application No. PCT/US2021/049520, mailed on Apr. 8, 2022, 8 pages.
International Search Report received for PCT Patent Application No. PCT/US2022/071208, mailed on Aug. 18, 2022, 9 pages.
International Search Report received for PCT Patent Application No. PCT/US2022/075481, mailed on Feb. 7, 2023, 7 pages.
International Search Report received for PCT Patent Application No. PCT/US2022/075482, mailed on Feb. 13, 2023, 7 pages.
International Search Report received for PCT Patent Application No. PCT/US2022/076808, mailed on Mar. 28, 2023, 6 pages.
International Search Report received for PCT Patent Application No. PCT/US2022/082379, mailed on May 30, 2023, 7 pages.

(56) References Cited

OTHER PUBLICATIONS

International Search Report received for PCT Patent Application No. PCT/US2023/019309, mailed on Sep. 1, 2023, 6 pages.
International Search Report received for PCT Patent Application No. PCT/US2023/060429, mailed on Jun. 28, 2023, 7 pages.
International Search Report received for PCT Patent Application No. PCT/US2023/074955, mailed on Feb. 1, 2024, 6 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2024/012828, mailed on May 6, 2024.
International Search Report received for PCT Patent Application No. PCT/US2024/030661, mailed on Nov. 4, 2024, 5 pages.
International Search Report received for PCT Patent Application No. PCT/US2024/032455, mailed on Sep. 25, 2024, 4 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/1282665402812608513>, [retrieved on Apr. 25, 2024], 2024, 1 page.
Light Manager, Available online at: https://manual.keyshot.com/manual/lighting/lighting-manager/, [retrieved on Jun. 9, 2023], 3 pages.
MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Non-Final Office Action received for U.S. Appl. No. 17/407,675, mailed on Sep. 11, 2023, 16 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/807,226, mailed on Jun. 26, 2023, 21 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.
Cas and Chary XR, "Oculus Go & Your Phone as 2nd Controller!!—An Inexpensive Way to Play PC VR Games", posted on Mar. 8, 2019, https://www.youtube.com/watch?v=i_iRVa0kemw, 2019, 4 pages.
Choe, et al., "Augmented-Reality-Based 3D Emotional Messenger for Dynamic User Communication with Smart Devices", Electronics, vol. 9, No. 1127, Jul. 10, 2020, 15 pages.
Didehkhorshid, et al., "Text Input in Virtual Reality Using a Tracked Drawing Tablet", HCII 2020, LNCS 12428, 2020, pp. 314-329.
Edmiston, et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Gamedbharat, "I Want to Rotate a Object on Double Tap, Can Any One Help Me With This?", posted on Jul. 26, 2017, https://discussions.

unity.com/t/i-want-to-rotate-a-object-on-double-tap-can-any-one-help-me-with-this/192010, 2017, 3 pages.
Huang, et al., "Proxy-Based Security Audit System for Remote Desktop Access", Computer Communications and Networks, ICCCN 2009. Proceedings of 18th International Conference on, IEEE, Piscataway, NJ, USA, Aug. 3, 2009, 5 pages.
Jones, et al., "The Future of Virtual Museums: On-Line, Immersive, 3D Environments", ProQuest (Technology Collection Database, Dissertations and Theses Database): Technical Literature Search, Jul. 26, 2002, 12 pages.
Lin, et al., "Ubii: Physical World Interaction Through Augmented Reality", Publisher: IEEE, DOI:10.1109/TMC.2016.2567378, May 13, 2016.
Locher, et al., "Mobile Phone and Cloud—a Dream Team for 3D Reconstruction", 2016 IEEE Winter Conference on Applications of Computer Vision (WACV), 2016, pp. 1-8.
Metalnwood, "Using a Tablet for Touch Control, with VR Headset on. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Qi, et al., "PointNet++: Deep Hierarchical Feature Learning on Point Sets in a Metric Space", Stanford University, Jun. 7, 2017, 14 pages.
Ro, et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Slambekova, Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
Strand, Robin, "Surface Skeletons in Grids With Non-cubic Voxels", 2004 IEEE Xplore, Available Online at: <DOI: 10.1109/ICPR.2004.1334195>, Sep. 2004, 5 pages.
Sun, et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Wood, Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxl>, 2 pages.
Writtenhouse, Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.
Yue, et al., "Optimal Region Selection for Stereoscopic Video Subtitle Insertion", IEEE Transactions on Circuits and Systems for Video Technology, vol. 28, No. 11, Nov. 2018, 13 pages.
Corrected Notice of Allowability received for U.S. Appl. No. 18/473,180, mailed on Apr. 1, 2025, 2 pages.
AquaSnap Window Manager: dock, snap, tile, organize [online], Nurgo Software, Available online at: <https://www.nurgo-software.com/products/aquasnap>, [retrieved on Jun. 27, 2023], 5 pages.
Corrected Notice of Allowability received for U.S. Appl. No. 17/448,875, mailed on Apr. 24, 2024, 4 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 17/932,999, mailed on Jan. 23, 2025, 9 pages.
Corrected Notice of Allowability received for U.S. Appl. No. 17/935,095, mailed on Oct. 18, 2024, 3 pages.
Corrected Notice of Allowability received for U.S. Appl. No. 18/154,757, mailed on Aug. 30, 2024, 2 pages.
Corrected Notice of Allowability received for U.S. Appl. No. 18/174,337, mailed on Jan. 15, 2025, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.

(56)     References Cited

OTHER PUBLICATIONS

Corrected Notice of Allowability received for U.S. Appl. No. 18/465,098, mailed on Mar. 13, 2024, 3 pages.
Corrected Notice of Allowability received for U.S. Appl. No. 17/478,593, mailed on Dec. 21, 2022, 2 pages.
European Search Report received for European Patent Application No. 21791153.6, mailed on Mar. 22, 2024, 5 pages.
European Search Report received for European Patent Application No. 21801387.7, mailed on Jul. 10, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Extended European Search Report received for European Patent Application No. 24159868.9, mailed on Oct. 9, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Extended European Search Report received for European Patent Application No. 24190323.6, mailed on Dec. 12, 2024, 9 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
Final Office Action received for U.S. Appl. No. 18/473,196, mailed on Dec. 6, 2024, 22 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/018213, mailed on Jul. 26, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
Non-Final Office Action received for U.S. Appl. No. 18/298,994, mailed on Mar. 7, 2025, 26 pages.
International Search Report received for PCT Patent Application No. PCT/US2021/050948, mailed on Mar. 4, 2022, 6 pages.
International Search Report received for PCT Patent Application No. PCT/US2021/071595, mailed on Mar. 17, 2022, 7 pages.

International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2022/076985, mailed on Feb. 20, 2023, 5 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.
International Search Report received for PCT Patent Application No. PCT/US2024/039190, mailed on Nov. 22, 2024, 5 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 17/935,095, mailed on Jun. 22, 2023, 15 pages.
Non-Final Office Action received for U.S. Appl. No. 18/149,640, mailed on Jan. 15, 2025, 17 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/322,469, mailed on Nov. 15, 2024, 34 pages.
Non-Final Office Action received for U.S. Appl. No. 18/375,280, mailed on Nov. 27, 2024, 17 pages.
Non-Final Office Action received for U.S. Appl. No. 18/473,196, mailed on Aug. 16, 2024, 21 pages.
Notice of Allowance received for U.S. Appl. No. 18/154,757, mailed on Aug. 26, 2024, 12 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/932,655, mailed on Jan. 24, 2024, 7 pages.

(56) References Cited

OTHER PUBLICATIONS

Notice of Allowance received for U.S. Appl. No. 17/932,655, mailed on Sep. 29, 2023, 7 pages.

Notice of Allowance received for U.S. Appl. No. 17/932,999, mailed on Sep. 12, 2024, 9 pages.

Notice of Allowance received for U.S. Appl. No. 17/935,095, mailed on Jul. 3, 2024, 9 pages.

Notice of Allowance received for U.S. Appl. No. 18/154,697, mailed on Aug. 6, 2024, 8 pages.

Notice of Allowance received for U.S. Appl. No. 18/154,697, mailed on Dec. 3, 2024, 7 pages.

Notice of Allowance received for U.S. Appl. No. 18/154,757, mailed Jan. 23, 2024, 10 pages.

Notice of Allowance received for U.S. Appl. No. 18/154,757, mailed on Jan. 23, 2025, 12 pages.

Notice of Allowance received for U.S. Appl. No. 18/154,757, mailed on May 10, 2024, 12 pages.

Notice of Allowance received for U.S. Appl. No. 18/174,337, mailed on Jan. 2, 2025, 8 pages.

Notice of Allowance received for U.S. Appl. No. 18/336,770, mailed on Nov. 29, 2024, 9 pages.

Notice of Allowance received for U.S. Appl. No. 18/421,675, mailed on Apr. 11, 2024, 9 pages.

Notice of Allowance received for U.S. Appl. No. 18/421,675, mailed on Jul. 31, 2024, 8 pages.

Notice of Allowance received for U.S. Appl. No. 18/421,827, mailed on Aug. 14, 2024, 10 pages.

Notice of Allowance received for U.S. Appl. No. 18/423,187, mailed on Jun. 5, 2024, 9 pages.

Notice of Allowance received for U.S. Appl. No. 18/463,739, mailed on Feb. 1, 2024, 10 pages.

Notice of Allowance received for U.S. Appl. No. 18/463,739, mailed on Jun. 17, 2024, 9 pages.

Notice of Allowance received for U.S. Appl. No. 18/463,739, mailed on Oct. 30, 2023, 11 pages.

Notice of Allowance received for U.S. Appl. No. 18/465,098, mailed on Jun. 20, 2024, 8 pages.

Notice of Allowance received for U.S. Appl. No. 18/465,098, mailed on Mar. 4, 2024, 6 pages.

Notice of Allowance received for U.S. Appl. No. 18/465,098, mailed on Nov. 17, 2023, 8 pages.

Notice of Allowance received for U.S. Appl. No. 18/515,188, mailed on Nov. 27, 2024, 9 pages.

Notice of Allowance received for U.S. Appl. No. 18/671,936, mailed on Jan. 15, 2025, 9 pages.

Restriction Requirement received for U.S. Appl. No. 17/932,999, mailed on Oct. 3, 2023, 6 pages.

Restriction Requirement received for U.S. Appl. No. 18/473,187, mailed on Dec. 30, 2024, 5 pages.

Search Report received for Chinese Patent Application No. 202310873465.7, mailed on Feb. 1, 2024, 5 pages (2 pages of English Translation and 3 pages of Official Copy).

Supplemental Notice of Allowance received for U.S. Appl. No. 18/515,188, mailed on Dec. 12, 2024, 2 pages.

Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.

Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.

Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.

Chatterjee et al., "Gaze+Gesture: Expressive, Precise and Targeted Free-Space Interactions", ICMI '15, Nov. 9-13, 2015, 8 pages.

Lin et al., "Towards Naturally Grabbing and Moving Objects in VR", IS&T International Symposium on Electronic Imaging and the Engineering Reality of Virtual Reality, 2016, 6 pages.

McGill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.

Pfeuffer et al., "Gaze + Pinch Interaction in Virtual Reality", In Proceedings of SUI '17, Brighton, United Kingdom, Oct. 16-17, 2017, pp. 99-108.

Pfeuffer et al., "Gaze and Touch Interaction on Tablets", UIST '16, Tokyo, Japan, ACM, Oct. 16-19, 2016, pp. 301-311.

Schenk et al., "SPOCK: A Smooth Pursuit Oculomotor Control Kit", CHI'16 Extended Abstracts, San Jose, CA, USA, Acm, May 7-12, 2016, pp. 2681-2687.

Non-Final Office Action received for U.S. Appl. No. 18/473,196, mailed on Feb. 28, 2025, 20 pages.

Notice of Allowance received for U.S. Appl. No. 18/671,936, mailed on Mar. 5, 2025, 7 pages.

International Search Report received for PCT Patent Application No. PCT/US2023/060592, mailed on Jun. 14, 2023, 7 pages.

Non-Final Office Action received for U.S. Appl. No. 18/153,943, mailed on Dec. 31, 2024, 33 pages.

Notice of Allowance received for U.S. Appl. No. 18/515,188, mailed on Mar. 20, 2025, 9 pages.

European Search Report received for European Patent Application No. 22703771.0, mailed on Feb. 26, 2025, 4 pages.

Final Office Action received for U.S. Appl. No. 17/580,495, mailed on Feb. 12, 2025, 29 pages.

Corrected Notice of Allowability received for U.S. Appl. No. 17/932,999, mailed on Feb. 20, 2025, 2 pages.

Non-Final Office Action received for U.S. Appl. No. 18/645,292, mailed on Feb. 21, 2025, 39 pages.

Macmostvideo, "A Beginner's Guide to selecting Items on Your Mac (#1566)", Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30.

Extended European Search Report received for European Patent Application No. 24217335.9, mailed on Feb. 24, 2025, 8 pages.

Non-Final Office Action received for U.S. Appl. No. 18/174,403, mailed on Mar. 20, 2025, 26 pages.

Notice of Allowance received for U.S. Appl. No. 18/322,469, mailed on Mar. 19, 2025, 14 pages.

Non-Final Office Action received for U.S. Appl. No. 18/988,115, mailed on Feb. 24, 2025, 40 pages.

Extended European Search Report received for European Patent Application No. 25179367.5, mailed on Jul. 1, 2025, 10 pages.

Extended European Search Report received for European Patent Application No. 25169060.8, mailed on May 12, 2025, 10 pages.

Extended European Search Report received for European Patent Application No. 25169059.0, mailed on May 12, 2025, 11 pages.

Extended European Search Report received for European Patent Application No. 25174955.2, mailed on Jun. 25, 2025, 12 pages.

Non-Final Office Action received for U.S. Appl. No. 18/473,198, mailed on Jul. 15, 2025, 13 pages.

Notice of Allowance received for U.S. Appl. No. 18/174,403, mailed on Aug. 21, 2025, 13 pages.

Notice of Allowance received for U.S. Appl. No. 18/894,997, mailed on Aug. 12, 2025, 13 pages.

Non-Final Office Action received for U.S. Appl. No. 18/473,197, mailed on May 1, 2025, 14 pages.

Non-Final Office Action received for U.S. Appl. No. 18/896,227, mailed on May 29, 2025, 14 pages.

Notice of Allowance received for U.S. Appl. No. 18/322,469, mailed on Jul. 7, 2025, 14 pages.

Non-Final Office Action received for U.S. Appl. No. 18/473,187, mailed on May 16, 2025, 15 pages.

Non-Final Office Action received for U.S. Appl. No. 18/473,195, mailed on Jun. 27, 2025, 16 pages.

Non-Final Office Action received for U.S. Appl. No. 18/467,523, mailed on Jun. 17, 2025, 19 pages.

(56) References Cited

OTHER PUBLICATIONS

Non-Final Office Action received for U.S. Appl. No. 18/471,729, mailed on Jun. 17, 2025, 19 pages.

Corrected Notice of Allowability received for U.S. Appl. No. 18/152,656, mailed on Jul. 22, 2025, 2 pages.

Corrected Notice of Allowability received for U.S. Appl. No. 18/988,115, mailed on Jul. 15, 2025, 2 pages.

Corrected Notice of Allowance received for U.S. Appl. No. 18/424,644, mailed on Jun. 24, 2025, 2 pages.

Final Office Action received for U.S. Appl. No. 18/473,196, mailed on Jul. 16, 2025, 20 pages.

Non-Final Office Action received for U.S. Appl. No. 17/905,483, mailed on Jul. 15, 2025, 20 pages.

Non-Final Office Action received for U.S. Appl. No. 18/518,340, mailed on Jul. 22, 2025, 20 pages.

Non-Final Office Action received for U.S. Appl. No. 18/473,176, mailed on May 14, 2025, 23 pages.

Final Office Action received for U.S. Appl. No. 18/149,640, mailed on May 21, 2025, 24 pages.

Non-Final Office Action received for U.S. Appl. No. 18/317,890, mailed on Apr. 17, 2025, 26 pages.

Final Office Action received for U.S. Appl. No. 17/933,020, mailed on May 21, 2025, 28 pages.

Non-Final Office Action received for U.S. Appl. No. 18/317,886, mailed on Apr. 30, 2025, 34 pages.

Non-Final Office Action received for U.S. Appl. No. 18/473,260, mailed on Jun. 27, 2025, 35 pages.

European Search Report received for European Patent Application No. 22723527.2, mailed on May 12, 2025, 4 pages.

International Search Report received for PCT Patent Application No. PCT/US2023/074978, mailed on Apr. 4, 2024, 4 pages.

International Search Report received for PCT Patent Application No. PCT/US2024/012828, mailed on May 6, 2024, 4 pages.

International Search Report received for PCT Patent Application No. PCT/US2024/032109, mailed on Sep. 13, 2024, 4 pages.

International Search Report received for PCT Patent Application No. PCT/US2024/043470, mailed on Oct. 29, 2024, 4 pages.

International Search Report received for PCT Patent Application No. PCT/US2025/011189, mailed on Apr. 23, 2025, 4 pages.

Non-Final Office Action received for U.S. Appl. No. 18/473,184, mailed on Jul. 25, 2025, 40 pages.

Final Office Action received for U.S. Appl. No. 18/645,292, mailed on Jun. 2, 2025, 41 pages.

Non-Final Office Action received for U.S. Appl. No. 18/473,155, mailed on Jul. 10, 2025, 47 pages.

International Search Report received for PCT Patent Application No. PCT/US2023/074960, mailed on Feb. 12, 2024, 6 pages.

International Search Report received for PCT Patent Application No. PCT/US2024/032153, mailed on Nov. 11, 2024, 6 pages.

Notice of Allowance received for U.S. Appl. No. 18/152,656, mailed on Jun. 25, 2025, 6 pages.

Notice of Allowance received for U.S. Appl. No. 18/424,644, mailed on Jun. 11, 2025, 6 pages.

Extended European Search Report received for European Patent Application No. 24221722.2, mailed on Apr. 17, 2025, 7 pages.

International Search Report received for PCT Patent Application No. PCT/US2023/074973, mailed on Mar. 7, 2024, 7 pages.

Notice of Allowance received for U.S. Appl. No. 18/153,943, mailed on Jun. 17, 2025, 7 pages.

Notice of Allowance received for U.S. Appl. No. 18/304,290, mailed on Aug. 20, 2025, 7 pages.

Notice of Allowance received for U.S. Appl. No. 18/988,115, mailed on Jun. 30, 2025, 7 pages.

Non-Final Office Action received for U.S. Appl. No. 18/882,622, mailed on May 22, 2025, 8 pages.

Notice of Allowance received for U.S. Appl. No. 18/473,182, mailed on Apr. 23, 2025, 8 pages.

Notice of Allowance received for U.S. Appl. No. 17/655,521, mailed on Apr. 16, 2025, 8 pages.

Notice of Allowance received for U.S. Appl. No. 18/882,622, mailed on Aug. 27, 2025, 8 pages.

Notice of Allowance received for U.S. Appl. No. 18/896,227, mailed on Jul. 11, 2025, 8 pages.

Notice of Allowance received for U.S. Appl. No. 18/919,095, mailed on Jul. 22, 2025, 8 pages.

Notice of Allowance received for U.S. Appl. No. 18/157,040, mailed on Jun. 24, 2025, 9 pages.

Notice of Allowance received for U.S. Appl. No. 18/427,434, mailed on Apr. 17, 2025, 9 pages.

Notice of Allowance received for U.S. Appl. No. 18/471,850, mailed on Jun. 10, 2025, 9 pages.

Notice of Allowance received for U.S. Appl. No. 18/473,179, mailed on May 8, 2025, 9 pages.

Notice of Allowance received for U.S. Appl. No. 18/473,262, mailed on Jun. 10, 2025, 9 pages.

Applicant-Initiated Interview Summary received for U.S. Appl. No. 18/119,219, mailed on May 21, 2024, 3 pages.

Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.

Final Office Action received for U.S. Appl. No. 17/655,521, mailed on Apr. 10, 2024, 18 pages.

International Search Report received for PCT Patent Application No. PCT/US2022/071228, mailed on Aug. 25, 2022, 6 pages.

International Search Report received for PCT Patent Application No. PCT/US2024/032140, mailed on Sep. 10, 2024, 4 pages.

International Search Report received for PCT Patent Application No. PCT/US2024/032423, mailed on Sep. 25, 2024, 5 pages.

Non-Final Office Action received for U.S. Appl. No. 17/655,521, mailed on Aug. 23, 2023, 13 pages.

Non-Final Office Action received for U.S. Appl. No. 17/655,521, mailed on Nov. 27, 2024, 17 pages.

Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.

VR Design Best Practices, LeapMotion, Aug. 29, 2015, 31 pages.

Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.

Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.

Berard Francois, "A Study on Two-Dimensional Scrolling with Head Motion", Clips-Imag Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.

Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.

Capturing Reality, "Data Sheet RealityCapture TARASQUE 1.2", Wayback Machine, https://web.archive.org/web/20220327110303/https://www.capturingreality.com/assets/Documents/datasheet_TARASQUE_1.2.pdf, Mar. 27, 2022, 5 pages.

Capturing Reality, "RealityCapture tutorial: Complete model in PPI", Youtube, https://www.youtube.com/watch?v=tw6wNNEbH_M, Oct. 14, 2021, 2 pages.

Dhakal et al., "SLAM-Share: Visual Simultaneous Localization and Mapping for Real-time Multi-user Augmented Reality", CoNEXT '22, Dec. 6-9, 2022, Roma, Italy, 14 pages.

Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.

(56)                References Cited

OTHER PUBLICATIONS

Headmaster Introduction, "If You Can Move Your Head, You Can Move Your World", Retrieved from: <https://www.microsoft.com/buxtoncollection/a/pdf/HeadMaster%20Introduction.pdf>, Retrieved on Dec. 26, 2024, 4 pages.

Kim et al., "Pseudo-haptic Button for Improving User Experience of Mid-air Interaction in VR", International Journal of Human-Computer Studies, vol. 168, No. 102907, Aug. 9, 2022, 11 pages.

Kim et al., "Virtual Object Sizes for Efficient and Convenient Mid-air Manipulation", The Visual Computer, vol. 38, No. 9, Jul. 1, 2022, pp. 3463-3474.

Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.

Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.

Lor Cas, "Reality Capture: Exporting Mesh", Youtube, https://www.youtube.com/watch?v=PdvTRa2B_s0, Dec. 10, 2020, 2 pages.

Mendes et al., "Mid-Air Interactions Above Stereoscopic Interactive Tables", IEEE Symposium on 3D User Interfaces (3DUI), Mar. 29-30, 2014, pp. 3-10.

Nunez Angulo et al., "Manual for the Design of Didactic Units in Augmented Reality Using the Cospaces EDU Application", 2020, 75 pages.

Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.

Ran et al., "Multi-User Augmented Reality with Communication Efficient and Spatially Consistent Virtual Objects", CoNEXT '20, Dec. 1-4, 2020, Barcelona, Spain, 13 pages.

Schubert Martin, "Design Sprints at Leap Motion: A Playground of 3D User Interfaces", Ultraleap for Developers [online]. Nov. 8, 2017 [retrieved on Mar. 21, 2025]. Retrieved from the Internet: <URL: https://blog.leapmotion.com/design-playground-3d-user-interfaces/>, 17 pages.

Schuetz Markus, "Interactive Exploration of Point Clouds", Technische Universitat Wien, reposiTUm, https://doi.org/10.34726/hss.2021.91668, Mar. 8, 2021, 119 pages.

Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.

Tolle et al., "Design of Head Movement Controller System (HEMOCS) for Control Mobile Application through Head Pose Movement Detection", Retrieved from:<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/ijim.v10i3.5552>, Retrieved on Dec. 26, 2024, 2016, 5 pages.

Zhuang et al., "Distributed Architecture for 3D Graphics Rendering in Collaborative System", Computer and Modernization, Issue 4, 2017, 5 pages (1 page of English Abstract and 4 pages of Official Copy).

* cited by examiner

Figure 1

Controller 110

Comm. Interface(s) 208

Programming Interface(s) 210

Processing Unit(s) 202

204

I/O Devices 206

Memory 220

Operating System 230

CGR Experience Module 240

Data Obtaining Unit 242

Tracking Unit 242

Eye Tracking Unit 243

Hand Tracking Unit 244

Coordination Unit 246

Data Transmission Unit 246

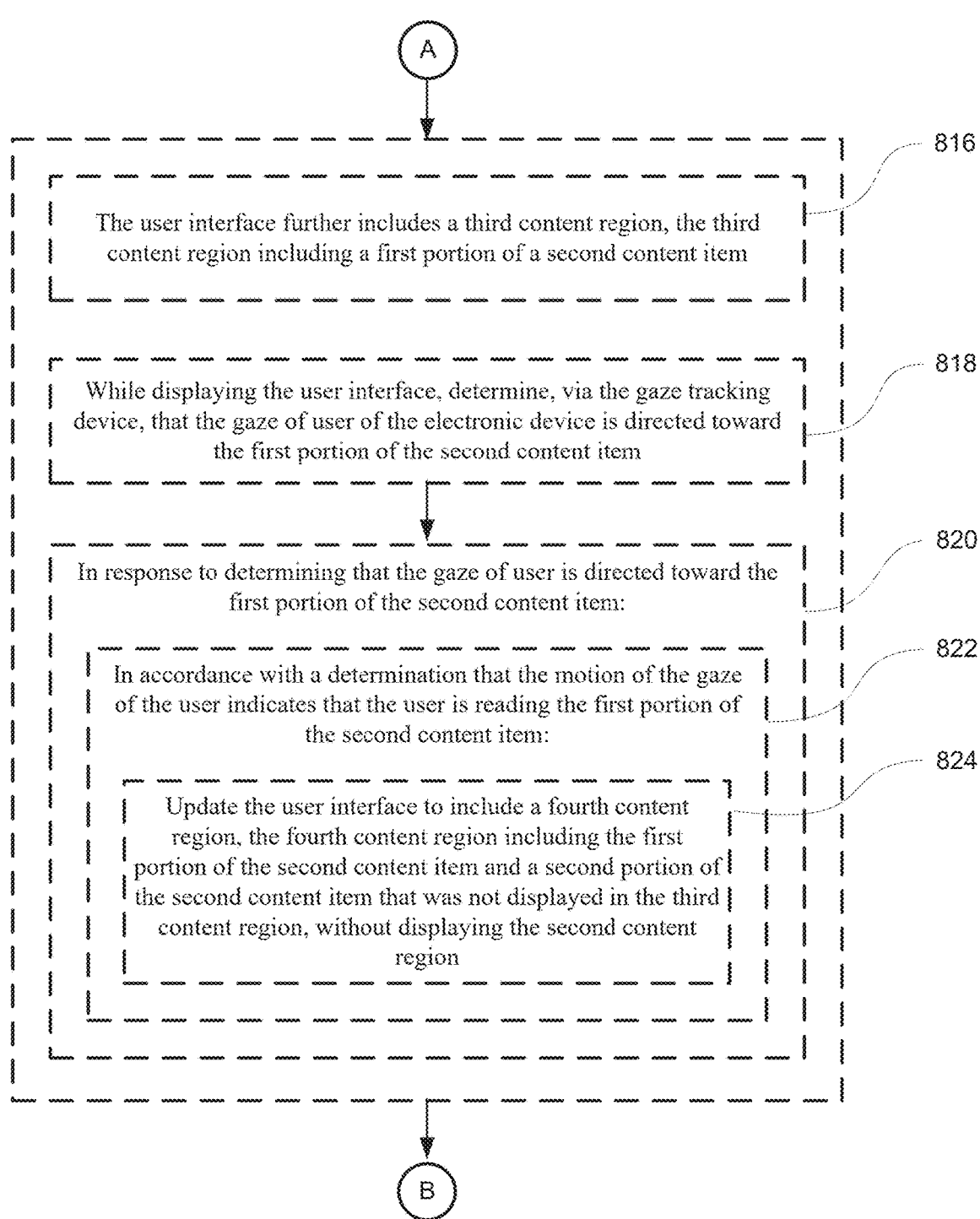

A

816

The user interface further includes a third content region, the third content region including a first portion of a second content item

818

While displaying the user interface, determine, via the gaze tracking device, that the gaze of user of the electronic device is directed toward the first portion of the second content item

820

In response to determining that the gaze of user is directed toward the first portion of the second content item:

822

In accordance with a determination that the motion of the gaze of the user indicates that the user is reading the first portion of the second content item:

824

Update the user interface to include a fourth content region, the fourth content region including the first portion of the second content item and a second portion of the second content item that was not displayed in the third content region, without displaying the second content region

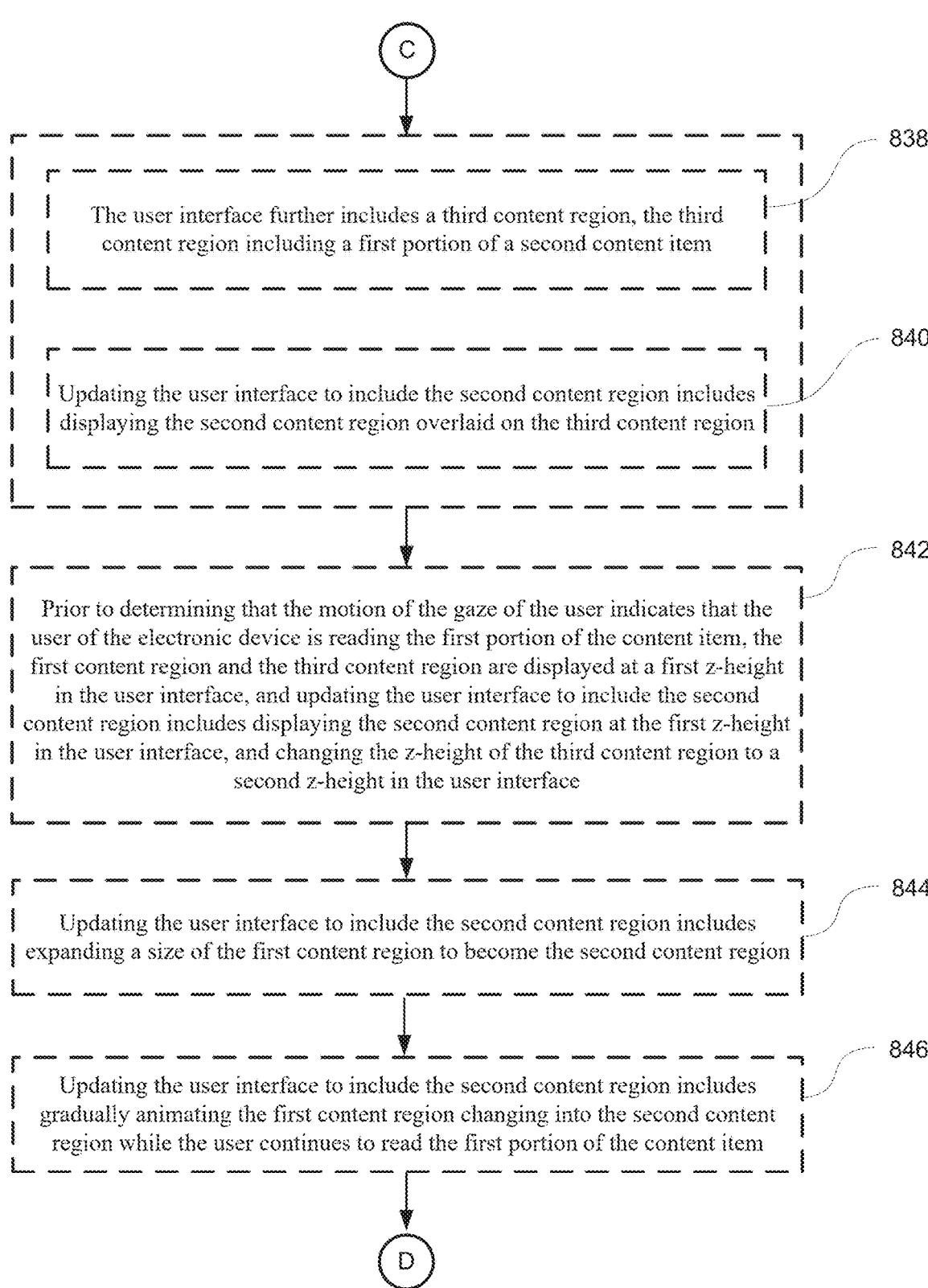

C

838

The user interface further includes a third content region, the third content region including a first portion of a second content item

840

Updating the user interface to include the second content region includes displaying the second content region overlaid on the third content region

842

Prior to determining that the motion of the gaze of the user indicates that the user of the electronic device is reading the first portion of the content item, the first content region and the third content region are displayed at a first z-height in the user interface, and updating the user interface to include the second content region includes displaying the second content region at the first z-height in the user interface, and changing the z-height of the third content region to a second z-height in the user interface

844

Updating the user interface to include the second content region includes expanding a size of the first content region to become the second content region

846

Updating the user interface to include the second content region includes gradually animating the first content region changing into the second content region while the user continues to read the first portion of the content item

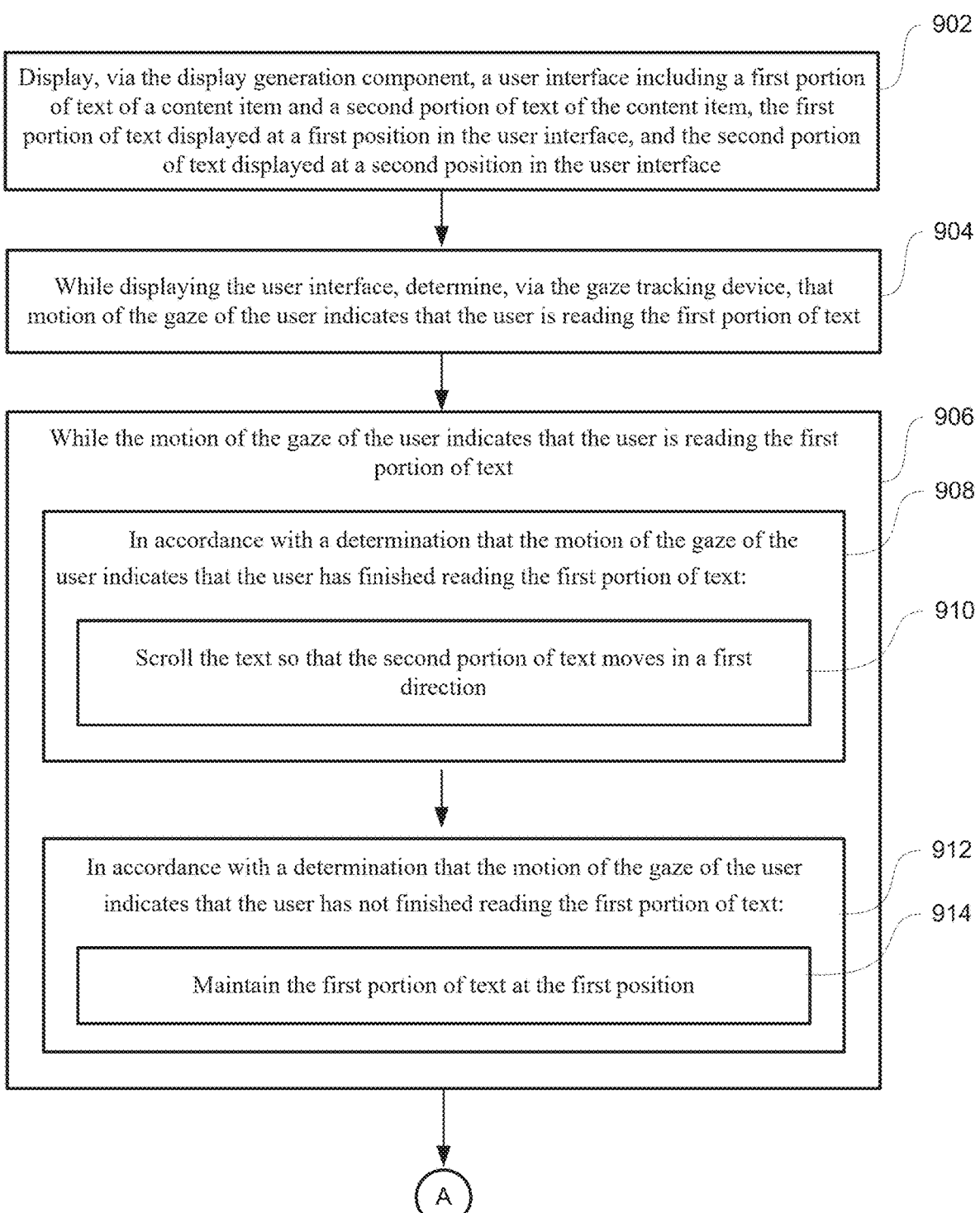

902

Display, via the display generation component, a user interface including a first portion of text of a content item and a second portion of text of the content item, the first portion of text displayed at a first position in the user interface, and the second portion of text displayed at a second position in the user interface

904

While displaying the user interface, determine, via the gaze tracking device, that motion of the gaze of the user indicates that the user is reading the first portion of text

906

While the motion of the gaze of the user indicates that the user is reading the first portion of text

908

In accordance with a determination that the motion of the gaze of the user indicates that the user has finished reading the first portion of text:

910

Scroll the text so that the second portion of text moves in a first direction

912

In accordance with a determination that the motion of the gaze of the user indicates that the user has not finished reading the first portion of text:

914

Maintain the first portion of text at the first position

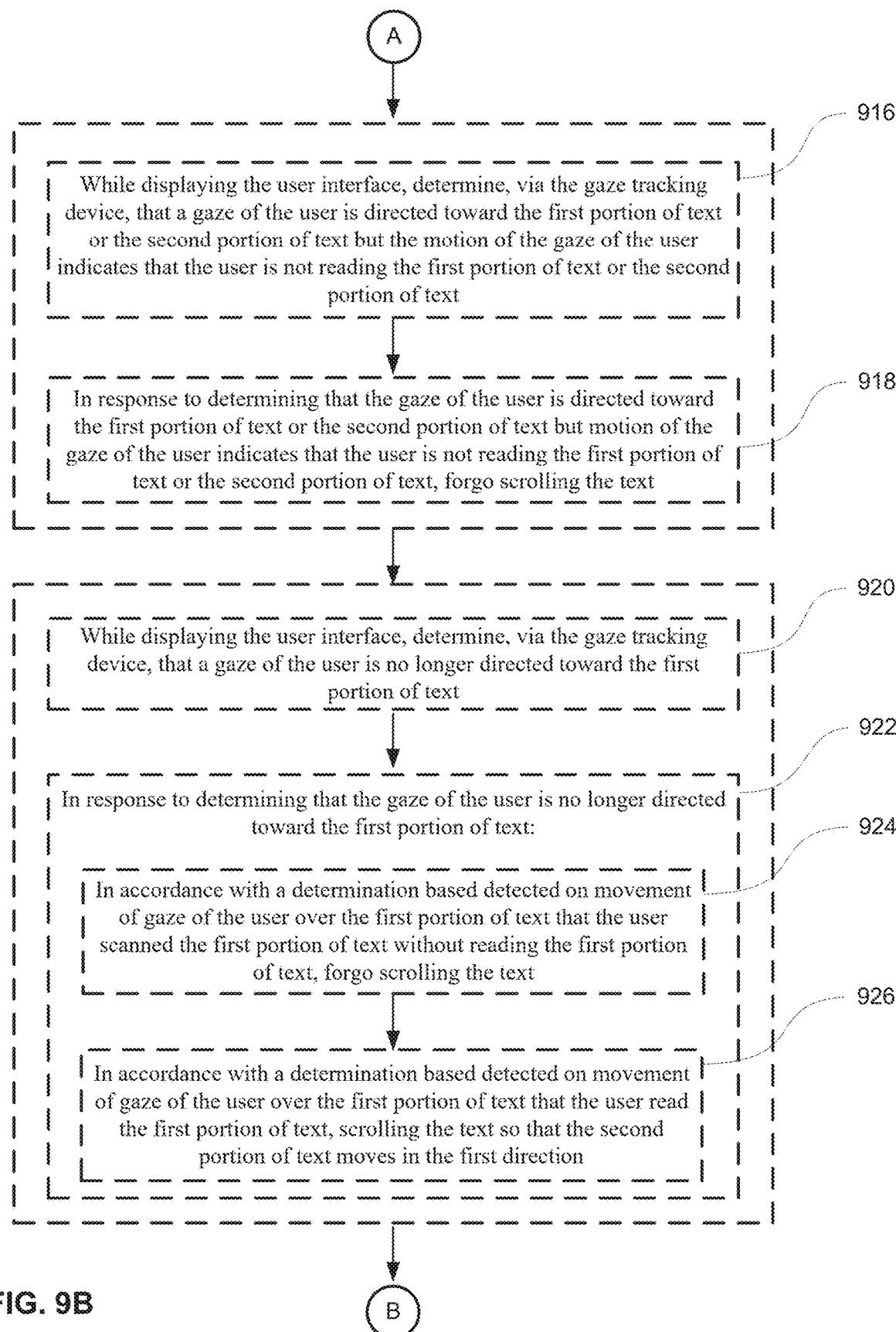

A

While displaying the user interface, determine, via the gaze tracking device, that a gaze of the user is directed toward the first portion of text or the second portion of text but the motion of the gaze of the user indicates that the user is not reading the first portion of text or the second portion of text

916

In response to determining that the gaze of the user is directed toward the first portion of text or the second portion of text but motion of the gaze of the user indicates that the user is not reading the first portion of text or the second portion of text, forgo scrolling the text

918

While displaying the user interface, determine, via the gaze tracking device, that a gaze of the user is no longer directed toward the first portion of text

920

In response to determining that the gaze of the user is no longer directed toward the first portion of text:

922

In accordance with a determination based detected on movement of gaze of the user over the first portion of text that the user scanned the first portion of text without reading the first portion of text, forgo scrolling the text

924

In accordance with a determination based detected on movement of gaze of the user over the first portion of text that the user read the first portion of text, scrolling the text so that the second portion of text moves in the first direction

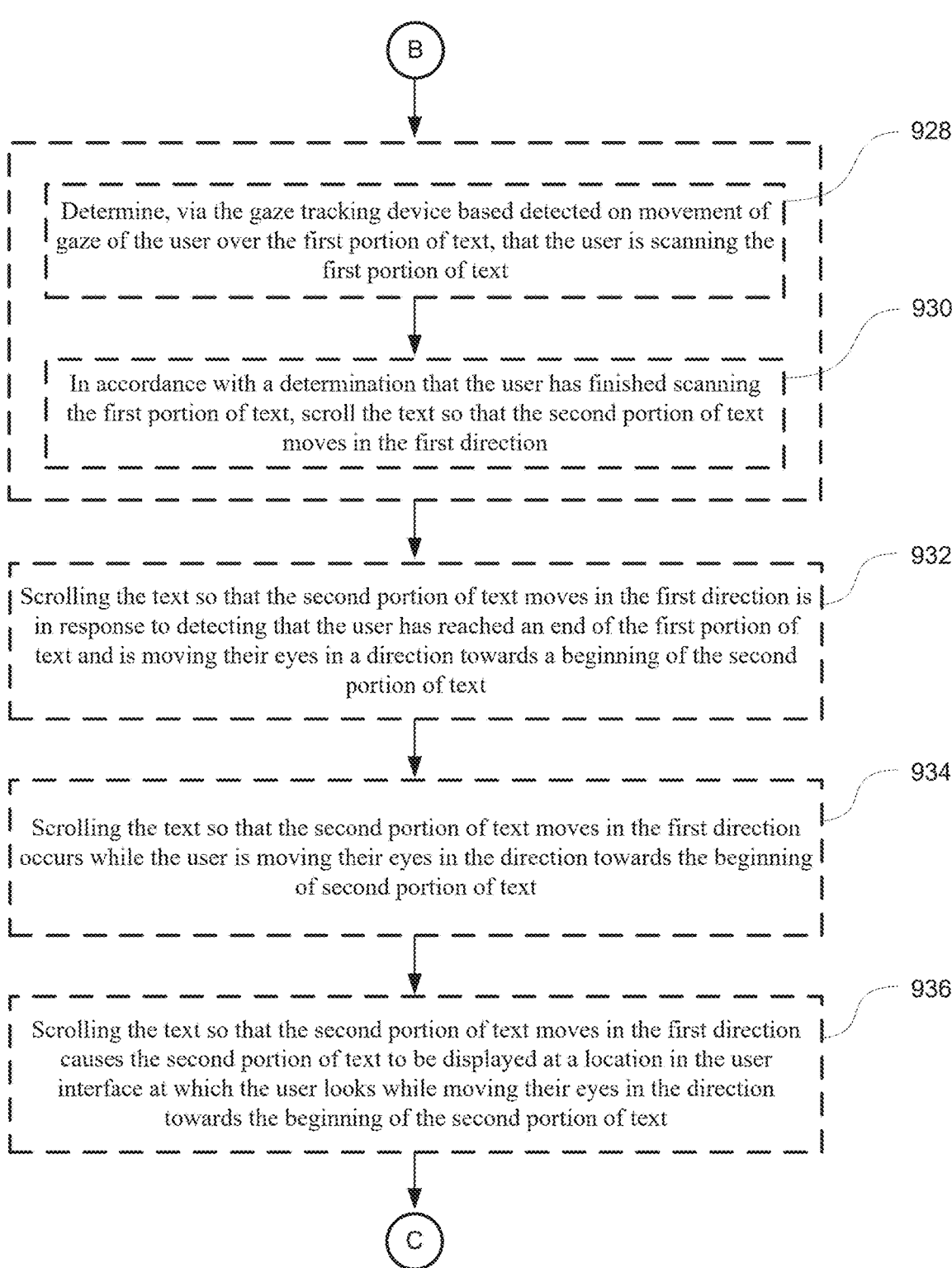

B

928

Determine, via the gaze tracking device based detected on movement of gaze of the user over the first portion of text, that the user is scanning the first portion of text

930

In accordance with a determination that the user has finished scanning the first portion of text, scroll the text so that the second portion of text moves in the first direction

932

Scrolling the text so that the second portion of text moves in the first direction is in response to detecting that the user has reached an end of the first portion of text and is moving their eyes in a direction towards a beginning of the second portion of text

934

Scrolling the text so that the second portion of text moves in the first direction occurs while the user is moving their eyes in the direction towards the beginning of second portion of text

936

Scrolling the text so that the second portion of text moves in the first direction causes the second portion of text to be displayed at a location in the user interface at which the user looks while moving their eyes in the direction towards the beginning of the second portion of text

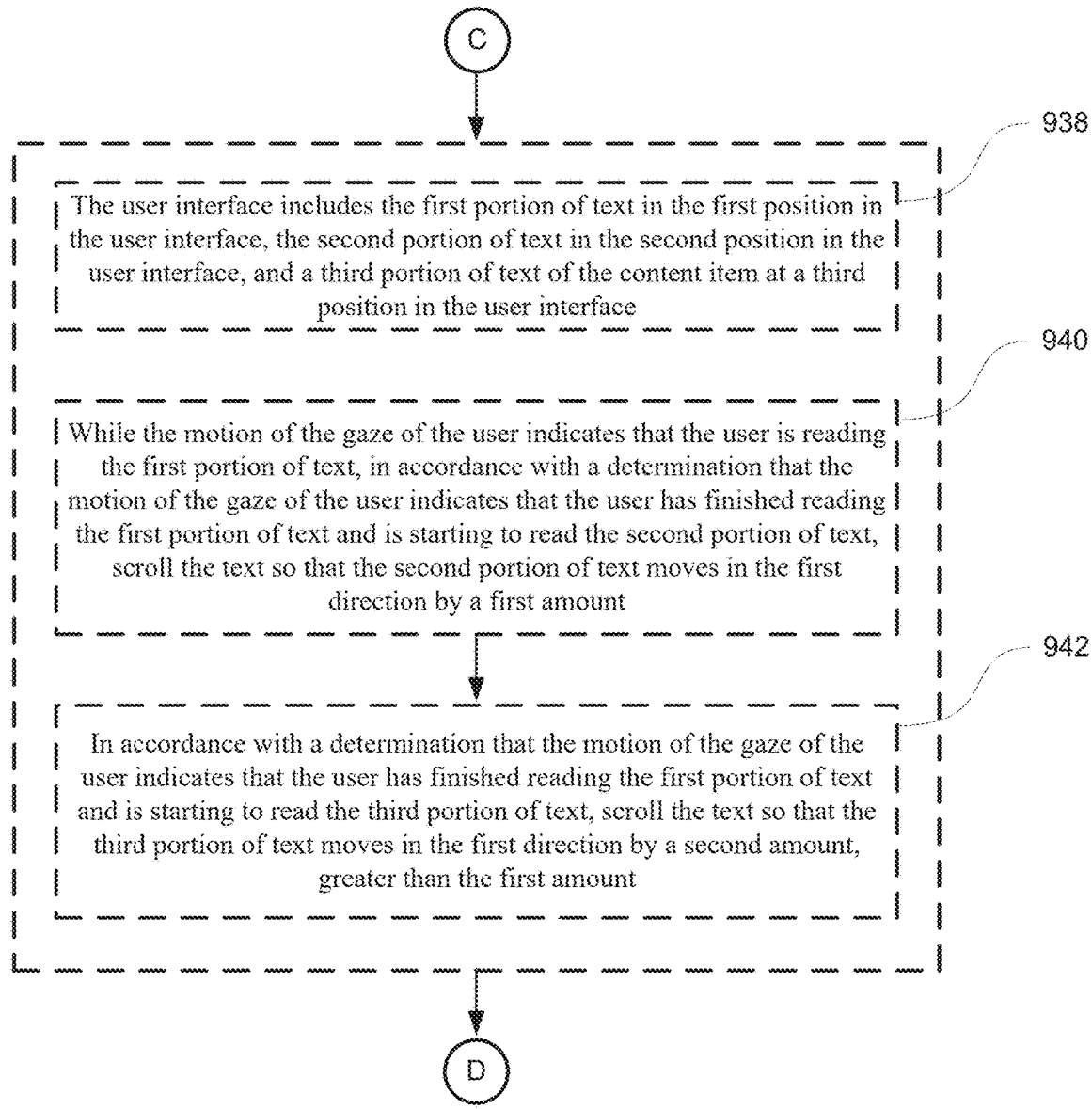

C

938

The user interface includes the first portion of text in the first position in the user interface, the second portion of text in the second position in the user interface, and a third portion of text of the content item at a third position in the user interface

940

While the motion of the gaze of the user indicates that the user is reading the first portion of text, in accordance with a determination that the motion of the gaze of the user indicates that the user has finished reading the first portion of text and is starting to read the second portion of text, scroll the text so that the second portion of text moves in the first direction by a first amount

942

In accordance with a determination that the motion of the gaze of the user indicates that the user has finished reading the first portion of text and is starting to read the third portion of text, scroll the text so that the third portion of text moves in the first direction by a second amount, greater than the first amount

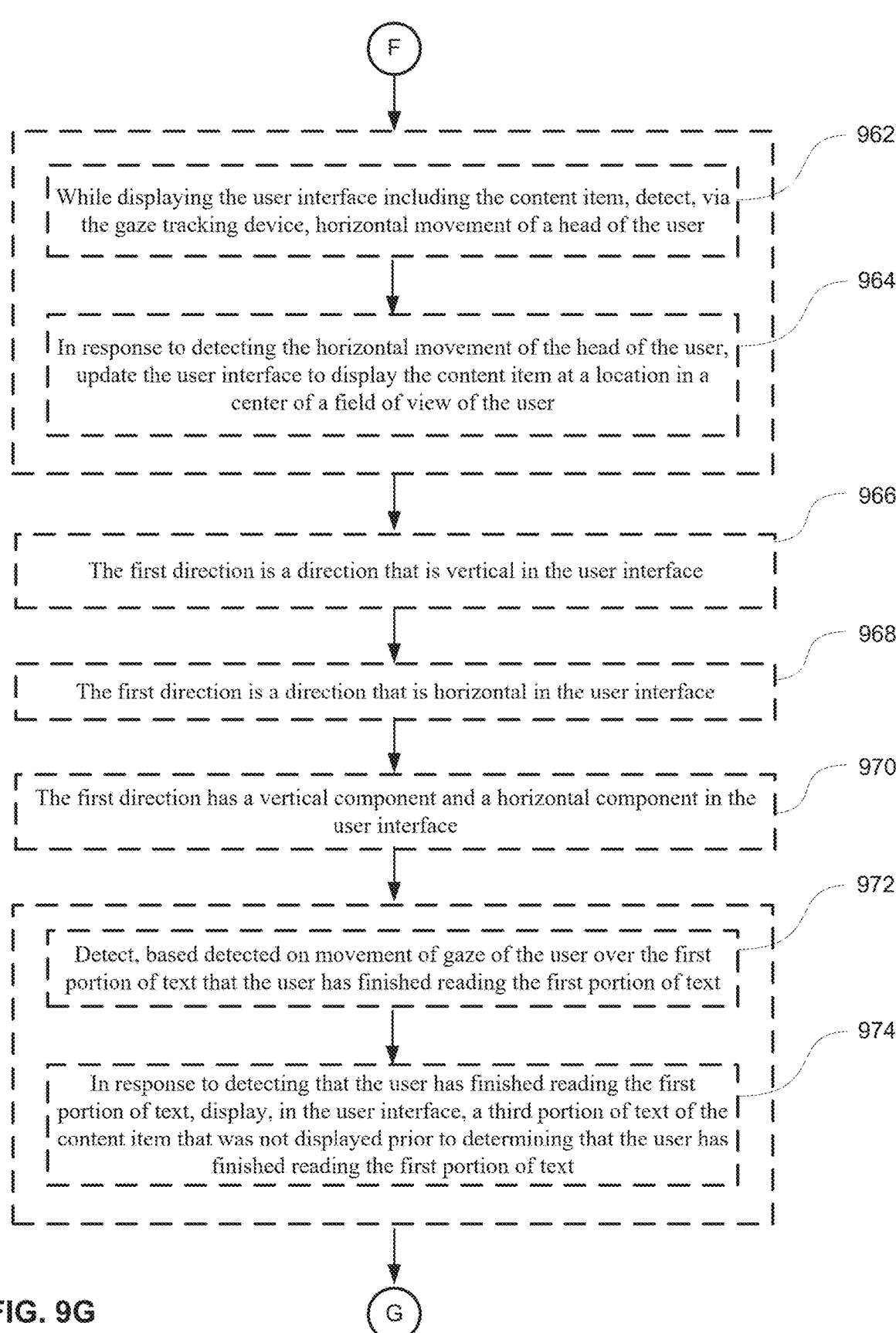

F

While displaying the user interface including the content item, detect, via the gaze tracking device, horizontal movement of a head of the user

962

In response to detecting the horizontal movement of the head of the user, update the user interface to display the content item at a location in a center of a field of view of the user

964

The first direction is a direction that is vertical in the user interface

966

The first direction is a direction that is horizontal in the user interface

968

The first direction has a vertical component and a horizontal component in the user interface

970

Detect, based detected on movement of gaze of the user over the first portion of text that the user has finished reading the first portion of text

972

In response to detecting that the user has finished reading the first portion of text, display, in the user interface, a third portion of text of the content item that was not displayed prior to determining that the user has finished reading the first portion of text

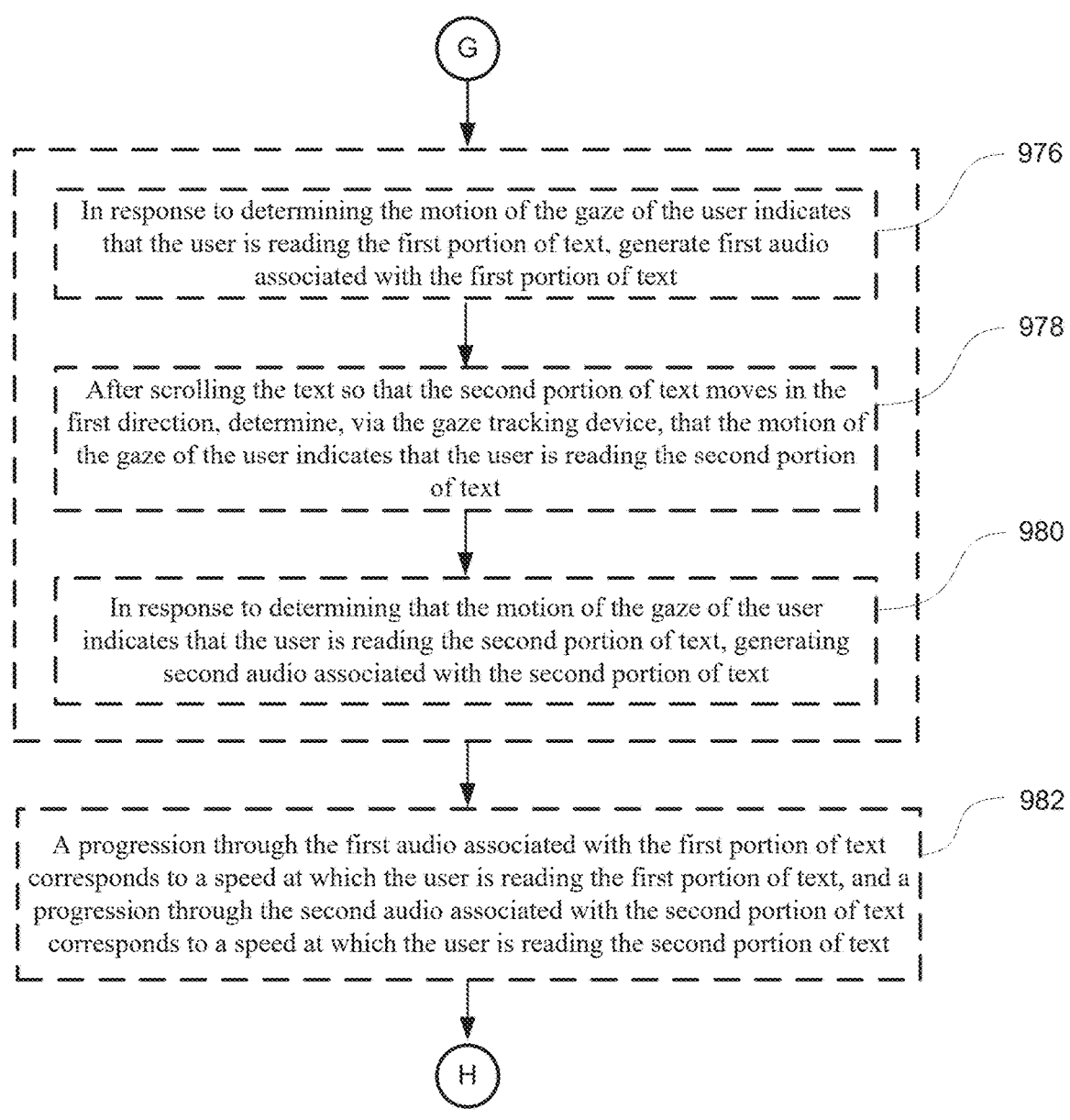

G

976

In response to determining the motion of the gaze of the user indicates that the user is reading the first portion of text, generate first audio associated with the first portion of text

978

After scrolling the text so that the second portion of text moves in the first direction, determine, via the gaze tracking device, that the motion of the gaze of the user indicates that the user is reading the second portion of text

980

In response to determining that the motion of the gaze of the user indicates that the user is reading the second portion of text, generating second audio associated with the second portion of text

982

A progression through the first audio associated with the first portion of text corresponds to a speed at which the user is reading the first portion of text, and a progression through the second audio associated with the second portion of text corresponds to a speed at which the user is reading the second portion of text

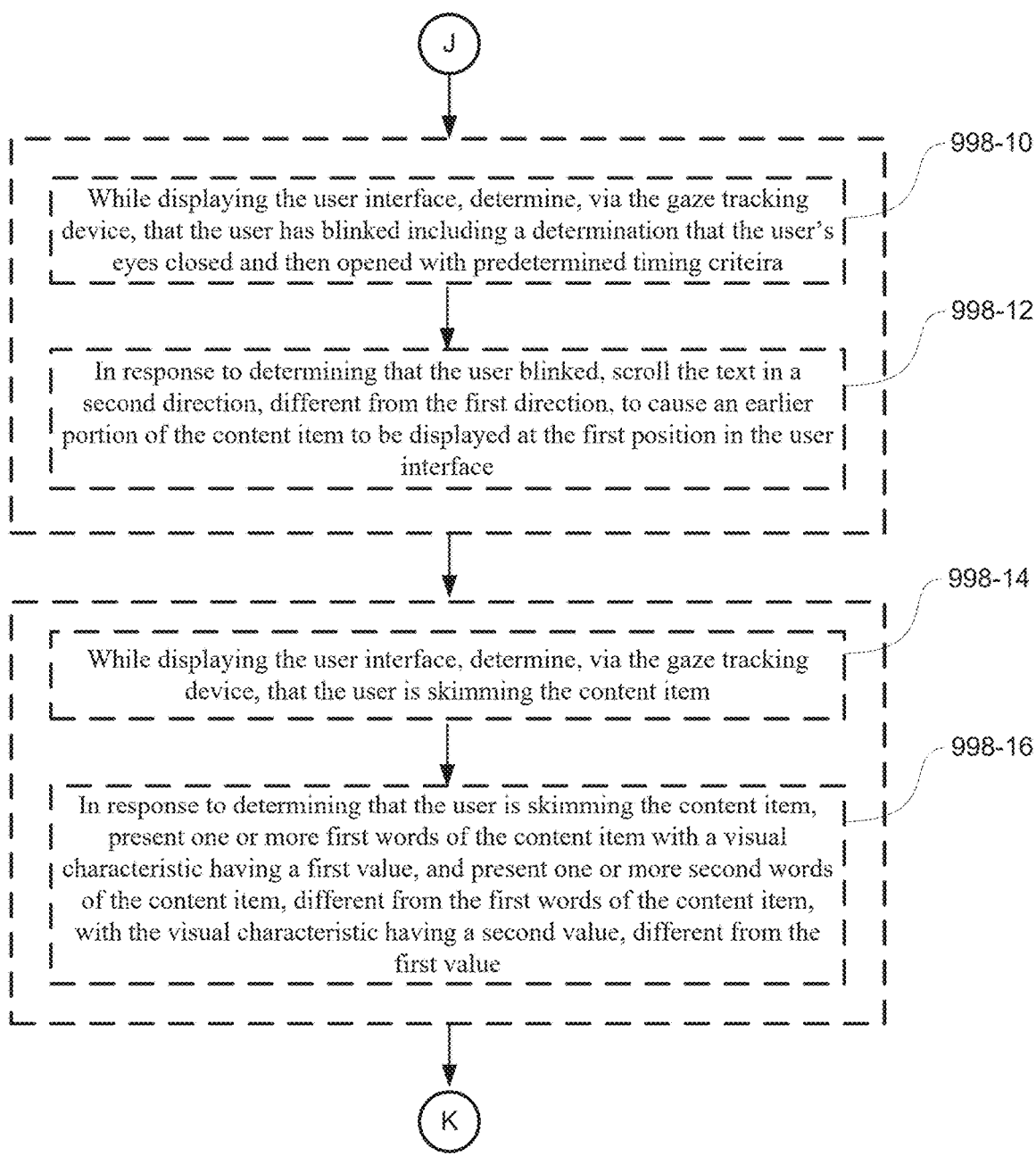

J

While displaying the user interface, determine, via the gaze tracking device, that the user has blinked including a determination that the user's eyes closed and then opened with predetermined timing criteira 998-10

In response to determining that the user blinked, scroll the text in a second direction, different from the first direction, to cause an earlier portion of the content item to be displayed at the first position in the user interface 998-12

While displaying the user interface, determine, via the gaze tracking device, that the user is skimming the content item 998-14

In response to determining that the user is skimming the content item, present one or more first words of the content item with a visual characteristic having a first value, and present one or more second words of the content item, different from the first words of the content item, with the visual characteristic having a second value, different from the first value 998-16

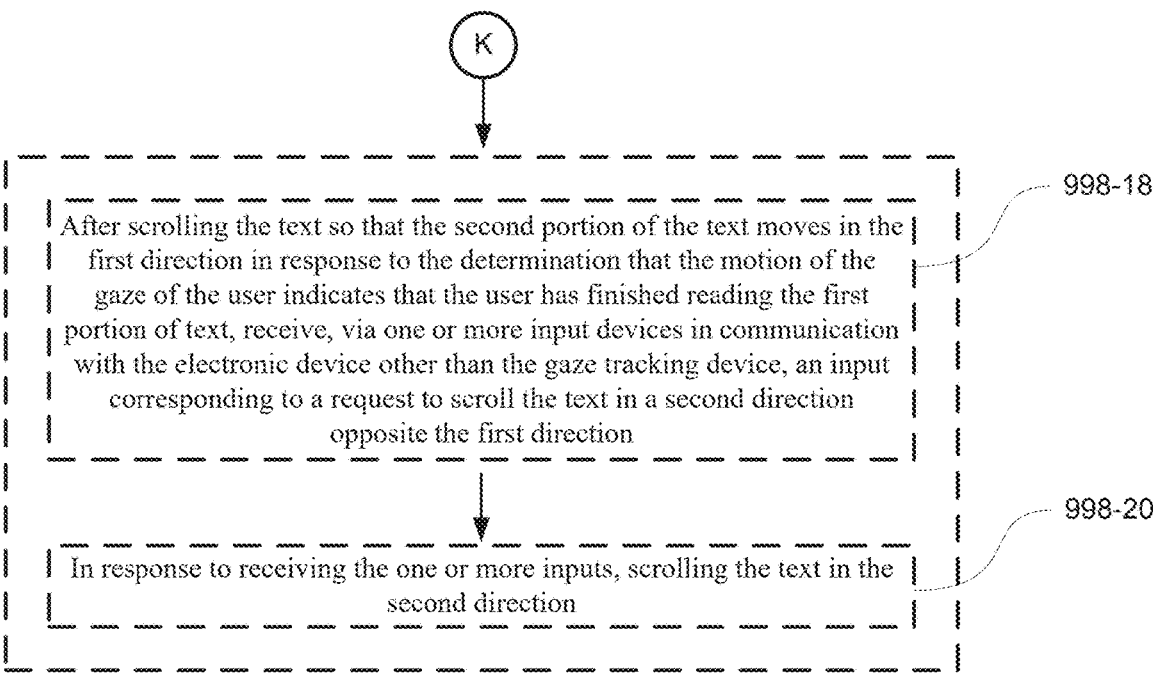

After scrolling the text so that the second portion of the text moves in the first direction in response to the determination that the motion of the gaze of the user indicates that the user has finished reading the first portion of text, receive, via one or more input devices in communication with the electronic device other than the gaze tracking device, an input corresponding to a request to scroll the text in a second direction opposite the first direction — 998-18

In response to receiving the one or more inputs, scrolling the text in the second direction — 998-20

FIG. 9L

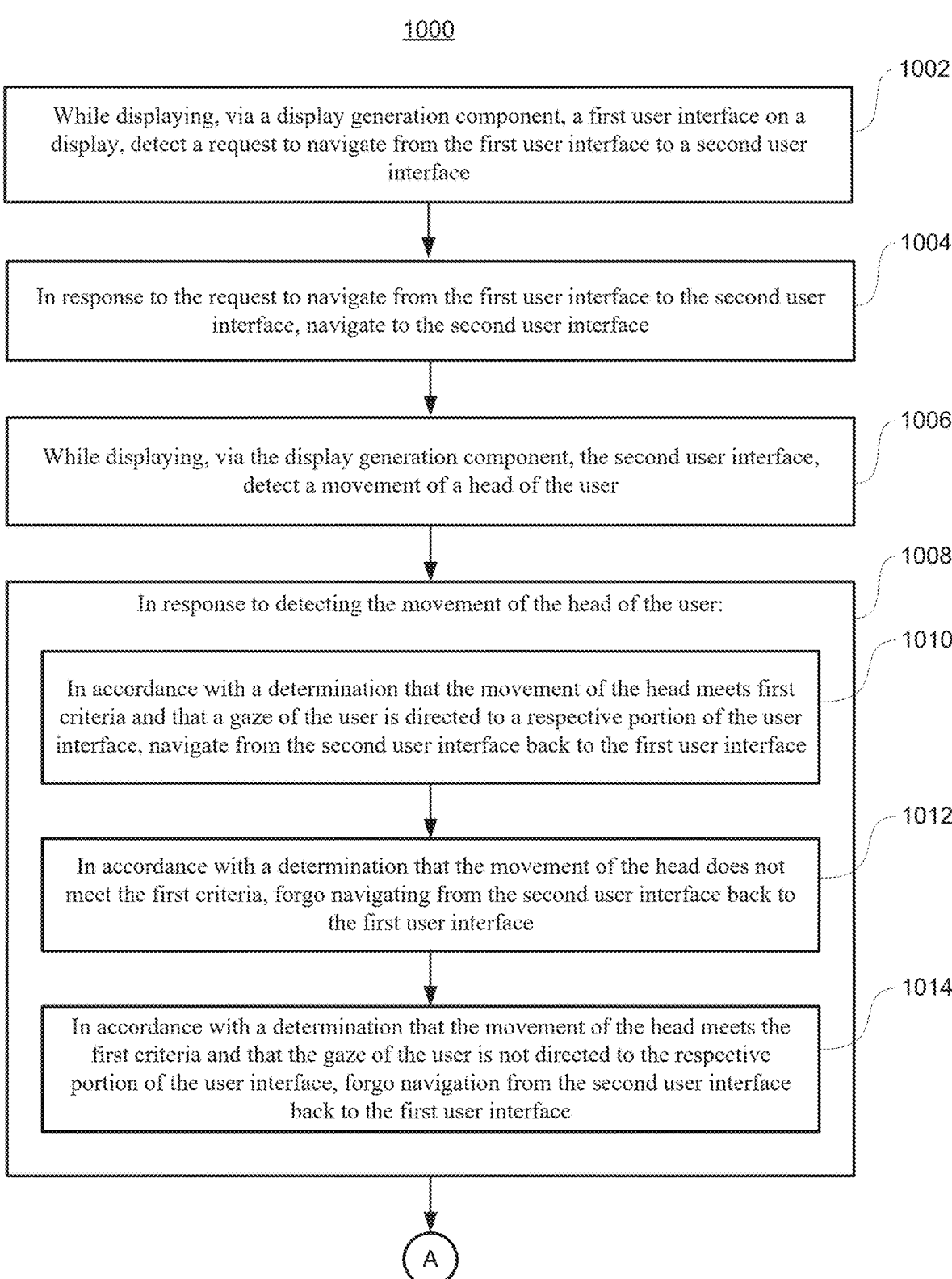

1000

1002 — While displaying, via a display generation component, a first user interface on a display, detect a request to navigate from the first user interface to a second user interface 1004 — In response to the request to navigate from the first user interface to the second user interface, navigate to the second user interface 1006 — While displaying, via the display generation component, the second user interface, detect a movement of a head of the user 1008 — In response to detecting the movement of the head of the user:

1010 — In accordance with a determination that the movement of the head meets first criteria and that a gaze of the user is directed to a respective portion of the user interface, navigate from the second user interface back to the first user interface 1012 — In accordance with a determination that the movement of the head does not meet the first criteria, forgo navigating from the second user interface back to the first user interface 1014 — In accordance with a determination that the movement of the head meets the first criteria and that the gaze of the user is not directed to the respective portion of the user interface, forgo navigation from the second user interface back to the first user interface

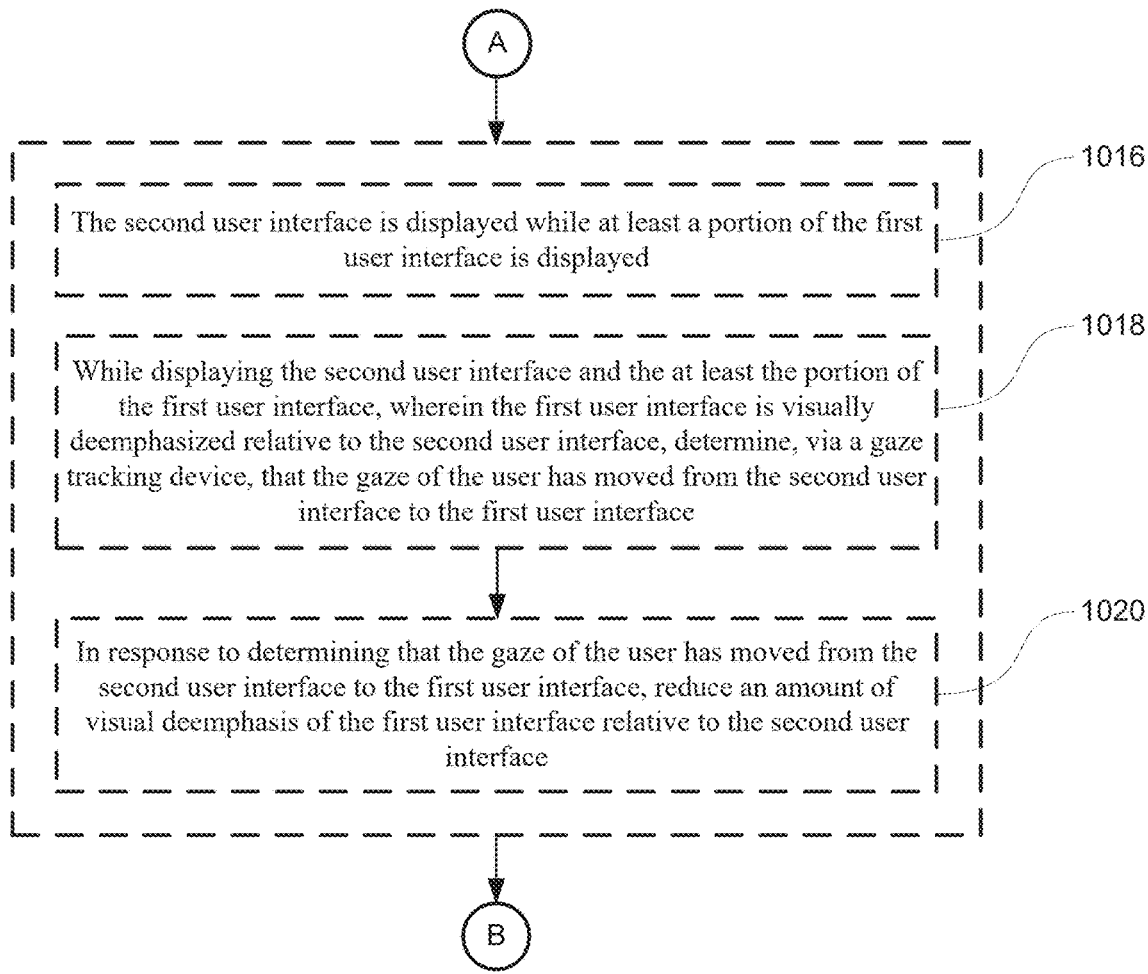

A

The second user interface is displayed while at least a portion of the first user interface is displayed — 1016

While displaying the second user interface and the at least the portion of the first user interface, wherein the first user interface is visually deemphasized relative to the second user interface, determine, via a gaze tracking device, that the gaze of the user has moved from the second user interface to the first user interface — 1018

In response to determining that the gaze of the user has moved from the second user interface to the first user interface, reduce an amount of visual deemphasis of the first user interface relative to the second user interface — 1020

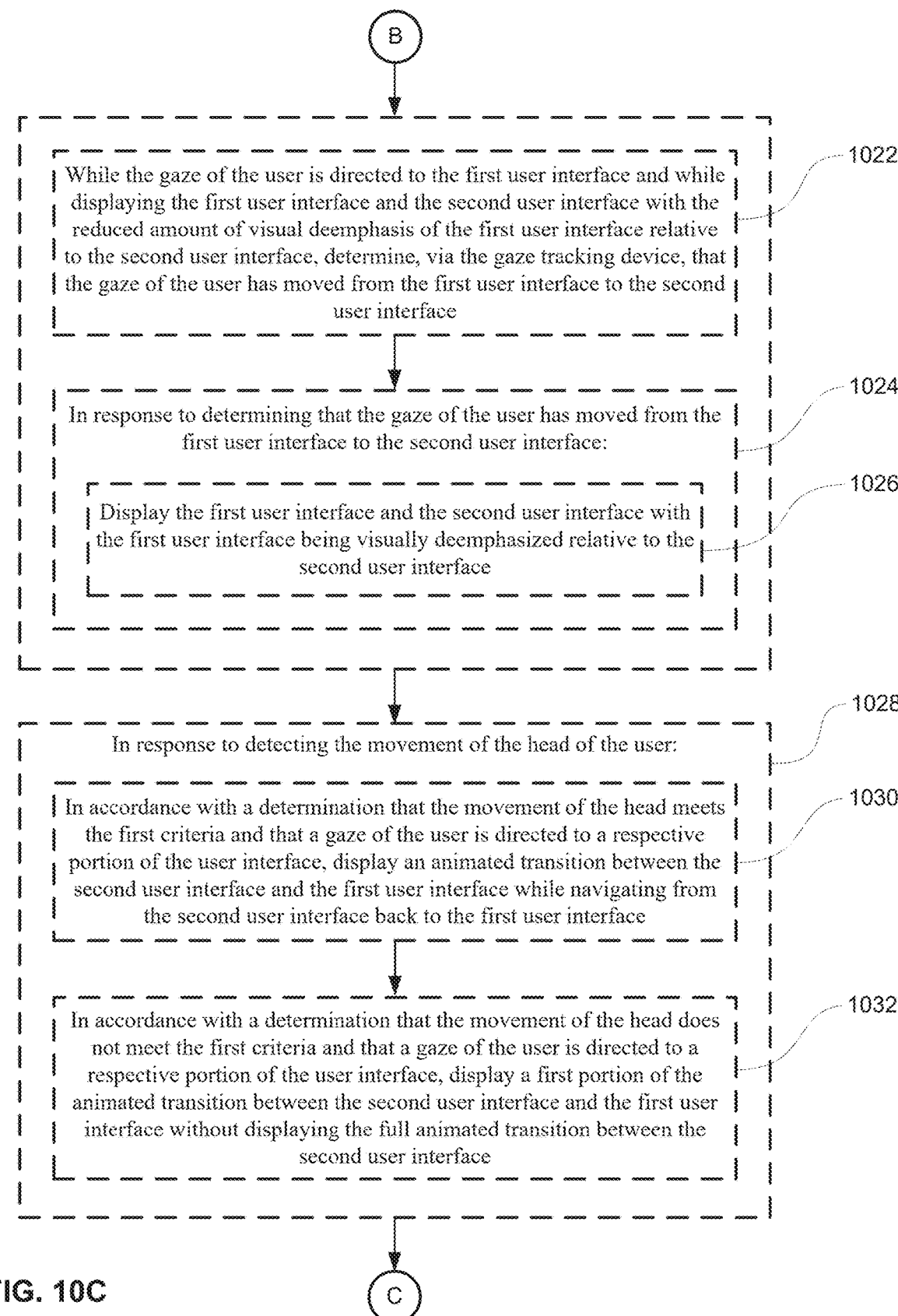

B

While the gaze of the user is directed to the first user interface and while displaying the first user interface and the second user interface with the reduced amount of visual deemphasis of the first user interface relative to the second user interface, determine, via the gaze tracking device, that the gaze of the user has moved from the first user interface to the second user interface — 1022

In response to determining that the gaze of the user has moved from the first user interface to the second user interface: — 1024

Display the first user interface and the second user interface with the first user interface being visually deemphasized relative to the second user interface — 1026

In response to detecting the movement of the head of the user: — 1028

In accordance with a determination that the movement of the head meets the first criteria and that a gaze of the user is directed to a respective portion of the user interface, display an animated transition between the second user interface and the first user interface while navigating from the second user interface back to the first user interface — 1030

In accordance with a determination that the movement of the head does not meet the first criteria and that a gaze of the user is directed to a respective portion of the user interface, display a first portion of the animated transition between the second user interface and the first user interface without displaying the full animated transition between the second user interface — 1032

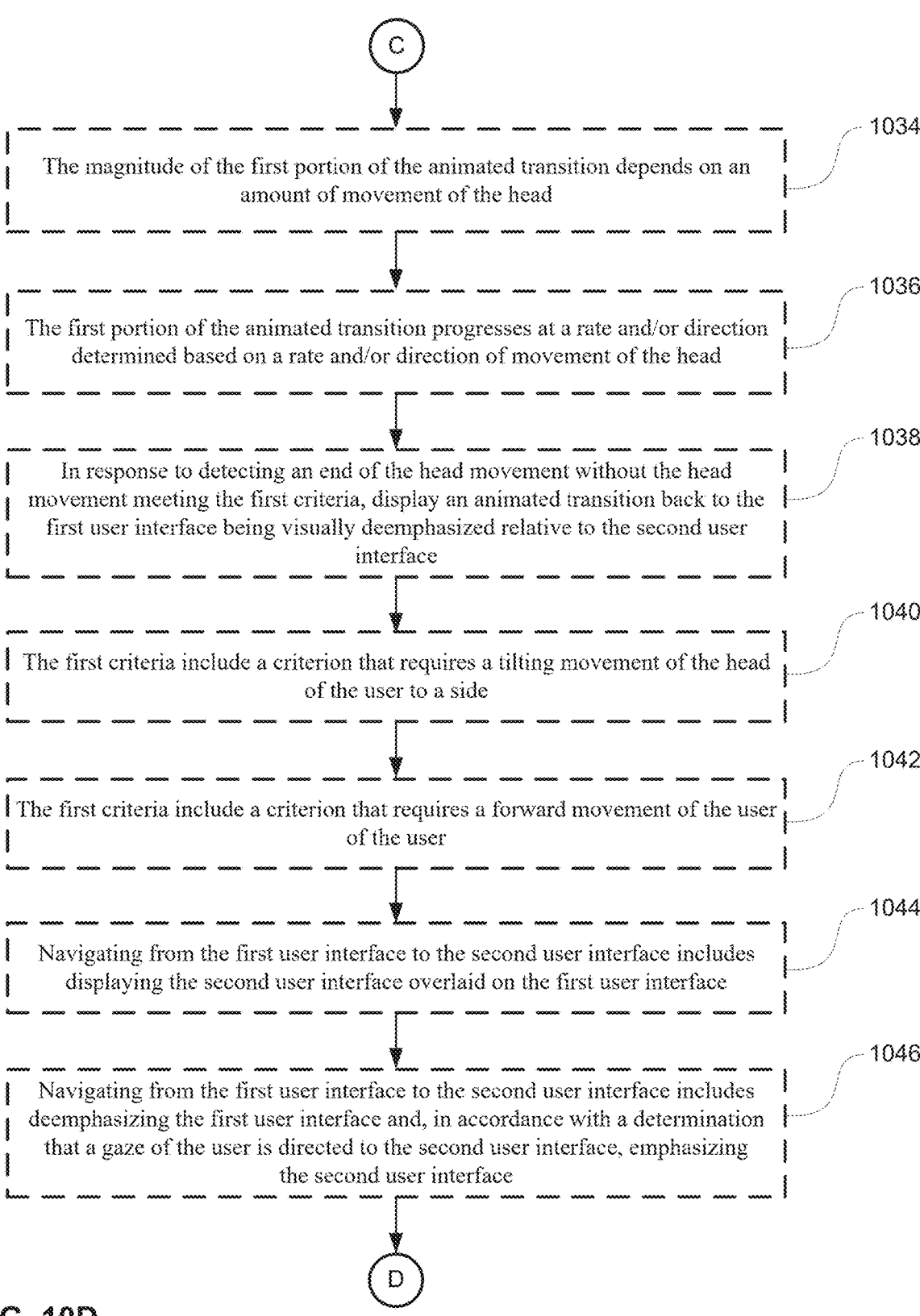

C

The magnitude of the first portion of the animated transition depends on an amount of movement of the head — 1034

The first portion of the animated transition progresses at a rate and/or direction determined based on a rate and/or direction of movement of the head — 1036

In response to detecting an end of the head movement without the head movement meeting the first criteria, display an animated transition back to the first user interface being visually deemphasized relative to the second user interface — 1038

The first criteria include a criterion that requires a tilting movement of the head of the user to a side — 1040

The first criteria include a criterion that requires a forward movement of the user of the user — 1042

Navigating from the first user interface to the second user interface includes displaying the second user interface overlaid on the first user interface — 1044

Navigating from the first user interface to the second user interface includes deemphasizing the first user interface and, in accordance with a determination that a gaze of the user is directed to the second user interface, emphasizing the second user interface — 1046

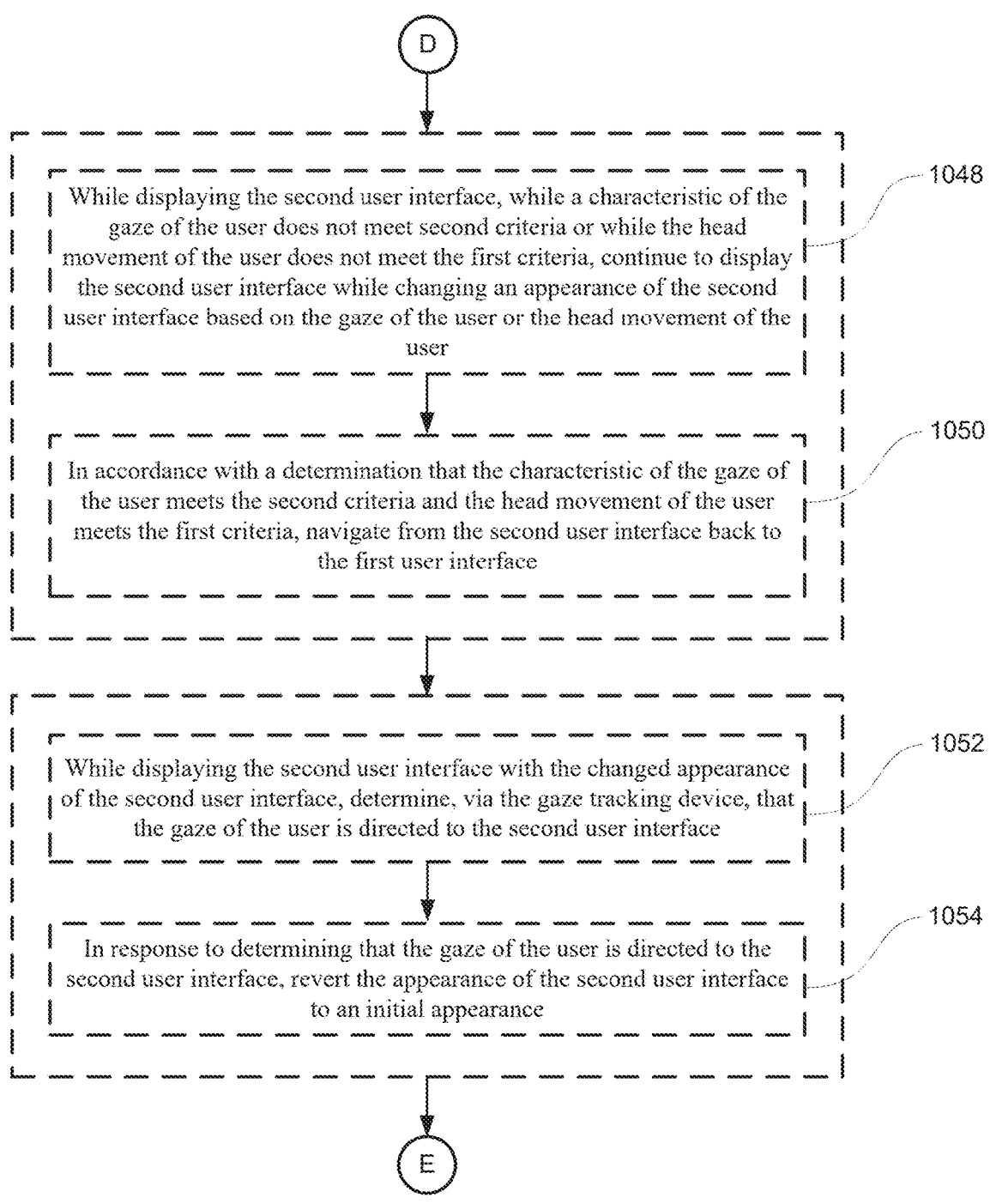

D

While displaying the second user interface, while a characteristic of the gaze of the user does not meet second criteria or while the head movement of the user does not meet the first criteria, continue to display the second user interface while changing an appearance of the second user interface based on the gaze of the user or the head movement of the user

1048

In accordance with a determination that the characteristic of the gaze of the user meets the second criteria and the head movement of the user meets the first criteria, navigate from the second user interface back to the first user interface

1050

While displaying the second user interface with the changed appearance of the second user interface, determine, via the gaze tracking device, that the gaze of the user is directed to the second user interface

1052

In response to determining that the gaze of the user is directed to the second user interface, revert the appearance of the second user interface to an initial appearance

Figure 11A:
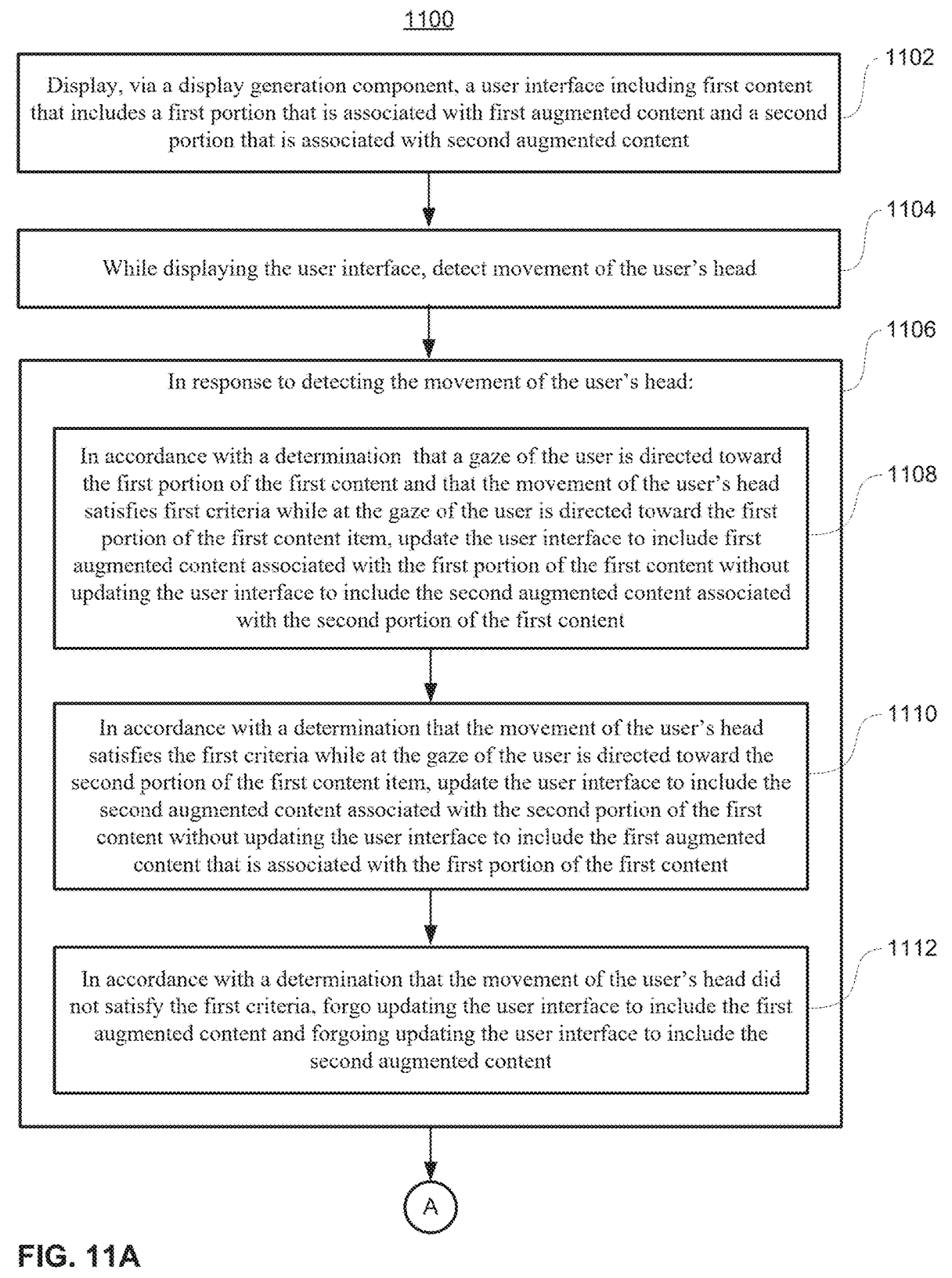

Display, via a display generation component, a user interface including first content that includes a first portion that is associated with first augmented content and a second portion that is associated with second augmented content
— 1102

While displaying the user interface, detect movement of the user's head
— 1104

In response to detecting the movement of the user's head:
— 1106

In accordance with a determination that a gaze of the user is directed toward the first portion of the first content and that the movement of the user's head satisfies first criteria while at the gaze of the user is directed toward the first portion of the first content item, update the user interface to include first augmented content associated with the first portion of the first content without updating the user interface to include the second augmented content associated with the second portion of the first content
— 1108

In accordance with a determination that the movement of the user's head satisfies the first criteria while at the gaze of the user is directed toward the second portion of the first content item, update the user interface to include the second augmented content associated with the second portion of the first content without updating the user interface to include the first augmented content that is associated with the first portion of the first content
— 1110

In accordance with a determination that the movement of the user's head did not satisfy the first criteria, forgo updating the user interface to include the first augmented content and forgoing updating the user interface to include the second augmented content
— 1112

The first augmented content is one of a definition of the first portion of the first content, a website preview of the first portion of the first content, or an enlarged version of the first portion of the first content and the second augmented content is one of a definition of the second portion of the first content, a website preview of the second portion of the first content, or an enlarged version of the second portion of the first content
— 1114

FIG. 11B

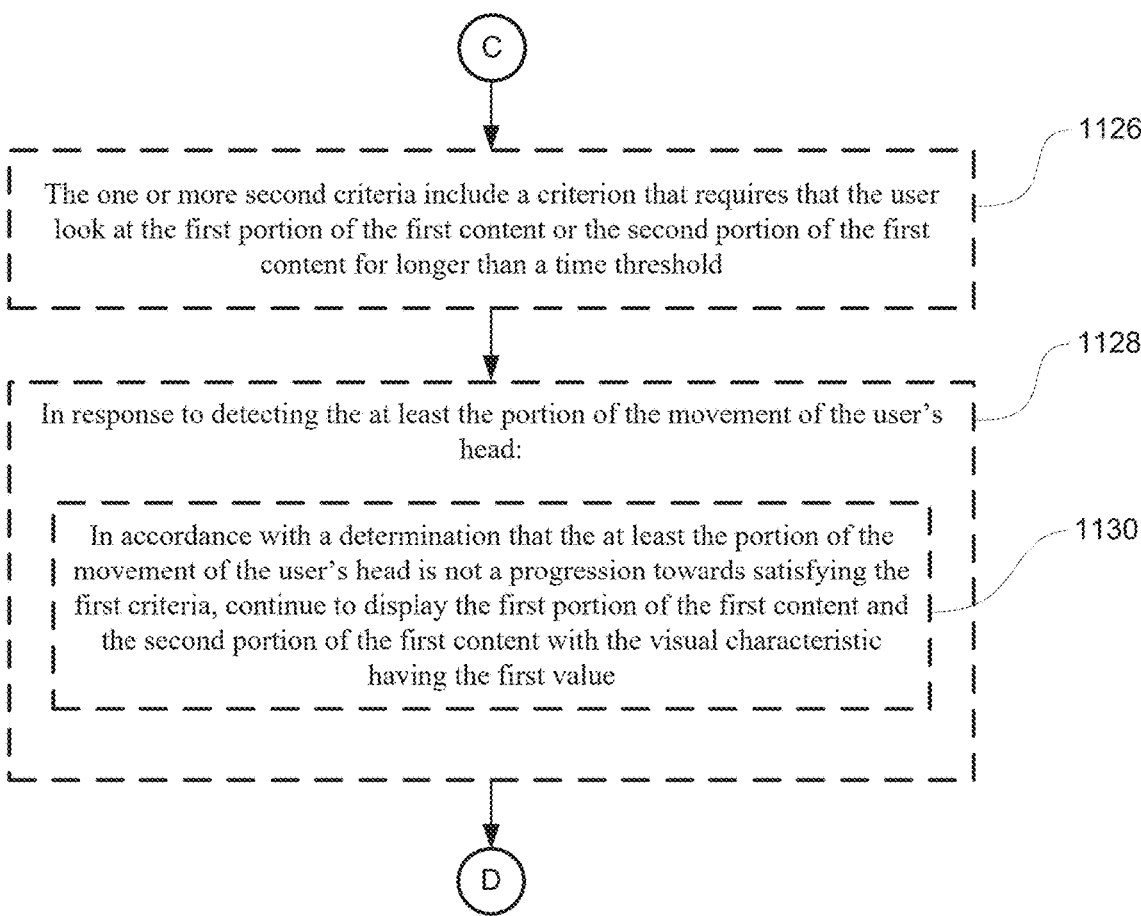

C

1126

The one or more second criteria include a criterion that requires that the user look at the first portion of the first content or the second portion of the first content for longer than a time threshold

1128

In response to detecting the at least the portion of the movement of the user's head:

1130

In accordance with a determination that the at least the portion of the movement of the user's head is not a progression towards satisfying the first criteria, continue to display the first portion of the first content and the second portion of the first content with the visual characteristic having the first value

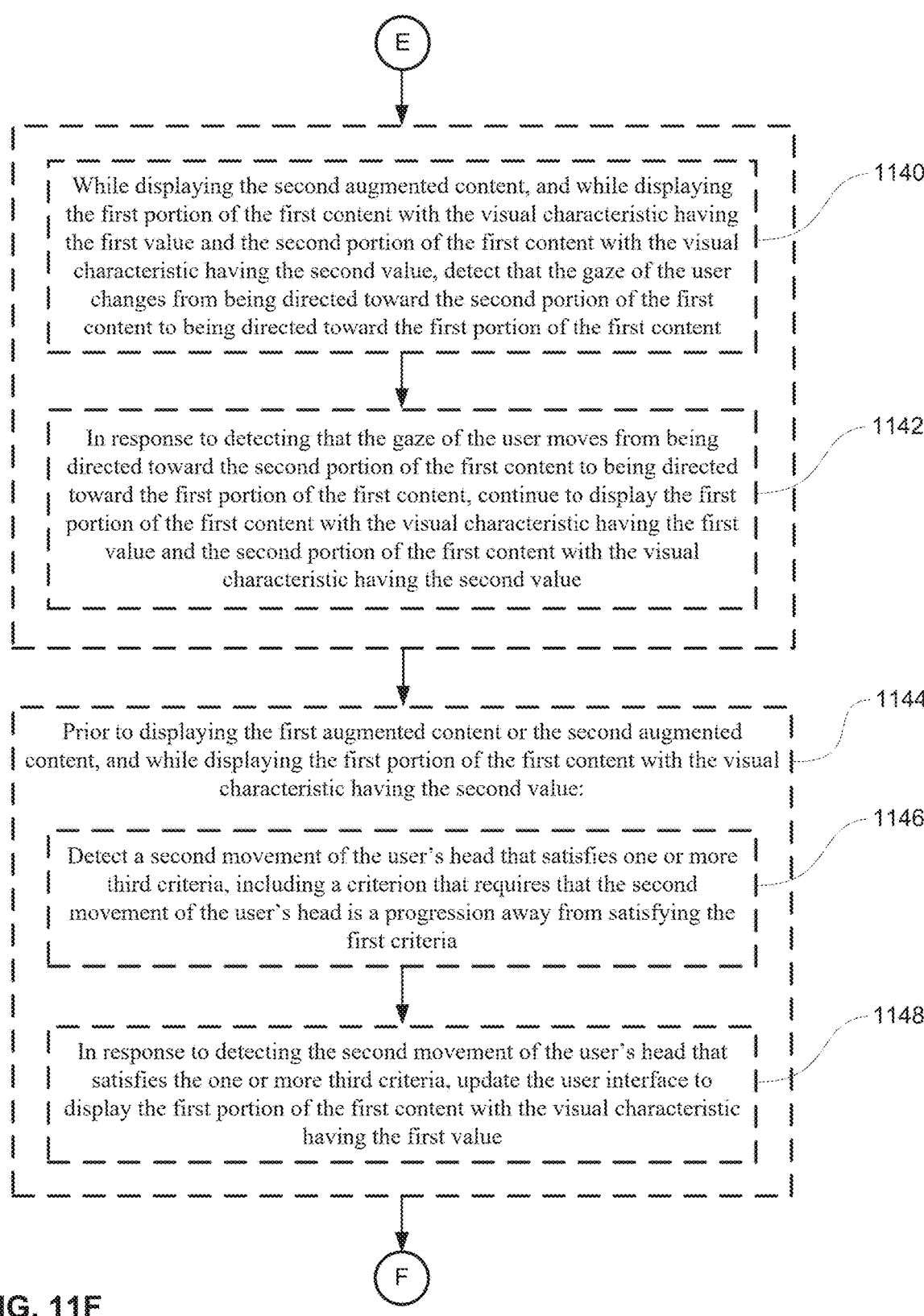

E

While displaying the second augmented content, and while displaying the first portion of the first content with the visual characteristic having the first value and the second portion of the first content with the visual characteristic having the second value, detect that the gaze of the user changes from being directed toward the second portion of the first content to being directed toward the first portion of the first content — 1140

In response to detecting that the gaze of the user moves from being directed toward the second portion of the first content to being directed toward the first portion of the first content, continue to display the first portion of the first content with the visual characteristic having the first value and the second portion of the first content with the visual characteristic having the second value — 1142

Prior to displaying the first augmented content or the second augmented content, and while displaying the first portion of the first content with the visual characteristic having the second value: — 1144

Detect a second movement of the user's head that satisfies one or more third criteria, including a criterion that requires that the second movement of the user's head is a progression away from satisfying the first criteria — 1146

In response to detecting the second movement of the user's head that satisfies the one or more third criteria, update the user interface to display the first portion of the first content with the visual characteristic having the first value — 1148

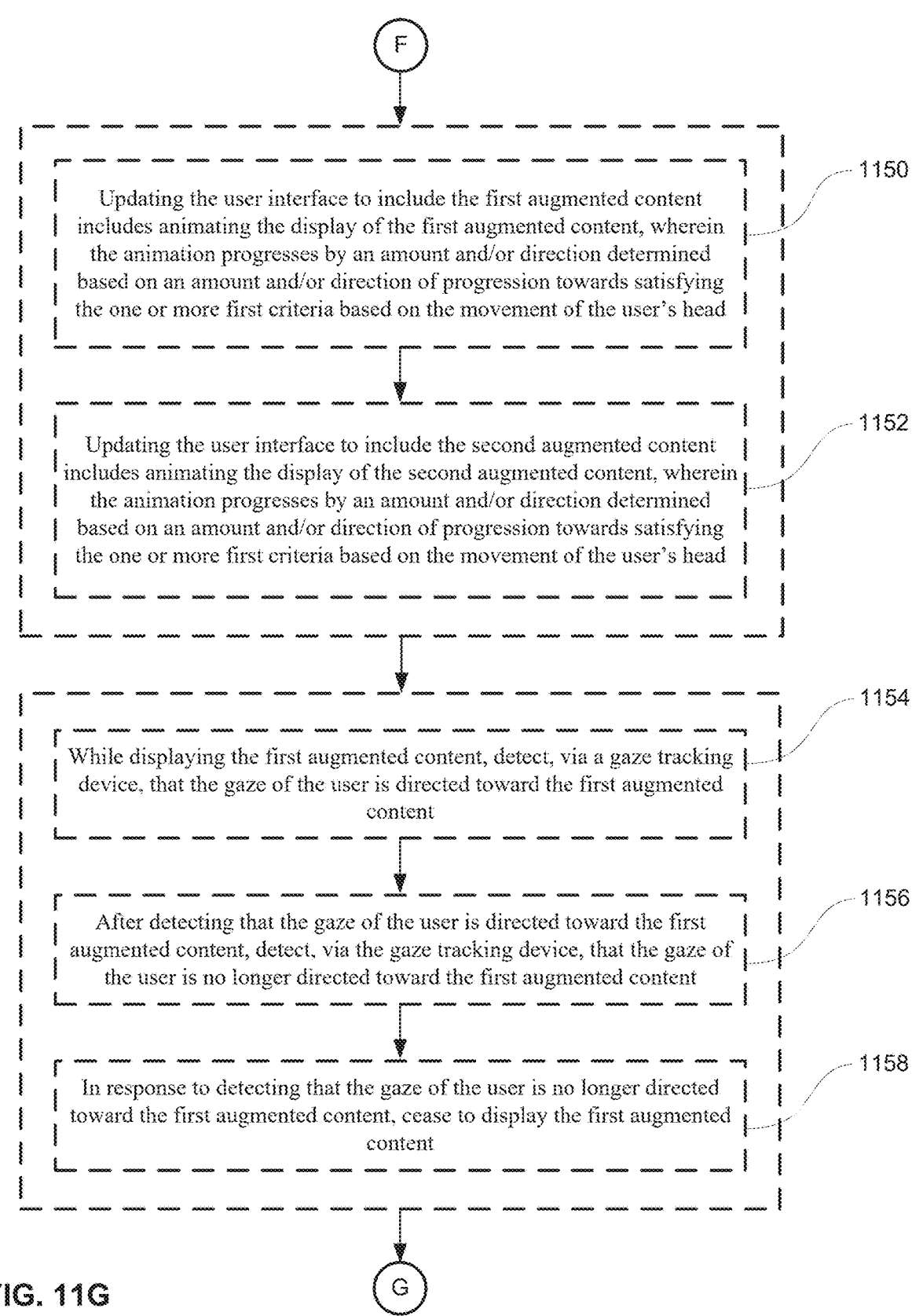

F

Updating the user interface to include the first augmented content includes animating the display of the first augmented content, wherein the animation progresses by an amount and/or direction determined based on an amount and/or direction of progression towards satisfying the one or more first criteria based on the movement of the user's head — 1150

Updating the user interface to include the second augmented content includes animating the display of the second augmented content, wherein the animation progresses by an amount and/or direction determined based on an amount and/or direction of progression towards satisfying the one or more first criteria based on the movement of the user's head — 1152

While displaying the first augmented content, detect, via a gaze tracking device, that the gaze of the user is directed toward the first augmented content — 1154

After detecting that the gaze of the user is directed toward the first augmented content, detect, via the gaze tracking device, that the gaze of the user is no longer directed toward the first augmented content — 1156

In response to detecting that the gaze of the user is no longer directed toward the first augmented content, cease to display the first augmented content — 1158

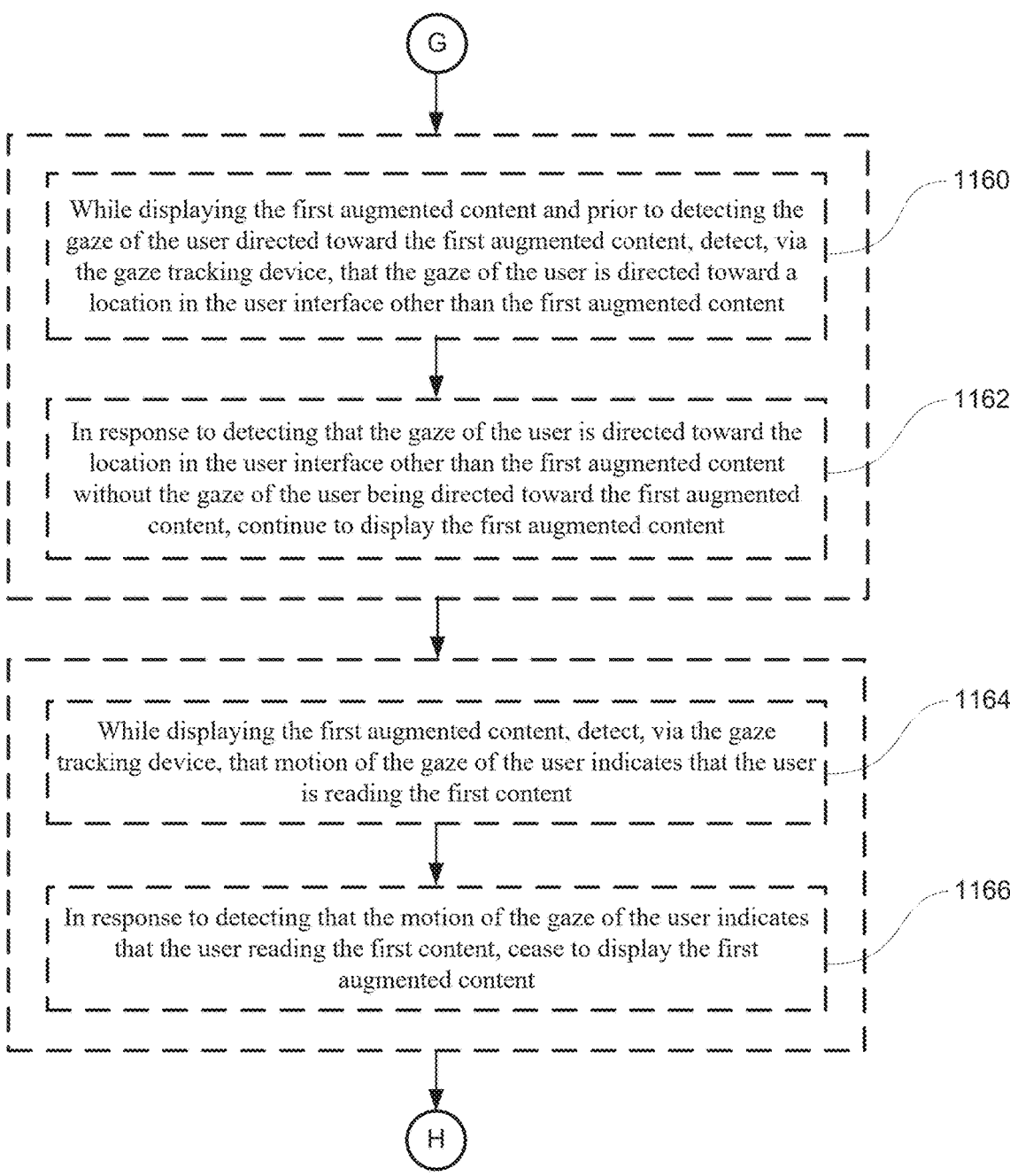

G

While displaying the first augmented content and prior to detecting the gaze of the user directed toward the first augmented content, detect, via the gaze tracking device, that the gaze of the user is directed toward a location in the user interface other than the first augmented content — 1160

In response to detecting that the gaze of the user is directed toward the location in the user interface other than the first augmented content without the gaze of the user being directed toward the first augmented content, continue to display the first augmented content — 1162

While displaying the first augmented content, detect, via the gaze tracking device, that motion of the gaze of the user indicates that the user is reading the first content — 1164

In response to detecting that the motion of the gaze of the user indicates that the user reading the first content, cease to display the first augmented content — 1166

While displaying the first augmented content, determine, via the gaze tracking device, a blink of the user's eyes that satisfies one or more second criteria

1178

In response to determining that the blink of the user's eyes satisfies the one or more second criteria, cease to display the first augmented content

1180

DEVICES, METHODS, AND GRAPHICAL USER INTERFACES FOR GAZE-BASED NAVIGATION

CROSS-REFERENCE TO RELATED APPLICATIONS

This application claims the benefit of U.S. Provisional Application No. 63/001,210, filed Mar. 27, 2020 and U.S. Provisional Application No. 63/131,754, filed Dec. 29, 2020, the contents of which are hereby incorporated by reference in their entireties for all purposes.

TECHNICAL FIELD

This relates generally to computer systems with a display generation component and one or more input devices that present graphical user interfaces, including but not limited to electronic devices that present graphical user interfaces, via the display generation component, that implement gaze-based navigation.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for navigating user interfaces. Such methods and interfaces may complement or replace conventional methods for interacting with a graphical user interface. Such methods and interfaces reduce the number, extent, and/or the nature of the inputs from a user and produce a more efficient human-machine interface.

In some embodiments, an electronic device expands an item of content in accordance with detection of a user's gaze. In some embodiments, an electronic device scrolls text of a content item in accordance with a determination that the user is reading the content item. In some embodiments, an electronic device navigates between user interfaces in accordance with detection of movement of the user's head and detection of the user's gaze. In some embodiments, an electronic device displays augmented content related to a portion of content in accordance with detection of movement of the user's head and detection of the user's gaze.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for read-ability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
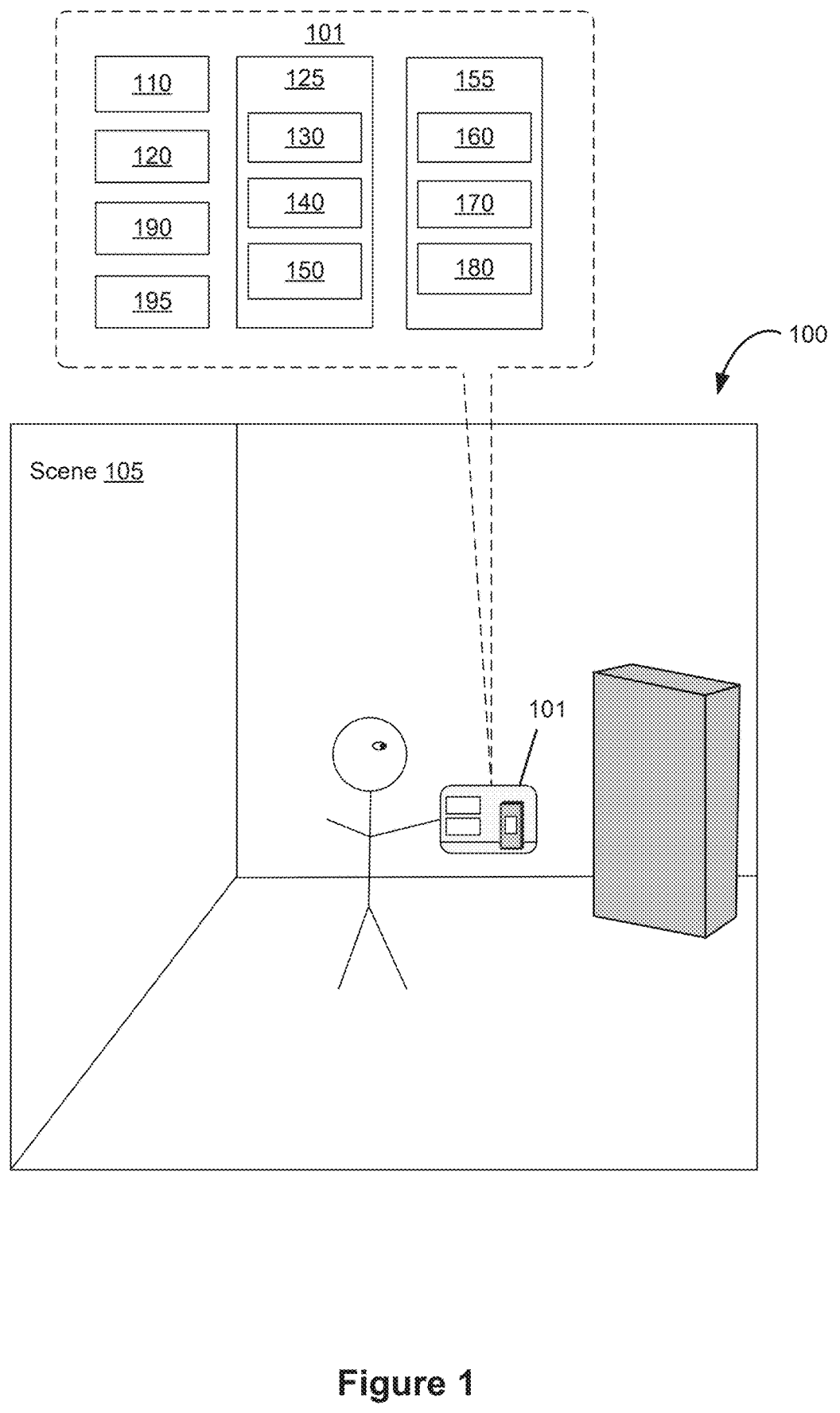

FIG. 1 is a block diagram illustrating an operating environment of a computer system for providing CGR experiences in accordance with some embodiments.

FIGS. 8A-8G is a flowchart illustrating a method of expanding an item of content in accordance with detection of a user's gaze in accordance with some embodiments.

FIGS. 9A-9L is a flowchart illustrating a method of scrolling text of a content item in accordance with a determination that the user is reading the content item in accordance with some embodiments.

FIGS. 10A-10G is a flowchart illustrating a method of navigating between user interfaces in accordance with detection of movement of the user's head and detection of the user's gaze in accordance with some embodiments.

FIGS. 11A-11J is a flowchart illustrating a method of displaying augmented content related to a portion of content in accordance with detection of movement of the user's head and detection of the user's gaze in accordance with some embodiments.

DESCRIPTION OF EMBODIMENTS

Figure 2:
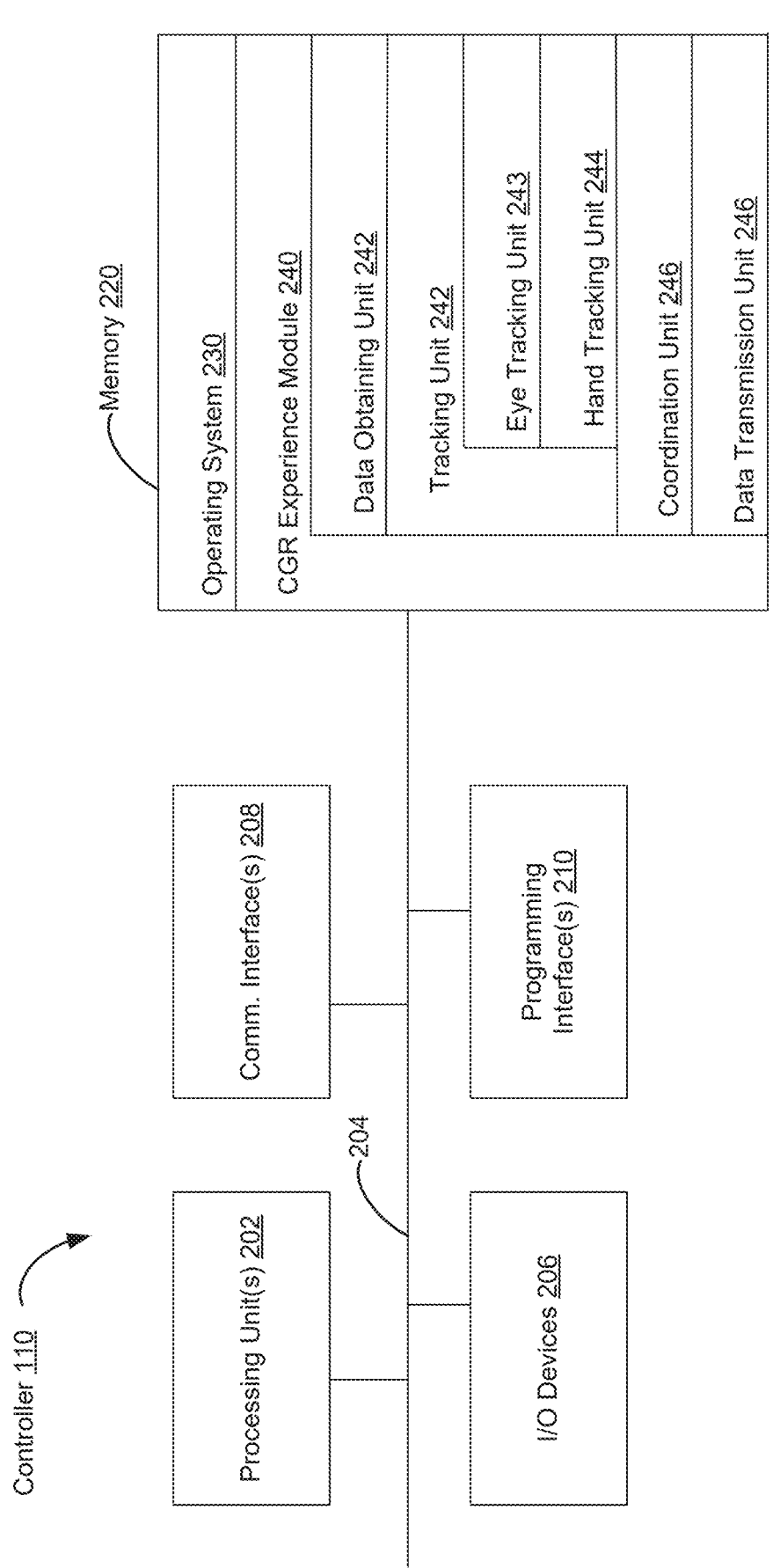
FIG. 2 is a block diagram illustrating a controller of a computer system that is configured to manage and coordinate a CGR experience for the user in accordance with some embodiments.

The present disclosure relates to user interfaces for providing a computer generated reality (CGR) experience to a user, in accordance with some embodiments.

The systems, methods, and GUIs described herein provide improved ways for an electronic device to provide for navigation based on user gaze and/or user head movement.

In some embodiments, a computer system expands an item of content based on detecting, via a gaze tracking device in communication with the computer system, that the user's gaze indicates that the user is reading the item of content. The user's gaze is detected using cameras (e.g., cameras integrated with a head-mounted device, installed away from the user (e.g., in a CGR room), or installed facing the user when the user is looking at an image presented by a display generation component (e.g., an array of cameras mounted above a display screen or touch screen)), e.g., as opposed to touch-sensitive surfaces or other physical controllers. The computing system optionally determines, based on the detected gaze location, which item of content of a plurality of displayed items of content the user is reading and expands the item of content that the user is reading. Expanding a respective item of content in response to detecting the user reading the respective item of content allows the user to continue reading the content item without using an input device other than the gaze tracking device to provide an input requesting to expand the respective item of content, which allows the user to access the expanded content more naturally and efficiently. In addition, gaze-based navigation only requires movement of the user's eyes and/or head, making the computing system accessible to people with impaired motor control.

In some embodiments, a computer system scrolls an item of content based on detecting, via a gaze tracking device in communication with the computer system, that the user's gaze indicates that the user finished reading a respective portion of the item of content. The user's gaze is detected using cameras (e.g., cameras integrated with a head-mounted device, installed away from the user (e.g., in a CGR room), or installed facing the user when the user is looking at an image presented by a display generation component (e.g., an array of cameras mounted above a display screen or touch screen)), e.g., as opposed to touch-sensitive surfaces or other physical controllers. The computing system optionally determines, based on the detected gaze location, that the user has finished reading a portion of the content, such as a respective line of text of the content. Scrolling an item of content in response to detecting the user's gaze allows the user to continue reading the content item without using an input device other than the gaze tracking device to provide an input requesting to scroll the item of content, which allows the user to read the content more naturally and efficiently. In addition, gaze-based scrolling only requires movement of the user's eyes and/or head, making the computing system accessible to people with impaired motor control.

In some embodiments, a computer system navigates a user interface based on detecting, via one or more image sensors in communication with the computer system, the gaze and/or head movement of the user. The user's gaze and head movement are detected using cameras (e.g., cameras integrated with a head-mounted device, installed away from the user (e.g., in a CGR room), or installed facing the user when the user is looking at an image presented by a display generation component (e.g., an array of cameras mounted above a display screen or touch screen)), e.g., as opposed to touch-sensitive surfaces or other physical controllers. The computing system optionally determines, based on the one or more image sensors, that the user is looking at a respective portion of a user interface corresponding to a navigational location other than the current navigational location and/or that the user is tilting or turning their head toward the respective portion of the user interface. In response to detecting the user's gaze and head movement directed towards the respective portion of the user interface, the electronic device optionally navigates to the respective portion of the user interface. Navigating the user interface in response to detecting the user's gaze and/or head movement allows the user to navigate the user interface without using an input device other than the gaze tracking device to provide an input requesting to expand the respective item of content, which allows the user to interact with the user interface more naturally and efficiently. In addition, gaze-based navigation only requires movement of the user's eyes and/or head, making the computing system accessible to people with impaired motor control.

In some embodiments, a computer system presents augmented content associated with a portion (e.g., a word, image, etc.) of an item of content based on detecting, via one or more image sensors in communication with the computer system, that the gaze and/or head movement of the user is directed toward the portion of content. The user's gaze and/or head movement are detected using cameras (e.g., cameras integrated with a head-mounted device, installed away from the user (e.g., in a CGR room), or installed facing the user when the user is looking at an image presented by a display generation component (e.g., an array of cameras mounted above a display screen or touch screen)), e.g., as opposed to touch-sensitive surfaces or other physical controllers. The computing system optionally determines, using the one or more image sensors, that the user's gaze is directed toward a portion of the content and that the user's head is moving forward with respect to the user's body. In response to the user's gaze and/or head movement, the electronic device displays augmented content (e.g., a definition, an expanded image, a website preview) associated with the portion of the content. Presenting the augmented content in response to detecting the user's gaze and/or head movement allows the user to view the augmented content without using an input device other than the gaze tracking device to provide an input requesting to present the augmented content, which allows the user to access the augmented content more naturally and efficiently. In addition, presenting the augmented content in response to detecting the user's gaze and/or head movement only requires movement of the user's eyes and/or head, making the computing system accessible to people with impaired motor control.

FIGS. 1-6 provide a description of example computer systems for providing CGR experiences to users. FIGS. 7A-7K illustrate examples of how an electronic device provides for navigation of a user interface in accordance with detection of a gaze of a user in accordance with some embodiments. FIGS. 8-11 are flow diagrams of methods of providing navigation in accordance with detection of gaze of a user, in accordance with various embodiments. The user interfaces in FIGS. 7A-7K are used to illustrate the processes in FIGS. 8-11, respectively.

In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CRG content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
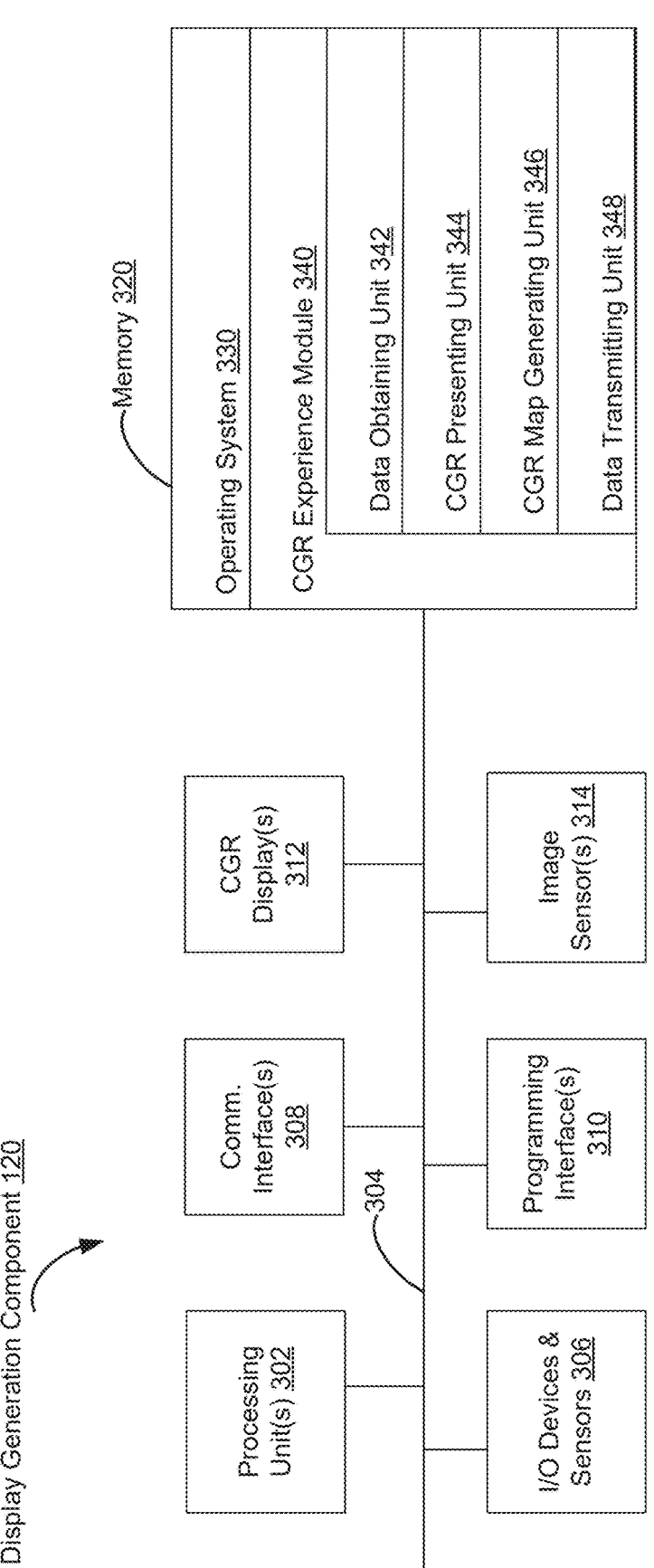
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAS, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
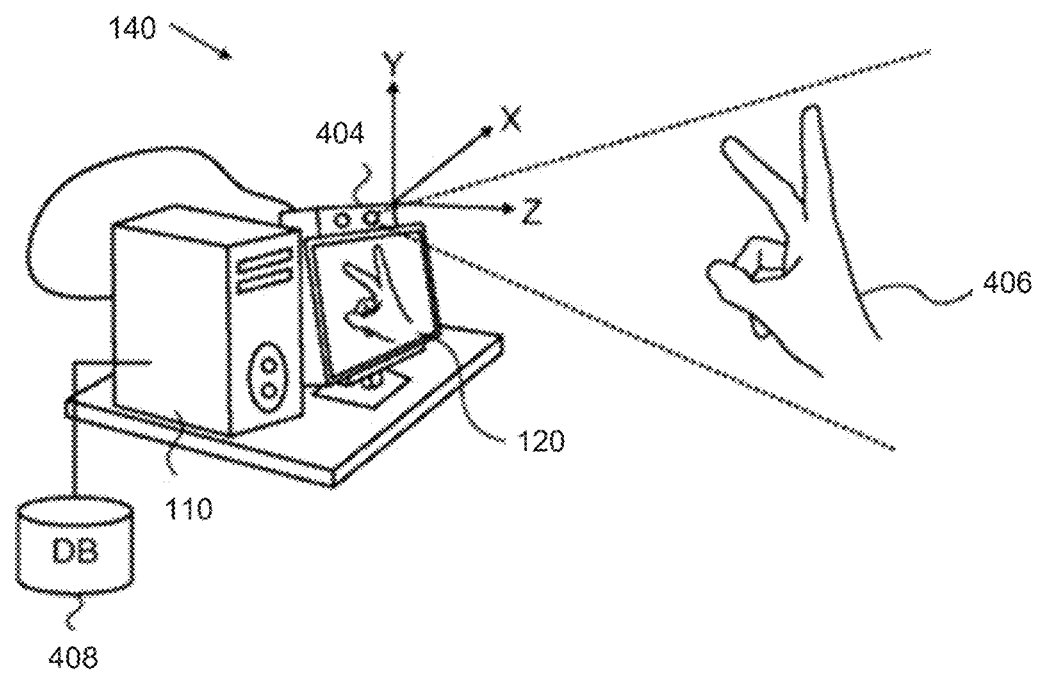
FIG. 4 is a block diagram illustrating a hand tracking unit of a computer system that is configured to capture gesture inputs of the user in accordance with some embodiments.
Figure 4:
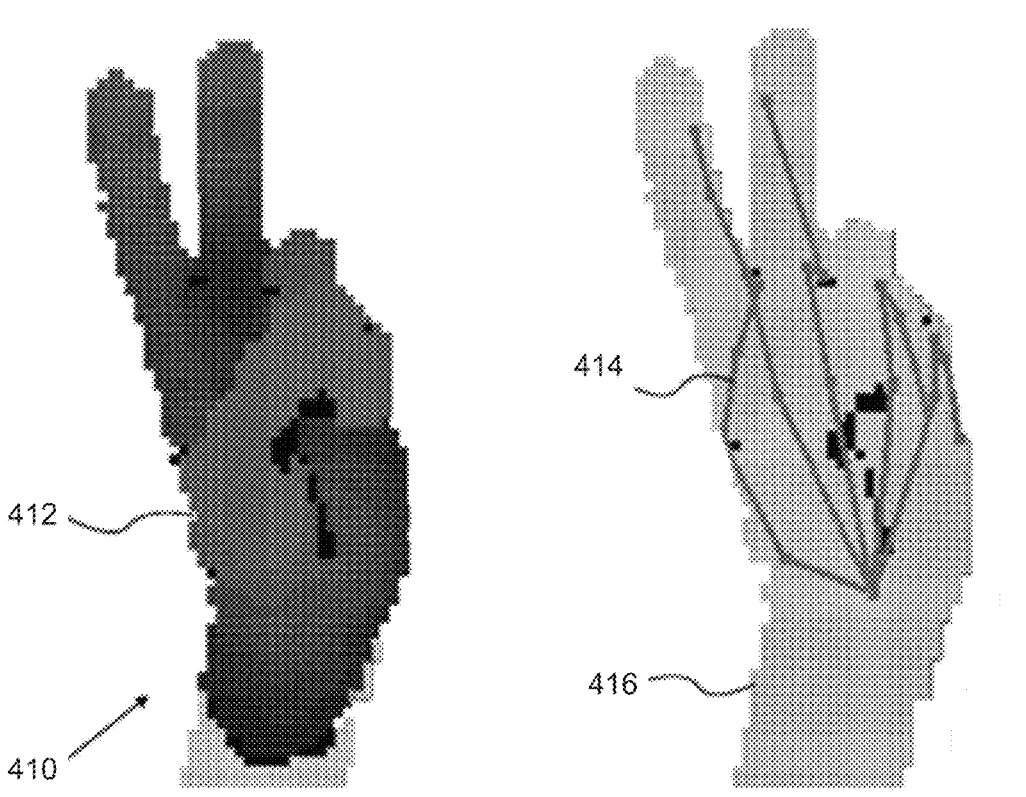

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, over-all size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
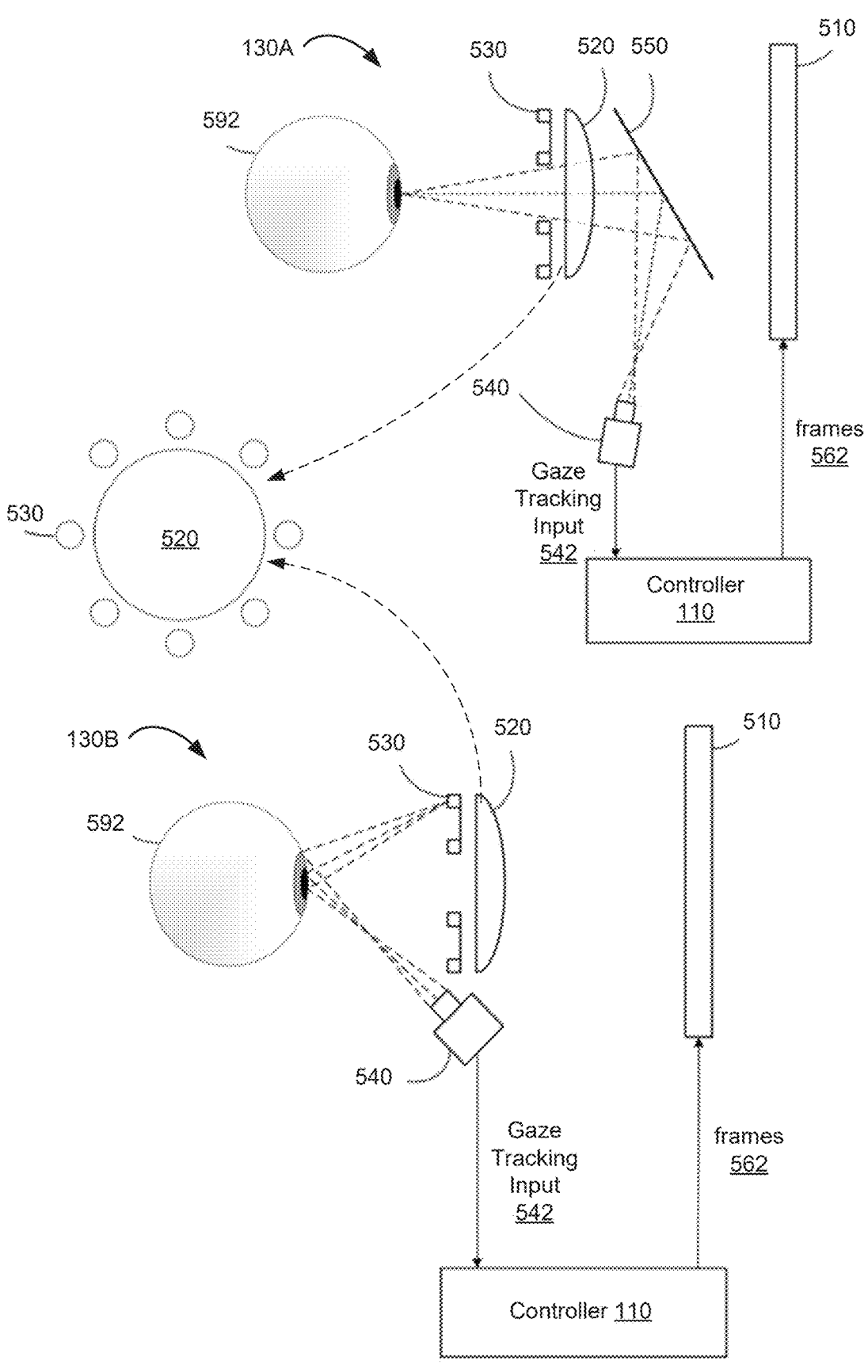
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lense(s) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
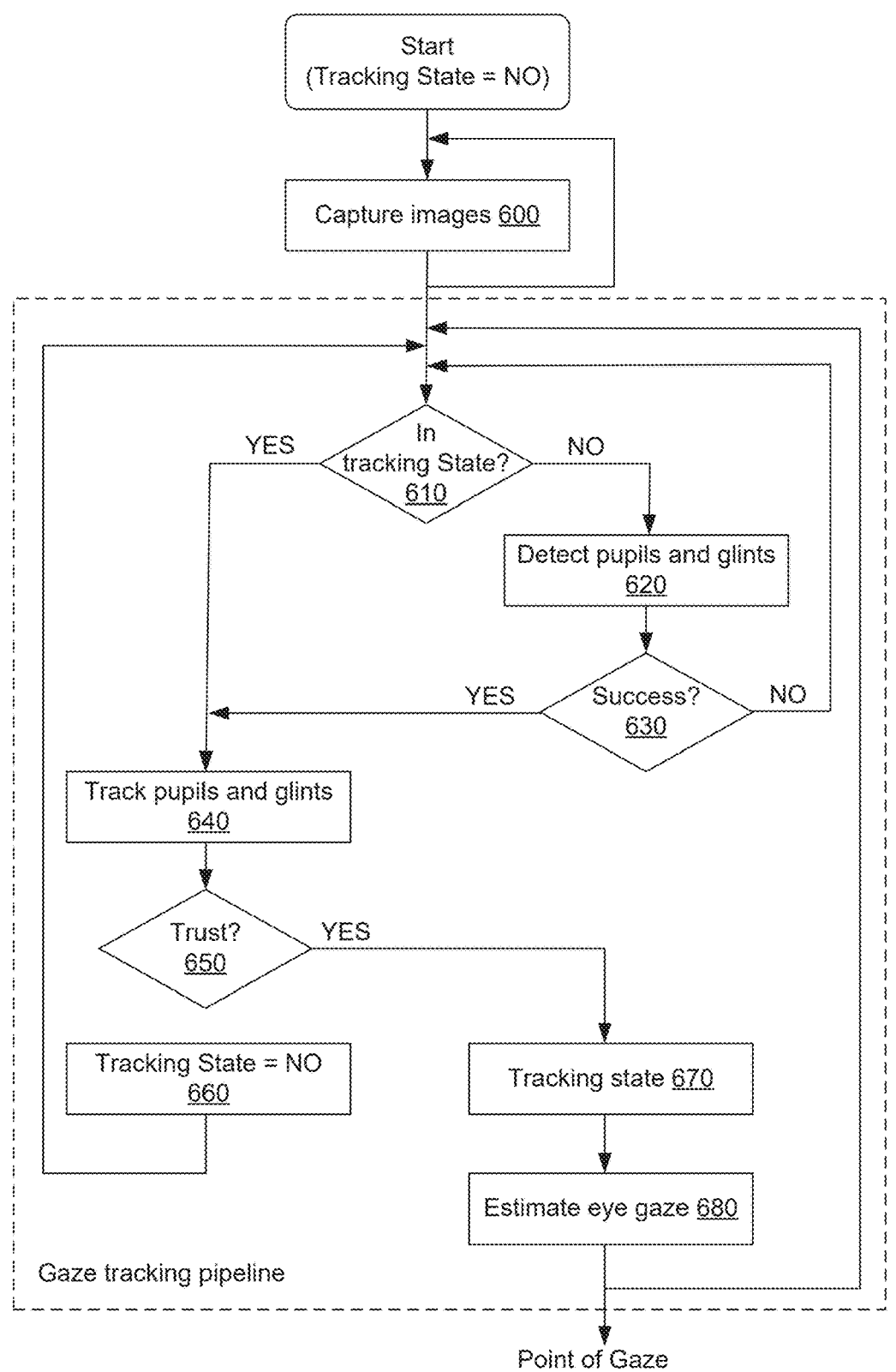
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

USER INTERFACES AND ASSOCIATED PROCESSES

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7K illustrate examples of how an electronic device provides for navigation of a user interface in accordance with detection of a gaze of a user in accordance with some embodiments.

Figure 7A:
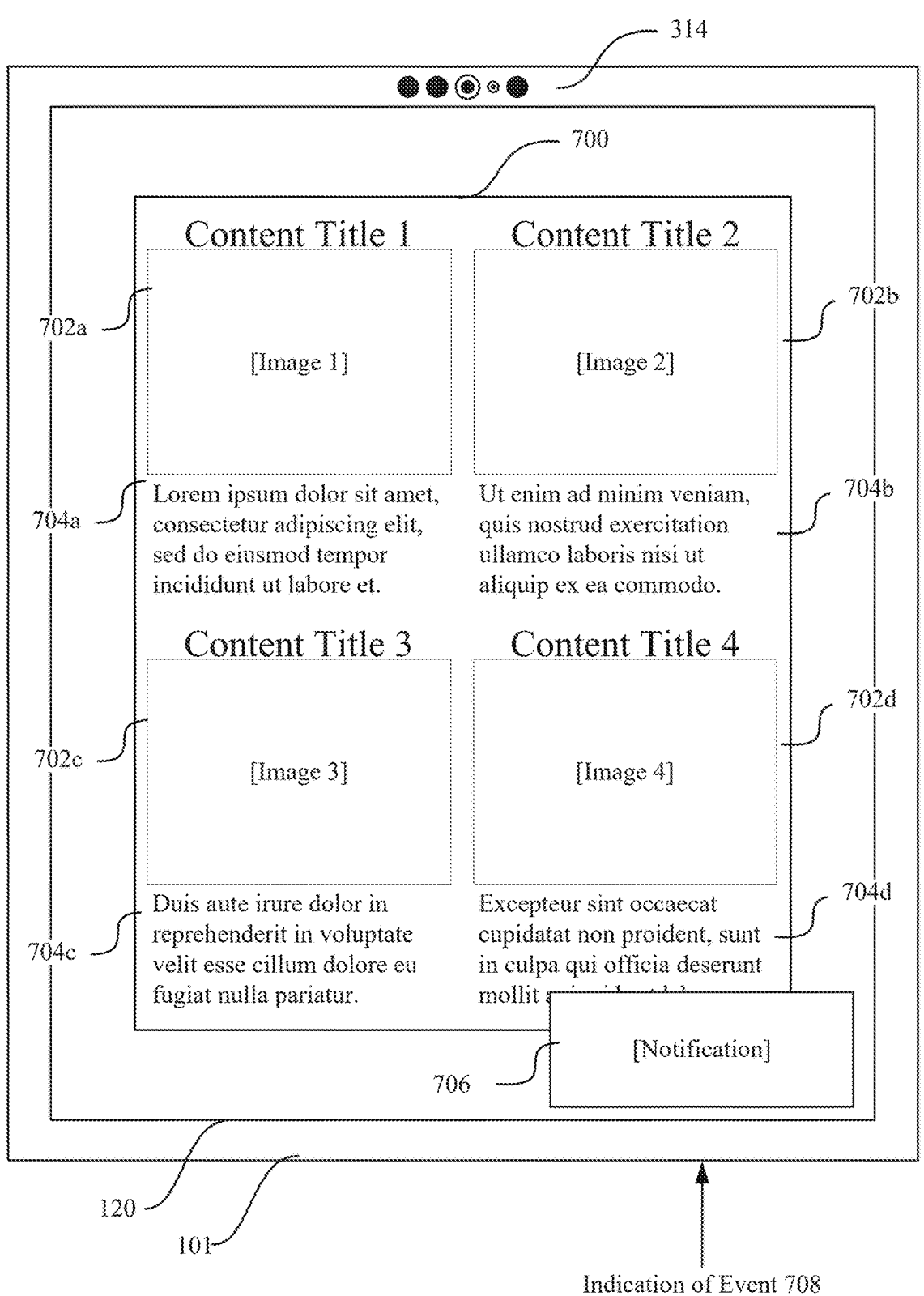
FIGS. 7A-7K illustrate examples of how an electronic device provides for navigation of a user interface in accordance with detection of a gaze of a user in accordance with some embodiments.

FIG. 7A illustrates an electronic device 101 displaying, via a display generation component 120, a content browsing user interface. As described above with reference to FIGS. 1-6, the electronic device 101 optionally includes a display generation component 120 (e.g., a touch screen) and a plurality of image sensors 314. The image sensors 314 optionally include one or more of a visible light camera, an infrared camera, a depth sensor, or any other sensor the electronic device 101 would be able to use to capture one or more images of a user or a part of the user while the user interacts with the electronic device 101.

As shown in FIG. 7A, the user interface includes a content browsing region 700. The content browsing region 700 includes representations of a plurality of content items, including images 702a-d and portions of text 704a-d associated with each item. FIG. 7A also includes an indication of an event 708 received at the electronic device and a visual indication 706 of the event that is displayed in response. For example, the indication of the event is an indication generated by an application accessible to the electronic device 101, such as an indication of an incoming message from another electronic device or a user account of another electronic device. The visual indication of the notification 706 optionally includes text and/or images associated with the event, such as text of a message received at the electronic device 101 and an image associated with the user account that sent the message. Thus, in some embodiments, absent an exception as will be described below, device 101 displays a visual indication 706 of a notification via display generation component 120 in response to receiving the indication of the notification-generating event (e.g., indication 708).

Figure 7B:
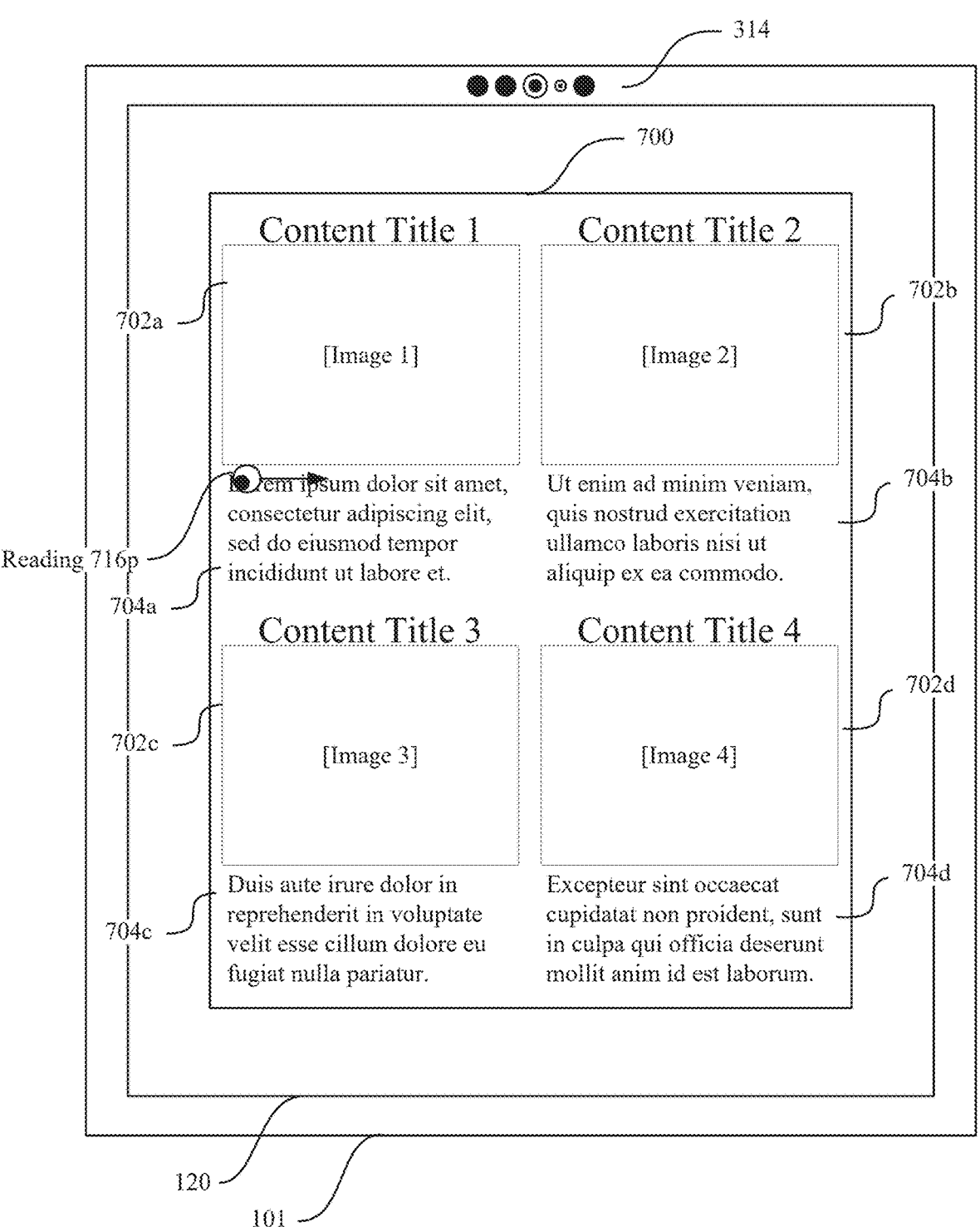

FIG. 7B illustrates the display generation component 120 displaying the content browsing region 700. In FIG. 7B, the electronic device 101 detects (e.g., using one or more image sensors 314) the gaze 716*p* of the user (e.g., the gaze location of the user being coincident with text 704*a*) and determines that the gaze of the user indicates that the user is reading the text 704*a* of one of the items of content. In some embodiments, the electronic device 101 determines whether or not the user is reading by tracking the movement of the user's gaze and determining whether the movement matches eye movement consistent with reading. For example, when people read, their gaze optionally gradually moves along the line of text in the direction of text in the relevant language (e.g., left to right for Latin, as shown in FIG. 7B) while reading a line of text and, when the user is finished reading a line of text, their gaze optionally moves in the opposite direction (e.g., right to left) along the line they just read before looking at the next line. The electronic device 101 optionally compares the detected movement of the user's gaze to this pattern to determine whether or not the user is reading.

Figure 7C:
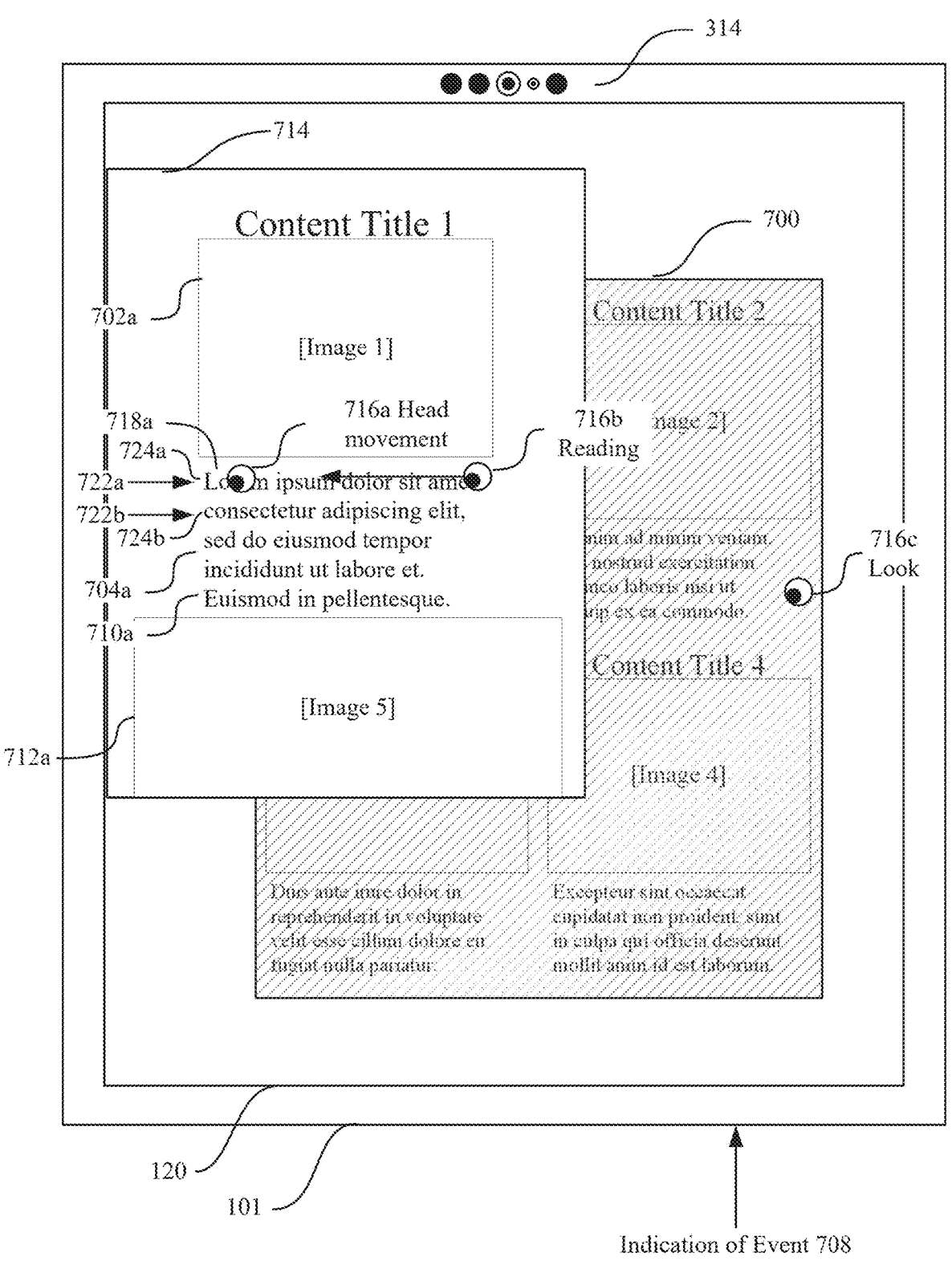

In response to detecting the user reading the text 704*a* of the content item as shown in FIG. 7B, the electronic device 101 updates the user interface as shown in FIG. 7C. As shown in FIG. 7C, the electronic device 101 displays, within an expanded content region 714 overlaid on the original content browsing user interface 700), the image 702*a* and the text 704*a* of the item of content, along with an additional portion 710*a* of text of the content and another image 712*a* included in the content. Thus, in some embodiments, the expanded content region 714 includes portions of the content (e.g., text 710*a*, image 712*a*) that were not visible in the content browsing user interface 700. Device 101 optionally changes the displayed user interface in other ways, which will be described in further detail below.

As described above, the electronic device 101 is able to determine, using the image sensors 314, whether the movement of the user's eyes while looking at the text 704*a* as shown in FIG. 7B corresponds to the user reading or not. In some embodiments, if the electronic device 101 detects that the user is merely looking at the text 704*a* of the content item without reading it, or scanning/skimming the text without reading it, the electronic device 101 continues to display the user interface shown in FIG. 7B instead of updating the display to display the user interface shown in FIG. 7C. In some embodiments, however, the electronic device 101 forgoes updating the user interface in response to detecting the user looking at the text 704*a* without reading it, and updates the user interface as shown in FIG. 7C in response to detecting that the user is scanning or skimming the text 704*a*.

As shown in FIG. 7B, the content browsing region 700 of the user interface includes representations of multiple items of content, such as the image 702*a* and text 704*a* of a first content item, and an image 702*b* and text 704*b* of another content item. As shown in FIG. 7C, when the electronic device 101 updates the user interface to include the other region 714 with additional portions of the first content item, the other content items (e.g., the content items the user was not determined to be reading) are not expanded (e.g., the electronic device 101 does not display additional portions of the other content items).

Likewise, if, in FIG. 7B, the user were to begin reading the text 704*b* of the second content item instead of reading the text 704*a* of the first content item, the electronic device

101 would update the user interface to include a user interface region with additional portions of the second content item in a manner similar to the way the electronic device 101 displays the additional region 714 for the first content item shown in FIG. 7C. The electronic device 101 will optionally similarly expand any other item of content the user begins reading (optionally without expanding the other items of content) while displaying the content browsing user interface 700 shown in FIG. 7B.

As shown in FIG. 7C, while displaying the first item of content in the expanded content region 714 of the user interface, the electronic device 101 continues to display the content browsing region 700 (and the other items of content within the content browsing region 700) of the user interface. The content browsing region 700 (and the items of content displayed therein) is displayed with a deemphasized appearance while displaying the additional portions 710*a* and 712*a* of the first content item in the expanded content region 714. For example, as shown in FIG. 7C, the content browsing region 700 (and content items displayed therein) is displayed with darkened colors and a smaller size compared to the way the content browsing region 700 was displayed before expanding the first content item, as shown in FIG. 7B. In some embodiments, the electronic device 101 displays the content browsing region 700 (and content items displayed therein) with increased translucency while displaying the expanded region 714 compared to how the content browsing region 700 (and content items displayed therein) were displayed before displaying the expanded content region 714.

Also, as shown in FIG. 7C, the expanded content region 714 including the first content item is displayed overlaid on the content browsing region 700 of the user interface. In some embodiments, the z-height of the expanded content region 714 in the user interface is the same as the z-height of the content browsing region 700 before the expanded content region 714 was displayed (e.g., the z-height of the content browsing region 700 in FIG. 7B). In some embodiments, when updating the user interface from the user interface illustrated in FIG. 7B to the user interface illustrated in FIG. 7C, the electronic device 101 optionally moves the content browsing region 700 to a lower z-height in the user interface.

As shown in FIG. 7C, in some embodiments, the electronic device 101 displays the content item in the expanded content region 714 of the user interface at the same location in the user interface (e.g., same horizontal and/or vertical location in the display area) at which the content item had been displayed in the content browsing user interface 700 as shown in FIG. 7B (e.g., image 702*a* and text 704*a* are displayed at the same horizontal and/or vertical location in the display area in FIGS. 7B and 7C). Also shown in FIG. 7C, the width of the content item is optionally the same while the content item is displayed in the expanded content region 714 as it was when the content item was displayed in the content browsing region 700 illustrated in FIG. 7B. As shown in FIG. 7C, the height of the content changes to reveal additional portions 710*a* and 712*a* of the content when it is displayed in the expanded content region 714. In some embodiments, the height of the content stays the same between FIGS. 7B and 7C. In some embodiments, the size of the text of the content item stays the same between FIGS. 7B and 7C, which, in some situations, avoids jarring movement or resizing of text that may be distracting to the user.

In some embodiments, rather than displaying the content at the same location in the user interface when transitioning between the user interface of FIG. 7B to the user interface of FIG. 7C, the electronic device 101 displays the content in the expanded content region 714 in the center (or other predetermined location) of the display area of display generation component 120. In some embodiments, the electronic device 101 initially displays the content in the expanded content region 714 at the same location at which the content item was displayed in the content browsing region 700 in FIG. 7B, and gradually moves the content in the expanded content region 714, and the expanded content region itself 714, to the center (or other predetermined location) of the display area as the user continues to read the content item in the expanded content region 714 (e.g., moves the expanded content region more and more as the user reads more and more of the content in the expanded content region).

When updating the user interface of FIG. 7B to the user interface of FIG. 7C, the electronic device 101 also optionally increases the portion of the user interface for displaying the first item of content. For example, the amount of display area for displaying the contents of the first content item in FIG. 7B is optionally less than the amount of display area for displaying the contents of the first content item in FIG. 7C. As a result, more of the first content item is able to be displayed in the expanded content region 714 than was displayed in the content browsing region 700.

In some embodiments, the electronic device 101 gradually animates the transition from the user interface illustrated in FIG. 7B to the user interface shown in FIG. 7C. The electronic device optionally progresses the animation at a rate proportional to the rate at which the user reads the text 704a of the content item (e.g., as the user reads more of text 704a, more of the transition to FIG. 7C is completed). For example, if the user reads a portion of the text 704a of the content item shown in FIG. 7B, the electronic device optionally displays a portion of the animation. As another example, if the user reads a greater portion of the text 704a of the content item, the electronic device 101 displays a greater portion of the animation.

Returning to FIG. 7C, if the user were to stop reading the text 704a or 710a of the content item and look away from the content item (e.g., looking at location 716c in the user interface), the electronic device 101 optionally reverts the user interface to the user interface shown in FIG. 7B. In some embodiments, the electronic device 101 instead navigates between the user interfaces displayed in FIGS. 7B and 7C in accordance with one or more steps of method 1000, described below. In some embodiments, the electronic device 101 reverts the user interface from the user interface illustrated in FIG. 7C to the user interface illustrated in FIG. 7B in response to detecting (e.g., using image sensors 314) that the user has stopped reading the text 704a and/or 710a of the content item. Moreover, in some embodiments, if the user looks away from the content item (e.g., to location 716c) while the electronic device 101 is displaying the animation of updating the user interface from the user interface illustrated in FIG. 7B to the user interface illustrated in FIG. 7C, the electronic device reverts the user interface to the user interface illustrated in FIG. 7B.

In some embodiments, the electronic device 101 forgoes displaying or generating indications 706 of events while the user is reading an item of content displayed in the user interface (e.g., in the expanded content region 714, or the content browsing region 700). For example, as shown in FIG. 7A, while the user is not reading any of the content items in the content browsing region 700, in response to detecting an indication 708 of an event, the electronic device 101 displays the visual indication 706 of the notification of the event. As shown in FIG. 7C, while the electronic device 101 detects the gaze 716b of the user reading a portion 704a of the content item, in response to receiving an indication 708 of an event, the electronic device 101 forgoes displaying the visual indication of the notification 706 that was displayed in FIG. 7A. In some embodiments, when the user stops reading the content item and while the user is not reading any other content items, the electronic device 101 displays the indication 706 of the event detected while the user had been reading. In some embodiments, the electronic device 101 does not display the visual indication 706 of the event even when the device 101 determines that the user has stopped reading any content in the user interface.

In some embodiments, the electronic device 101 scrolls the text of a content item in accordance with the user's reading of the content item. In FIG. 7C, the electronic device 101 displays a first line 724a of text of the content item at a first position 722a in the user interface (e.g., directly below image 702a). The electronic device 101 also displays a second line 724b of text at a second position 722b (e.g., directly below position 722a) in the user interface.

Figure 7D:
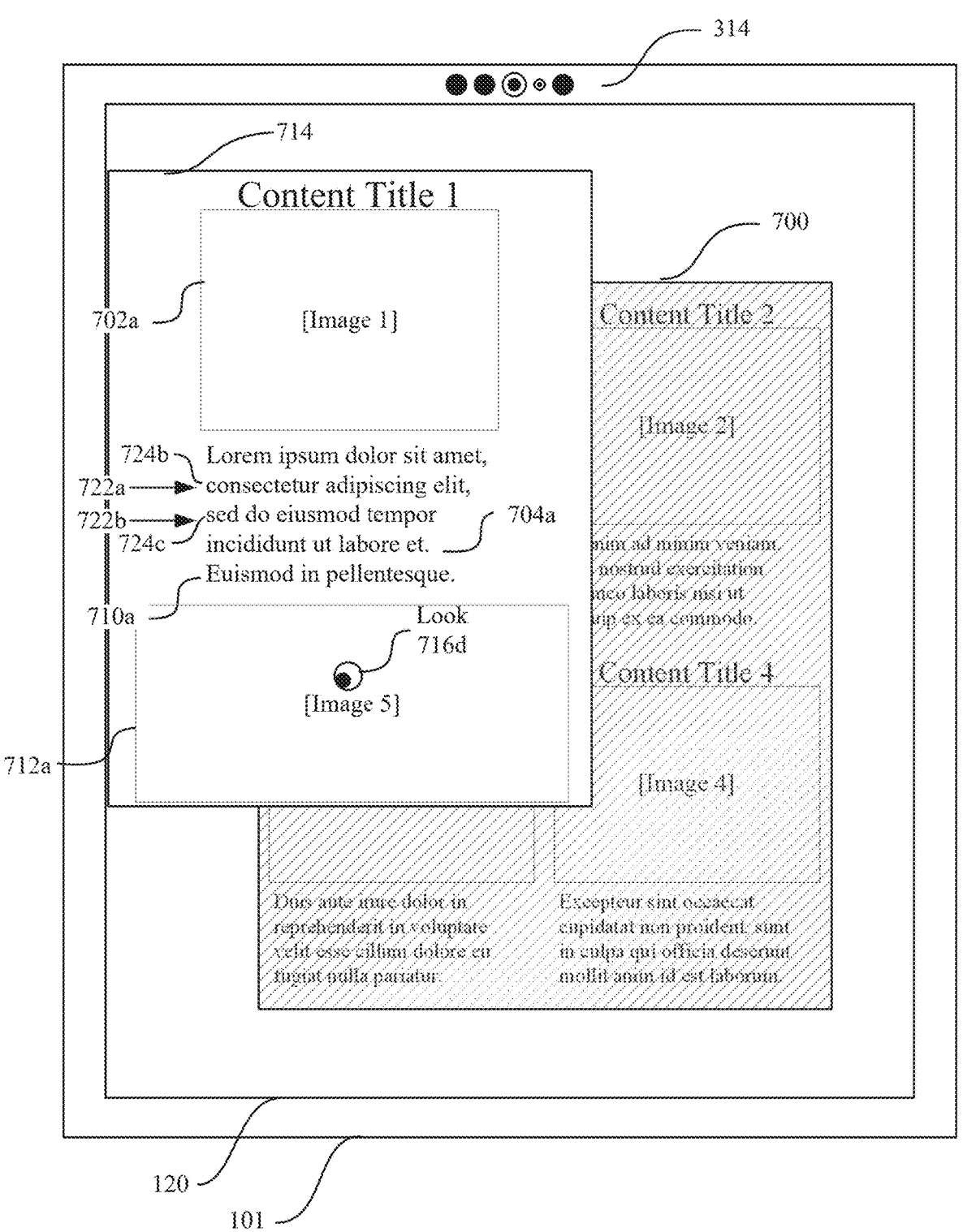

In response to detecting the user's gaze 716b indicative that the user has finished reading the first line 724a of text, the electronic device 101 scrolls the text as shown in FIG. 7D. As shown in FIG. 7D, the result of the scrolling is that the second line of text 724b is now displayed in the first position 722a and a third line of text 724c after the second line of text 724b is displayed at the second position 722b. The electronic device 101 also scrolls the rest of the portions of the content item up, such as text 710a and image 712a. In some embodiments, positions 722a and 722b are fixed relative to the rest of the user interface. In some embodiments, after scrolling the second line of text 724b to position 722a in the user interface, the electronic device ceases to display the first line of text 724a. In some embodiments, image 712a does not scroll.

Returning to FIG. 7C, in some embodiments, the electronic device 101 does not scroll the content until the electronic device detects that the user has finished reading the line 724a of text. While detecting the user reading the line of text 724a without finishing reading the line of text, the electronic device 101 maintains the current scroll state of the content in the user interface (e.g., forgoes scrolling the content). Moreover, the electronic device 101 optionally forgoes scrolling the content in response to detecting the user looking at the content item without reading, or looking elsewhere in the user interface or looking away from the user interface. In some embodiments, in response to detecting the user skimming or scanning the text 724a, rather than thoroughly reading the text 724a, the electronic device 101 also forgoes scrolling the content item. In some embodiments, the electronic device 101 does scroll the text while the user is scanning or skimming the text. For example, while detecting, using image sensors 314, that the user is scanning or skimming the content item, in response to detecting that the user has finished scanning or skimming the first line 724a of text, the electronic device 101 optionally scrolls the text to the position illustrated in FIG. 7D. In summary, in some embodiments, if the user's gaze does not correspond to the user finishing reading the line 724a of text, the electronic device 101 forgoes scrolling the content item.

In some embodiments, the electronic device 101 scrolls the text in response to detecting that the user has finished reading the first line 724a of text, including detecting the user's gaze 716b moving backwards (e.g., from right to left for Latin, as shown) along the line 724a they just read. In some embodiments, users look backwards along the line they just read before looking at the next line 724*a*-thus, detecting the user's gaze 716*b* moving backwards along the line 724*a* of text indicates that the user is about to read the next line 724*b* of text. In some embodiments, the electronic device 101 times the scrolling of the text 704*a* so that the second line 724*b* of text moves to the first position 722*a*, as shown in FIG. 7D, at the same time (e.g., within a time threshold of, such as 0.1, 0.3, 0.5 seconds) the user's gaze 716*b* moves to the start of the first position 722*a*. In this way, the user is able to read the second line of text 724*b* in the same position 722*a* they read the first line of text 724*a* without moving their gaze down to look at the second position 722*a* in the user interface.

In some embodiments, users skip one or more lines of text while reading the content. For example, suppose the user finishes reading the first line of text 724*a* and, instead of starting to read the second line of text 724*b*, the user begins reading portion 710*a* of the text of the content item. In response to detecting, using the user's gaze, that the user is reading the portion 710*a* of the text of the content item, the electronic device 101 optionally scrolls portion 710*a* to position 722*a*. In some embodiments, the speed at which the electronic device 101 scrolls the portion 710*a* of the text to position 722*a* is the same or slower than the speed at which the electronic device 101 scrolls line 724*b* to position 722*a* (e.g., in response to detecting that the user has finished reading the first line 724*a* of text). In some embodiments, as the user continues reading the content item from portion 710*a*, the current reading position of the user in the user interface gradually moves to position 722*a* in the user interface (e.g., part of the way there after reading a first line of text in portion 710*a*, another part of the way there after reading a second line of text in portion 710*a*, etc.).

In some embodiments, the electronic device 101 scrolls images of the content item in response to detecting the user's gaze on the image. FIG. 7D illustrates detection of the user's gaze 716*d* directed to image 712*a* of the content item. In response to detecting the user's gaze 716*d* directed to image 712*a* as shown in FIG. 7D, the electronic device 101 scrolls the content to display the image 712*a* (e.g., the vertical center or other predetermined portion of image 712) at position 722*a*, as shown in FIG. 7E.

Figure 7E:
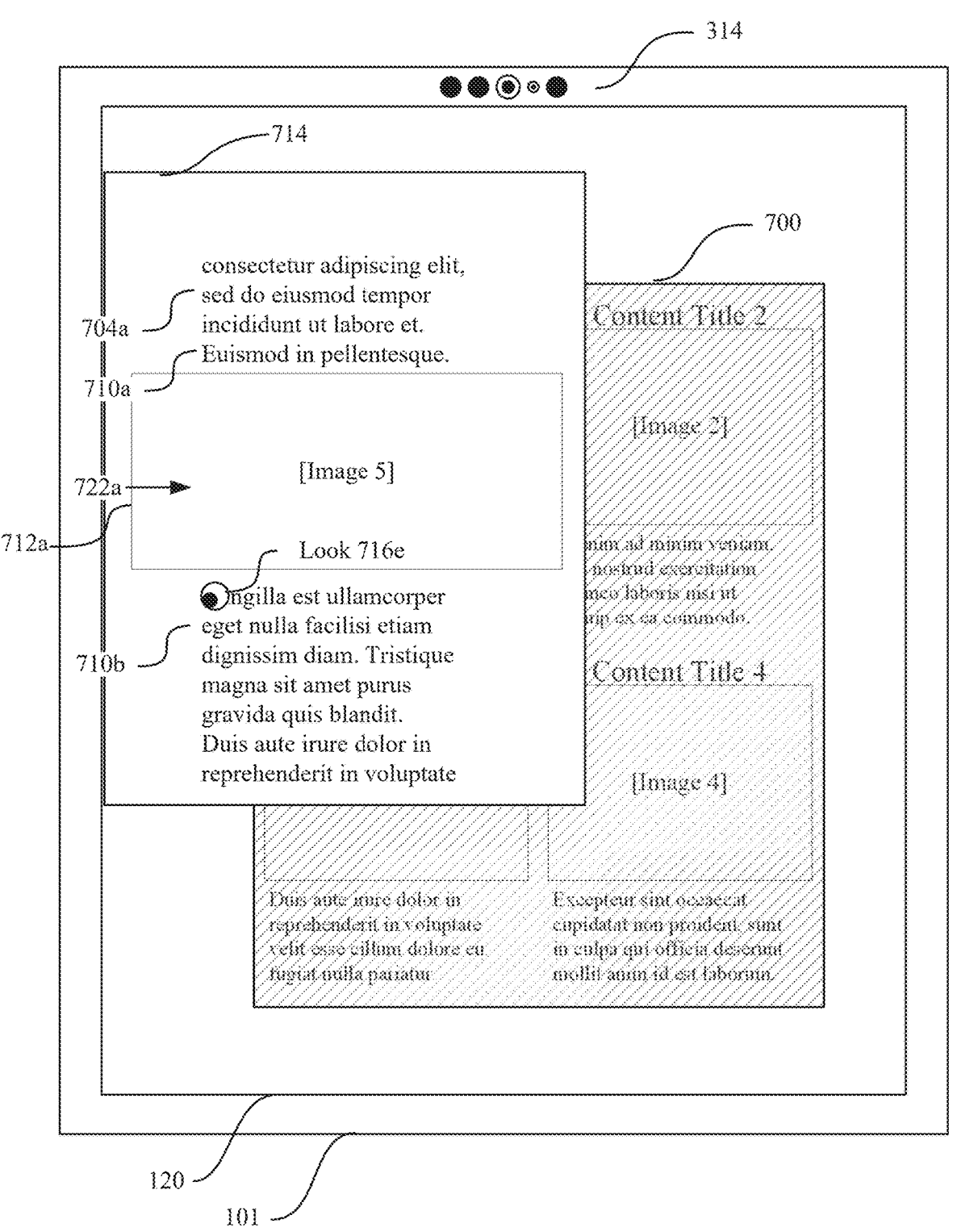
Figure 7F:
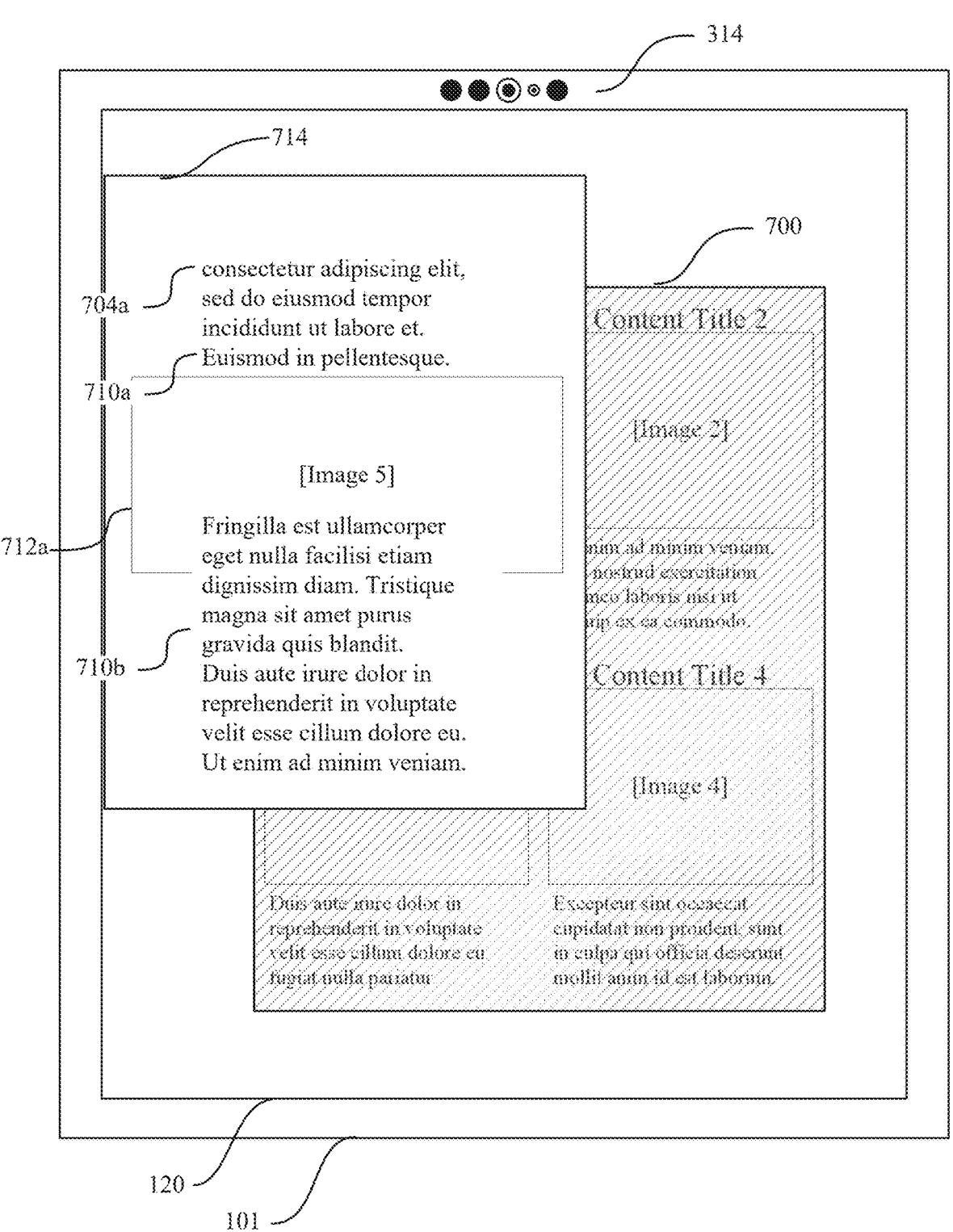

While displaying the image 712*a* at position 722*a*, the electronic device detects the user's gaze 716*e* directed to a portion of text 710*b* of the content item displayed below the image 712*a*, as shown in FIG. 7E. In response, the electronic device 101 scrolls the text 710*b* up to overlap image 712*a* (e.g., without scrolling image 712*a* in the user interface), as shown in FIG. 7F. In some embodiments, device 101 scrolls the text 710*b* such that the portion of text 710*b* to which the user's gaze is directed is displayed at position 722*a* in the user interface. In some embodiments, device scrolls the text 710*b* such that the portion of text 710*b* to which the user's gaze is directed is displayed at another scroll position in the user interface overlaid on image 712*a*. In some embodiments, rather than scrolling the text 710*b* to the position described with reference to FIG. 7F in response to detecting the user looking at the text 710*b* as shown in FIG. 7E, the electronic device 101 scrolls the text 710*b* up to the position described with reference to FIG. 7F in response to different criteria, such as in response to detecting a predetermined amount of time passing since scrolling the image 712*a* to position 722*a* as shown in FIG. 7E, or in response to detecting that the user is reading, rather than merely looking at, text 710*b*.

In some embodiments, while displaying the user interface illustrated in FIG. 7F, the electronic device 101 detects, using the user's gaze, that the user is reading the portion 710*b* of text overlaid on image 712*a*. In response to detecting the user reading the portion 710*b* of text overlaid on image 712*a*, the electronic device 101 optionally scrolls the image 712*a* up so that text 710*b* is no longer overlaid on the image. Optionally, the electronic device 101 also scrolls text 704*a* and 710*a* up (and optionally ceases to display some or all of text 704*a* and 710*a*) in a similar manner when scrolling image 712*a* up. Scrolling of the content item optionally continues based on the user's gaze as described with reference to FIGS. 7C-7F.

As shown in FIGS. 7C-7F, in some embodiments, the electronic device 101 scrolls text vertically. In some embodiments, the electronic device 101 scrolls text horizontally as the user reads the text. Moreover, in some embodiments, the electronic device 101 moves the text (and/or the entire region 714 in which the content item is displayed) to "follow" the user's head movement and/or gaze (e.g., to continue to coincide with the user's gaze). In this way, for example, the electronic device 101 is able to display the content at a predetermined location in the user interface, such as the middle of the user interface, at the location at which the content item was displayed in the content browsing region 700 as shown in FIG. 7A, or at another predetermined location.

In some embodiments, other ways of scrolling the content are possible. The scrolling direction optionally includes both vertical and horizontal scrolling of text. For example, if the user is reading a digital comic book, the panels of the comic book optionally scroll vertically and horizontally as needed to display the panel the user is currently reading at a predetermined location in the user interface. In some embodiments, while displaying the digital comic book, the electronic device 101 optionally does not display speech bubbles and/or one or more images of the digital comic book until the user finishes reading the currently-displayed speech bubbles of the comic (e.g., speech bubbles or other portions of the digital comic book that immediately or otherwise precede the hidden portions of the digital comic book that are displayed in response to the user reading the preceding portions of the digital comic book).

In some embodiments, the electronic device 101 presents audio content associated with the text and/or images of the content item, such as music, sound effects, and/or a recording of the text being read aloud. The electronic device 101 optionally plays the audio content at a speed that is coordinated with the speed at which the user reads the content.

Also, in some embodiments, the electronic device 101 is able to save an indication of the content the user is reading and/or a timestamp at which the user was reading the content. At a later time, in response to a request to present an indication of the item of content the user was reading at a respective time, the electronic device 101 is optionally able to present the indication of the content item the user was reading at the respective time. In some embodiments, the electronic device 101 is also able to store the user's reading progress of an item of content and, when the user returns to the item of content, the electronic device 101 optionally presents an indication of the portion of the content the user last read and/or scrolls the content to the portion the user last read.

In some embodiments, while displaying the content item in expanded content region 714 and scrolling the content in accordance with the user's gaze, in response to detecting, using the image sensors 314, that the user closes their eyes for a predetermined amount of time (e.g., 0.5 seconds, 1 second, 2 seconds), the electronic device scrolls the content item to the beginning, such as to the state of the content item illustrated in FIG. 7C.

In some embodiments, in response to detecting the user skimming or scanning the content item, the electronic device 101 optionally displays one or more key words of the content item with a visual characteristic different from the rest of the content item. For example, the key words are displayed in bold and/or in a different color and/or size than the rest of the text.

As described with reference to FIGS. 7C-7F, the electronic device 101 scrolls the text down in response to detecting the user reading the text. In some embodiments, an input other than gaze detection is needed to scroll the text up (e.g., device 101 optionally does not scroll the content item upwards in response to a gaze input). For example, the electronic device optionally scrolls the text up in response to detecting an input from an input device other than the image sensors 314, such as a directional input detected at a touch screen, mouse, keyboard, motion sensor, or other input device for scrolling the content item upwards in the user interface. In this way, device 101 is able to avoid distracting and unnecessary back-and-forth scrolling that might occur if upwards and downwards scrolling were both performed based on gaze.

As described above with reference to FIGS. 7A-7C, the electronic device 101 displays the region 714 overlaid on the content browsing region 700 in response to detecting the user reading the portion 704a of the content item. As shown in FIG. 7C, region 714 is visually emphasized relative to the content browsing region 700 while the user looks at region 714, such as by displaying region 714 overlaid on region 700 and/or displaying region 714 with full color, clarity (e.g., no blurriness), and/or size while displaying the content browsing region 700 with dull color (e.g., reduced saturation), reduced clarity (e.g., with blurriness), and/or reduced size.

In some embodiments, the electronic device 101 navigates between the content browsing region 700 of the user interface and region 714 of the user interface in accordance with the user's gaze and/or head movement. Returning to FIG. 7C, while displaying the content item in the region 714 overlaid on the content browsing region 700, the electronic device 101 detects the user's gaze 716c on the content browsing region 700. In some embodiments, the electronic device 101 also detects movement of the user's head that meets one or more criteria, such as movement of the user's head forward (with respect to the user's body) and/or towards the content browsing region 700 (e.g., tilting or turning to the right). In response to detecting the gaze 716c of the user and the head movement, the electronic device 101 begins to navigate back to the content browsing user interface shown in FIGS. 7A and/or 7B, as will be described in more detail below.

Figure 7G:
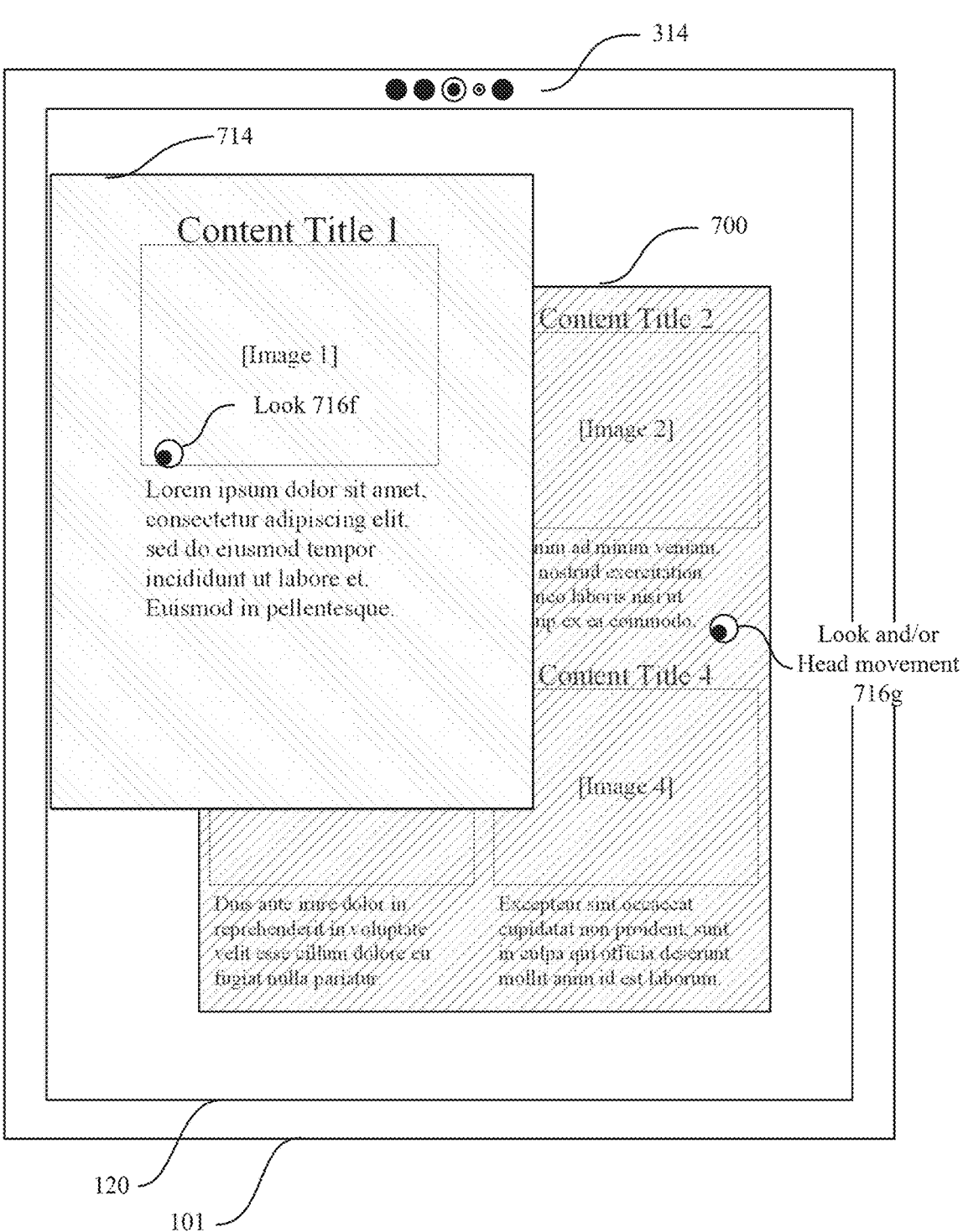
Figure 7H:
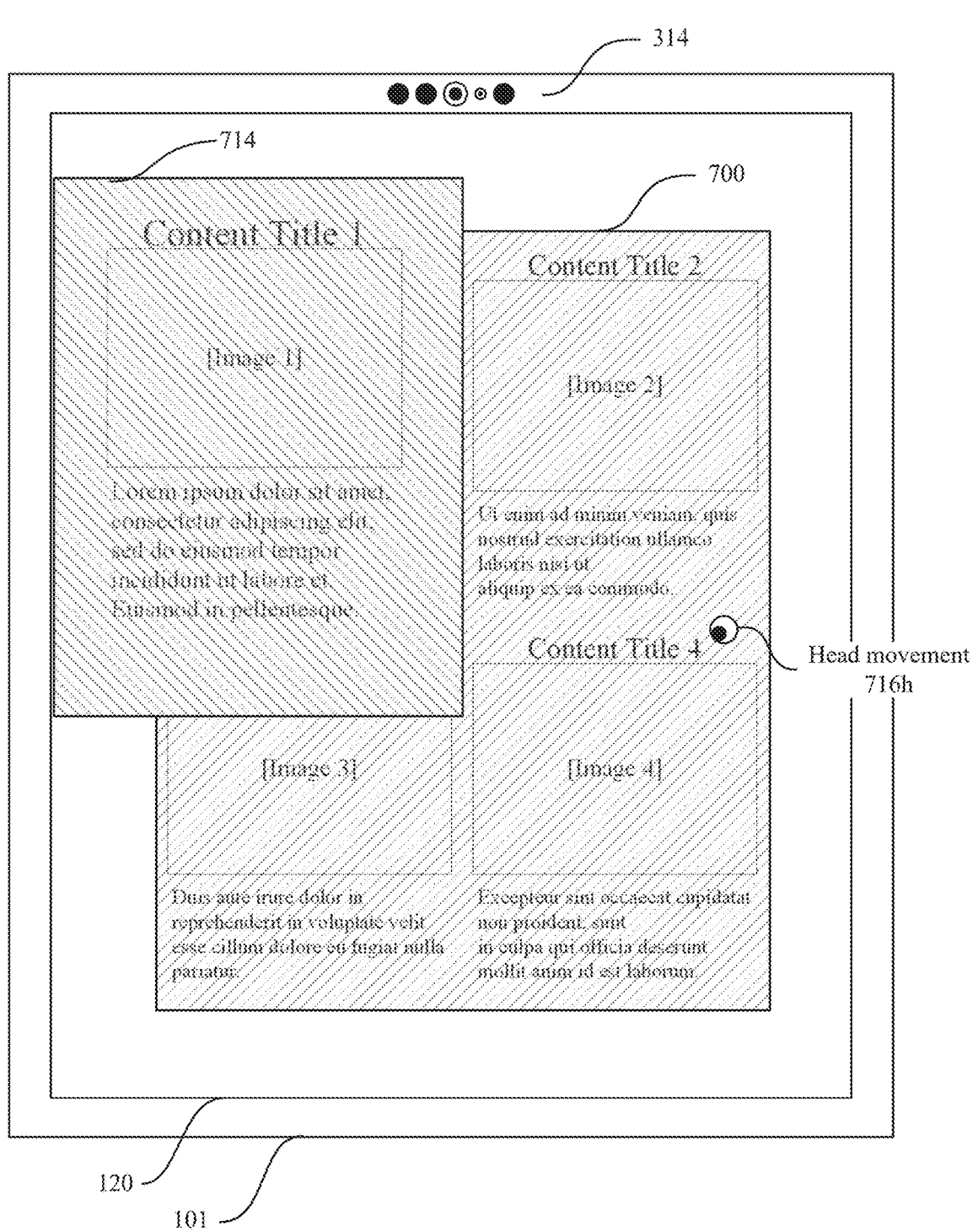

The electronic device 101 optionally animates the transition between displaying the region 714 overlaid on the content browsing region 700 as shown in FIG. 7C, and displaying the content browsing region as shown in FIG. 7B. In some embodiments, the animation progresses at a rate proportional to the amount and/or duration of the head movement forward and/or toward content browsing region 700 and/or the duration of the user's gaze on the content browsing region 700. FIGS. 7G and 7H illustrate intermediate frames of the animation. In response to detecting the user's head movement forward and/or toward content browsing region 700 and the user's gaze 716c in FIG. 7C, the electronic device 101 begins the animation, including displaying the user interface illustrated in FIG. 7G. As shown in FIG. 7G, the electronic device 101 begins to de-emphasize (e.g., darken and/or blur) the region 714 and/or emphasize (e.g., lighten and/or increase the clarity of) the content browsing region 700. In some embodiments, the electronic device 101 modifies other characteristics of the regions 714 and 700, such as translucency, brightness, saturation, and/or size.

In response to continuing to detect the head movement forward and/or towards content browsing region 700 and the user's gaze 716g on the content browsing region 700 as shown in FIG. 7G, the electronic device 101 progresses the animation, including displaying the user interface illustrated in FIG. 7H. As shown in FIG. 7H, the electronic device 101 continues to de-emphasize (e.g., darken and/or blur) region 714 and/or emphasize (e.g., lighten and/or increase the clarity of) the content browsing region 700. Also, the electronic device 101 displays the region 714 with a decreased size and displays the content browsing region 700 with an increased size compared to the sizes at which the regions 714 and 700 were displayed earlier in the animation as shown in FIG. 7G. In some embodiments, the electronic device 101 modifies other characteristics of the regions 714 and 700, such as translucency, brightness, saturation, and/or size. In some embodiments, in response to detecting the user's gaze 716c directed toward content browsing region 700 (as shown in FIG. 7C), without detecting the head movement forward and/or toward content browsing region 700, the electronic device 101 begins displaying the animation shown in FIGS. 7G and 7H. The electronic device optionally does not navigate back to the content browsing region 700 as shown in FIG. 7B, however, unless both the user's gaze 716c directed toward the content browsing region 700 and the head movement satisfying the criteria are detected. In some embodiments, in response to detecting the user's gaze moving back and forth between regions 700 and 714 without the corresponding head movement that is optionally needed to initiate navigation between regions 700 and 714, device 101 only changes one or more visual characteristics, other than size, of the two regions, without displaying or animating changes in size and/or movement of the two regions. For example, while the user's gaze is directed to region 714, it is displayed with full clarity, color, etc., and region 700 is displayed with less clarity (e.g., blurred), color (e.g., reduced saturation such as grayscale), etc., and in response to the user's gaze being directed to region 700 without corresponding head movement, device 101 displays region 700 with full clarity, color, etc., and region 714 is displayed with less clarity (e.g., blurred), color (e.g., grayscale), etc., and vice versa.

In response to continuing to detect the head movement forward and/or toward content browsing region 700 and the user's gaze 716h on the content browsing region 700 as shown in FIG. 7H (e.g., in response to detecting that the user's gaze and head movement satisfy one or more predetermined criteria), the electronic device 101 continues to progress the animation to display the content browsing region 700 and ceases to display the expanded content region 714, as shown in FIG. 7B. As shown in FIG. 7B, the content browsing region 700 is displayed at full size, full color, full clarity, and/or minimal translucency, and the region 714 is no longer displayed. Thus, in response to detecting the head movement of the user forward and/or toward content browsing region 700 and the user's gaze on the content browsing user interface 700, the electronic device 101 navigates from the region 714 back to the content browsing region 700.

Returning to FIG. 7C, in response to detecting movement of the user's head that does not meet the criteria for navigating back to region 700, or detecting no head movement at all, the electronic device 101 continues to display region 714 overlaid on the content browsing region 700. Also, in response to detecting the gaze of the user 716c on the content browsing region 700 without detecting the head movement, the electronic device 101 forgoes navigating back to the content browsing region 700. Moreover, if the user performs the head movement meeting the navigation criteria (e.g., forward movement or movement toward content browsing region 700) but continues to look at region 714 instead of looking at the content browsing region 700, the electronic device 101 forgoes navigating back to the content browsing region 700.

In some embodiments, the electronic device 101 reverses the animation of navigating from region 714 to region 700 and forgoes navigating back to the content browsing region 700 if the user looks at the region 714 while the animation is being displayed. As shown in FIG. 7G, the electronic device 101 detects the gaze 716f of the user on region 714 while displaying the animation of navigating from region 714 to the content browsing region 700. In response to detecting the user's gaze 716f, the electronic device 101 optionally stops navigating back to the content browsing region 700 and displays the user interface illustrated in FIG. 7C. As shown in FIG. 7C, the region 714 is displayed with full color, clarity, and/or size and/or minimal translucency, and the content browsing region 700 is displayed at a reduced size and with darker color, increased blur, and/or increased translucency compared to the appearances of the regions 714 and 700 illustrated in FIG. 7G.

Thus, as described above with reference to FIGS. 7A-7H, the electronic device is able to navigate between regions of the user interface, including ceasing to display text, in accordance with gaze and/or head movement of the user. In some embodiments, some text (e.g., visual indications of notifications 706, text shown in the expanded content region 714, etc.) cannot be dismissed unless it is first read. For example, visual indications 706 of notifications and/or terms and conditions are displayed until the electronic device 101 has detected (e.g., with image sensors 314) that the user has read the content of these items. In some embodiments, in response to detecting that the user has read the indication of the notification 706, the electronic device displays the application associated with the notification.

In some embodiments, the electronic device 101 displays augmented content related to a portion of a content item in response to detecting the user looking at the portion of the content item and moving their head forward (e.g., relative to the user's body). For example, the augmented content is the definition of a word, a preview of a hyperlink, or an enlarged (e.g., scaled up or un-cropped) version of an image included in the content item.

For example, turning to FIG. 7C, the electronic device 101 detects the gaze 716a of the user while the user moves their head forward. As shown in FIG. 7C, the gaze 716a of the user is at a location of a respective word 718a ("Lorem") of the content item. In response to detecting the gaze 716a of the user on the respective word 718a for a predetermined amount of time and/or, while the gaze 716a of the user is on the respective word 718a, the head movement of the user for the predetermined amount of time and/or over a predetermined distance, the electronic device 101 displays the word 718a with a modified appearance, such as displaying the word 718a in bold typeface as shown in FIG. 7I.

Figure 7I:
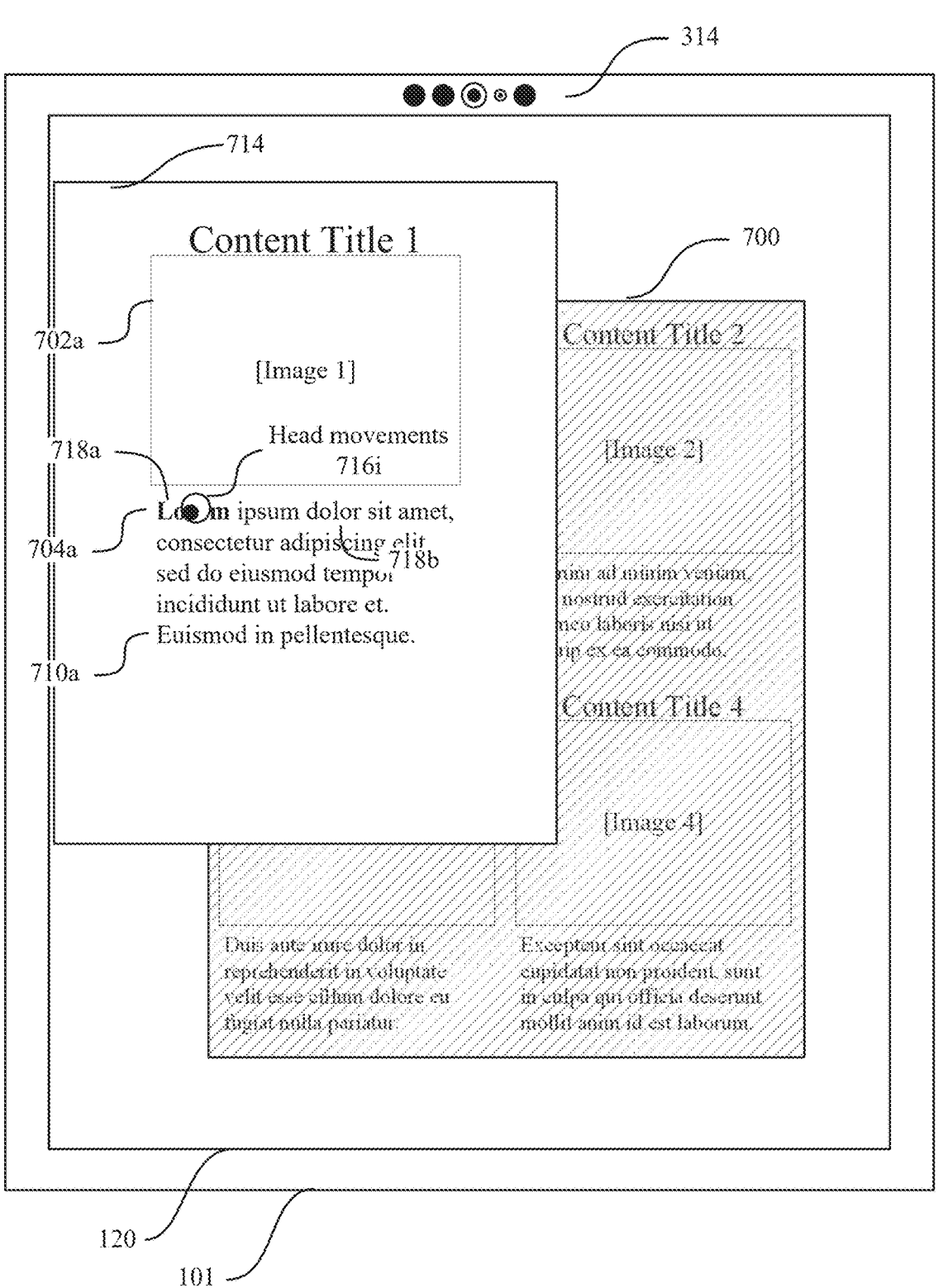
Figure 7J:
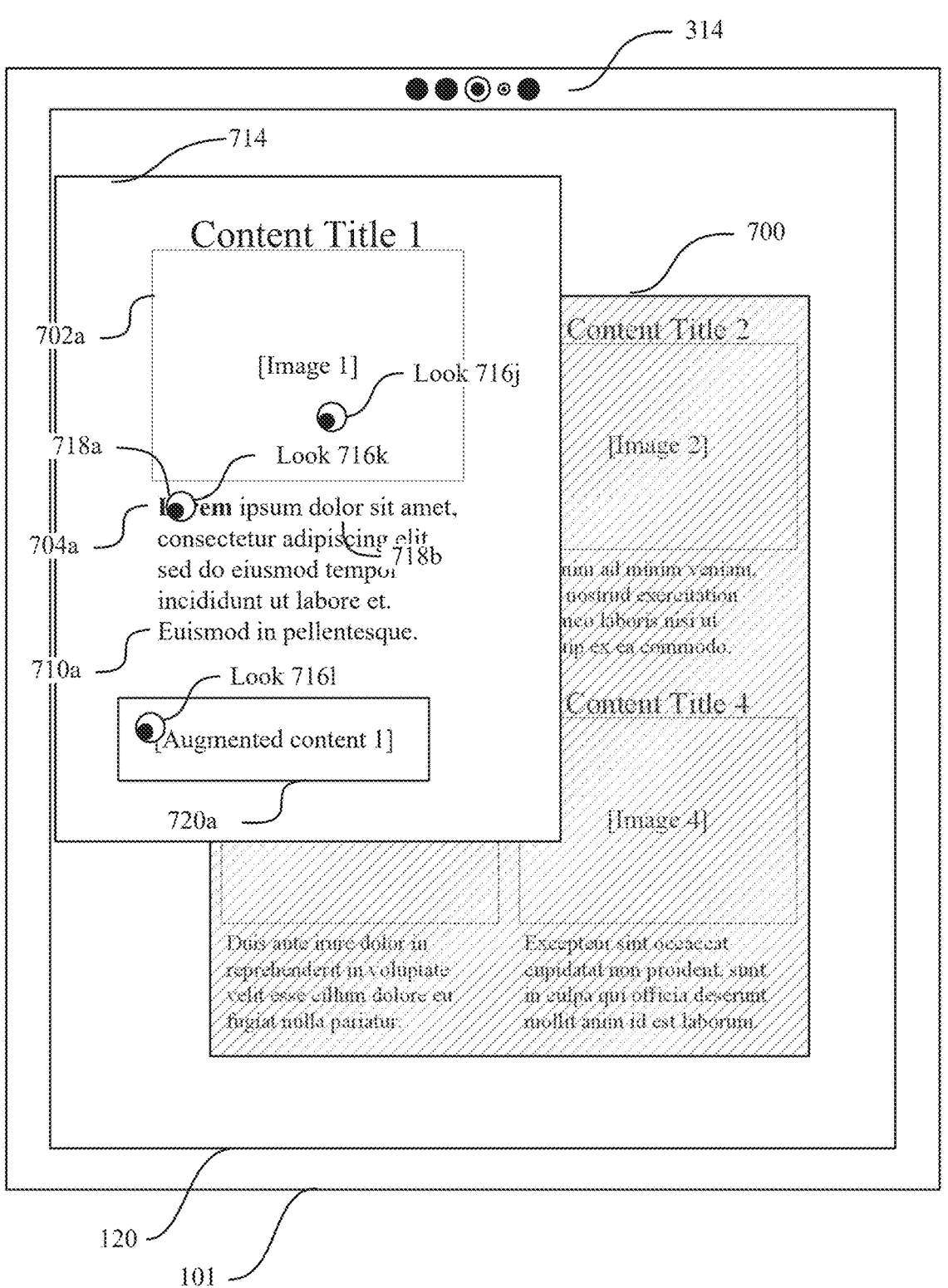

In response to continuing to detect the gaze 716i of the user on word 718a and the movement of the head forward, as shown in FIG. 7I, the electronic device 101 displays the augmented content 720a associated with the word 718a, as shown in FIG. 7J. Thus, in response to the user's gaze and head movement, the electronic device 101 first displays an indication that the electronic device 101 is about to display the augmented content 720 (e.g., changing the appearance of the word to which the gaze is directed) and then, if the head movement is maintained or continued and the gaze is held on word 718a, the electronic device 101 displays the augmented content 720a.

In some embodiments, the electronic device 101 animates the transition between the user interface illustrated in FIG. 7I and the user interface illustrated in FIG. 7J. The progression of the animation is optionally proportional to the duration the user's gaze is on word 718a, the duration the user held their head forward, or the distance and/or speed at which the user moves their head forward.

Figure 7K:
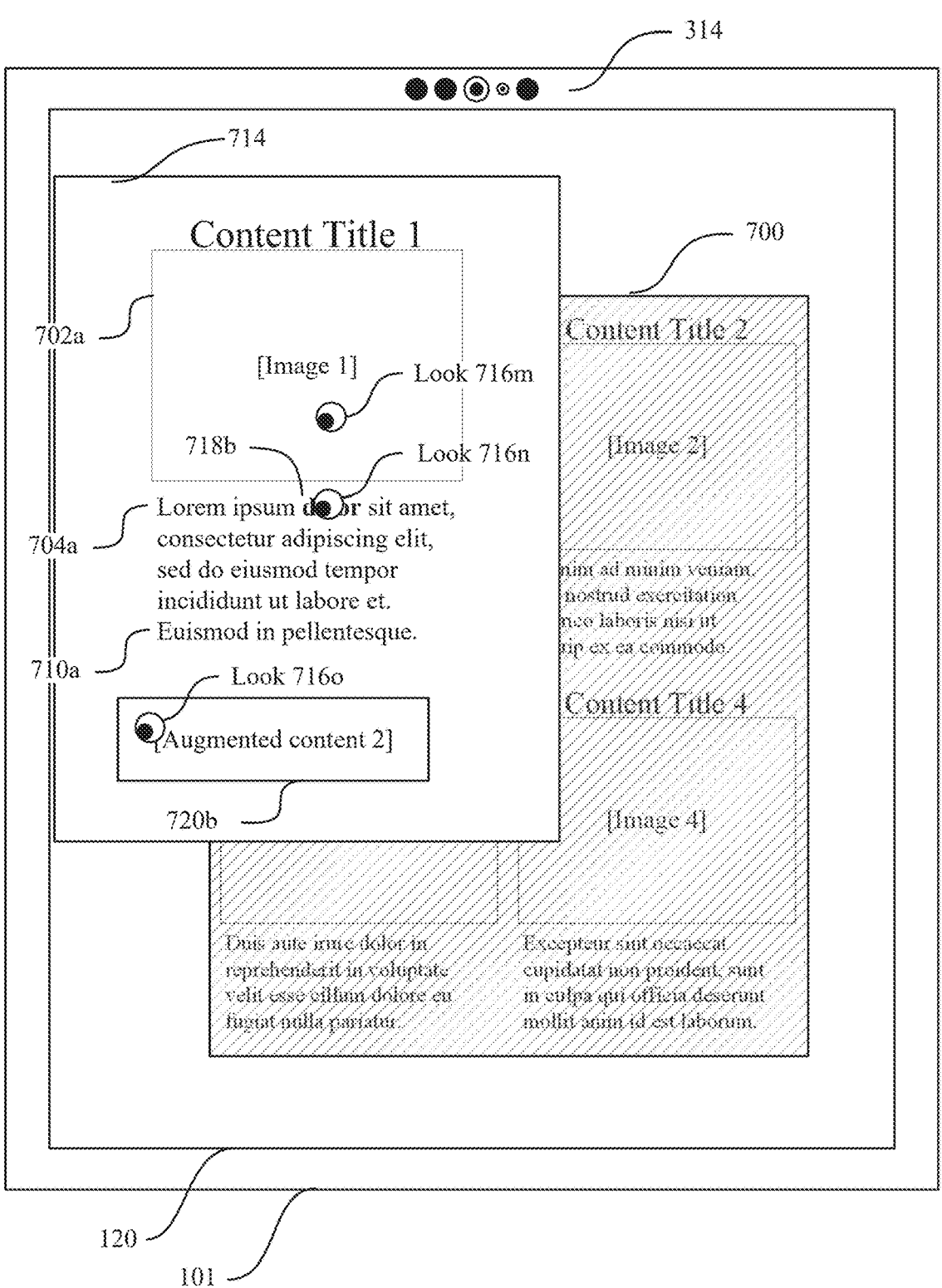
Figure 8A:
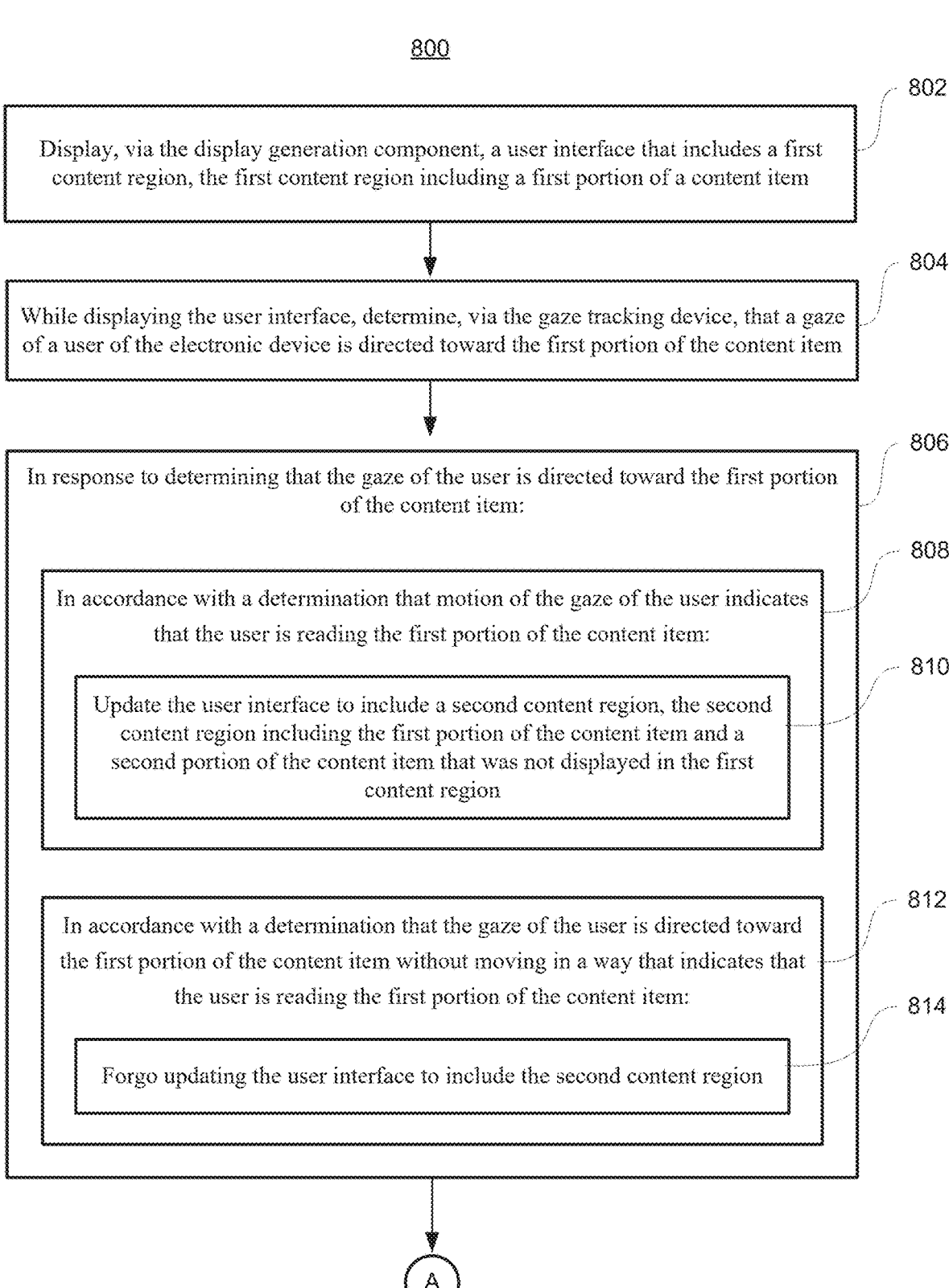
Figure 8C:
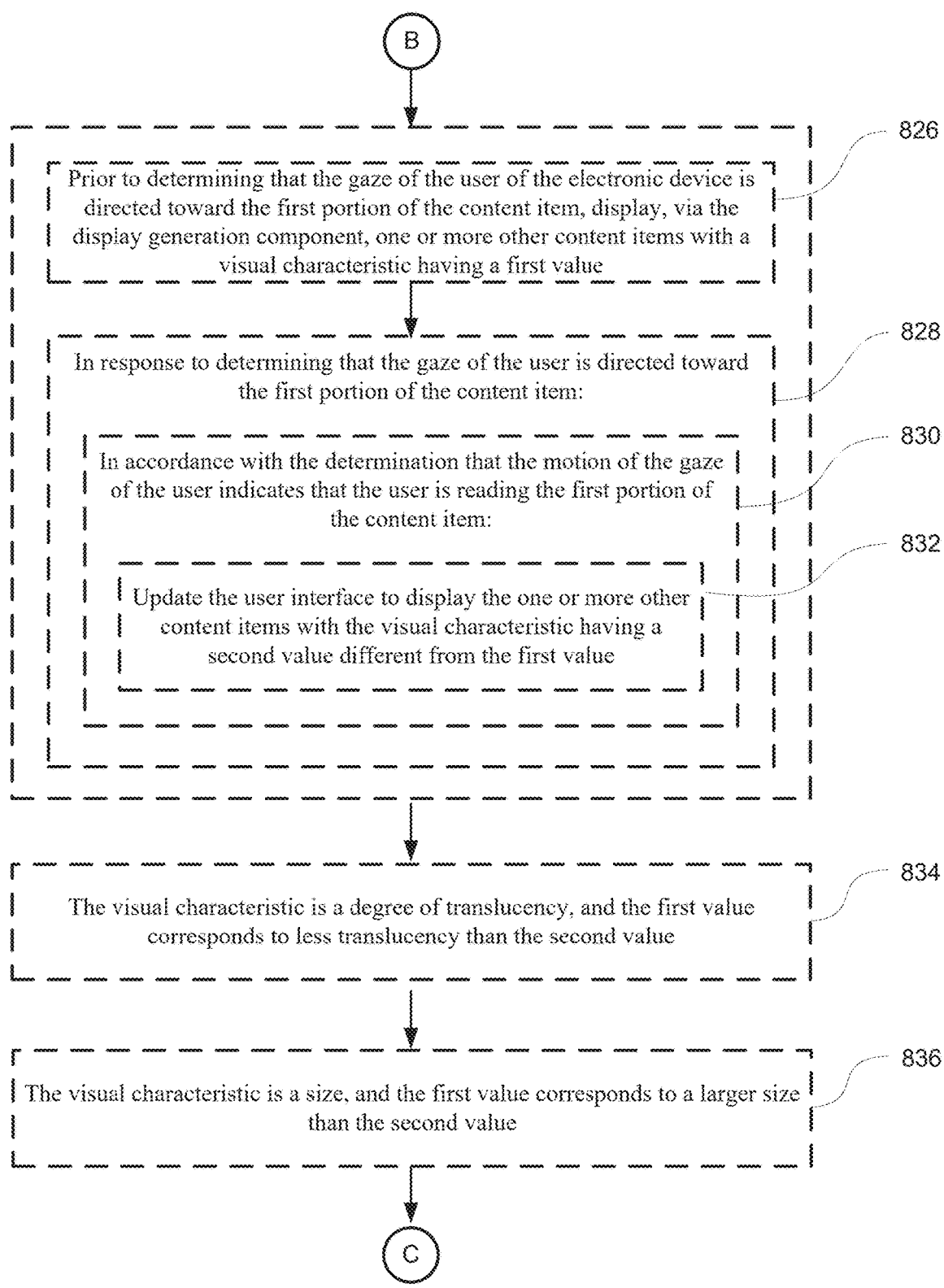
Figure 8E:
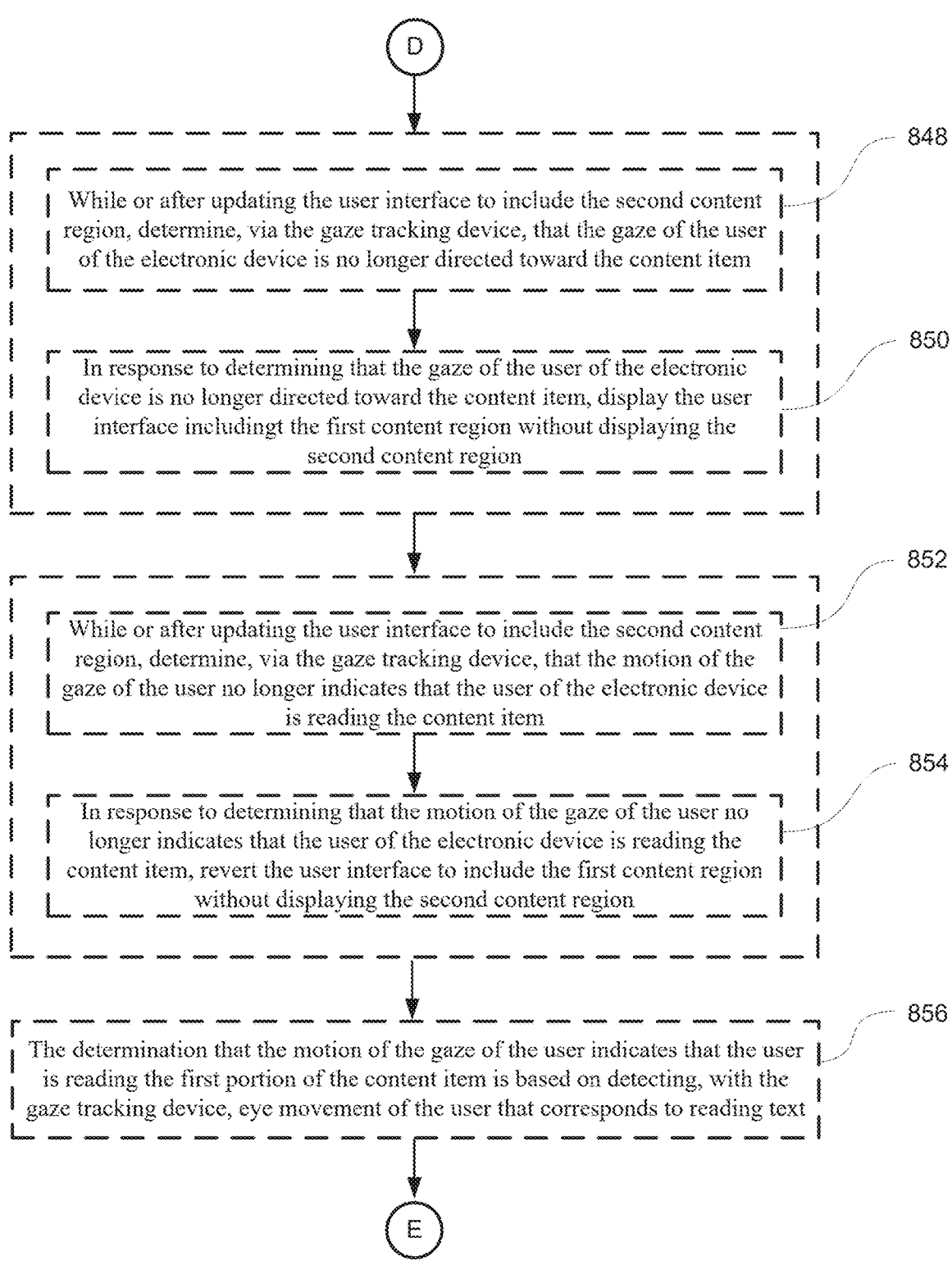
Figure 8F:
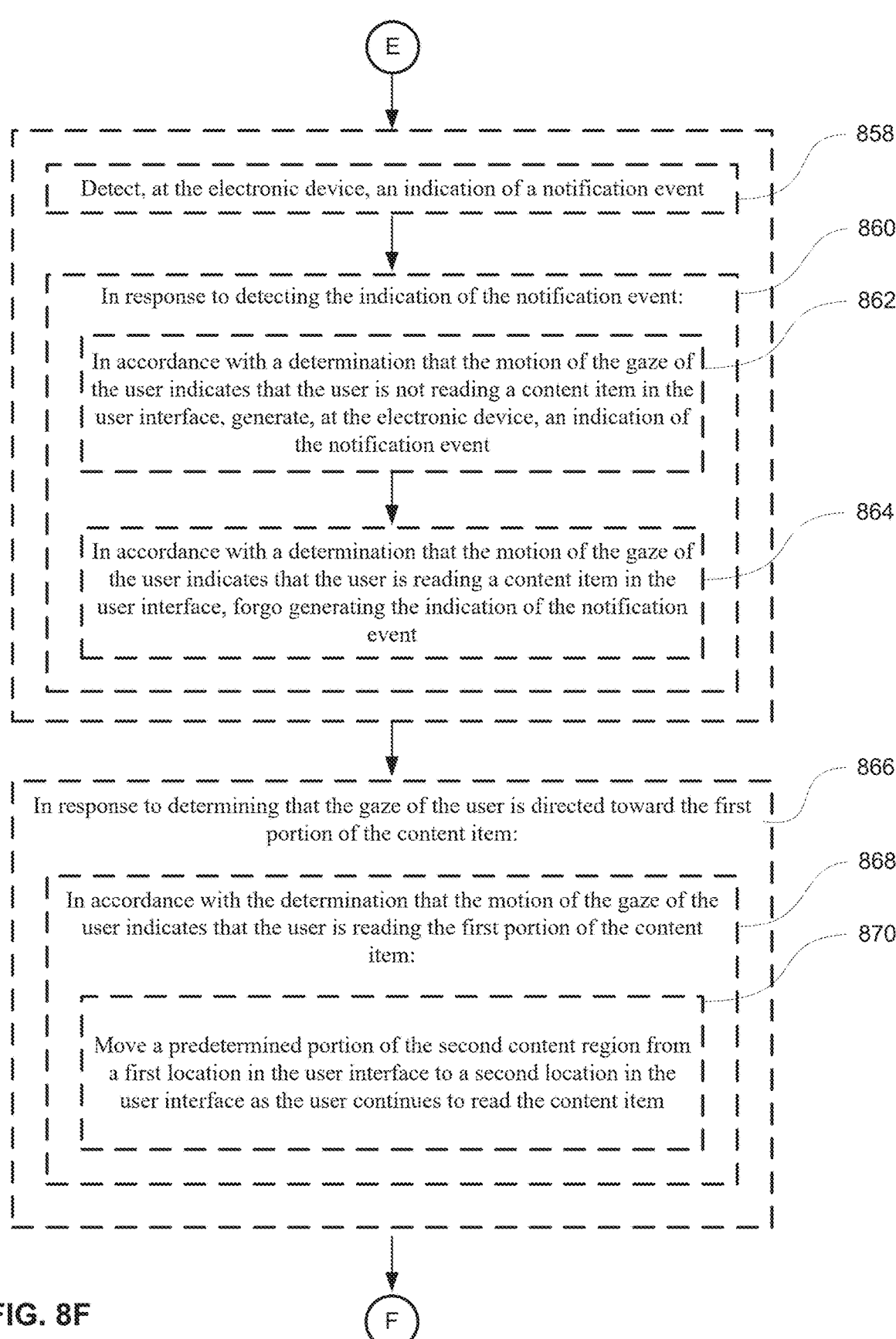
Figure 8G:
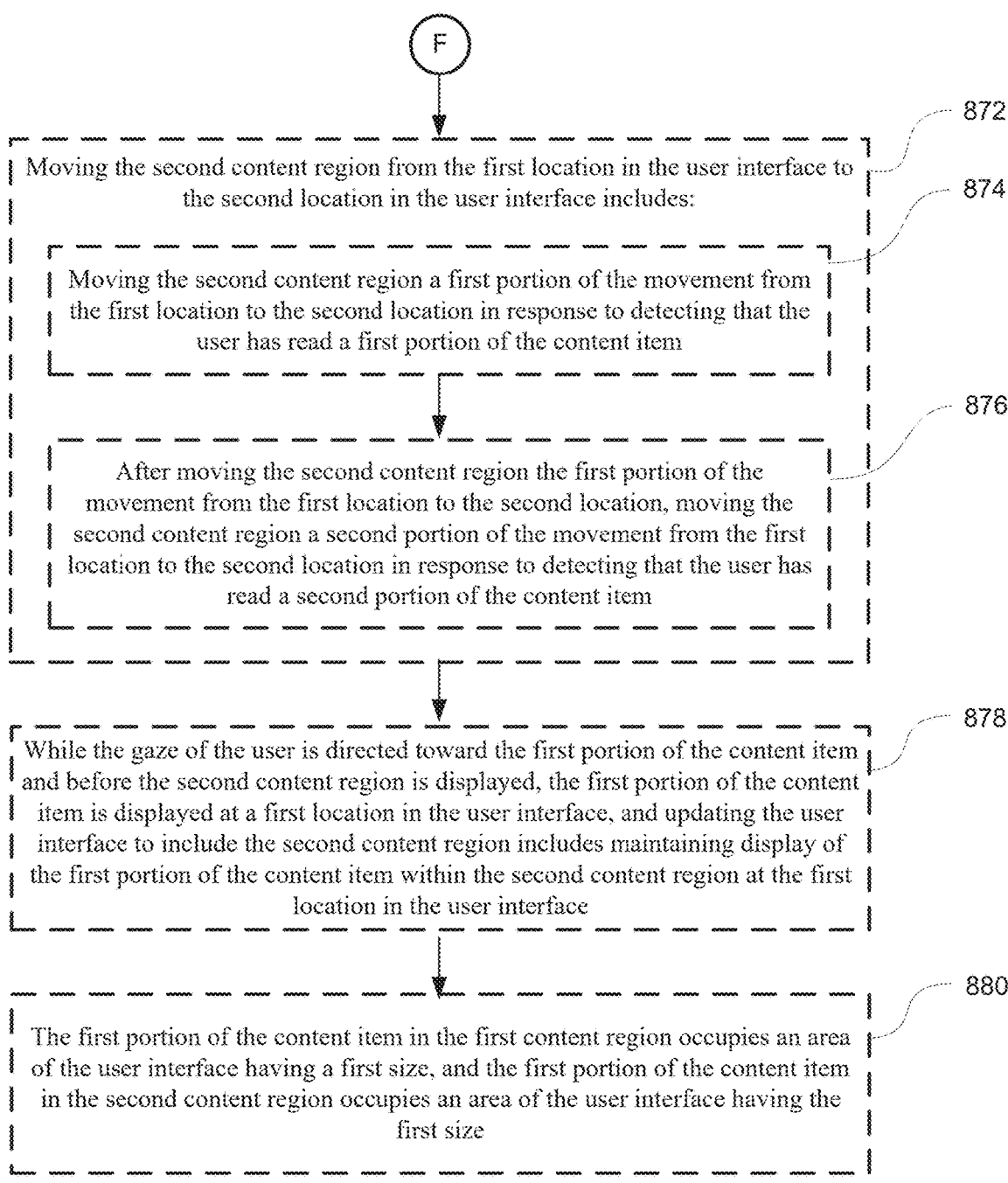
Figure 9E:
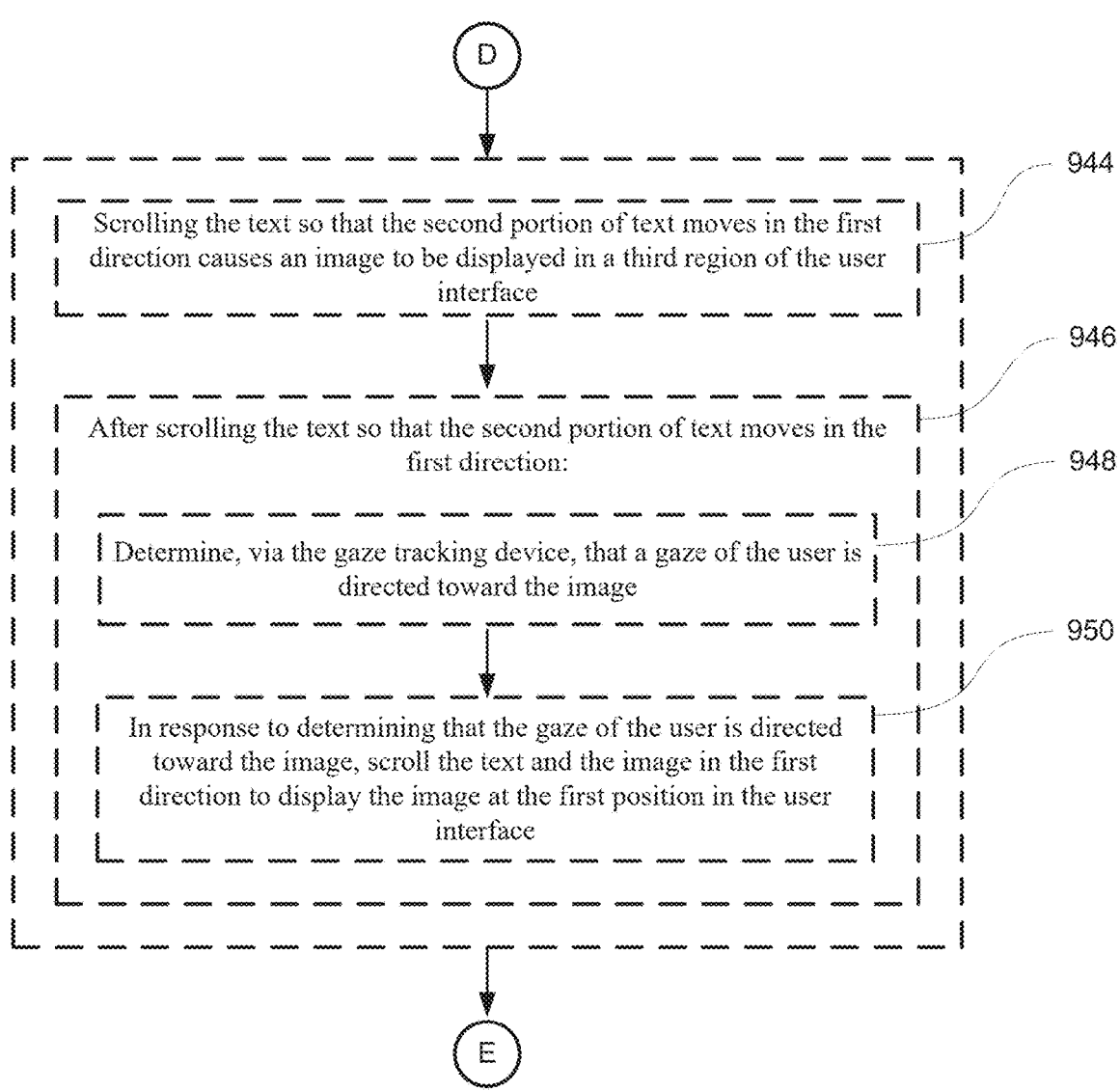
Figure 9F:
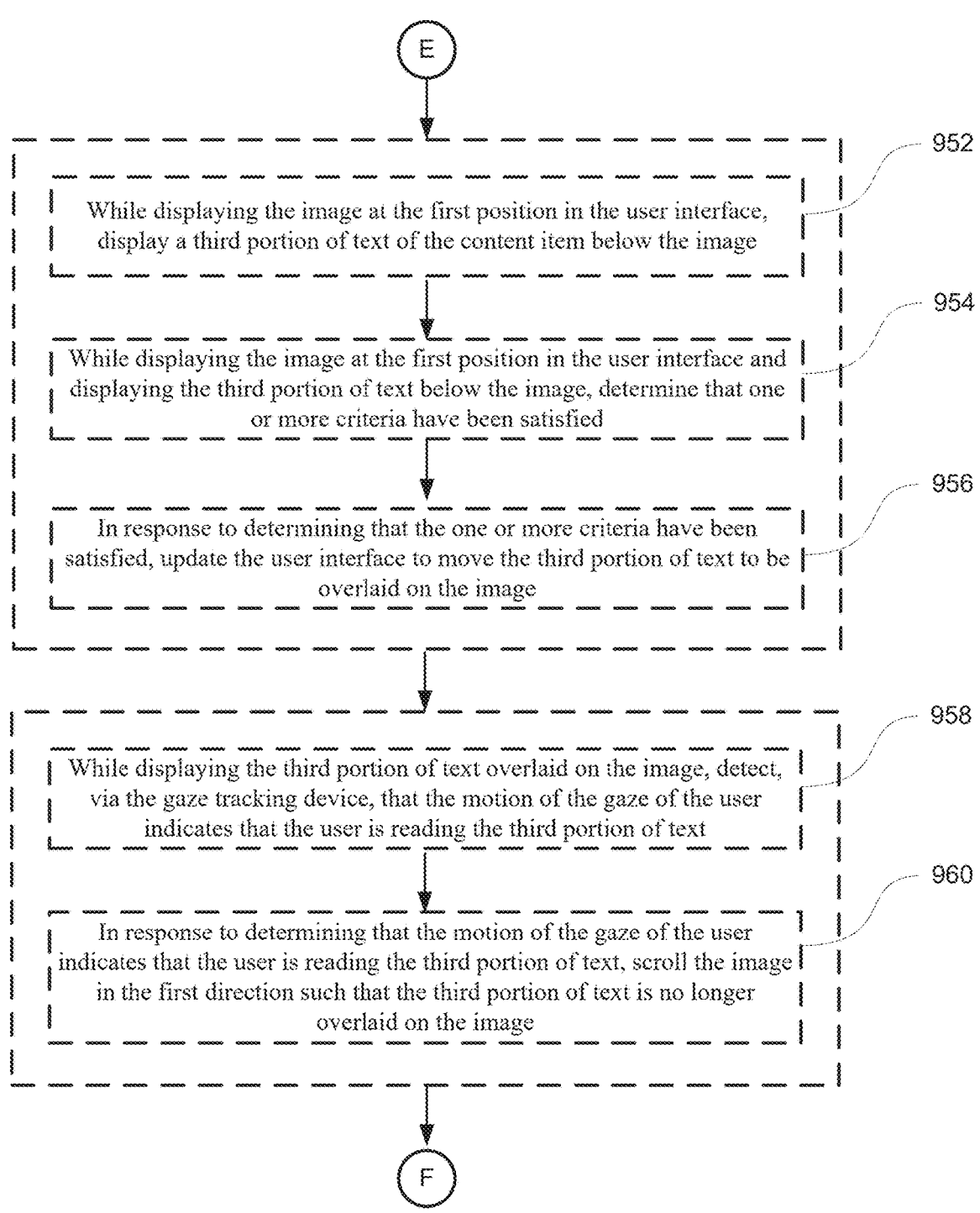
Figure 9I:
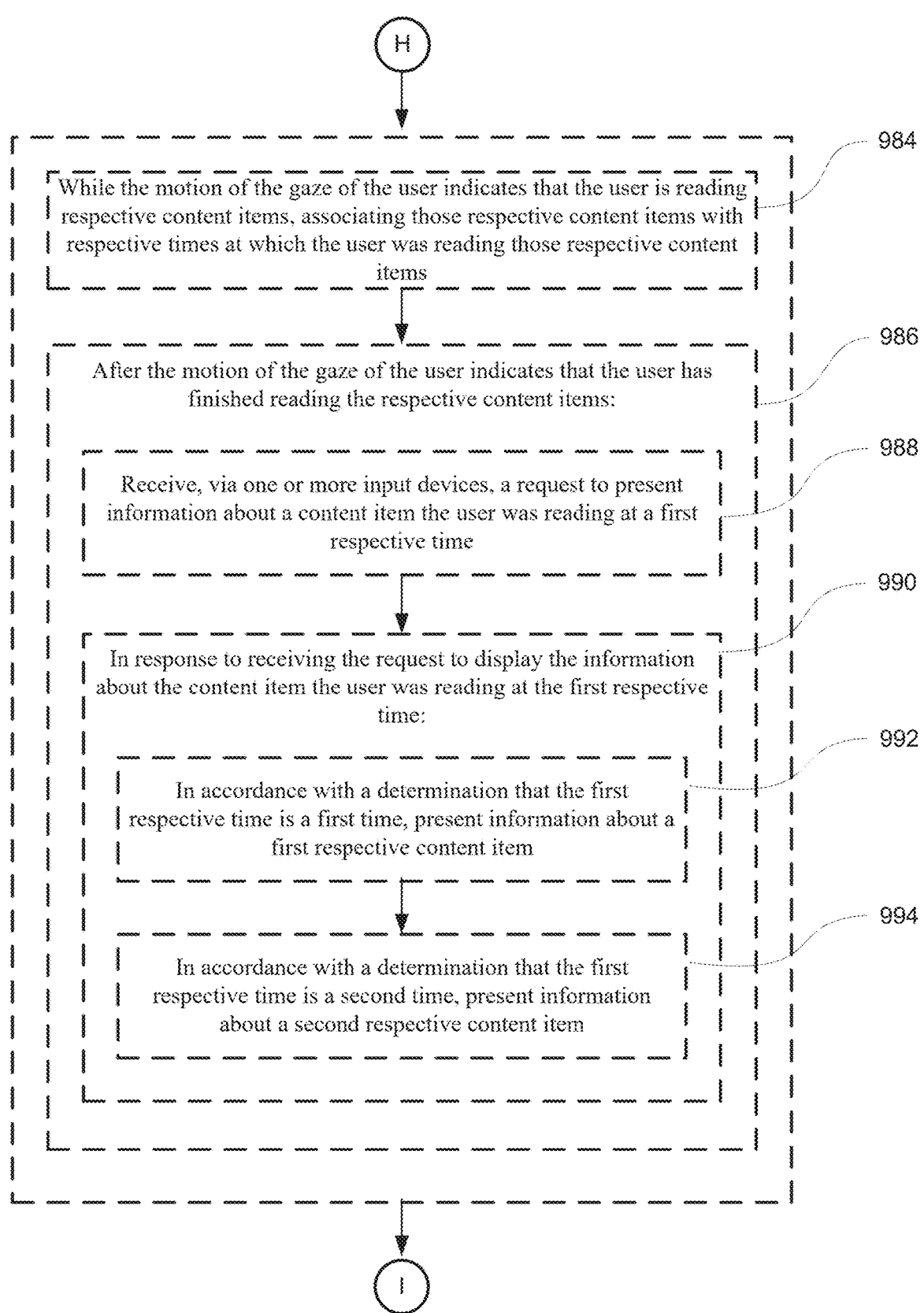
Figure 9J:
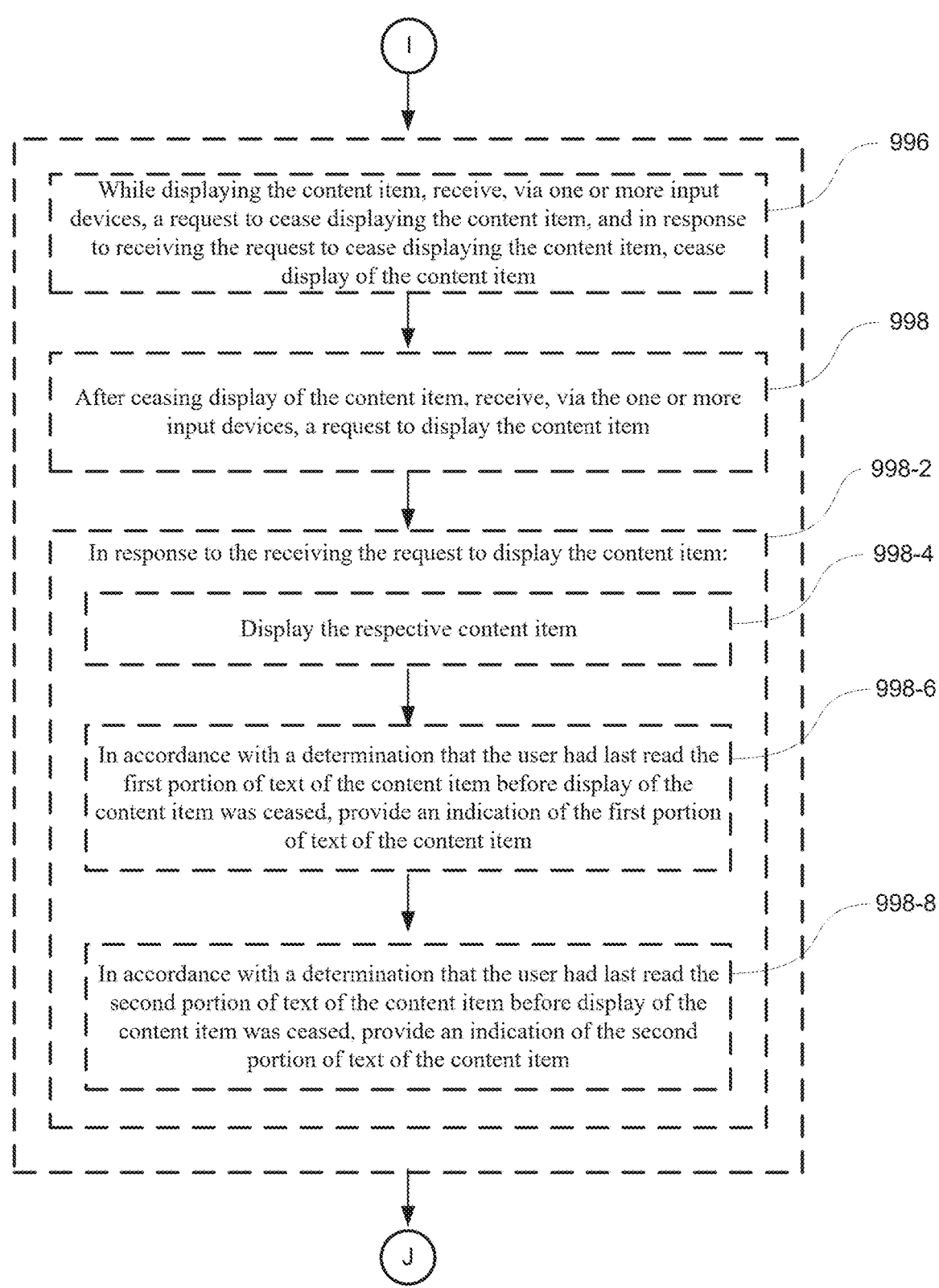
Figure 10F:
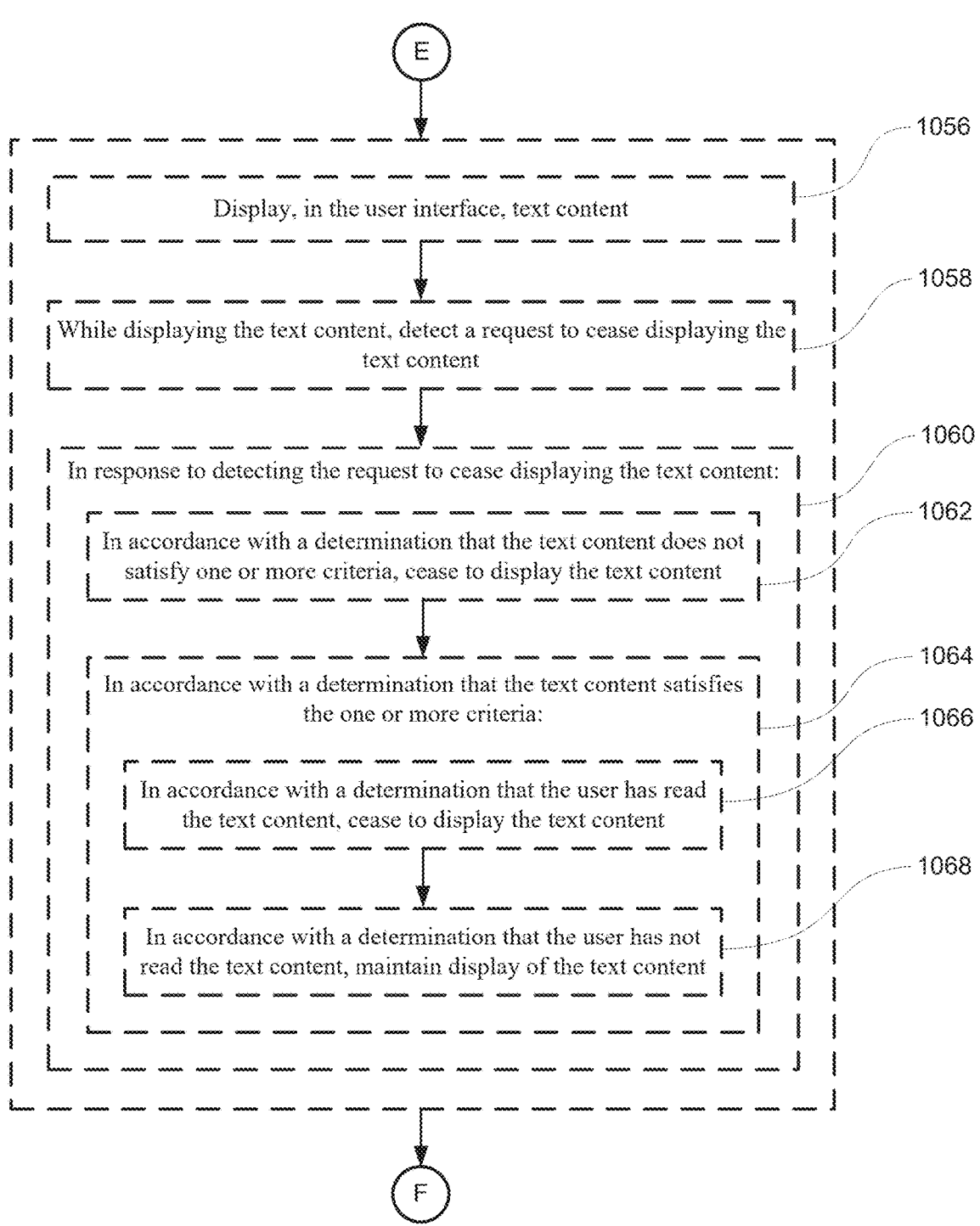
Figure 10G:
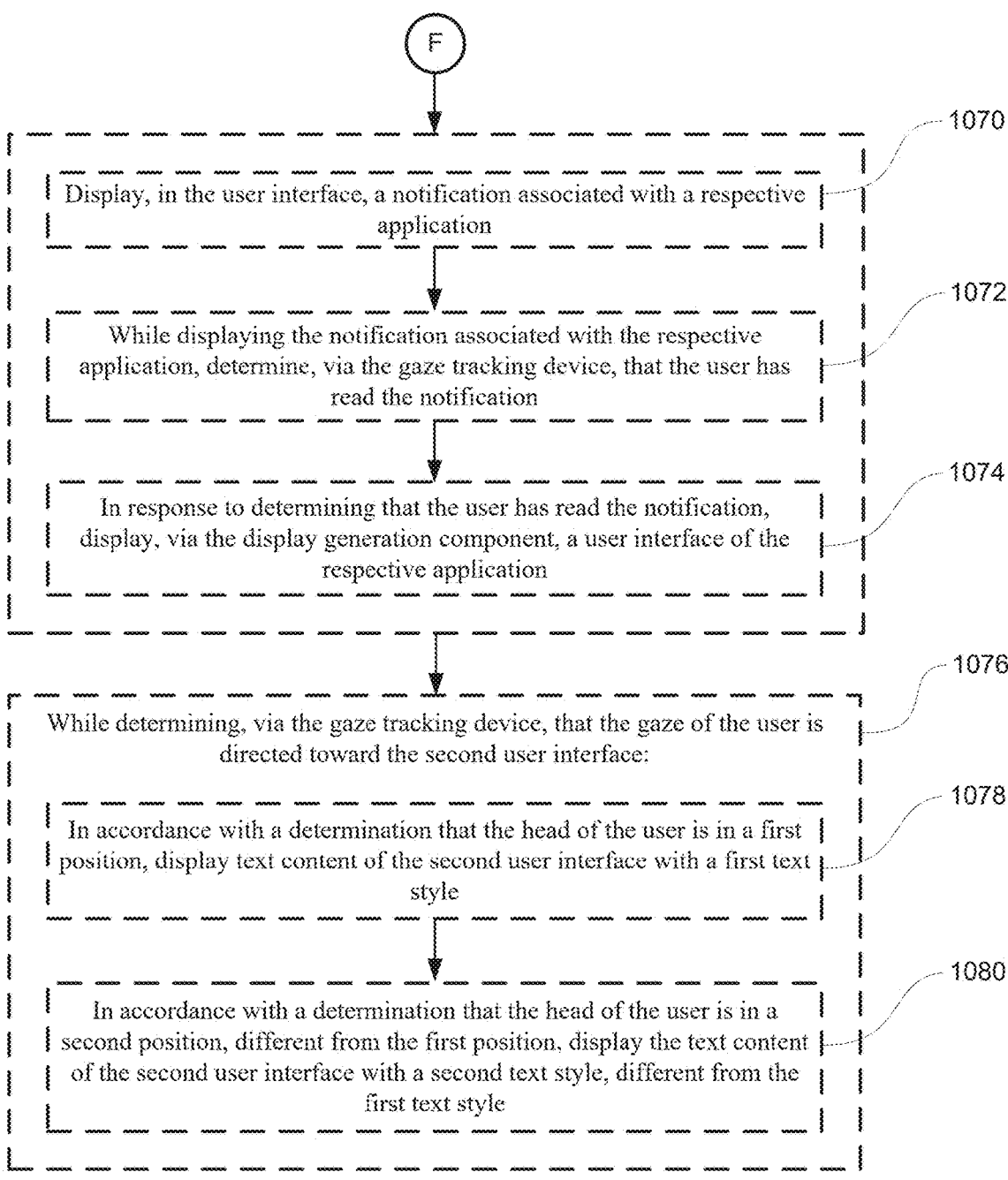
Figure 11C:
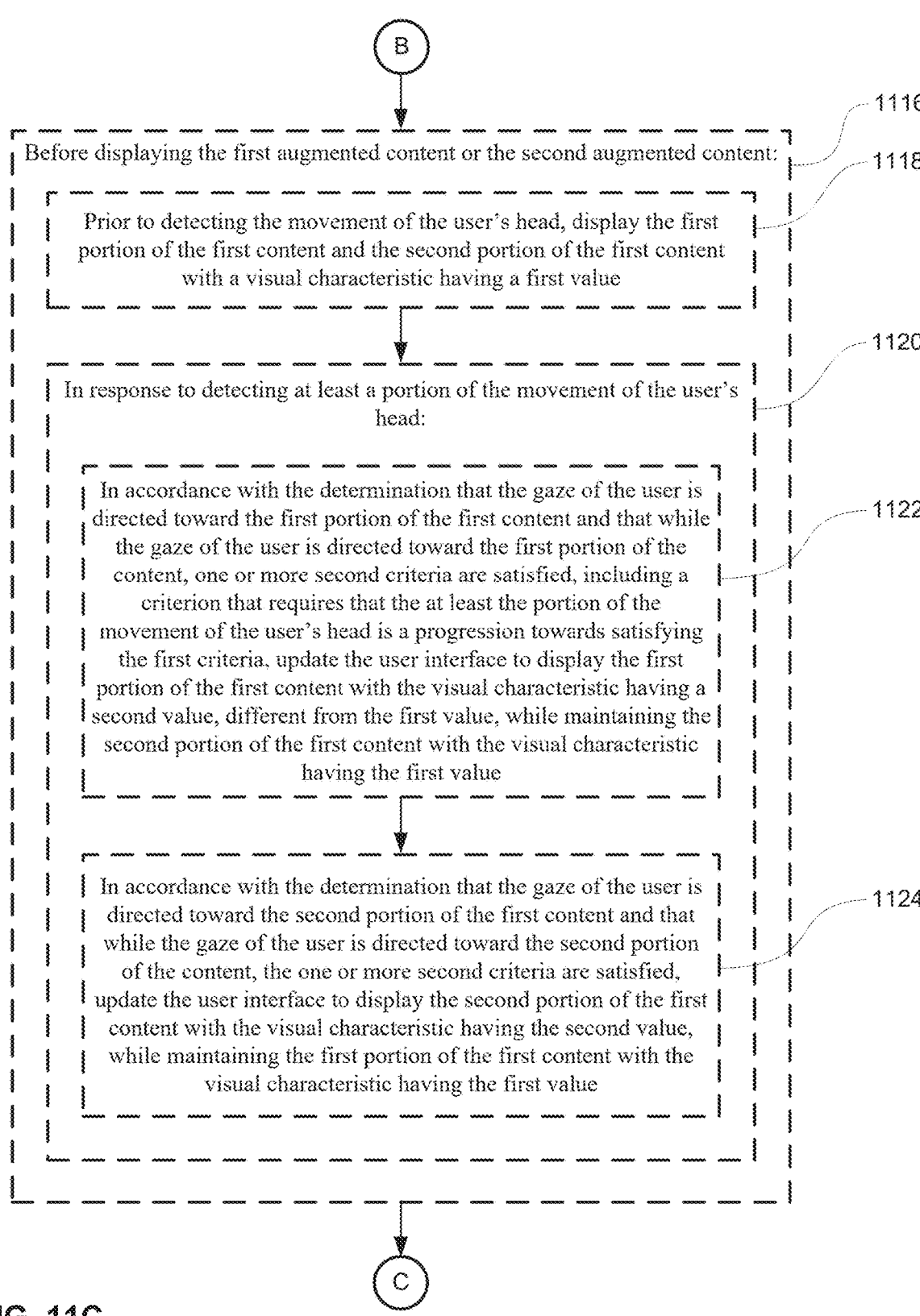
Figure 11E:
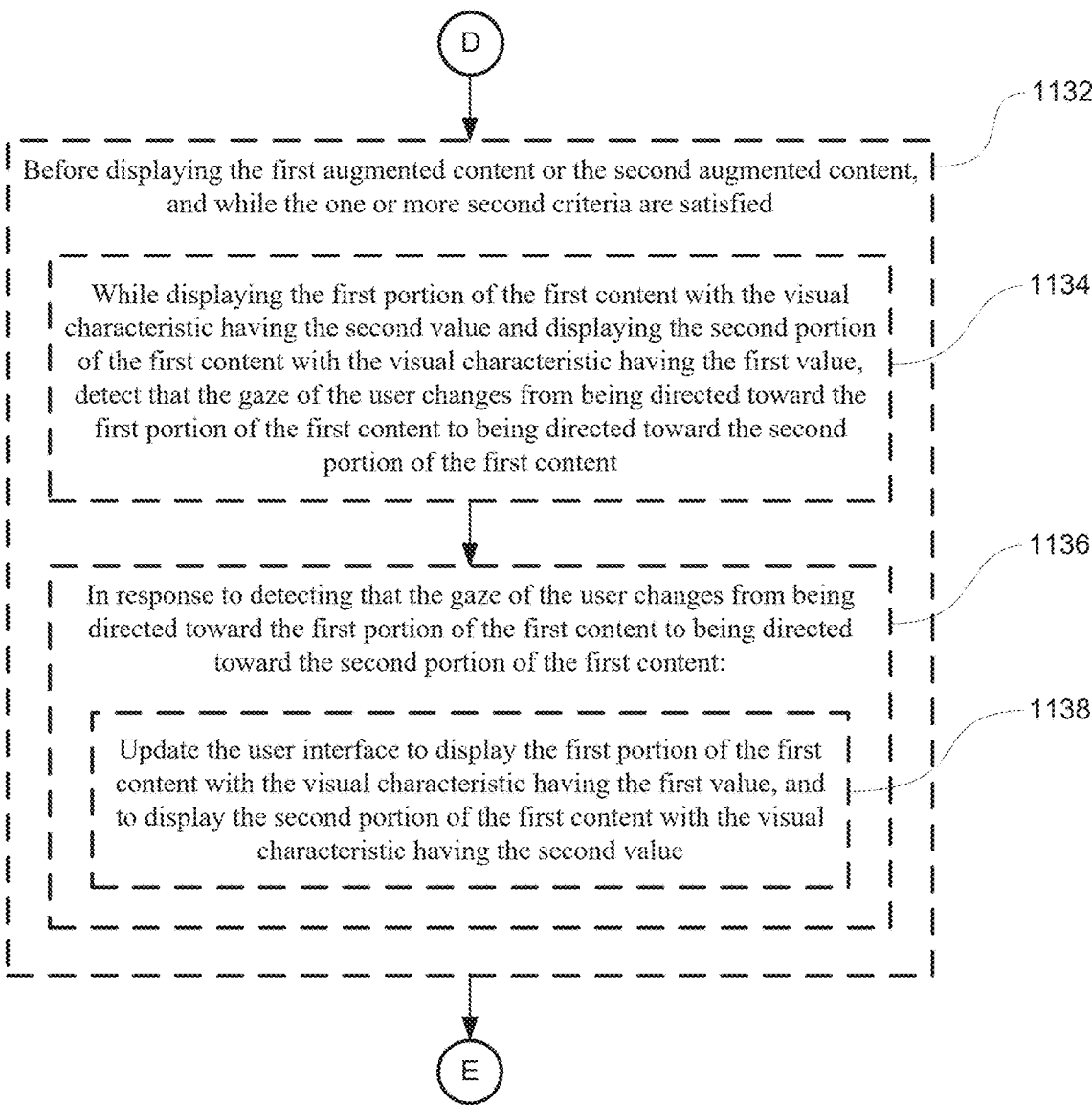
Figure 11I:
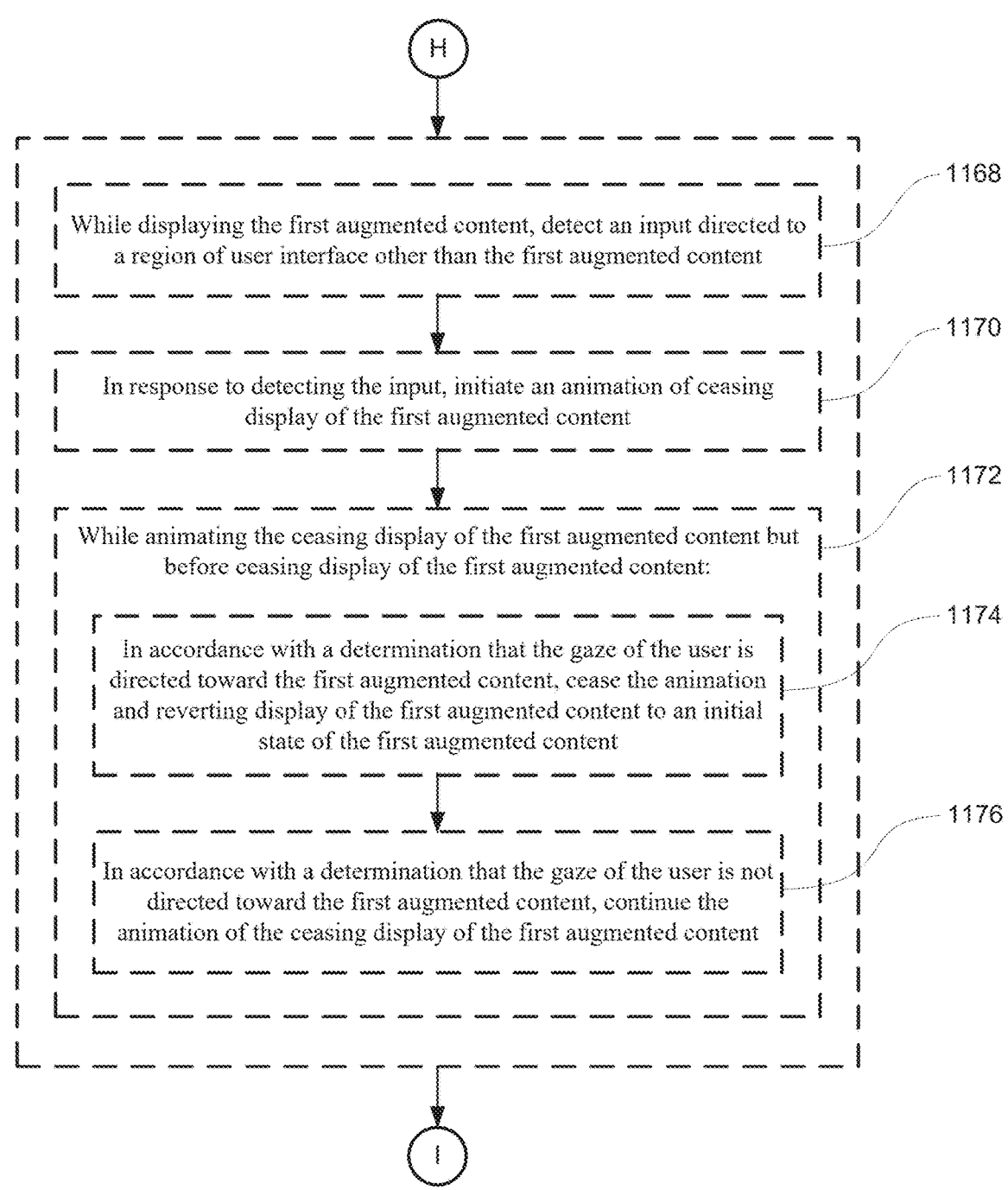
Figure 11J:
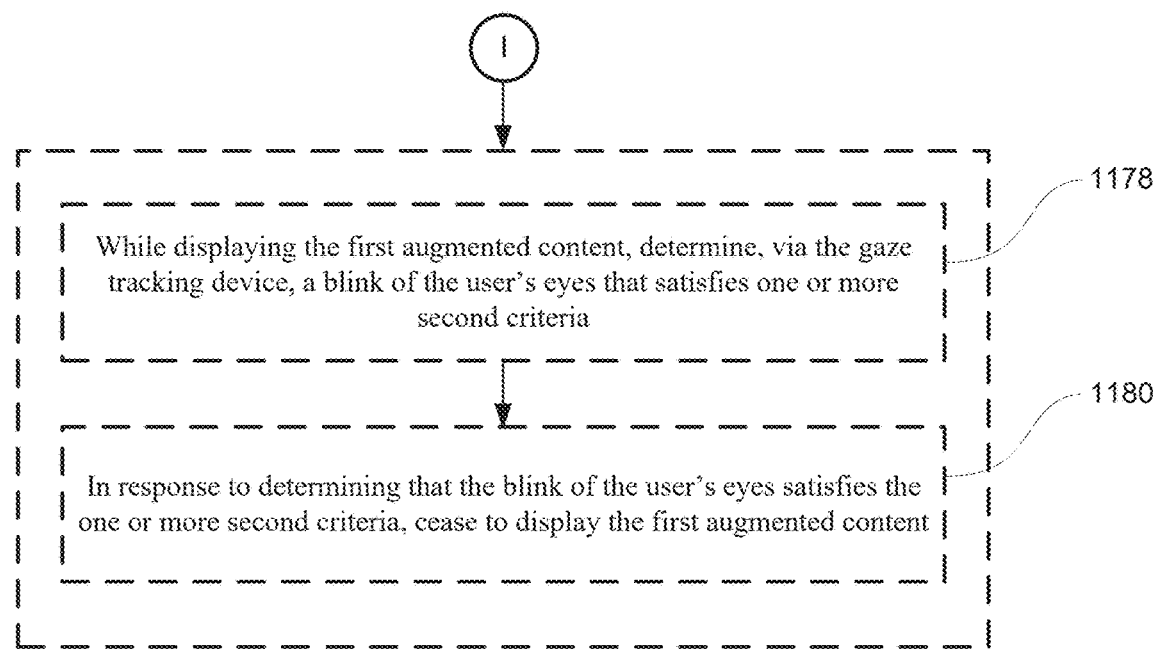

If the user were to look at a different word or at an image of the content item while moving their head forward, but before displaying the augmented content for word 718a, the electronic device 101 optionally displays augmented content related to the different word or the image, including first displaying a visual indication that the augmented content is about to be displayed (e.g., bolding the other word) and then displaying the augmented content if the head movement continues or is maintained and the gaze is held. For example, as shown in FIG. 7K, in response to detecting the user's gaze 716n on word 718b and the head movement, the electronic device 101 displays augmented content 720b related to word 718b.

In some embodiments, the electronic device 101 does not display the augmented content related to a portion of the content item if the user merely looks at the portion of the content item without performing the head movement. Moreover, the electronic device 101 also forgoes displaying the indication that the electronic device 101 is about to display the augmented content (e.g., bolding the word or portion of the content) unless the head movement is detected while the user looks at the portion of the content. For example, referring to FIG. 7C, in response to detecting the user's gaze 716a on word 718a without detecting the head movement, the electronic device 101 continues to display the user interface of FIG. 7C instead of displaying the user interface of FIG. 7I.

Also, in some embodiments, if the user looks at a different portion of the content item while the electronic device 101 displays the user interface of FIG. 7I, the electronic device 101 forgoes displaying the augmented content associated with the word 718a. Instead, in some embodiments, the electronic device 101 first displays an indication that augmented content is about to be displayed that is associated with the other part of the content item at which the user is looking (e.g., bolding that other portion of the content item) and then, if the user continues to look at that portion of the content item while maintaining or continuing the head movement, the electronic device 101 displays augmented content associated with the other portion of the content item.

For example, while displaying the user interface illustrated in FIG. 7I in response to detecting the user looking at word 718a while moving their head forward, the electronic device optionally detects the user looking at word 718b. In response to detecting the user looking at word 718b, the electronic device 101 optionally stops displaying word 718a in bold and instead displays word 718b in bold. Then, in this example, if the user continues to look at word 718b and continues or maintains the head movement forward, the electronic device 101 displays the augmented content 720*b* associated with word 718*b*, as shown in FIG. 7K.

In some embodiments, as shown in FIGS. 7J and 7K, the electronic device displays the augmented content 720 within the expanded content region 714. In some embodiments, the augmented content 720 is displayed overlaid on or proximate to the word to which the augmented content 720 corresponds. Although FIGS. 7J and 7K illustrate the augmented content 720*a* displayed in expanded content region 714 without being overlaid on the text or image(s) of the content, in some embodiments, the augmented content 714 is overlaid on the content item displayed in the expanded content region 714.

In some embodiments, however, once the augmented content corresponding to a respective word is displayed, looking at a different word will not cause the electronic device 101 to display the other word in bold typeface and/or the augmented content for that other word. For example, referring to FIG. 7J, if the user were to look at word 718*b* while the augmented content 720*a* associated with word 718*a* is displayed, the electronic device 101 would not update the user interface to display the word 718*b* in bold typeface. In some embodiments, the user is able to change the portion of content for which the augmented content is to be displayed before the augmented content is displayed, but not after.

Returning to FIG. 7I, if, while displaying the word 718*a* in bold to indicate that the electronic device 101 is about to display augmented content associated with the word 718*a*, the electronic device 101 detects the user moving their head backwards, the electronic device 101 ceases the process of displaying the augmented content. In response to detecting the movement of the head backwards, the electronic device 101 ceases displaying word 718*a* in bold and reverts the user interface to the user interface illustrated in FIG. 7C.

Returning to FIG. 7J, in some embodiments, while the electronic device 101 displays augmented content 720*a*, the electronic device 101 optionally detects one or more criteria for ceasing to display the augmented content 720*a*. For example, the electronic device 101 optionally ceases to display the augmented content 720*a* in response to detecting the user's gaze 716*l* on the augmented content, followed by detecting the user's gaze at a different location in the user interface (e.g., location 716*j*). As another example, if the electronic device 101 detects the user looking at the augmented content 720*a* and then resumes reading the text 704*a* or 710*a* of the content item, the electronic device 101 ceases displaying the augmented content 720*a*. If the user doesn't look at the augmented content 720*a*, but looks at a different location of the user interface, such as looking at location 716*j* on image 702*a*, the electronic device 101 optionally continues to display the augmented content 720*a* so that the user is able to look at it at a later time.

However, in some embodiments, if the electronic device 101 detects the user reading the content (e.g., text 704*a* or 710*a*) whether or not the user has looked at augmented content 720*a*, the electronic device 101 ceases to display the augmented content 720*a*. Also, in some embodiments, in response to detecting the user closing their eyes for a predetermined time (e.g., 0.5 seconds, 1 second, 2 seconds, etc.) longer than a typical blink, the electronic device 101 ceases displaying the augmented content 720*a*. The electronic device 101 optionally ceases displaying the augmented content 720*a* by displaying an animation of the augmented content 720*a* fading or moving away. In some embodiments, if the user looks at the augmented content

720*a* while it is fading or moving away but before it completely ceases to be displayed, the electronic device 101 reverts the user interface to display the augmented content 720*a* as shown in FIG. 7J.

Additional descriptions regarding FIGS. 7A-7K are provided below in references to methods 800-1100 described with respect to FIGS. 8-11 below.

FIGS. 8A-8G is a flowchart illustrating a method 800 of expanding an item of content in accordance with detection of a user's gaze in accordance with some embodiments. In some embodiments, the method 800 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In the method 800, in some embodiments, an electronic device (e.g., computer system 101 in FIG. 1) in communication with a display generation component and a gaze tracking device (e.g., 314) (e.g., a mobile device (e.g., a tablet, a smartphone, a media player), a computer (e.g., a desktop computer, a laptop computer), or a wearable device (e.g., a watch, a head-mounted device) displays (802), via a display generation component (e.g., 120), a user interface that includes a first content region (e.g., 700), the first content region including a first portion (e.g., 704*a*) of a content item, such as in FIG. 7A (e.g., the content item includes text content and the first portion of the content item is a first portion of the text content).

In some embodiments, while displaying the user interface, the electronic device (e.g., 101) determines (804), via a gaze tracking device (e.g., 314), that a gaze (e.g., 716*p*) of a user of the electronic device is directed toward the first portion (e.g., 704*a*) of the content item, such as in FIG. 7B (e.g., the gaze tracking device optionally captures one or more images of the user's eyes and detects the pupils and glints in the captured one or more images to track the user's gaze, as described in more detail above with reference to FIG. 6.).

In some embodiments, in response to determining that the gaze (e.g., 716*p*) of the user is directed toward the first portion (e.g., 704*a*) of the content item (806), such as in FIG. 7B, in accordance with a determination that motion of the gaze (e.g., 716*p*) of the user indicates that the user is reading the first portion (e.g., 704*a*) of the content item (808) (e.g., the electronic device is able to determine whether the user is merely looking at the first portion of the content item or whether the user is actually reading the first portion of the content item based on detected movement of the user's eyes) the electronic device (e.g., 101) updates (810) the user interface to include a second content region (e.g., 714), such as in FIG. 7C, the second content region (e.g., 714) including the first portion (e.g., 704*a*) of the content item and a second portion (e.g., 710*a*) of the content item that was not displayed in the first content region (e.g., 700) (e.g., expanding the region of the user interface in which the content item is displayed).

In some embodiments, in accordance with a determination that the gaze (e.g., 716p) of the user shown in FIG. 7B is directed toward the first portion (e.g., 704a) of the content item without moving in a way that indicates that the user is reading the first portion (e.g., 704a) of the content item (812) (e.g., the electronic device determines, based on the one or more images of the user's eyes, that the movement of the user's eyes is does not match with eye movements that are consistent with reading), the electronic device (e.g., 101) forgoes updating the user interface to include the second content region (e.g., 714) shown in FIG. 7C (e.g., the electronic device continues to display the user interface with the first content region).

In some embodiments, the display generation component is a display integrated with the electronic device (optionally a touch screen display) and/or an external display such as a monitor, projector, television, etc. In some embodiments, the gaze tracking device includes one or more camera(s) (e.g., IR cameras, NIR cameras, visible light cameras, etc.).

In some embodiments, the user interface includes portions of multiple content items. For example, the user interface is a digital newspaper user interface that includes article headlines and/or a portion of one or more articles of the digital newspaper. As another example, the user interface is an Email inbox user interface and the content item is a preview of an Email that includes an indication of the sender of the Email, an indication of the subject line of the Email, and/or a preview of the text of the Email message. In some embodiments, the content item includes content other than text, such as one or more images.

The electronic device optionally compares one or more captured images of the user's eyes to determine whether the movement of the user's eyes matches movement that is consistent with reading.

For example, in response to detecting that the user is reading a first portion of text of an article, the electronic device initiates display of a second portion of text of the article. In some embodiments, the first and second portions of the content item are displayed overlaid on the user interface that includes the first content region. In some embodiments, before displaying the second content region, in response to detecting that the user is reading the first portion of the content, the electronic device begins to animate the gradual display of the second content region. For example, the electronic device begins to display part of the second portion of the content or displays the second portion of the content overlaid on the user interface initially with a transparent appearance that gradually becomes more opaque. While animating the gradual display of the second content region, in response to detecting the user looking away from the first content item, the electronic device optionally ceases displaying the second portion of the content and resumes displaying the first content region. In some embodiments, in response to detecting that the user continues to read the content item, the electronic device fully transitions to displaying the second content region including the first and second portions of the content item, such as by displaying the entire portion of the second portion of the content item or displaying the second content region with full opacity. In some embodiments, updating the user interface is performed in response to data collected by the gaze tracking component without receiving additional input from another input device in communication with the electronic device.

The above-described manner of displaying the second content region with the first and second portions of the content item in response to detecting that the user is reading the first portion of the content item enables the electronic device to expand the content item without requiring user input beyond tracking the user's gaze which simplifies the interaction between the user and the electronic device and enhances the operability of the electronic device and makes the user-device interface more efficient (e.g., by only expanding content if the user is actually reading it), which additionally reduces power usage and improves battery life of the electronic device by enabling the user to use the electronic device more quickly and efficiently, such as through the reduction of user error.

In some embodiments, such as in FIG. 7B, the user interface further includes a third content region, the third content region including a first portion (e.g., 704b) of a second content item (816) (e.g., In some embodiments, the second content item includes text content). The second content item is optionally different from the first content item. For example, the first content item and the second content item are articles in a digital newspaper.

In some embodiments, while displaying the user interface, the electronic device determines (818), via the gaze tracking device (e.g., 314), that the gaze of user of the electronic device is directed toward the first portion (e.g., 704b) of the second content item (e.g., the gaze tracking device optionally captures one or more images of the user's eyes and detects the pupils and glints in the captured one or more images to track the user's gaze, as described in more detail with reference to FIG. 6).

In some embodiments, in response to determining that the gaze of user is directed toward the first portion (e.g., 704b) of the second content item (820), in accordance with a determination that the motion of the gaze of the user indicates that the user is reading the first portion (e.g., 704b) of the second content item (822) (e.g., the electronic device is able to determine that the user is reading the first portion of the second content item based on movement(s) of the user's eyes while the user is looking at the first portion of the second content item), the electronic device (e.g., 101) updates (824) the user interface to include a fourth content region, the fourth content region including the first portion (e.g., 704b) of the second content item and a second portion of the second content item that was not displayed in the third content region, without displaying the second content region in a manner similar to the manner in which the electronic device (e.g., 101) displays content region (e.g., 714), as shown in FIG. 7C.

In some embodiments, in response to detecting that the user is reading the first portion of the second content item displayed in the third content region, the electronic device displays an additional portion of the second content item. Thus, while the electronic device displays multiple content items (e.g., the first content item and the second content item), the electronic device detects that the user starts reading one of the content items and, in response, expands the content item that the user is reading without expanding the content item that the user is not reading. In some embodiments, in accordance with a determination that the user is not looking at the first content item or the second content item (or any other content item displayed in the first content region), the electronic device forgoes updating the user interface to include a respective region with additional portion(s) of a respective content item.

The above-described manner of displaying the second portion of the second content item in response to detecting the user reading the second content item and displaying the second portion of the first content item in response to detecting the user reading the first content item enables the electronic device to provide an efficient way of presenting additional portions of the content item the user is reading which simplifies the interaction between the user and the electronic device and enhances the operability of the electronic device and makes the user-device interface more efficient (e.g., by accepting the detection of the user reading as input for expanding the content item instead of requiring an additional input to expand the content), which additionally reduces power usage and improves battery life of the electronic device by enabling the user to use the electronic device more quickly and efficiently.

In some embodiments, prior to determining that the gaze (e.g., 716p) of the user of the electronic device (e.g., 101) is directed toward the first portion (e.g., 704a) of the content item, the electronic device (e.g., 101) displays (826), via the display generation component 120, one or more other content items with a visual characteristic having a first value, such as in FIG. 7B (e.g., the electronic device displays a plurality of portions of content items while displaying the first portion of the first content item in the first content region).

In some embodiments, in response to determining that the gaze (e.g., 716p) of the user is directed toward the first portion (e.g., 704a) of the content item (828), such as in FIG. 7C, in accordance with the determination that the motion of the gaze (e.g., 716p) of the user indicates that the user is reading the first portion (e.g., 704b) of the content item (830), the electronic device (e.g., 101) updates (832) the user interface to display the one or more other content items with the visual characteristic having a second value different from the first value, such as in FIG. 7C. In some embodiments, while displaying the first content item in the second content region, the electronic device displays the other (e.g., not expanded) content items with reduced size, reduced opacity, darker or lower-contrast or -saturation color, and/or reduced clarity (e.g., increased blurriness).

The electronic device optionally displays the plurality of content items with full size, full opacity, full color, and/or full clarity prior to expanding the content item that the user is reading. The first content item in the second content region is optionally displayed with full opacity, full color, and/or full clarity. In some embodiments, in accordance with a determination that the user is not reading the first portion of the content item and/or the user is not looking at the first portion of the content item, the electronic device continues displaying the one or more content items with the visual characteristic having the first value.

The above-described manner of changing the value of the visual characteristic with which the one or more other content items are displayed in response to detecting the user reading the content item enables the electronic device to reduce visual clutter while the user is reading the content item in the second content region, providing less distraction for reading the expanded content item, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIGS. 7B-7C, the visual characteristic is a degree of translucency (e.g., opacity and/or clarity), and the first value corresponds to less translucency than the second value (834). In some embodiments, the opacity and/or clarity of the other content items is reduced (e.g., blurred) while the electronic device displays the first content item in the second content region.

The above-described manner of increasing the translucency of the one or more other content items in response to detecting that the user is reading the content item enables the electronic device to continue to display the other content items in a way that does not distract from the content item the user is reading, which simplifies the interaction between the user and the electronic device and enhances the operability of the electronic device and makes the user-device interface more efficient (e.g., by enabling the user to see the other content items without dismissing the second content region), which additionally reduces power usage and improves battery life of the electronic device by enabling the user to use the electronic device more quickly and efficiently.

In some embodiments, such as in FIGS. 7B-7C, the visual characteristic is a size, and the first value corresponds to a larger size than the second value (836). In some embodiments, the electronic device reduces the size of the other content items while the electronic device displays the first content item in the second content region. In some embodiments, the content in the second content region is displayed at the same size as the original content in the first content region.

The above-described manner of reducing the size of the other content items in response to detecting that the user is reading the content item enables the electronic device to continue to display the other content items in a way that is less distracting to the user while the user reads the content item which simplifies the interaction between the user and the electronic device and enhances the operability of the electronic device and makes the user-device interface more efficient (e.g., by enabling the user to read the content faster and to see the other content items without navigating away from the second content region), which additionally reduces power usage and improves battery life of the electronic device by enabling the user to use the electronic device more quickly and efficiently.

In some embodiments, the user interface further includes a third content region, the third content region including a first portion (e.g., 704b) of a second content item (838), such as in FIG. 7B (e.g., the third content region is concurrently displayed with the first content region). The second content item optionally includes text content.

In some embodiments, such as in FIG. 7C, updating the user interface to include the second content region (e.g., 714) includes displaying the second content region (e.g., 714) overlaid on the third content region (840). In some embodiments, before displaying the second content region, the electronic device displays a content browsing user interface that includes portions of a plurality of content items, including the first portion of the first content item and the first portion of the second content item. The electronic device optionally displays the second content region including the first and second portions of the first content item overlaid on the content browsing user interface.

The above-described manner of displaying the second content region overlaid on the third content region enables the electronic device to continue to display the third content region in a way that is less visually distracting to the user while the user is reading the content item which simplifies the interaction between the user and the electronic device and enhances the operability of the electronic device and makes the user-device interface more efficient (e.g., by enabling the user to read the content item more quickly and simultaneously continue to see the third content region without navigating away from the second content region), which additionally reduces power usage and improves battery life of the electronic device by enabling the user to use the electronic device more quickly and efficiently.

In some embodiments, prior to determining that the motion of the gaze of the user indicates that the user of the electronic device is reading the first portion (e.g., 704a) of the content item, the first content region (e.g., 700) and the third content region are displayed at a first z-height in the user interface, such as in FIG. 7B (e.g., a top height such that no other content is overlaid on the first and third content regions), and updating the user interface to include the second content region (e.g., 714) includes displaying the second content region (e.g., 714) at the first z-height in the user interface, and changing the z-height of the third content region to a second z-height in the user interface (842) such as in FIG. 7C. In some embodiments, the second z-height is below the first z-height (e.g., further back in the user interface). The electronic device optionally displays the second content region overlaid on the third content region, and in the same z-height that the first content region was displayed in, in response to detecting that the user is reading the content. In some embodiments, the electronic device also displays the second content region overlaid on the first content region, moving the first content region to a lower z-height.

The above-described manner of displaying the first content region at the same z-level as the third content region and displaying the second content region at a higher z-level than the third content region in response to detecting that the user is reading the content item enables the electronic device to continue to display the third content region in a way that is less visually distracting to the user while the user is reading the content item which simplifies the interaction between the user and the electronic device and enhances the operability of the electronic device and makes the user-device interface more efficient (e.g., by enabling the user to read the content item more quickly and simultaneously continue to see the third content region without navigating away from the second content region), which additionally reduces power usage and improves battery life of the electronic device by enabling the user to use the electronic device more quickly and efficiently.

In some embodiments, such as in FIG. 7C updating the user interface to include the second content region (e.g., 714) includes expanding a size of the first content region to become the second content region (e.g., 714) (844). In some embodiments, the content region expands in one or more dimensions. For example, the second content region is longer than the first content region, allowing the electronic device to display more of the first content item in the second content region than in the first content region. In some embodiments, the height and the width of the content region are expanded. In some embodiments, the second content region is displayed at the same z-level in the user interface at which the first content region was displayed.

The above-described manner of expanding the first content region to become the second content region enables the electronic device to display additional portions of the content item in the second content region while maintaining visual continuity, which simplifies the interaction between the user and the electronic device and enhances the operability of the electronic device and makes the user-device interface more efficient (e.g., by providing clear navigational continuity between the first content region and the second content region), which additionally reduces power usage and improves battery life of the electronic device by enabling the user to use the electronic device more quickly and efficiently.

In some embodiments, updating the user interface to include the second content region (e.g., 714) includes gradually animating the first content region changing into the second content region (e.g., 714) while the user continues to read the first portion (e.g., 704a) of the content item (846). In some embodiments, the progress of the animation is proportional to the amount of time the user has continuously been reading the first content item. For example, the user begins reading the first portion of the first content item and the animation begins and as the user continues to read, the animation continues to progress. In some embodiments, the animation has a predetermined duration after it begins. Animating the first content region changing into the second content region optionally includes animating the progression of one or more differences between the first and second content regions. For example, the size of the first content region gradually expands to become the second content region that is larger than the first content regions. In some embodiments, if the user stops reading the content item, the animation stops or reverses.

The above-described manner of gradually animating the first content region changing into the second content region as the user continues to read the content item enables the electronic device to provide feedback to the user that reading the first portion of the content item causes the first content region to change into the second content region, which simplifies the interaction between the user and the electronic device and enhances the operability of the electronic device and makes the user-device interface more efficient (e.g., by giving the user an opportunity to stop the transition by, for example, stopping the reading of the content item and/or looking away from the content item), which additionally reduces power usage and improves battery life of the electronic device by enabling the user to use the electronic device more quickly and efficiently.

In some embodiments, while or after updating the user interface to include the second content region (e.g., 714), the electronic device (e.g., 101) determines (848), via the gaze tracking device (e.g., 314), that the gaze (e.g., 716c) of the user of the electronic device is no longer directed toward the content item, such as in FIG. 7C (e.g., the electronic device detects that the user is looking at a portion of the user interface that does not include the content item (e.g., a region other than the second content region) or the user is looking away from the user interface). For example, the user is looking at a different content item over which the first content item is overlaid.

In some embodiments, in response to determining that the gaze (e.g., 716c) of the user of the electronic device (e.g., 101) is no longer directed toward the content item, such as in FIG. 7C, the electronic device (e.g., 101) displays (850) the user interface including the first content region (e.g., 700) without displaying the second content region (e.g., 714), such as in FIG. 7B.

For example, the first content region is displayed in a content browsing user interface that includes portions of other content items in addition to the first portion of the content item and, in response to detecting the user looking away from the content item, the electronic device displays the content browsing user interface again at its initial size, z-level, and/or appearance. The electronic device optionally, thus, displays a portion of the content item in the first content region (e.g., the first portion of the content item, or a portion of the content item that the user was last reading before looking away from the content item) instead of displaying a larger portion of the content item in the second region.

The above-described manner of reverting the user interface to include the first content region without displaying the second content region in response to detecting that the user is no longer looking at the content item enables the electronic device to navigate back to the first content region in response to the user's gaze without any additional input which simplifies the interaction between the user and the electronic device and enhances the operability of the electronic device and makes the user-device interface more efficient (e.g., by reducing the number of inputs needed by the user to request to view the first content region again), which additionally reduces power usage and improves battery life of the electronic device by enabling the user to use the electronic device more quickly and efficiently.

In some embodiments, while or after updating the user interface to include the second content region (e.g., 314), the electronic device (e.g., 101) determines (852), via the gaze tracking device (e.g., 314), that the motion of the gaze of the user no longer indicates that the user of the electronic device is reading the content item, such as in FIG. 7C (e.g., in some embodiments, the user continues to look at the content item or the user looks away from the content item, such as looking at a different region of the user interface (e.g., a region other than the second content region) or looking away from the user interface).

In some embodiments, in response to determining that the motion of the gaze of the user no longer indicates that the user of the electronic device (e.g., 101) is reading the content item, the electronic device (e.g., 101) reverts (854) the user interface to include the first content region (e.g., 700) without displaying the second content region, such as in FIG. 7B. For example, the first content region is displayed in a content browsing user interface that includes portions of other content items in addition to the first portion of the content item and, in response to detecting the user no longer reading the content item, the electronic device displays the content browsing user interface again at its initial size, z-level, and/or appearance. The electronic device optionally, thus, displays a portion of the content item in the first content region (e.g., the first portion of the content item, or a portion of the content item that the user was last reading before they stopped reading the content item) instead of displaying a larger portion of the content item in the second region.

The above-described manner of reverting the user interface to include the first content region without displaying the second content region in response to detecting that the user is no longer reading the content item enables the electronic device to navigate back to the first content region in response to the user's gaze without any additional input which simplifies the interaction between the user and the electronic device and enhances the operability of the electronic device and makes the user-device interface more efficient (e.g., by reducing the number of inputs needed by the user to request to view the first content region again), which additionally reduces power usage and improves battery life of the electronic device by enabling the user to use the electronic device more quickly and efficiently.

In some embodiments, such as in FIG. 7B, the determination that the motion of the gaze (e.g., 716*p*) of the user indicates that the user is reading the first portion (e.g., 704*a*) of the content item is based on detecting, with the gaze tracking device (e.g., 314), eye movement of the user that corresponds to reading text (856). In some embodiments, the electronic device detects that the user is reading the content by detecting the user's gaze move along a line of text in the reading direction of the language of the text (e.g., left to right for English, right to left for Hebrew, etc.) and then quickly (e.g., more quickly than in the direction of the language of the text) moving in the opposite direction along the line the user just read before looking below to the next line. Optionally, the electronic device detects that the user is reading even if the user does not look directly at every word or every letter of the line of text, as people optionally read without looking directly at each letter or even each word in a line of text. In some embodiments, the electronic device is able to detect that the user has finished reading a line of text by detecting movement of the user's gaze backwards along the line of text the user was just looking at to read.

The above-described manner of detecting that the user is reading the content based on the eye movement of the user enables the electronic device to use the determination that the user is reading to navigate the user interface without other inputs which simplifies the interaction between the user and the electronic device and enhances the operability of the electronic device and makes the user-device interface more efficient (e.g., by reducing the inputs needed to navigate the user interface), which additionally reduces power usage and improves battery life of the electronic device by enabling the user to use the electronic device more quickly and efficiently.

In some embodiments, the electronic device (e.g., 101) detects (858), at the electronic device (e.g., 101), an indication (e.g., 708) of a notification event, such as in FIG. 7A (e.g., an alert generated by an application accessible to the electronic device). For example, receipt of a message from a user account other than a user account associated with the electronic device is one type of notification event, receiving a phone or video call, etc.

In some embodiments, such as in FIG. 7A, in response to detecting the indication (e.g., 708) of the notification event (860), in accordance with a determination that the motion of the gaze of the user indicates that the user is not reading a content item in the user interface (e.g., the electronic device determines, using the gaze tracking device, that the user is not reading any of the content presented by the display generation component. In some embodiments, the user is merely looking at content in the user interface without reading that content), the electronic device (e.g., 101) generates (862), at the electronic device (e.g., 101), an indication (e.g., 706) (e.g., audio, visual, etc.) of the notification event (e.g., the indication includes an image including text associated with the notification event, a sound, and/or tactile feedback).

In some embodiments, such as in FIG. 7C, in accordance with a determination that the motion of the gaze (e.g., 716*b*) of the user indicates that the user is reading a content item in the user interface, the electronic device (e.g., 101) forgoes (864) generating the indication of the notification event. In some embodiments, indications of notification events are not presented while the user is reading. In response to detecting (e.g., via the gaze tracking component) that the user has stopped reading, the electronic device optionally presents the indications (e.g., all of the indications that were previously suppressed, the last indication that was previously suppressed, etc. of notification events that were detected while the user was reading.

The above-described manner of forgoing presenting indications of notifications while the user is reading the content enables the electronic device to present the content without distractions which simplifies the interaction between the user and the electronic device and enhances the operability of the electronic device and makes the user-device interface more efficient (e.g., by enabling the user to read the content in less time), which additionally reduces power usage and improves battery life of the electronic device by enabling the user to use the electronic device more quickly and efficiently.

In some embodiments, in response to determining that the gaze of the user is directed toward the first portion (e.g., 704*a*) of the content item (866) (e.g., via the gaze tracking device), in accordance with the determination that the motion of the gaze (e.g., 716*p*) of the user indicates that the user is reading the first portion of the content item (868), such as in FIG. 7B (e.g., via the gaze tracking device), the electronic device (e.g., 101) moves (870) a predetermined portion of the second content region from a first location in the user interface to a second location in the user interface as the user continues to read the content item.

In some embodiments, the electronic device moves the second content region (e.g., the vertical and/or horizontal center of the second content region) to a center (e.g., vertical center and/or horizontal center) of the display area of the display generation component. The predetermined portion of the second content region optionally includes text, images, or other content of the content item. Thus, in some embodiments, the first content region is displayed at a location other than the second location in the user interface (e.g., displayed at the first location in the user interface), the second content region is displayed via expansion of the first content region at the first location in the user interface, and as the user continues to read the content item, the device shifts the user interface/display such that the second content region moves to the second location in the user interface. In some embodiments, in accordance with a determination that the user is looking at the first portion of the content item without reading the first portion of the content item, the electronic device forgoes moving the second content region.

The above-described manner of moving the predetermined portion of the second content region to the second location in the user interface as the user continues to read the content item enables the electronic device to display the content item at an ergonomic location in the user interface, making it easier for the user to read the content, which simplifies the interaction between the user and the electronic device and enhances the operability of the electronic device and makes the user-device interface more efficient (e.g., by enabling the user to read the content faster), which additionally reduces power usage and improves battery life of the electronic device by enabling the user to use the electronic device more quickly and efficiently.

In some embodiments, moving the second content region from the first location in the user interface to the second location in the user interface includes (872), moving the second content region a first portion of the movement from the first location to the second location in response to detecting that the user has read a first portion of the content item (874) (e.g., initially moving the second content region a first amount in response to detecting that the user has read a first portion of the content item), and after moving the second content region the first portion of the movement from the first location to the second location, moving the second content region a second portion of the movement from the first location to the second location in response to detecting that the user has read a second portion of the content item (876) (e.g., moving the second content region by a second amount in response to detecting that the user has read a second portion of the first portion of the content item).

In some embodiments, the electronic device moves the second content region by an amount that is proportional to the amount of the first content item the user has read or the amount of time the user has spent reading the first portion of the first content item. In some embodiments, moving the content region includes moving the boundaries of the content region. In some embodiments, moving the content region includes moving the content within the content region without moving the boundaries of the content region itself.

The above-described manner of moving the second content region to the second location in the user interface by an amount that is proportional to the amount of the content the user has read enables the electronic device to efficiently move the second content region with visual continuity, which simplifies the interaction between the user and the electronic device and enhances the operability of the electronic device and makes the user-device interface more efficient (e.g., by reducing the inputs the user may attempt to enter to cause the movement of the second content region to the second location in the user interface), which additionally reduces power usage and improves battery life of the electronic device by enabling the user to use the electronic device more quickly and efficiently.

In some embodiments, while the gaze of the user is directed toward the first portion of the content item and before the second content region is displayed, the first portion of the content item is displayed at a first location in the user interface, and updating the user interface to include the second content region includes maintaining display of the first portion of the content item within the second content region at the first location in the user interface (878). In some embodiments, the location of the second content region is selected to give the appearance that the first portion of the content item doesn't move. The first portion of the content item is optionally displayed at a same location of the display generation component or is optionally displayed to follow head movements or the gaze of the user.

The above-described manner of displaying the first portion of the content item at the same location in the user interface in the first content region and in the second content region enables the electronic device to display the first portion of the content item without moving the first portion of the content item, thus maintaining visual continuity and making the content item easier for the user to read, which simplifies the interaction between the user and the electronic device and enhances the operability of the electronic device and makes the user-device interface more efficient (e.g., by enabling the user to read the content item faster), which additionally reduces power usage and improves battery life of the electronic device by enabling the user to use the electronic device more quickly and efficiently.

In some embodiments, the first portion of the content item in the first content region (e.g., 700) occupies an area of the user interface having a first size, such as in FIG. 7B, and the first portion of the content item in the second content region (e.g., 714) occupies an area of the user interface having the first size, such as in FIG. 7C (880). In some embodiments, the size of the content stays the same when transitioning from displaying the first content region to the second content region. In some embodiments, the width of the content stays the same and the length changes (e.g., to display more of the content vertically). For example, the second portion of the content is displayed below the first portion of the content, making the content longer. In some embodiments, the width and the length of the content change when transitioning from being displayed in the first content region to being displayed in the second content region.

The above-described manner of displaying the first portion of the first content item at the same size in the first content region and the second content region enables the electronic device to continue to display the first portion of the content item in a manner that is easy for the user to read while transitioning the user interface from including the first content region to displaying the second content region, which simplifies the interaction between the user and the electronic device and enhances the operability of the electronic device and makes the user-device interface more efficient (e.g., by enabling the user to read the content quicker), which additionally reduces power usage and improves battery life of the electronic device by enabling the user to use the electronic device more quickly and efficiently.

FIGS. 9A-9L is a flowchart illustrating a method 900 of scrolling text of a content item in accordance with a determination that the user is reading the content item in accordance with some embodiments. In some embodiments, the method 900 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 900 are, optionally, combined and/or the order of some operations is, optionally, changed.

In the method 900, in some embodiments, an electronic device (e.g., 101) (e.g., computing system (e.g., 101)) in communication with a display generation (e.g., 120) component and a gaze tracking device (e.g., 314) (e.g., a mobile device (e.g., a tablet, a smartphone, a media player), a computer (e.g., a desktop computer, a laptop computer), or a wearable device (e.g., a watch, a head-mounted device), displays (902), via the display generation component (e.g., 120), a user interface including a first portion (e.g., 724a) of text of a content item and a second portion (e.g., 724b) of text of the content item, the first portion of text (e.g., 724a) displayed at a first position (e.g., 722a) in the user interface, and the second portion (e.g., 724b) of text displayed at a second position (e.g., 722b) in the user interface, such as in FIG. 7C (e.g., the first portion of text is a first line of text and the second portion of text is a second line of text below the first line of text).

In some embodiments, while displaying the user interface, the electronic device determines (904), via the gaze tracking device, that motion of the gaze of the user indicates that the user is reading the first portion of text (e.g., the gaze tracking device optionally captures one or more images of the user's eyes and detects the pupils and glints in the captured one or more images to determine the location of the user's gaze, as described in more detail above with reference to FIG. 6).

In some embodiments, while the motion of the gaze (e.g., 716b) of the user indicates that the user is reading the first portion (e.g., 724a) of text (906) (e.g., while the electronic device continues to detect eye movements consistent with reading the first portion of text), in accordance with a determination that the motion of the gaze (e.g., 716b) of the user indicates that the user has finished reading the first portion (e.g., 724a) of text, such as in FIG. 7C (e.g., detecting that the user has read to the end of the first portion of text and is starting to look at the second portion of text), the electronic device (e.g., 101) scrolls (910) the text so that the second portion (e.g., 724b) of text moves in a first direction, such as in FIG. 7D (e.g., toward a position at which the user's gaze is directed, toward a location that was previously occupied by the first portion of text, or toward a predefined portion of the user interface such as a center of the user interface) (e.g., scrolling the second portion of text to be at the current scroll position in the user interface).

In some embodiments, in accordance with a determination that the motion of the gaze of the user indicates that the user has not finished reading the first portion of text (e.g., 724a) in FIG. 7C (e.g., the user is still reading the first portion of text or looks away from the first portion of text without finishing the first portion of text), the electronic device (e.g., 101) maintains (914) the first portion of text (e.g., 724a) at the first position (e.g., 722a), such as in FIG. 7C (e.g., forgoing scrolling the user interface).

In some embodiments, the display generation component is a display integrated with the electronic device (optionally a touch screen display) and/or an external display such as a monitor, projector, television, etc. In some embodiments, the gaze tracking device includes one or more camera(s) (e.g., IR cameras, NIR cameras, visible light cameras, etc.).

For example, the text is vertically scrollable. In some embodiments, the first portion of text is a first section of a line of text and the second portion of text is a second section of a line of text displayed to the right (e.g., for languages that are read from left to right) or to the left (e.g., for languages that are read from right to left) of the first section of the line of text, and the text is horizontally scrollable. The current scroll position in the user interface is optionally a location in the user interface that is fixed relative to the rest of the user interface (e.g., a fixed location within a window of the user interface). In some embodiments, the current scroll position is selected to be ergonomically friendly, such as at a location at which the user is able to look by looking straight ahead (e.g., without bending their neck and while allowing their eyes to look straight ahead at a neutral height). In some embodiments, the electronic device changes the location of the current scroll location in response to detecting movement of the user's head relative to the user interface. For example, if the user is reading content on a monitor coupled to a desktop computer and moves their head (or moves their torso or body, causing the head to move) relative to the monitor, the current scroll location optionally moves with the movement of the user's head. In some embodiments, the location of the first portion of text is selected to be ergonomically friendly for the user based on detecting a location and orientation of the user's head. For example, the first portion of text is displayed at a location the user is able to look at while their head and/or eyes are in a neutral position.

Moreover, in some embodiments, the electronic device is able to detect whether the user is merely looking at the first portion of text or whether the user is reading the first portion of the text item based on detected movement of the user's eyes. The electronic device optionally compares one or more captured images of the user's eyes to determine whether the movement of the user's eyes matches movement that is consistent with reading.

For example, detecting that the user has read an entire line of text and is moving their eyes to look at the start of the second line of text.

For example, the electronic device scrolls the text vertically to display the second portion of text at the height at which the first portion of the text had previously been displayed. As another example, the electronic device scrolls the text horizontally to display the second portion of text at the horizontal location at which the first portion of the text had previously been displayed. Updating the second scroll position of the second portion of text optionally includes updating the location of the first portion of text (e.g., moving the first portion of text vertically or horizontally to make room for the second portion of text) or ceasing to display the first portion of text. In some embodiments, updating the user scroll position is performed in response to data collected by the gaze tracking component without receiving additional input from another input device in communication with the electronic device.

In some embodiments, the electronic device continues to display the first and second portions of text at their respective positions in the user interface.

The above-described manner of updating the scroll position of the content item in response to detecting that the user has finished reading the first portion of text enables the electronic device to scroll at the speed at which the user is reading without receiving inputs from input devices other than the gaze tracking device which simplifies the interaction between the user and the electronic device and enhances the operability of the electronic device and makes the user-device interface more efficient (e.g., by reducing user error in scrolling too much or too little and avoiding the need for inputs from other input devices), which additionally reduces power usage and improves battery life of the electronic device by enabling the user to use the electronic device more quickly and efficiently, such as by enabling the user to read faster and/or through the reducing of user input errors.

In some embodiments, while displaying the user interface, the electronic device (e.g., 101) determines (916), via the gaze tracking device (e.g., 314), that a gaze of the user is directed toward the first portion (e.g., 724a) of text or the second portion (e.g., 724b) of text shown in FIG. 7C, but the motion of the gaze of the user indicates that the user is not reading the first portion of text or the second portion of text (e.g., the movement of the user's eyes does not correspond to eye movement indicative of reading).

In some embodiments, in response to determining that the gaze of the user is directed toward the first portion of text (e.g., 724a) or the second portion (e.g., 724b) shown in FIG. 7C, of text but motion of the gaze of the user indicates that the user is not reading the first portion of text or the second portion of text, the electronic device (e.g., 101) forgoes (918) scrolling the text. In some embodiments, in response to detecting that the user is reading the text, the electronic device scrolls the text and in response to detecting that the user is looking at the text without reading it, the electronic device forgoes scrolling the text (e.g., the text remains in its current location in the user interface).

The above-described manner of forgoing scrolling the text in response to detecting that the user is looking at the text without reading the text enables the electronic device to avoid unnecessary scrolling which simplifies the interaction between the user and the electronic device and enhances the operability of the electronic device and makes the user-device interface more efficient (e.g., by reducing the need for inputs reverting unnecessary scrolling), which additionally reduces power usage and improves battery life of the electronic device by enabling the user to use the electronic device more quickly and efficiently.

In some embodiments, while displaying the user interface, the electronic device (e.g., 101) determines (920), via the gaze tracking device (e.g., 314), that a gaze of the user is no longer directed toward the first portion (e.g., 724a) of text (e.g., 724a) shown in FIG. 7C (e.g., the user looks at a different portion of the user interface, such as beginning to look at the second portion of text or looking at any other part of the user interface or away from the user interface).

In some embodiments, in response to determining that the gaze of the user is no longer directed toward the first portion (e.g., 724a) of text shown in FIG. 7C (922), in accordance with a determination based detected on movement of gaze of the user over the first portion of text that the user scanned the first portion (e.g., 724a) of text without reading the first portion (e.g., 724a) of text, the electronic device (e.g., 101) forgoes (924) scrolling the text (e.g., continuing to display the first and second portions of the text at the same locations in the user interface). In some embodiments, while the user is scanning (or skimming) the text, the movement of the user's eyes does not correspond to movement indicative of reading the text because people generally skim text differently than they read text.

In some embodiments, in accordance with a determination based detected on movement of gaze (e.g., 716b) of the user over the first portion (e.g., 724a) of text that the user read the first portion (e.g., 724a) of text, such as in FIG. 7C, the electronic device (e.g., 101) scrolls (926) the text so that the second portion (e.g., 724b) of text moves in the first direction. In some embodiments, the electronic device scrolls the text in response to detecting that the user is reading the text and forgoes scrolling the text in response to detecting that the user is scanning or skimming the text.

The above-described manner of forgoing scrolling the text in response to detecting that the user is scanning the text enables the electronic device to allow the user to control the scrolling speed of the text, which may be irregular while the user is scanning the text which simplifies the interaction between the user and the electronic device and enhances the operability of the electronic device and makes the user-device interface more efficient (e.g., by providing intuitive ways of scrolling the text in different situations to reduce scrolling errors and inputs needed to correct errors), which additionally reduces power usage and improves battery life of the electronic device by enabling the user to use the electronic device more quickly and efficiently.

In some embodiments, the electronic device (e.g., 101) determines (928), via the gaze tracking device (e.g., 314) based detected on movement of gaze of the user over the first portion (e.g., 724a) of text shown in FIG. 7C, that the user is scanning the first portion of text (e.g., 724a) (e.g., while the user is scanning the text, the gaze of the user moves across the text but does not match an eye movement pattern indicative of reading).

In some embodiments, in accordance with a determination that the user has finished scanning the first portion (e.g., 724a) of text, the electronic device (e.g., 101) scrolls (930) the text so that the second portion (e.g., 724b) of text moves in the first direction such as in FIGS. 7C-7D. In some embodiments, the electronic device scrolls the text in response to detecting that the user is either reading or scanning the text. In some embodiments, in accordance with a determination that the user has not yet finished scanning the first portion of text, the electronic device forgoes scrolling the text.

The above-described manner of scrolling the text in response to reading or scanning enables the electronic device to efficiently scroll the text when the user is scanning without requiring a user input other than gaze location, which simplifies the interaction between the user and the electronic device and enhances the operability of the electronic device and makes the user-device interface more efficient (e.g., by reducing the inputs needed to scroll the text), which additionally reduces power usage and improves battery life of the electronic device by enabling the user to use the electronic device more quickly and efficiently.

In some embodiments, scrolling the text so that the second portion (e.g., 724*b*) of text shown in FIG. 7C moves in the first direction is in response to detecting that the user has reached an end of the first portion (e.g., 724*a*) of text and is moving their eyes in a direction towards a beginning of the second portion (e.g., 724*b*) of text (932).

For example, the beginning of the second portion of text is the first word of a (e.g., next) line of text. In some embodiments, the electronic device detects eye movements corresponding to the user reading the text. The eye movements corresponding to reading optionally include movement of the eyes in the direction of text (e.g., left to right for English) looking at words or parts of words as the user reads the line of text, followed by movement of the eye along the line the user just read in the opposite direction of the text (e.g., right to left for English), and then down to the beginning of the next line. In some embodiments, the scrolling is performed in response to detecting the movement of the user's eyes along the line the user just read in the opposite direction of the text and/or in response to detecting the movement of the user's eyes down to the beginning of the next line of text.

The above-described manner of scrolling the text in response to detecting movement of the eyes towards a beginning of the second portion of text enables the electronic device to scroll the text at a time while the user is not actively reading one or more words of the text which simplifies the interaction between the user and the electronic device and enhances the operability of the electronic device and makes the user-device interface more efficient (e.g., by scrolling in a manner that does not confuse the user or cause them to lose their place within the content), which additionally reduces power usage and improves battery life of the electronic device by enabling the user to use the electronic device more quickly and efficiently, such as by enabling the user to read the content faster.

In some embodiments, scrolling the text so that the second portion (e.g., 724*b*) of text shown in FIG. 7C moves in the first direction occurs while the user is moving their eyes in the direction towards the beginning of second portion of text (e.g., 724*b*) (934).

For example, the beginning of the second portion of text is the first word of a line of text. In some embodiments, the electronic device detects eye movements corresponding to the user reading the text. The eye movements corresponding to reading optionally include movement of the eyes in the direction of text (e.g., left to right for English) looking at words or parts of words as the user reads the line of text, followed by movement of the eye along the line the user just read in the opposite direction of the text (e.g., right to left for English). In some embodiments, the scrolling is performed in response to detecting the movement of the user's eyes along the line the user just read in the opposite direction of the standard reading direction for the text and while the user moves their eyes along the line the user just read in the opposite direction of text.

The above-described manner of scrolling the text while the user's eyes move towards a beginning of the second portion of text enables the electronic device to scroll the text at a time such that by the time the user's eyes have moved back to the beginning of the line of text, the beginning of the next line of text is displayed at that position, which simplifies the interaction between the user and the electronic device and enhances the operability of the electronic device and makes the user-device interface more efficient (e.g., by scrolling in a manner that does not confuse the user or cause them to lose their place within the content), which additionally reduces power usage and improves battery life of the electronic device by enabling the user to use the electronic device more quickly and efficiently, such as by enabling the user to read the content faster.

In some embodiments, scrolling the text so that the second portion (e.g., 724*b*) of text shown in FIG. 7C moves in the first direction causes the second portion (e.g., 724*b*) of text to be displayed at a location in the user interface at which the user looks while moving their eyes in the direction towards the beginning of the second portion (e.g., 724*b*) of text (936).

For example, the beginning of the second portion of text is the first word of a line of text. In some embodiments, the electronic device detects eye movements corresponding to the user reading the text. The eye movements corresponding to reading optionally include movement of the eyes in the direction of text (e.g., left to right for English, right to left for Arabic) looking at words or parts of words as the user reads the line of text, followed by movement of the eye along the line the user just read in the opposite direction of the text (e.g., right to left for English, left to right for Arabic). In some embodiments, the scrolling is performed so that the second portion of text moves to the location at which the first portion of text was previously displayed while the user moves their eyes backward along the first portion of text. For example, the scrolling is timed such that the second portion of text is moved to the location at which the user is looking. For example, while the user is looking at a location in the user interface next to the beginning of the first portion of text, the electronic device scrolls the text and displays the second portion of text where the user is looking. Thus, the second portion of text "meets" the user's gaze as the user finishes looking backwards along the first portion of text.

The above-described manner of scrolling the text so the second portion of text is displayed at a location at which the user is looking while moving their eyes towards the beginning of the second portion of text enables the electronic device to scroll the text so that the text has finished scrolling when the user is likely to be about to read the second portion of text, which simplifies the interaction between the user and the electronic device and enhances the operability of the electronic device and makes the user-device interface more efficient (e.g., by enabling the user to read the text faster), which additionally reduces power usage and improves battery life of the electronic device by enabling the user to use the electronic device more quickly and efficiently.

In some embodiments, the user interface includes the first portion (e.g., 724*a*) of text in the first position (e.g., 722*a*) in the user interface, the second portion (e.g., 724*b*) of text in the second position (e.g., 722*b*) in the user interface, and a third portion (e.g., 710*a*) of text of the content item at a third position in the user interface, such as in FIG. 7C (938) (e.g., the first, second, and third portions of text are optionally lines of text). For example, the second portion of text is a line of text immediately following the first portion of text, which is also a line of text, and the third portion of text is a line of text following the second line of text. In some embodiments, the third portion of text immediately follows the second portion of text and in some embodiments, there are one or more other lines of text between the third portion of text and second portion of text.

In some embodiments, while the motion of the gaze (e.g., 716*b*) of the user indicates that the user is reading the first portion (e.g., 724*a*) of text such as in FIG. 7C, in accordance with a determination that the motion of the gaze (e.g., 716*b*)

of the user indicates that the user has finished reading the first portion (e.g., 724a) of text and is starting to read the second portion (e.g., 724b) of text, the electronic device (e.g., 101) scrolls (940) the text so that the second portion (e.g., 724b) of text moves in the first direction by a first amount (e.g., the second portion of text moves to a location in the user interface at which the first portion of text was displayed while the user was reading the first portion of text).

In some embodiments, in accordance with a determination that the motion of the gaze of the user indicates that the user has finished reading the first portion (e.g., 724a) of text shown in FIG. 7C and is starting to read the third portion (e.g., 710a) of text, the electronic device 10 scrolls (942) the text so that the third portion (e.g., 710a) of text moves in the first direction by a second amount, greater than the first amount.

In some embodiments, the second portion of text is the line of text directly under the first portion of text, which is also a line of text, and the second portion of text advances up by the height of one line. In some embodiments, in accordance with a determination that the user has not finished reading the first portion of text, the electronic device forgoes scrolling the text.

In some embodiments, the third portion of text is a line of text that is further from the first portion of text than the distance between the second portion of text and the first portion of text. In response to detecting the user reading the third portion of text, the electronic device optionally scrolls the third portion of text to a location in the user interface at which the first portion of text had been displayed while the user was reading the first portion of text. Thus, in some embodiments, the third portion of text is scrolled a greater distance than the second portion of text is scrolled in order to display the portion of text the user is reading at the position in the user interface at which the first portion of text had been displayed. In some embodiments, the third portion of text is not immediately scrolled to the location at which the first portion of text was displayed, but rather is scrolled part of the way to that location, and as the user reads more text, eventually, the portion of text the user is currently reading is scrolled to coincide with the location at which the first portion of text was displayed. In some embodiments, the text is scrolled more when the user skips down multiple lines of text than when the user simply moves to the next line of text so that the currently-read portion of the text is able to, eventually, catch up to the original location of the first portion of text in the user interface.

The above-described manner of scrolling the second portion of text by a first amount in response to detecting the user reading the second portion of text and scrolling the third portion of text by the third amount in response to detecting the user reading the third portion of text enables the electronic device to work towards displaying the portion of text the user is reading at a constant location in the user interface, which simplifies the interaction between the user and the electronic device and enhances the operability of the electronic device and makes the user-device interface more efficient (e.g., by enabling the user to read the content faster), which additionally reduces power usage and improves battery life of the electronic device by enabling the user to use the electronic device more quickly and efficiently.

In some embodiments, scrolling the text so that the second portion (e.g., 724b) of text shown in FIG. 7C moves in the first direction causes an image (e.g., 712a) to be displayed in a third region of the user interface (944) (e.g., in some embodiments, the image is part of the content item and is placed after the second portion of text within the content item). For example, the third region of the user interface is below the second portion of text, optionally with other portions of text between the second portion of text and the image.

In some embodiments, after scrolling the text so that the second portion (e.g., 724b) of text moves in the first direction (946), the electronic device (e.g., 101) determines (948), via the gaze tracking device (e.g., 314), that a gaze (e.g., 716d) of the user is directed toward the image (e.g., 712a), such as in FIG. 7D, and in response to determining that the gaze (e.g., 716d) of the user is directed toward the image (e.g., 712a), the electronic device (e.g., 101) scrolls (950) the text and the image (e.g., 712a) in the first direction to display the image (e.g., 712a) at the first position (e.g., 722a) in the user interface, such as in FIG. 7E.

In some embodiments, the image is displayed at the location in the user interface at which the first portion of text was displayed while the user was reading the first portion of text. Scrolling the text and the image optionally includes revealing additional text displayed after the image. In some embodiments, in accordance with a determination that the gaze of the user is not directed toward the image, the electronic device forgoes scrolling the text and the image in the first direction to display the image at the first position in the user interface.

The above-described manner of displaying the image at the first position in the user interface in response to detecting that the user is looking at the image enables the electronic device to move the image to a viewing location that is comfortable for the user without requiring an input other than gaze which simplifies the interaction between the user and the electronic device and enhances the operability of the electronic device and makes the user-device interface more efficient (e.g., by reducing the number of inputs needed to view and image), which additionally reduces power usage and improves battery life of the electronic device by enabling the user to use the electronic device more quickly and efficiently.

In some embodiments, while displaying the image (e.g., 712a) at the first position (e.g., 722a) in the user interface, displaying a third portion (e.g., 710b) of text (e.g., a line of text) of the content item below the image (952).

In some embodiments, while displaying the image (e.g., 712a) at the first position (e.g., 722a) in the user interface and displaying the third portion (e.g., 710b) of text below the image (e.g., 712a), the electronic device (e.g., 101) determines (954) that one or more criteria have been satisfied, such as in FIG. 7E (e.g., the one or more criteria include a criterion that is satisfied when the user starts reading the third portion of text (e.g., the user has read a predetermined portion (e.g., one word, two words, three words) of the text or has been reading the text for a predetermined amount of time (e.g., 1 second, 2 seconds, etc.), a criterion that is satisfied when the user looks at the third portion of text, and/or a criterion that is satisfied when the user looks away from the image).

In some embodiments, in response to determining that the one or more criteria have been satisfied, the electronic device (e.g., 101) updates (956) the user interface to move the third portion (e.g., 710b) of text to be overlaid on the image (e.g., 712a), such as FIG. 7F.

In some embodiments, the content is scrolled such that the third portion of text is displayed at the first location in the user interface. The image optionally extends above the first location in the user interface and optionally has a larger width than the third portion of text. In some embodiments, the text is displayed with a background that has a high contrast with the text. For example, the third portion of text is displayed in black text overlaid on a white rectangle that is overlaid on the image. In some embodiments, there is no background overlaid on the image and, instead, the text color and/or translucency of the image are modified to create contrast between the text and the image. In some embodiments, an additional portion of text is also overlaid on the image. For example, the third portion of text is a line of text and additional lines of text are displayed overlaid on the image. In some embodiments, in accordance with a determination that the one or more criteria are not satisfied, the electronic device forgoes updating the user interface to move the third portion of the text to be overlaid on the image.

The above-described manner of displaying the third portion of text overlaid on the image enables the electronic device to quickly and efficiently bring the current text of interest to the current reading location while maintain visual continuity of the image, which simplifies the interaction between the user and the electronic device and enhances the operability of the electronic device and makes the user-device interface more efficient (e.g., by reducing the amount of time it takes the user to look at the image and read the content together), which additionally reduces power usage and improves battery life of the electronic device by enabling the user to use the electronic device more quickly and efficiently.

In some embodiments, while displaying the third portion (e.g., 710b) of text overlaid on the image (e.g., 712a) such as in FIG. 7F, the electronic device (e.g., 101) detects (958), via the gaze tracking device (e.g., 314), that the motion of the gaze of the user indicates that the user is reading the third portion of text (e.g., 710a) (e.g., the electronic device detects eye movement of the user that conforms to movement consistent with reading).

In some embodiments, in response to determining that the motion of the gaze of the user indicates that the user is reading the third portion (e.g., 710b) of text shown in FIG. 7F, the electronic device (e.g., 101) scrolls (960) the image (e.g., 712a) in the first direction such that the third portion (e.g., 710b) of text is no longer overlaid on the image (e.g., 712a).

In some embodiments, the third portion of text continues to be displayed at the first position in the user interface and the image moves to be displayed at a location that does not overlap the first position in the user interface. For example, the image is displayed above the third portion of text. In some embodiments, in accordance with a determination that the user is not reading the third portion of the text, the electronic device forgoes scrolling the image in the first direction such that the third portion of text is no longer overlaid on the image.

The above-described manner of scrolling the image so that the third portion of text is no longer overlaid on the image in response to detecting the user reading the third portion of content enables the electronic device to reduce visual clutter around the third portion of the text while the user is reading the third portion of content, which simplifies the interaction between the user and the electronic device and enhances the operability of the electronic device and makes the user-device interface more efficient (e.g., by enabling the user to read the content quickly), which additionally reduces power usage and improves battery life of the electronic device by enabling the user to use the electronic device more quickly and efficiently.

In some embodiments, while displaying the user interface including the content item, the electronic device detects (962), via the gaze tracking device (e.g., 314), horizontal movement of a head of the user (e.g., head movement that is along a horizontal direction of the user interface (e.g., left to right)).

In some embodiments, in response to detecting the horizontal movement of the head of the user, the electronic device (e.g., 101) updates (964) the user interface to display the content item at a location in a center of a field of view of the user.

For example, in response to detecting that the user moves their head to their right, the electronic device moves the content to the right. Thus, in some embodiments, the electronic device displays the content in the (e.g., horizontal and/or vertical) center of the field of view of the user even after the user moves their head. In some embodiments, if the electronic device does not detect horizontal movement of the user's head, the electronic device does not update the user interface.

The above-described manner of moving the content item in response to detecting the horizontal head movement of the user enables the electronic device to display the content item at a location the user is able to efficiently read which simplifies the interaction between the user and the electronic device and enhances the operability of the electronic device and makes the user-device interface more efficient (e.g., by enabling the user to read the content quicker), which additionally reduces power usage and improves battery life of the electronic device by enabling the user to use the electronic device more quickly and efficiently.

In some embodiments, the first direction is a direction that is vertical in the user interface, such as in FIGS. 7C-7D (966). Optionally, the content includes text that is vertically scrollable, such as multiple lines of text. In some embodiments, the electronic device scrolls the content up as the user reads each line of text. The electronic device optionally scrolls the content down in response to an input received at an input device other than the gaze tracking device (e.g., the user supplies an input through a different input device that corresponds to a request to scroll the content up), and the user is optionally not able to scroll the content down in response to providing only gaze-based inputs.

The above-described manner of scrolling the text vertically enables the electronic device to automatically display text at a vertical location in the user interface where the user is already looking which simplifies the interaction between the user and the electronic device and enhances the operability of the electronic device and makes the user-device interface more efficient (e.g., by enabling the user to read the content more quickly), which additionally reduces power usage and improves battery life of the electronic device by enabling the user to use the electronic device more quickly and efficiently.

In some embodiments, the first direction is a direction that is horizontal in the user interface (968). In some embodiments, the text is a (e.g., single) line of text that is horizontally scrollable. For example, if the text is in English or another language that is read from left to right, the electronic device scrolls the text to the left as the user reads the text. The electronic device is optionally able to scroll the text in the opposite direction in response to receiving an input through an input device other than the gaze tracking component (e.g., the user supplies an input through a different input device that corresponds to a request to scroll the content backwards), and the user is optionally not able to scroll the content in the opposite direction in response to providing only gaze-based inputs.

The above-described manner of scrolling the text horizontally enables the electronic device to automatically display text at a horizontal location in the user interface where the user is already looking which simplifies the interaction between the user and the electronic device and enhances the operability of the electronic device and makes the user-device interface more efficient (e.g., by enabling the user to read the content more quickly), which additionally reduces power usage and improves battery life of the electronic device by enabling the user to use the electronic device more quickly and efficiently.

In some embodiments, the first direction has a vertical component and a horizontal component in the user interface (970). In some embodiments, the content is arranged in a grid or another two-dimensional array. For example, the content is a multi-panel comic. In some embodiments, after the user finishes reading the content of a panel of the comic, the electronic device displays the next panel in the first location of the user interface, thus enabling the user to continue reading the comic, panel after panel, at one location in the user interface.

The above-described manner of scrolling the text horizontally and vertically enables the electronic device to automatically display text at a location in the user interface where the user is already looking which simplifies the interaction between the user and the electronic device and enhances the operability of the electronic device and makes the user-device interface more efficient (e.g., by enabling the user to read the content more quickly), which additionally reduces power usage and improves battery life of the electronic device by enabling the user to use the electronic device more quickly and efficiently.

In some embodiments, the electronic device (e.g., 101) detects (972), based detected on movement of gaze (e.g., 716*b*) of the user over the first portion (e.g., 724*a*) of text that the user has finished reading the first portion (e.g., 724*a*) of text, such as in FIG. 7C.

In some embodiments, in response to detecting that the user has finished reading the first portion (e.g., 724*a*) of text, the electronic device (e.g., 101) displays (974), in the user interface, a third portion of text of the content item that was not displayed prior to determining that the user has finished reading the first portion of text (e.g., 724*a*).

In some embodiments, the electronic device initiates display of subsequent portions of the content as the user finishes reading portions of content that are displayed (e.g., displays the second portion of text after the user finishes reading the first portion of text, where the second portion of text would have been visible/displayed in the user interface before the user finished reading the first portion of text had the second portion of text been displayed/visible before the user finished reading the first portion of text). In some embodiments, in accordance with a determination that the user has not finished reading the first portion of text, the electronic device forgoes displaying the third portion of the text of the content item.

The above-described manner of initiating display of subsequent portions of content as the user finishes reading displayed portions of the content enables the electronic device to provide the portions of the content that the user is currently reading with less visual distractions which simplifies the interaction between the user and the electronic device and enhances the operability of the electronic device and makes the user-device interface more efficient (e.g., by enabling the user to read the content more quickly), which additionally reduces power usage and improves battery life of the electronic device by enabling the user to use the electronic device more quickly and efficiently.

In some embodiments, in response to determining the motion of the gaze (e.g., 716*b*) of the user indicates that the user is reading the first portion (e.g., 724*a*) of text such as in FIG. 7C, the electronic device (e.g., 101) generates (976) first audio associated with the first portion of text (e.g., the first audio optionally includes music, sound effects, or audio of the text of the first portion of text (e.g., audio of the first portion of the text being read aloud).

In some embodiments, after scrolling the text so that the second portion of text (e.g., 724*b*) shown in FIG. 7D moves in the first direction, the electronic device (e.g., 101) determines (978), via the gaze tracking device (e.g., 314), that the motion of the gaze of the user indicates that the user is reading the second portion (e.g., 724*b*) of text (e.g., the electronic device detects movement of the user's eyes that are consistent with reading while the user looks at the second portion of text).

In some embodiments, in response to determining that the motion of the gaze of the user indicates that the user is reading the second portion (e.g., 724*b*) shown in FIG. 7D of text, the electronic device (e.g., 101) determines (980) second audio associated with the second portion of text. For example, the second audio optionally includes music, sound effects, or audio of the text of the second portion of text (e.g., audio of the second portion of the text being read aloud). In some embodiments, if the user ceases reading the text, the electronic device ceases presenting one or more portions of the audio associated with the text.

The above-described manner of generating audio corresponding to the portion of text the user is currently reading while the user is reading enables the electronic device to play the audio without receiving an input other than detection of the user's gaze which simplifies the interaction between the user and the electronic device and enhances the operability of the electronic device and makes the user-device interface more efficient (e.g., by reducing the inputs required by the user to cause the electronic device to play audio coordinated with the content item), which additionally reduces power usage and improves battery life of the electronic device by enabling the user to use the electronic device more quickly and efficiently.

In some embodiments, a progression through the first audio associated with the first portion (e.g., 724*a*) of text shown in FIG. 7C corresponds to a speed at which the user is reading the first portion (e.g., 724*a*) of text, and a progression through the second audio (e.g., 724*b*) associated with the second portion (e.g., 724*b*) of text corresponds to a speed at which the user is reading the second portion of text (982).

In some embodiments, the faster the user reads the text, the faster the corresponding audio content is played. Likewise, in some embodiments, the slower the user reads the text, the slower the corresponding audio content is played. For example, the audio content is a recording of the text being read aloud and the audio is played back at a speed such that the phrases and/or words that are being played aloud are synchronized with the phrases/words currently being read by the user.

The above-described manner of generating audio at a speed that corresponds to the speed at which the user is reading the text enables the electronic device to play the audio coordinated with the user's reading speed without receiving an input other than detection of the user's gaze, which simplifies the interaction between the user and the electronic device and enhances the operability of the electronic device and makes the user-device interface more efficient (e.g., by reducing the inputs required by the user to cause the electronic device to play audio coordinated with the user's reading speed), which additionally reduces power usage and improves battery life of the electronic device by enabling the user to use the electronic device more quickly and efficiently.

In some embodiments, while the motion of the gaze of the user indicates that the user is reading respective content items, the electronic device associates (984) those respective content items with respective times at which the user was reading those respective content items (e.g., while the user is reading a content item, the electronic device stores an indication of the content item (or an indication of a specific portion of the content item) in association with a timestamp of the time at which the user is reading the content item). For example, while the user is reading a news article, the electronic device stores an indication of the news article and the time at which the user is reading the news article. As another example, while the user is reading a respective chapter of an e-book, the electronic device stores an indication of the respective chapter, page, line and/or word in association with a timestamp of the time the user is reading the chapter, page, line and/or word.

In some embodiments, after the motion of the gaze of the user indicates that the user has finished reading the respective content items (986), the electronic device (e.g., 101) receives (988), via one or more input devices, a request to present information about a content item the user was reading at a first respective time (e.g., the user enters an input requesting the electronic device to present an indication of the content item the user was reading at the first respective time). For example, the user asks a virtual assistant of the electronic device "what was I reading yesterday at 3 pm?" and, in response, the electronic device presents an indication of a content item (e.g., chapter, page, line and/or word) the user was reading the previous day at 3 μm. In some embodiments, other forms of input, such as providing text input through a keyboard or soft keyboard, are possible.

In some embodiments, in response to receiving the request to display the information about the content item the user was reading at the first respective time (990), in accordance with a determination that the first respective time is a first time, the electronic device (e.g., 101) presents (992) information about a first respective content item (e.g., if the user requests information about the content that they were reading the previous day at 10 am, the electronic device presents an indication of the content item or the portion of the content item the user was reading the previous day at 10 am).

In some embodiments, in accordance with a determination that the first respective time is a second time, the electronic device (e.g., 101) presents (994) information about a second respective content item. For example, if the user requests information about the content item that they were reading last Monday at 2 μm, the electronic device presents an indication of the content item or the portion of the content item the user was reading the previous Monday at 2 μm. In some embodiments, the user requests information about what they were reading at a time for which the electronic device does not have a respective read content item stored. In response to the request, the electronic device optionally indicates that the user was not reading anything at the indicated time and/or presents an indication of the content item the user was reading at the time closest to the requested time for which an associated content item is stored. In some embodiments, in accordance with a determination that the user was not reading a content item at the respective time, the electronic device presents an indication that the user was not reading at the respective time.

The above-described manner of storing an indication of a content item the user is reading in association with the current time and, in response to a request to present information about a content item that was being read at a respective time, presenting an indication of the content item that was being read at the respective time enables the electronic device to efficiently navigate to a content item without being provided the title or other identifying information about the content item, which simplifies the interaction between the user and the electronic device and enhances the operability of the electronic device and makes the user-device interface more efficient (e.g., by enabling the user to quickly recall and view content they previously viewed), which additionally reduces power usage and improves battery life of the electronic device by enabling the user to use the electronic device more quickly and efficiently.

In some embodiments, while displaying the content item, the electronic device (e.g., 101) receives (996), via one or more input devices, a request to cease displaying the content item, and in response to receiving the request to cease displaying the content item, ceasing display of the content item (e.g., in response to detecting the user looking at an area of the display different from the area of the display in which the content item is displayed while performing a head movement that satisfies one or more criteria, the electronic device ceases displaying the content item or only displays a predetermined portion of the content item in a content browsing user interface according to one or more steps of method 1000, described in more detail below). The electronic device optionally ceases displaying the content item in response to a user input detected with an input device other than the gaze tracking device. In some embodiments, the electronic device ceases displaying the content item in response to a user input that corresponds to a request to display a different content item or a user interface for an application different from the application that presents the content item.

In some embodiments, after ceasing display of the content item, the electronic device (e.g., 101) receives (998), via the one or more input devices, a request to display the content item (e.g., the request to display the content item is optionally received after a relatively short duration of time (e.g., 5 minutes to an hour) has passed or after a longer period of time has passed (e.g., one or more days)).

In some embodiments, in response to the receiving the request to display the content item (998-2), the electronic device displays (998-4) the respective content item (e.g., in some embodiments, the content item is displayed overlaid on a content browsing user interface according to one or more steps of process 800 described above).

In some embodiments, in accordance with a determination that the user had last read the first portion of text of the content item before display of the content item was ceased, the electronic device (e.g., 101) provides (998-6) an indication of the first portion of text of the content item (e.g., displaying the indication of the first portion of the text of the content item includes displaying the first portion of the text of the content item with a visual indication).

In some embodiments, in accordance with a determination that the user had last read the second portion of text of the content item before display of the content item was ceased, the electronic device (e.g., 101) provides (998-8) an indication of the second portion of text of the content item.

For example, even if the first portion of the text of the content item is not the beginning of the content item, the content item is displayed scrolled to the first portion of the content item. In some embodiments, the beginning of the content item is displayed, even if it does not include the first portion of the content item, concurrently with an indication of the first portion of the content item. In response to detecting selection of the indication of the first portion of the content item, the electronic device optionally scrolls the content item to the first portion of the content item. In some embodiments, the indication is one or more of an audio or visual indication.

In some embodiments, displaying the indication of the second portion of the text of the content item includes displaying the second portion of the text of the content item with a visual indication. For example, even if the second portion of the text of the content item is not the beginning of the content item, the content item is displayed scrolled to the second portion of the content item. In some embodiments, the beginning of the content item is displayed, even if it does not include the second portion of the content item, concurrently with an indication of the second portion of the content item. In response to detecting selection of the indication of the second portion of the content item, the electronic device optionally scrolls the content item to the second portion of the content item. In some embodiments, the indication is one or more of an audio or video indication.

The above-described manner of displaying the indication of the portion of the content item the user last read prior to ceasing to display the content item enables the electronic device to quickly present the portion of the content item the user was reading previously which simplifies the interaction between the user and the electronic device and enhances the operability of the electronic device and makes the user-device interface more efficient (e.g., by reducing the amount of time it takes for the user to resume reading the content after navigating away from the content), which additionally reduces power usage and improves battery life of the electronic device by enabling the user to use the electronic device more quickly and efficiently.

In some embodiments, while displaying the user interface, the electronic device (e.g., 101) determines (998-10), via the gaze tracking device (e.g., 314), that the user has blinked including a determination that the user's eyes closed and then opened with predetermined timing criteria (e.g., user's eyes are closed for longer than a time threshold (e.g., 0.05, 0.1, 0.2, 0.5 seconds, 1 second, 2 seconds, etc.) and then reopened). In some embodiments, the threshold is longer than a period of time a user blinks normally while looking at the user interface or reading the content.

In some embodiments, in response to determining that the user blinked, the electronic device (e.g., 101) scrolls (998-12) the text in a second direction, different from the first direction, to cause an earlier portion of the content item to be displayed at the first position (e.g., 722a) in the user interface. For example, the electronic device scrolls the text down as the user is reading and, in response to detecting the user's blink lasting longer than the predetermined threshold amount of time, the electronic device scrolls the content up. In some embodiments, the first portion of the content item is the beginning of the content item. In some embodiments, a long blink causes the content item to be scrolled back to the beginning of the content item. In some embodiments, a long blink causes the content item to be scrolled back in increment (each blink causing an increment of backwards scrolling). In some embodiments, in accordance with a determination that the user's eyes did not close and then open with predetermined timing criteria, the electronic device forgoes scrolling the text in the second direction.

The above-described manner of scrolling the content item backwards in response to detecting the blink lasting longer than the predetermined threshold time enables the electronic device to efficiently navigate to earlier parts of the content item which simplifies the interaction between the user and the electronic device and enhances the operability of the electronic device and makes the user-device interface more efficient (e.g., by reducing the amount of time needed to start reading the content item from an earlier portion), which additionally reduces power usage and improves battery life of the electronic device by enabling the user to use the electronic device more quickly and efficiently.

In some embodiments, while displaying the user interface, the electronic device (e.g., 101) determines (998-14), via the gaze tracking device (e.g., 314), that the user is skimming the content item (e.g., eye movements associated with skimming text are different from eye movements associated with reading text). The electronic device is optionally able to determine, via the gaze tracking device, that the user is skimming the content.

In some embodiments, in response to determining that the user is skimming the content item, the electronic device (e.g., 101) presents (998-16) one or more first words of the content item with a visual characteristic having a first value, and presenting one or more second words of the content item, different from the first words of the content item, with the visual characteristic having a second value, different from the first value.

The visual characteristic is optionally one or more of color, opacity, size, highlighting, or a text style (e.g., bold, underline, italic). In some embodiments, the electronic device optionally presents one or more predetermined words deemed of key importance to the content item with an appearance that is easier to read (e.g., higher-contrast color, higher opacity, larger size, being highlighted, or presented in a bold, italic, or underlined typeface) and the remaining words of the content item with an appearance that is easier to skim over (e.g., lower-contrast color, lower opacity, smaller size, not being highlighted, or not being presented in the text styling that the other words are presented with). For example, the electronic device displays a content item on a white background with the key words displayed in black text and the other words displayed in gray text. In some embodiments, in accordance with a determination that the user is not skimming the content item, the electronic device forgoes presenting one or more first words of the content item with a visual characteristic having a first value, and presenting one or more second words of the content item, different from the first words of the content item, with the visual characteristic having a second value, different from the first value.

The above-described manner of displaying the first words and second words with different visual characteristics in response to detecting that the user is skimming the content enables the electronic device to display the content in a manner that is easier to skim which simplifies the interaction between the user and the electronic device and enhances the operability of the electronic device and makes the user-device interface more efficient (e.g., by reducing the amount of time it takes the user to skim the text), which additionally reduces power usage and improves battery life of the electronic device by enabling the user to use the electronic device more quickly and efficiently.

In some embodiments, after scrolling the text so that the second portion (e.g., 724*b*) of the text moves in the first direction in response to the determination that the motion of the gaze (e.g., 716*b*) of the user indicates that the user has finished reading the first portion (e.g., 724*a*) of text, such as in FIG. 7C, the electronic device (e.g., 101) receives (998-18), via one or more input devices (e.g., keyboard, mouse, touch screen, touch sensitive surface, trackpad, voice command, etc.) in communication with the electronic device (e.g., 101) other than the gaze tracking device (e.g., 314), an input corresponding to a request to scroll the text in a second direction opposite the first direction.

In some embodiments, in response to receiving the one or more inputs, the electronic device (e.g., 101) scrolls (998-20) the text in the second direction. In some embodiments, in response to a request received at an input device other than the gaze tracking device to scroll the content backwards, the electronic device scrolls the content backwards. For example, the electronic device automatically scrolls the content down as the user reads the content and, in response to an input received at a trackpad corresponding to a request to scroll the content up, the electronic device scrolls the content up. In some embodiments, the electronic device does not scroll the content backwards in response to input detected via the gaze tracking device. For example, the electronic device scrolls the content down as the user reads the content and detects that the user is looking at a region of the display above a respective portion of content the user is reading. In this example, the electronic device does not scroll the content up in response to simply detecting the user's gaze.

The above-described manner of scrolling the content in the first direction in response to gaze and in the second direction in response to an input device other than the gaze tracking device enables the electronic device to forgo scrolling the content in the second direction in response to gaze, thus allowing the user to freely look around the user interface without inadvertently scrolling the text backwards, which simplifies the interaction between the user and the electronic device and enhances the operability of the electronic device and makes the user-device interface more efficient (e.g., by reducing the likelihood of user error and reducing inputs needed to correct user error), which additionally reduces power usage and improves battery life of the electronic device by enabling the user to use the electronic device more quickly and efficiently.

FIGS. 10A-10G is a flowchart illustrating a method 1000 of navigating between user interfaces in accordance with detection of movement of the user's head and detection of the user's gaze in accordance with some embodiments. In some embodiments, the method 1000 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In the method 1000, in some embodiments, an electronic device (e.g., computer system (e.g., 101)) in communication with a display generation component (e.g., 120) and a gaze tracking device (e.g., 314) (e.g., a mobile device (e.g., a tablet, a smartphone, a media player), a computer (e.g., a desktop computer, a laptop computer), or a wearable device (e.g., a watch, a head-mounted device), while displaying, via the display generation component (e.g., 120), a first user interface (e.g., 700) on a display as shown in FIG. 7B, detects (1002) a request to navigate from the first user interface (e.g., 700) to a second user interface (e.g., 714) (e.g., the first user interface is optionally a navigational user interface including one or more options that, when selected, cause the electronic device to navigate to a different user interface).

In some embodiments, in response to the request to navigate from the first user interface (e.g., 700) to the second user interface (e.g., 714), the electronic device (e.g., 101) navigates (1004) to the second user interface (e.g., the electronic device displays the second user interface, such as a content user interface including an item of content, in response to detecting the request to navigate to the second user interface).

In some embodiments, while displaying, via the display generation component (e.g., 120), the second user interface (e.g., 714) such as in FIG. 7C, the electronic device (e.g., 101) detects (1006) a movement of a head of the user (e.g., the head movement satisfies one or more criteria indicating that the movement of the user's head matches a predetermined head movement).

In some embodiments, in response to detecting the movement of the head of the user (1008), in accordance with a determination that the movement of the head meets first criteria (e.g., movement to the side and then forward) and that a gaze (e.g., 716*c*) of the user is directed to a respective portion of the user interface (e.g., 700) (e.g., a portion that is outside of a content region, optionally in a first direction from the content region such as to a left side of the content region.), the electronic device (e.g., 101) navigates (1010) from the second user (e.g., 714) interface back to the first user interface (e.g., 700) as shown in FIG. 7B (e.g., the electronic device optionally ceases displaying the second user interface and displays the first user interface).

In some embodiments, in accordance with a determination that the movement of the head does not meet the first criteria, the electronic device (e.g., 101) forgoes (1012) navigating from the second user interface (e.g., 714) back to the first user interface (e.g., 700) (e.g., the electronic device optionally continues to display the second user interface).

In some embodiments, in accordance with a determination that the movement of the head meets the first criteria and that the gaze of the user is not directed to the respective portion of the user interface (e.g., 700), the electronic device (e.g., 101) forgoes (1014) navigation from the second user interface (e.g., 714) back to the first user interface (e.g., 700).

In some embodiments, the display generation component is a display integrated with the electronic device (optionally a touch screen display) and/or an external display such as a monitor, projector, television, etc. In some embodiments, the gaze tracking device includes one or more camera(s) (e.g., IR cameras, NIR cameras, visible light cameras, etc.).

For example, the first user interface is a content browsing user interface including one or more representations of items of content. In response to detecting a request to view one of the items of content, such as according to one or more steps of method 800, the electronic device optionally displays the requested item of content in the second user interface. Thus, in some embodiments, the second user interface is a content viewing user interface that includes an item of content (e.g., text content, photo content, and/or video content).

In some embodiments, the second user interface is displayed overlaid on the first user interface and a portion of the first user interface remains visible while the electronic device displays the second user interface, such as according to one or more steps of method 800.

For example, the head movement includes one or more of moving forward (e.g., in a direction of the display generation component and/or gaze tracking device and/or otherwise towards the user interface in a virtual environment) and/or moving or rotating to the side of the user interface (e.g., in a virtual environment) at which a portion of the first user interface is displayed. For example, if a portion of the first user interface is visible to the left of the second user interface, the head movement includes detecting movement and/or rotation towards the left.

In some embodiments in which the second user interface is overlaid on the first user interface, the electronic device detects that the user is looking at a portion of the first user interface.

In some embodiments, a head movement that meets the first criteria includes movement of the head towards a side of the user interface at which a portion of the first user interface is displayed. For example, if a portion of the first user interface is visible to the right of the second user interface, the head movement that satisfies the first criteria includes movement of the head to the right. In some embodiments, the location of the user's gaze is detected using the gaze tracking device. The gaze tracking device optionally captures one or more images of the user's eyes and detects the pupils and glints in the captured one or more images to track the user's gaze, as described in more detail above with reference to FIG. 6. In some embodiments, the first user interface object is partially overlaid on the second user interface object and part of the second user interface object is visible. The electronic device optionally detects that the user is looking at the visible portion of the second user interface object.

In some embodiments, a head movement fails to meet the first criteria if one or more of the direction, magnitude, or duration of the head movement is outside of a predetermined range or fails to match a predetermined pattern.

In some embodiments, the electronic device does not navigate back to the first user interface unless it is determined both that the head movement meets the first criteria and that the gaze of the user is directed to the respective portion of the user interface. The electronic device optionally continues to display the second user interface in accordance with the determination that the head movement meets the first criteria and that the gaze of the user is not directed to the respective portion of the user interface.

The above-described manner of navigating back to the first user interface in response to detecting the user's gaze and head movement enables the electronic device to navigate between user interface objects without user input beyond gaze and head movement, but also avoiding erroneous backward navigation due to the dual head and gaze requirements, which simplifies the interaction between the user and the electronic device and enhances the operability of the electronic device and makes the user-device interface more efficient (e.g., by reducing the amount of time it takes for the user to enter a navigational input and reducing erroneous navigational results), which additionally reduces power usage and improves battery life of the electronic device by enabling the user to use the electronic device more quickly and efficiently.

In some embodiments, the second user interface (e.g., 714) is displayed while at least a portion of the first user interface (e.g., 700) is displayed, such as in FIG. 7C (1016) (e.g., the second user interface is overlaid on the first user interface and a portion of the first user interface is visible next to the boundary of the second user interface). For example, the first user interface is a content browsing user interface and the second user interface includes an item of content the user navigated to from the first user interface.

In some embodiments, while displaying the second user interface (e.g., 714) and the at least the portion of the first user interface (e.g., 700), wherein the first user interface (e.g., 700) is visually deemphasized relative to the second user interface (e.g., 714), the electronic device (e.g., 101) determines (1018), via the gaze tracking device (e.g., 314), that the gaze (e.g., 716c) of the user has moved from the second user interface (e.g., 714) to the first user interface (e.g., 700), such as in FIG. 7C (e.g., the first user interface is optionally displayed with a higher translucency than the second user interface, the first user interface is displayed with a higher degree of blurriness than the second user interface, the first user interface is displayed with less brightness or contrast than the second user interface, the first user interface is displayed with a reduced size and the second user interface is displayed full-size, etc. while the user is looking at the second user interface).

In some embodiments, in response to determining that the gaze (e.g., 716c) of the user has moved from the second user interface (e.g., 714) to the first user interface (e.g., 700), such as in FIG. 7C, the electronic device (e.g., 101) reduces (1020) an amount of visual deemphasis of the first user interface (e.g., 714) relative to the second user interface (e.g., 700), such as in FIG. 7G (e.g., displaying the second user interface with the visual characteristic having a third value, different from the first value (e.g., increased translucency, increased blurriness, reduced brightness or contrast, reduced size, etc.); and/or displaying the at least the portion of the first user interface with the visual characteristic having a fourth value, different from the second value) (e.g., reduced translucency, reduced blurriness, increased brightness or contrast, increased size, etc.).

In some embodiments, while the user is looking at the second user interface, the second user interface is displayed at full size, with full color, contrast, or brightness, full clarity, and low translucency and the first user interface is displayed at a reduced size, muted color, low contrast and/or brightness, reduced clarity, and/or higher translucency. In response to detecting the user looking at the first user interface, the electronic device optionally decreases the size, color, contrast, brightness, and/or clarity and/or increases the translucency of the second user interface and increases the size, contrast, brightness and/or clarity, brightens the colors, and/or reduces the translucency of the first user interface.

The above-described manner of modifying the visual characteristics of the first and second user interfaces in response to detecting the user's gaze moving from the second user interface to the first user interface enables the electronic device to efficiently visually emphasize the user interface the user is currently looking at, which simplifies the interaction between the user and the electronic device and enhances the operability of the electronic device and makes the user-device interface more efficient (e.g., by enabling the user to read content more quickly), which additionally reduces power usage and improves battery life of the electronic device by enabling the user to use the electronic device more quickly and efficiently.

In some embodiments, while the gaze of the user is directed to the first user interface (e.g., 700) and while displaying the first user interface (e.g., 700) and the second user interface (e.g., 714) with the reduced amount of visual deemphasis of the first user interface (e.g., 700) relative to the second user interface (e.g., 714), such as in FIG. 7G, the electronic device (e.g., 101) determines (1022), via the gaze tracking device (e.g., 314), that the gaze (e.g., 716*f*) of the user has moved from the first user interface (e.g., 700) to the second user interface (e.g., 714) (e.g., while the user is looking at the first user interface, the first user interface is displayed with increased size, contrast, clarity, and/or brightness, brightened colors, and/or reduced translucency and the second user interface is displayed with decreased size, contrast, clarity, and/or brightness, dimmed colors, and/or increased translucency compared to the presentation of the first user interface while the user is looking at the first user interface).

In some embodiments, in response to determining that the gaze (e.g., 716*f*) of the user has moved from the first user interface (e.g., 700) to the second user interface (e.g., 714) (1024) such as in FIG. 7G, the electronic device (e.g., 101) displays (1026) the first user interface (e.g., 700) and the second user interface (e.g., 714) with the first user interface (e.g., 700) being visually deemphasized relative to the second user interface (e.g., 714) as shown in FIG. 7C (e.g., restoring the level of visual deemphasis to be the same as the amount of deemphasis prior to detecting the user looking at the first user interface).

In some embodiments, the second user interface is displayed with reduced translucency, reduced blurriness, increased brightness or contrast, increased size, etc. and the first user interface is displayed with increased translucency, increased blurriness, reduced brightness or contrast, reduced size, etc.). In some embodiments, in response to detecting the user looking at the second user interface, the electronic device displays the second user interface with increased size, contrast, clarity, and/or brightness, brightened colors, and/or reduced translucency and displays the first user interface with decreased size, contrast, clarity, and/or brightness, dimmed colors, and/or increased translucency compared to the presentation of the first and second user interfaces while the user is looking at the second user interface.

The above-described manner of modifying the visual characteristics of the first and second user interfaces in response to detecting the user looking at the second user interface enables the electronic device to efficiently display the user interface at which the user is looking with reduced visual clutter, which simplifies the interaction between the user and the electronic device and enhances the operability of the electronic device and makes the user-device interface more efficient (e.g., by enabling the user to more quickly interpret the user interface at which they are looking), which additionally reduces power usage and improves battery life of the electronic device by enabling the user to use the electronic device more quickly and efficiently.

In some embodiments, in response to detecting the movement of the head of the user (1028), in accordance with a determination that the movement of the head meets the first criteria (e.g., movement to the side and then forward) and that a gaze of the user is directed to a respective portion of the user interface (e.g., a portion that is outside of a content region, optionally in a first direction from the content region such as to a left side of the content region.), the electronic questions displays (1030) an animated transition between the second user interface and the first user interface while navigating from the second user interface back to the first user interface, such as in FIGS. 7G-7H. In some embodiments in which the second user interface is overlaid on the first user interface, the electronic device detects that the user is looking at a portion of the first user interface.

In some embodiments, in accordance with a determination that the movement of the head does not meet the first criteria and that a gaze of the user is directed to a respective portion of the user interface, the electronic device (e.g., 101) displays (1032) a first portion of the animated transition between the second user interface and the first user interface without displaying the full animated transition between the second user interface, such as in FIG. 7G.

In some embodiments, the electronic device displays an animation of the visual characteristics of the first and second user interfaces changing in accordance with which of the user interfaces the user is looking at. For example, in response to detecting the user moving their gaze from the second user interface to the first user interface, the electronic device displays an animation of the first user interface becoming larger and more clear and the second user interface becoming smaller and less clear. In some embodiments, the progress of the animation is proportional to how much the user's head has moved. In some embodiments, if the user moves their head by a greater amount, the animation progresses by a greater amount.

The above-described manner of animating the changes to the visual characteristics of the user interfaces as the user moves their head, enables the electronic device to provide efficient visual feedback to the user indicating that the head movement causes navigation between the user interfaces, which simplifies the interaction between the user and the electronic device and enhances the operability of the electronic device and makes the user-device interface more efficient (e.g., by enabling the user to navigate between the user interfaces with the head movement more quickly), which additionally reduces power usage and improves battery life of the electronic device by enabling the user to use the electronic device more quickly and efficiently.

In some embodiments, the magnitude of the first portion of the animated transition depends on an amount of movement of the head (1034). For example, if the user moves their head by a first amount, the animation progresses a first amount and if the user moves their head by a greater amount, the animation progresses by a greater amount.

The above-described manner of animating the changes to the visual characteristics of the user interfaces by an amount depending on the amount by which the user moves their head enables the electronic device to provide efficient visual feedback to the user indicating that the head movement causes navigation between the user interfaces, which simplifies the interaction between the user and the electronic device and enhances the operability of the electronic device and makes the user-device interface more efficient (e.g., by enabling the user to navigate between the user interfaces with the head movement more quickly), which additionally reduces power usage and improves battery life of the electronic device by enabling the user to use the electronic device more quickly and efficiently.

In some embodiments, the first portion of the animated transition progresses at a rate and/or direction determined based on a rate and/or direction of movement of the head (1036) (including moving forward and/or backward). In some embodiments, the electronic device progresses the animation at a relatively slow speed in response to detecting relatively slow movement of the user's head and progresses the animation at a relatively quick speed in response to detecting relatively quick movement of the user's head. The electronic device optionally progresses the animation forward in response to detecting movement of the user's head in a first direction and optionally progresses the animation backward in response to detecting movement of the user's head in a second direction opposite the first direction.

The above-described manner of animating the changes to the visual characteristics of the user interfaces at a rate or direction based on the rate or direction of the head movement enables the electronic device to provide efficient visual feedback to the user indicating that the head movement causes navigation between the user interfaces, which simplifies the interaction between the user and the electronic device and enhances the operability of the electronic device and makes the user-device interface more efficient (e.g., by enabling the user to navigate between the user interfaces with the head movement more quickly), which additionally reduces power usage and improves battery life of the electronic device by enabling the user to use the electronic device more quickly and efficiently.

In some embodiments, in response to detecting an end of the head movement without the head movement meeting the first criteria (e.g., end of head gesture or end of gaze), the electronic device (e.g., 101) displays (1038) an animated transition back to the first user interface (e.g., 700) being visually deemphasized relative to the second user interface (e.g., 714), as shown in FIG. 7C (e.g., reverse the first portion of the animated transition). In some embodiments, the end of the head movement corresponds to detecting that the user stops moving their head or reverses the head movement such that the head is positioned as it was prior to the beginning of the head movement.

The animated transition back to the first user interface being visually deemphasized relative to the second user interface is optionally the animated transition of reducing the amount of deemphasis of the first user interface relative to the second user interface played in reverse. In some embodiments, the electronic device displays the animated transition back to the first user interface being visually deemphasized relative to the second user interface in response to detecting the user looking away from the first user interface. The above-described manner of displaying the animated transition back to the first user interface being visually deemphasized relative to the second user interface enables the electronic device to provide efficient visual feedback to the user indicating that the head movement causes navigation between the user interfaces, which simplifies the interaction between the user and the electronic device and enhances the operability of the electronic device and makes the user-device interface more efficient (e.g., by enabling the user to navigate between the user interfaces with the head movement more quickly), which additionally reduces power usage and improves battery life of the electronic device by enabling the user to use the electronic device more quickly and efficiently.

In some embodiments, the first criteria include a criterion that requires a tilting movement of the head of the user to a side (1040). In some embodiments, the criterion is satisfied if the user tilts their head to the left or the right, the criterion is satisfied if the user tilts their head to the left, or the criterion is satisfied if the user tilts their head to the right. The electronic device optionally displays the second user interface overlaid on the first user interface, with a portion of the first user interface being visible. For example, the second user interface is displayed overlaid on a left side of the first user interface and a portion of the first user interface remains visible to the right of the second user interface and in response to detecting at least movement of the user's head to the right, the electronic device navigates back to the first user interface.

The above-described manner of navigating back to the first user interface in response to detecting at least movement of the user's head to the side enables the electronic device to provide an efficient and intuitive way of navigating from the second user interface to the first user interface, which simplifies the interaction between the user and the electronic device and enhances the operability of the electronic device and makes the user-device interface more efficient (e.g., by reducing the amount of time it takes the user to navigate between user interfaces), which additionally reduces power usage and improves battery life of the electronic device by enabling the user to use the electronic device more quickly and efficiently.

In some embodiments, the first criteria include a criterion that requires a forward movement of the user (1042) (e.g., relative to a body of the user). In some embodiments, in response to detecting at least movement of the user's head in a forward direction relative to the body of the user, the electronic device navigates from the second user interface to the first user interface.

The above-described manner of navigating back to the first user interface in response to detecting at least movement of the user's head forward enables the electronic device to provide an efficient and intuitive way of navigating from the second user interface to the first user interface, which simplifies the interaction between the user and the electronic device and enhances the operability of the electronic device and makes the user-device interface more efficient (e.g., by reducing the amount of time it takes the user to navigate between user interfaces), which additionally reduces power usage and improves battery life of the electronic device by enabling the user to use the electronic device more quickly and efficiently.

In some embodiments, navigating from the first user interface (e.g., 700) to the second user interface (e.g., 714) includes displaying the second user (e.g., 714) interface overlaid on the first user interface (e.g., 700), such as in FIG. 7C (1044). In some embodiments, the second user interface is overlaid on a portion of the first user interface such that a portion of the first user interface is visible while the second user interface is being displayed. For example, the second user interface is overlaid on a left portion of the first user interface and a right portion of the first user interface is visible to the right of the second user interface.

The above-described manner of displaying the second user interface overlaid on the first user interface enables the electronic device to concurrently display the second user interface and a portion of the first user interface which simplifies the interaction between the user and the electronic device and enhances the operability of the electronic device and makes the user-device interface more efficient (e.g., by allowing the user to see a portion of the first user interface so the user knows whether or not they want to navigate back to the first user interface before inputting the request to navigate back to the first user interface), which additionally reduces power usage and improves battery life of the electronic device by enabling the user to use the electronic device more quickly and efficiently.

In some embodiments, navigating from the first user interface to the second user interface includes deemphasizing the first user interface and, in accordance with a determination that a gaze of the user is directed to the second user interface, emphasizing the second user interface (1046). In some embodiments, deemphasizing the first user interface includes one or more of reducing size, contrast, brightness, opacity, and/or clarity of the first user interface and emphasizing the second user interface includes one or more of increasing the size, contrast, brightness, opacity, and/or clarity of the second user interface.

The above-described manner of deemphasizing the first user interface and emphasizing the second user interface as part of navigating from the first user interface to the second user interface enables the electronic device to efficiently display the user interfaces with reduced visual clutter while the user is looking at the second user interface, which simplifies the interaction between the user and the electronic device and enhances the operability of the electronic device and makes the user-device interface more efficient (e.g., by enabling the user to comprehend the second user interface more quickly and providing an efficient way of navigating from the second user interface back to the first user interface), which additionally reduces power usage and improves battery life of the electronic device by enabling the user to use the electronic device more quickly and efficiently.

In some embodiments, while displaying the second user interface (e.g., 714) (e.g., while navigated to the second user interface), while a characteristic (e.g., length of time) of the gaze of the user does not meet second criteria or while the head movement of the user does not meet the first criteria (e.g., length of time of head movement, distance of head movement, and/or speed of head movement fail to meet one or more criteria and/or the location, duration, and/or other characteristic of the gaze fail to meet one or more criteria), the electronic device (e.g., 101) continues (1048) to display the second user interface (e.g., 714) while changing an appearance of the second user interface (e.g., 714) (e.g., or an appearance of the first user interface) based on the gaze of the user or the head movement of the user, such as in FIG. 7G (e.g., displaying the first user interface with increased contrast, brightness, size, opacity, and/or clarity and displaying the second user interface with decreased contrast, brightness, size, opacity, and/or clarity compared to the appearance of the first and second user interfaces prior to detecting the gaze of the user on the first user interface and the head movement of the user).

In some embodiments, in accordance with a determination that the characteristic of the gaze of the user meets the second criteria and the head movement of the user meets the first criteria, the electronic device (e.g., 101) navigates (1050) from the second user interface (e.g., 714) back to the first user interface (e.g., 700), such as in FIG. 7B.

In some embodiments, remaining navigated to the second user interface includes continuing to display the second user interface (e.g., overlaid on the first user interface). Moreover, if, while the electronic device is navigated to the second user interface, the user looks away from both the first and second user interfaces (e.g., looks at a system user interface or system user interface element of the electronic device or looks away from the display area of the display generation component), the electronic device reverts to displaying the first and second user interfaces the way they were displayed while the user was looking at the second user interface.

In some embodiments, navigating from the second user interface back to the first user interface includes ceasing to display the second user interface. Moreover, once the electronic device navigates back to the first user interface, if the user looks away from the first user interfaces as described above, the electronic device continues to display the first user interface without displaying the second user interface.

The above-described manner of navigating back to the first user interface in response to detecting that the gaze of the user and the user's head movement meet the predetermined criteria, but changing the appearance of both the first and second user interfaces based on head/gaze inputs that are not sufficient to navigate back to the first user interface, enables the electronic device to efficiently provide feedback to the user that continuing to perform the head movement and continuing to look at the first user interface will cause navigation back to the first user interface, which simplifies the interaction between the user and the electronic device and enhances the operability of the electronic device and makes the user-device interface more efficient (e.g., by enabling the user to more quickly navigate back to the first user interface when they intend to do so), which additionally reduces power usage and improves battery life of the electronic device by enabling the user to use the electronic device more quickly and efficiently.

In some embodiments, while displaying the second user interface (e.g., 714) with the changed appearance of the second user interface (e.g., 714), such as in FIG. 7G (e.g., while navigated to the second user interface and displaying at least a portion of the first user interface), the electronic device (e.g., 101) determines (1052), via the gaze tracking device (e.g., 314), that the gaze (e.g., 716f) of the user is directed to the second user interface (e.g., 714) (e.g., or first user interface).

In some embodiments, in response to determining that the gaze (e.g., 716f) of the user is directed to the second user interface (e.g., 714), as shown in FIG. 7G, the electronic device (e.g., 101) reverts (1054) the appearance of the second user interface (e.g., 714) to an initial appearance, such as in FIG. 7C.

In some embodiments, the changed appearance includes one or more of reduced size, contrast, clarity, and/or opacity compared to the initial appearance of the second user interface while the user was looking at the second user interface before looking at the first user interface and performing a head movement.

In some embodiments, reverting the appearance of the second user interface to the initial appearance includes forgoing navigating back to the first user interface. The electronic device optionally also reverts the first user interface to an initial appearance that has a decreased size, contrast, clarity, and/or opacity compared to the appearance of the first user interface in response to detecting the user looking at the first user interface while performing the head movement.

The above-described manner of reverting the appearance of the second user interface to the initial appearance in response to detecting the user looking at the second user interface enables the electronic device to provide an efficient way for the user to halt the process of navigating back to the first user interface and continue looking at the second user interface, which simplifies the interaction between the user and the electronic device and enhances the operability of the electronic device and makes the user-device interface more efficient (e.g., by providing a quick and efficient way of resuming display of the second user interface with the initial appearance), which additionally reduces power usage and improves battery life of the electronic device by enabling the user to use the electronic device more quickly and efficiently.

In some embodiments, the electronic device (e.g., 101) displays (1056), in the user interface, text content (e.g., the text content is overlaid on the first and second user interfaces or is displayed in the first or second user interfaces).

In some embodiments, while displaying the text content, the electronic device (e.g., 101) detects (1058) a request to cease displaying the text content (e.g., a user input received at one of the input devices in communication with the electronic device other than the gaze detection device).

In some embodiments, in response to detecting the request to cease displaying the text content (1060), in accordance with a determination that the text content does not satisfy one or more criteria, the electronic device (e.g., 101) ceases (1062) to display the text content (e.g., the one or more criteria are associated with predetermined notification events, such as important alerts, notifications generated by applications indicated by the user or the system as being important, or text that is indicated by the text creator as being important).

In some embodiments, in accordance with a determination that the text content satisfies the one or more criteria (1064) (e.g., the one or more criteria are associated with predetermined notification events, such as important alerts, notifications generated by applications indicated by the user or the system as being important, or text that is indicated by the text creator as being important), in accordance with a determination (e.g., via the gaze tracking device) that the user has read the text content, the electronic device (e.g., 101) ceases (1066) to display the text content (e.g., the electronic device determines, based on data captured by the gaze tracking component, that the user's eye movement is consistent with reading the text content).

In some embodiments, in accordance with a determination (e.g., via the gaze tracking device) that the user has not read the text content, the electronic device (e.g., 101) maintains (1068) display of the text content.

The text content optionally includes text associated with an indication of a notification event. For example, the text content is a message preview of a message received at an electronic device, the message preview being displayed in a notification indication that indicates receipt of the message. In some embodiments, the text is terms and conditions text associated with a software product or electronic device service.

In some embodiments, the input is a gaze input for navigating away from, for example, the second user interface, as described above.

For example, the input is one of a press of a key of a keyboard, selection of an option to cease displaying the text made via a touch screen, trackpad, mouse, etc., or a voice command.

In accordance with a determination that the text does not satisfy the criteria, the electronic device ceases displaying the text in response to a user request to do so (e.g., navigates away from and stops displaying the second user interface in the example that the text content is included in the second user interface).

In response to detecting the input corresponding to a request to cease displaying the text and in accordance with a determination that the user has read the text, the electronic device ceases to display the text (e.g., navigates away from and stops displaying the second user interface in the example that the text content is included in the second user interface).

In some embodiments, if the text satisfies the one or more criteria, the user must read the text for the text to be dismissed in response to the user input corresponding to the request to cease displaying the text.

The above-described manner of dismissing text that satisfies the one or more criteria only in response to detecting that the user has read the text and in response to the input requesting that the text cease to be displayed enables the electronic device to efficiently continue to display important text until it has been read by the user which simplifies the interaction between the user and the electronic device and enhances the operability of the electronic device and makes the user-device interface more efficient (e.g., by reducing the inputs needed by the user to access the text to read it), which additionally reduces power usage and improves battery life of the electronic device by enabling the user to use the electronic device more quickly and efficiently.

In some embodiments, the electronic device (e.g., 101) displays (1070), in the user interface, a notification (e.g., 706) associated with a respective application (e.g., the notification includes text or an image indicating a notification event detected at the electronic device). For example, the notification event is receipt of a message and the notification includes text of the message and an indication of the user account from which the message was received. The notification of the message is optionally associated with a messaging application.

In some embodiments, while displaying the notification (e.g., 706) associated with the respective application, the electronic device (e.g., 101) determines (1072), via the gaze tracking device, that the user has read the notification (e.g., 706) (e.g., the eye movements of the user while looking at the notification are consistent with reading). In some embodiments, the electronic device determines that the user has read all of the text included in the notification.

In some embodiments, in response to determining that the user has read the notification (e.g., 706) (e.g., a determination that the user has completed reading the notification), the electronic device (e.g., 101) displays (1074), via the display generation component (e.g., 120), a user interface of the respective application. For example, the notification is the notification of a message and, in response to detecting that the user has read the notification, the electronic device displays the messaging application. In some embodiments, in accordance with a determination that the user has not finished reading the notification, the electronic device forgoes displaying the user interface of the respective application.

The above-described manner of displaying a user interface of an application associated with a notification the user has read enables the electronic device to present additional information associated with the notification in an efficient manner which simplifies the interaction between the user and the electronic device and enhances the operability of the electronic device and makes the user-device interface more efficient (e.g., by reducing the inputs needed to open an application associated with a notification the user has read), which additionally reduces power usage and improves battery life of the electronic device by enabling the user to use the electronic device more quickly and efficiently.

In some embodiments, while determining, via the gaze tracking device (e.g., 314), that the gaze of the user is directed toward the second user interface (e.g., 714) (1076), in accordance with a determination that the head of the user is in a first position, the electronic device (e.g., 101) displays (1078) text content of the second user interface (e.g., 714) with a first text style (e.g., the first style includes a font, a text size, and/or text styling such as bold, italic, or underlined).

In some embodiments, in accordance with a determination that the head of the user is in a second position, different from the first position, the electronic device (e.g., 101) displays (1080) the text content of the second user interface (e.g., 714) with a second text style, different from the first text style. For example, if the user moves their head forward relative to the rest of their body and/or relative to an initial position of their head, the electronic device optionally displays the text with a larger size or a different font (e.g., a font that has a higher resolution (DPI) but the same size, or a font that is easier to read from shorter distances than the originally-displayed font that is optionally easier to read from longer distances) than the font that was displayed before the user moved their head.

The above-described manner of modifying the text style in response to detecting movement of the user's head enables the electronic device to provide an efficient way of changing the style of text to optimize text display at different head/eye distances, such as a size or level of ornamentation of the text, which simplifies the interaction between the user and the electronic device and enhances the operability of the electronic device and makes the user-device interface more efficient (e.g., by reducing the inputs needed to make the text more legible or aesthetically pleasing), which additionally reduces power usage and improves battery life of the electronic device by enabling the user to use the electronic device more quickly and efficiently.

FIG. 11 is a flowchart illustrating a method 1100 of displaying augmented content related to a portion of content in accordance with detection of movement of the user's head and detection of the user's gaze in accordance with some embodiments. In some embodiments, the method 1100 is performed at a computer system (e.g., computer system 101 in FIG. 1) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1100 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1100 are, optionally, combined and/or the order of some operations is, optionally, changed.

In the method 1100, in some embodiments, an electronic device (e.g., computing system (e.g., 101)) in communication with a display generation component (e.g., 120) and a gaze tracking device (e.g., 314) (e.g., a mobile device (e.g., a tablet, a smartphone, a media player), a computer (e.g., a desktop computer, a laptop computer), or a wearable device (e.g., a watch, a head-mounted device), displays (1102), via the display generation component (e.g., 120), a user interface including first content that includes a first portion (e.g., 718a) that is associated with first augmented content and a second portion (e.g., 718b) that is associated with second augmented content such as in FIG. 7I (e.g., text content. In some embodiments, the content item includes text and/or images).

In some embodiments, while displaying the user interface, the electronic device (e.g., 101) detects (1104) movement of the user's head (e.g., movement of the user's head forward with respect to the user's body).

In some embodiments, in response to detecting the movement of the user's head (1106), in accordance with a determination that a gaze (e.g., 716i) of the user is directed toward the first portion (e.g., 718a) of the first content (e.g., the gaze tracking device optionally captures one or more images of the user's eyes and detects the pupils and glints in the one or more captured images to track the user's gaze, as described in more detail above with reference to FIG. 6) and that the movement of the user's head satisfies first criteria while at the gaze (e.g., 716i) of the user is directed toward the first portion of the first content item such as in FIG. 7I (e.g., movement of the head forward (e.g., towards the respective portion in a virtual environment)), the electronic device (e.g., 101) updates (1108) the user interface to include first augmented content (e.g., 720a) associated with the first portion (e.g., 718a) of the first content without updating the user interface to include the second augmented content associated with the second portion of the first content, such as in FIG. 7J (e.g., the augmented content includes one or more of additional text and/or images).

In some embodiments, in accordance with a determination that the movement of the user's head satisfies the first criteria while at the gaze (e.g., 716n) of the user is directed toward the second portion (e.g., 718b) of the first content item, the electronic device (e.g., 101) updates (1110) the user interface to include the second augmented content (e.g., 720b) associated with the second portion (e.g., 718b) of the first content without updating the user interface to include the first augmented content that is associated with the first portion of the first content, such as in FIG. 7K (e.g., the augmented content that is displayed in response to detecting that the user is looking at a respective portion of the first content item while performing a head movement that meets the one or more criteria is different depending on which portion of the first content item the user is looking at).

In some embodiments, in accordance with a determination that the movement of the user's head did not satisfy the first criteria, the electronic device (e.g., 101) forgoes (1112) updating the user interface to include the first augmented content and forgoes updating the user interface to include the second augmented content.

In some embodiments, the display generation component is a display integrated with the electronic device (optionally a touch screen display) and/or an external display such as a monitor, projector, television, etc. In some embodiments, the gaze tracking device includes one or more camera(s) (e.g., IR cameras, NIR cameras, visible light cameras, etc.).

For example, the content item is an article, a message, e-book, or other content including text. In some embodiments, the first portion is a first word of the text content and the second portion is a second word of the text content.

In some embodiments, detecting the user is moving their head forward includes detecting that the user moves their head in the direction in which they are looking and/or in a direction of the display generation component and/or gaze tracking device. The one or more criteria optionally further include time- and distance-based criteria, such as performing the head movement for at least a predetermined amount of time, moving the head at least a predetermined distance, and/or moving the head with a speed within a predetermined range.

For example, the first portion of the first content item is a word and the augmented content is a definition of the word. As another example, the first portion of the first content item is a hyperlink to a website and the first augmented content is a preview of the website. As another example, the augmented content is an enlarged version of the first portion of the first content item. For example, the first portion of the first content item is part of an image and the augmented content is the full image. As another example, the augmented content is the same as the first portion of the first content item but displayed with a larger size. In some embodiments, the augmented content is related to the first portion of the first content item that supplements the first content item. The augmented content is optionally not included in the first content item. In some embodiments, displaying the augmented content is performed in response to detecting the user's gaze and head movement without receiving additional input from another input device in communication with the electronic device.

In some embodiments, the type of content of the augmented content varies depending on which portion of the first content item the user looks at. For example, if the first portion of the first content item is a word, the first augmented content is a definition and if the second portion of the first content item is a website link, the second augmented content is a preview of the website or if the second portion of the augmented content is an image, the second augmented content is another image. In some embodiments, displaying the augmented content is performed in response to detecting the user's gaze and head movement without receiving additional input from another input device in communication with the electronic device.

In some embodiments, determining that the user did not perform the head movement that satisfies the one or more criteria includes determining that the user isn't moving their head or is moving their head in a way that does not satisfy the one or more criteria. For example, if the user performs the wrong head movement (e.g., moving or turning right or left instead of moving forward), moves in the wrong direction (e.g., moving backwards instead of forwards), moves in a way that does not satisfy the time- or distance-based criteria described above, or doesn't move their head at all while looking at the respective portion of the content, the electronic device forgoes updating the user interface to include the augmented content corresponding to that respective portion of the content.

The above-described manner of displaying augmented content in response to the user's gaze and head movement enables the electronic device to quickly display augmented content related to the portion of the content item at which the user is looking in response only to the user's gaze and head movement, which simplifies the interaction between the user and the electronic device and enhances the operability of the electronic device and makes the user-device interface more efficient (e.g., by reducing the time it takes the user to provide an input requesting the augmented content and reducing erroneous display of augmented content), which additionally reduces power usage and improves battery life of the electronic device by enabling the user to use the electronic device more quickly and efficiently.

In some embodiments, the first augmented content (e.g., 720*a*) such as in FIG. 7J is one of a definition of the first portion (e.g., 718*a*) of the first content, a website preview of the first portion of the first content (e.g., 718*a*), or an enlarged version of the first portion of the first content (e.g., 718*a*) and the second augmented content (e.g., 720*b*) such as in FIG. 7K is one of a definition of the second portion (e.g., 718*b*) of the first content, a website preview of the second portion (e.g., 718*b*) of the first content, or an enlarged version of the second portion (e.g., 718*b*) of the first content (1114).

For example, the respective portion of content is a word and the augmented content is a definition of the word. As another example, the respective portion of content is an image (or a portion of an image) and the augmented content is an enlarged version of the image (or the entirety of the image). As another example, the respective portion of content is a hyperlink and the augmented content is a preview of the content of the hyperlink.

The above-described manner of displaying a definition, image, or website preview enables the electronic device to quickly and efficiently provide additional context for the portion of the content while continuing to display the content item which simplifies the interaction between the user and the electronic device and enhances the operability of the electronic device and makes the user-device interface more efficient (e.g., by reducing the time it takes the user to view the definition, image, or website preview associated with a respective portion of the content item), which additionally reduces power usage and improves battery life of the electronic device by enabling the user to use the electronic device more quickly and efficiently.

In some embodiments, before displaying the first augmented content (e.g., 720*a*) shown in FIG. 7J or the second augmented content (e.g., 720*b*) shown in FIG. 7K (1116), prior to detecting the movement of the user's head, the electronic device (e.g., 101) displays (1118) the first portion (e.g., 718*a*) of the first content and the second portion (e.g., 718*b*) of the first content with a visual characteristic having a first value, such as in FIG. 7C (e.g., the visual characteristic is one or more of size, color, boldness, or highlighting (or lack thereof)).

In some embodiments, in response to detecting at least a portion of the movement of the user's head (1120) (e.g., the electronic device displays the augmented content in response to detecting movement of the user's head that exceeds a threshold amount of time, distance or some other criteria), in accordance with the determination that the gaze (e.g., 716*i*) of the user is directed toward the first portion (e.g., 718*a*) of the first content and that while the gaze (e.g., 716*i*) of the user is directed toward the first portion (e.g., 718*a*) of the content, one or more second criteria are satisfied, including a criterion that requires that the at least the portion of the movement of the user's head is a progression towards satisfying the first criteria, the electronic device (e.g., 101) updates (1122) the user interface to display the first portion (e.g., 718*a*) of the first content with the visual characteristic having a second value, different from the first value, while maintaining the second portion (e.g., 718*b*) of the first content with the visual characteristic having the first value, such as in FIG. 7I (e.g., the one or more second criteria are optionally similar to the one or more first criteria, but it is possible for the one or more second criteria to be met without meeting the one or more first criteria).

In some embodiments, the portion of the movement of the user's head does not exceed the threshold time or distance or does not meet the other criteria for display of the augmented content.

For example, the one or more first criteria are satisfied when the user moves their head a predetermined amount (e.g., 2 cm, 3 cm, 4 cm, etc.) and continues moving for a predetermined amount of time (e.g., 1 second) and the one or more second criteria are satisfied when the user moves their head by a smaller amount and/or for a shorter period of time. Displaying the first portion of the content with the visual characteristic having the second value optionally includes displaying the first portion of the content at a larger size, with highlighting, with an additional outline, or with additional text styling (e.g., bold, underline, italic) compared to the presentation of the first portion of the content with the visual characteristic having the first value. Meanwhile, the second portion of the content item optionally continues to be displayed with the same visual appearance as prior to detecting the head movement of the user, in some embodiments. In some embodiments, in accordance with a determination that the one or more first criteria are not satisfied, the electronic device forgoes updating the user interface to display the first portion of the first content with the visual characteristic having the second value.

In some embodiments, in accordance with the determination that the gaze (e.g., 716*n*) of the user is directed toward the second portion (e.g., 718*b*) of the first content and that while the gaze (e.g., 716*n*) of the user is directed toward the second portion (e.g., 718*b*) of the content, the one or more second criteria are satisfied, the electronic device (e.g., 101) updates (1124) the user interface to display the second portion (e.g., 718*b*) of the first content with the visual characteristic having the second value, while maintaining the first portion (e.g., 718*a*) of the first content with the visual characteristic having the first value, such as in FIG. 7K.

Displaying the second portion of the content with the visual characteristic having the second value optionally includes displaying the second portion of the content at a larger size, with highlighting, with an additional outline, or with additional text styling (e.g., bold, underline, italic) compared to the presentation of the second portion of the content with the visual characteristic having the first value. Meanwhile, the first portion of the content item optionally continues to be displayed with the same visual appearance as prior to detecting the head movement of the user in some embodiments. In some embodiments, in accordance with a determination that the one or more second criteria are not satisfied, the electronic device forgoes updating the user interface to display the second portion of the first content with the visual characteristic having the second value.

The above-described manner of updating the visual appearance of a portion of the content item at which the user is looking while performing the head movement that satisfies the one or more second criteria enables the electronic device to efficiently provide feedback to the user about which portion of content is selected for the display of augmented content before displaying the augmented content which simplifies the interaction between the user and the electronic device and enhances the operability of the electronic device and makes the user-device interface more efficient (e.g., by enabling the user to accurately request augmented content for a desired portion of the content), which additionally reduces power usage and improves battery life of the electronic device by enabling the user to use the electronic device more quickly and efficiently.

In some embodiments, the one or more second criteria include a criterion that requires that the user look at the first portion (e.g., 718*a*) of the first content or the second portion (e.g., 718*b*) of the first content shown in FIG. 7I for longer than a time threshold (1126) (e.g., 0.2 seconds, 0.3 seconds, 0.4 seconds, 0.5 seconds, etc.).

In some embodiments, the one or more first criteria also include a criterion that is satisfied when the user looks at the respective portion of the content for longer than a time threshold that is larger than the time threshold associated with the second criteria. For example, the time threshold associated with the first one or more criteria is optionally 0.5 seconds, 0.6 seconds, 0.7 seconds, 0.8 seconds, 0.9 seconds, or 1 second.

The above-described manner of updating the appearance of a respective portion of the content item at which the user is looking in response to determining that the user has looked at the respective portion for at least a threshold amount of time enables the electronic device to display the content in a consistent way when the user is looking at the content without intending to view augmented content which simplifies the interaction between the user and the electronic device and enhances the operability of the electronic device and makes the user-device interface more efficient (e.g., by reducing visual clutter, thereby enabling the user to view the content more quickly), which additionally reduces power usage and improves battery life of the electronic device by enabling the user to use the electronic device more quickly and efficiently.

In some embodiments, in response to detecting the at least the portion of the movement of the user's head (1128), in accordance with a determination that the at least the portion of the movement of the user's head is not a progression towards satisfying the first criteria, the electronic device (e.g., 101) continues (1130) to display the first portion (e.g., 718*a*) of the first content and the second portion (e.g., 718*b*) of the first content with the visual characteristic having the first value, such as in FIG. 7C.

In some embodiments, if the user moves their head in a direction that is different from the direction of movement that satisfies the one or more first criteria, or performs additional head movements while moving their head in the direction that satisfies the first criteria, the electronic device forgoes updating the visual characteristic of the respective portion of the content. For example, the head movement associated with the first criteria is a head movement forward relative to the user's body. In this example, a head movement backwards, or to the left or right without moving forward does not cause the electronic device to update the visual characteristic of the portion of the content item. Also, in this example, a head movement forwards that includes a head rotation up, down, or to the side does not cause the electronic device to update the display of the respective portion of the content item if the first criteria exclude the additional movement. In some embodiments, even if the time threshold of gaze criteria has been met, without the head movement criteria being met, the first/second portions of the first content are not displayed with the updated visual characteristic.

The above-described manner of forgoing updating the visual characteristic of the respective portion of the content item in response to detecting that the head movement is not a progression towards satisfying the first criteria enables the electronic device to display the content with reduced visual clutter when the user moves their head in way that is different from the movement associated with the first criteria which simplifies the interaction between the user and the electronic device and enhances the operability of the electronic device and makes the user-device interface more efficient (e.g., by allowing the user to read the content more quickly even if their head is not still), which additionally reduces power usage and improves battery life of the electronic device by enabling the user to use the electronic device more quickly and efficiently.

In some embodiments, before displaying the first augmented content (e.g., 720*a*) shown in FIG. 7J or the second augmented content (e.g., 720*b*) shown in FIG. 7K, and while the one or more second criteria are satisfied (1132) (e.g., the user is looking at the first or second portion of the first content and performs a head movement that satisfies the one or more second criteria, but not the one or more first criteria), while displaying the first portion (e.g., 718*a*) of the first content with the visual characteristic having the second value and displaying the second portion (e.g., 718*b*) of the first content with the visual characteristic having the first value, such as in FIG. 7I, the electronic device (e.g., 101) detects (1134) that the gaze (e.g., 716*n*) of the user changes from being directed toward the first portion (e.g., 718*a*) of the first content to being directed toward the second portion (e.g., 718*b*) of the first content, such as in FIG. 7K (e.g., the first portion of the first content is displayed with the visual characteristic having the second value in response to detecting that the user is looking at the first portion of the first content).

In some embodiments, in response to detecting that the gaze (e.g., 716*n*) of the user changes from being directed toward the first portion (e.g., 718*a*) of the first content to being directed toward the second portion (e.g., 718*b*) of the first content (1136), the electronic device (e.g., 101) updates (1138) the user interface to display the first portion (e.g., 718*a*) of the first content with the visual characteristic having the first value, and to display the second portion (e.g., 718*b*) of the first content with the visual characteristic having the second value, such as in FIG. 7K.

Likewise, if the user is looking at the second portion of the content while the second criteria are satisfied, the electronic device optionally displays the second portion of the content with the visual characteristic having the second value and displays the first portion of the content with the visual characteristic having the first value.

In some embodiments, if the user is looking at the second portion of the content while the one or more second criteria are satisfied and then looks at the first portion of the content, the electronic device displays the first portion of the content with the visual characteristic having the second value and displays the second portion of the content with the visual characteristic having the first value in response to the user's gaze moving from the second portion to the first portion of the content. In some embodiments, if the electronic device does not detect the gaze of the user changing from being directed toward the first portion of the content to being directed toward the second portion of the first content, the electronic device optionally forgoes updating the user interface to display the first portion of the first content with the visual characteristic having the first value, and to display the second portion of the first content with the visual characteristic having the second value.

The above-described manner of updating the visual characteristics of the first and second portions of content in response to detecting movement of the user's gaze from the first portion of the second portion of the content enables the electronic device to quickly and efficiently provide the user with feedback about to which portion of content the augmented content to be displayed will correspond, and the ability to change to which portion of content the augmented content will correspond, which simplifies the interaction between the user and the electronic device and enhances the operability of the electronic device and makes the user-device interface more efficient (e.g., by reducing the time and inputs it takes for the user to accurately select a portion of content for which augmented content will be displayed), which additionally reduces power usage and improves battery life of the electronic device by enabling the user to use the electronic device more quickly and efficiently.

In some embodiments, while displaying the second augmented content (e.g., 720*b*) shown in FIG. 7K (e.g., augmented content associated with the second portion of the first content), and while displaying the first portion (e.g., 718*a*) of the first content with the visual characteristic having the first value and the second portion (e.g., 718*b*) of the first content with the visual characteristic having the second value, such as in FIG. 7K, the electronic device (e.g., 101) detects (1140) that the gaze of the user changes from being directed toward the second portion (e.g., 718*b*) of the first content to being directed toward the first portion (e.g., 718*a*) of the first content.

In some embodiments, in response to detecting that the gaze of the user moves from being directed toward the second portion (e.g., 718*b*) of the first content to being directed toward the first portion (e.g., 718*a*) of the first content, the electronic device (e.g., 101) continues (1142) to display the first portion (e.g., 718*a*) of the first content with the visual characteristic having the first value and the second portion (e.g., 718*b*) of the first content with the visual characteristic having the second value, such as in FIG. 7K.

In some embodiments, once the augmented content is displayed, movement of the user's gaze from one portion of the first content to another does not change the portion of the first content with which the augmented content is associated. The second augmented content optionally continues to be displayed in response to detecting the movement of the user's gaze from the second portion of the first content to the first portion of the first content. In some embodiments, prior to displaying the second augmented content and while displaying the first portion of the content with the visual characteristic having the second value and displaying the second portion of the content with the visual characteristic having the first value, in response to detecting the movement of the user's head that satisfies the criteria, the electronic device displays the augmented content corresponding to the first portion. Optionally, while displaying the first augmented content corresponding to the first portion of the content item, in response to detecting that the user is looking at the second portion of the content item, the electronic device continues to display the first augmented content and displays the first portion of the content item with the visual characteristic having the second value and the second portion of the second content item with the visual characteristic having the first value.

The above-described manner of continuing to display the second portion of the first content with the visual characteristic having the second value after detecting the user's gaze moving from the second portion of the first content to the first portion of the first content while displaying the second augmented content enables the electronic device to avoid unnecessary user interface changes (e.g., such as the visual characteristics of the first and second portions of the content item changing), which simplifies the interaction between the user and the electronic device and enhances the operability of the electronic device and makes the user-device interface more efficient (e.g., by enabling the user to review the augmented content more quickly), which additionally reduces power usage and improves battery life of the electronic device by enabling the user to use the electronic device more quickly and efficiently.

In some embodiments, prior to displaying the first augmented content (e.g., 720*a*) shown in FIG. 7J or the second augmented content (e.g., 720*b*) shown in FIG. 7K, and while displaying the first portion (e.g., 718*a*) of the first content with the visual characteristic having the second value (1144), such as in FIG. 7I, the electronic device (e.g., 101) detects (1146) a second movement of the user's head that satisfies one or more third criteria, including a criterion that requires that the second movement of the user's head is a progression away from satisfying the first criteria (e.g., movement of the user's head forward with respect to the user's body satisfies the first and second criteria and movement of the user's head back (e.g., to a neutral position) satisfies the third criteria).

In some embodiments, in response to detecting the second movement of the user's head that satisfies the one or more third criteria, the electronic device (e.g., 101) updates (1148)

the user interface to display the first portion (e.g., 718a) of the first content with the visual characteristic having the first value, such as in FIG. 7C.

For example, the electronic device displays the first portion of the first content with the visual characteristic having the second value in response to detecting forward movement of the user's head and the electronic device displays the first portion of the first content with the visual characteristic having the first value in response to detecting backwards movement of the user's head.

The above-described manner of reverting the user interface to display the first portion of the first content displayed with the first visual characteristic in response to detecting the head movement that satisfies the third criteria provides a quick and efficient way of backing out of displaying augmented content in response to the user reversing the head movement, which simplifies the interaction between the user and the electronic device and enhances the operability of the electronic device and makes the user-device interface more efficient (e.g., by providing an efficient way to cancel the display of augmented content), which additionally reduces power usage and improves battery life of the electronic device by enabling the user to use the electronic device more quickly and efficiently.

In some embodiments, updating the user interface to include the first augmented content (e.g., 720a) as shown in FIG. 7J includes animating the display of the first augmented content (e.g., 720a), wherein the animation progresses by an amount and/or direction determined based on an amount and/or direction of progression towards satisfying the one or more first criteria based on the movement of the user's head (1150) (e.g., in some embodiments, movement of the head by at least a threshold amount satisfies the one or more criteria).

In some embodiments, updating the user interface to include the second augmented content (e.g., 720b) shown in FIG. 7K includes animating the display of the second augmented content (e.g., 720b), wherein the animation progresses by an amount and/or direction determined based on an amount and/or direction of progression towards satisfying the one or more first criteria based on the movement of the user's head (1152).

In response to detecting the user moving their head by an amount less than the threshold amount, the electronic device optionally initiates a portion of the animation of the augmented content being displayed and optionally continues to progress the animation as the user continues to move their head closer to the threshold amount.

In some embodiments, the electronic device animates the display of the augmented content at a rate proportional to the progress of the user's head movement regardless of the portion of the first content at which the user is looking.

The above-described manner of animating the display of the augmented content at a rate proportional to the progression of the user's head movement enables the electronic device to provide efficient feedback to the user that the head movement will cause the augmented content to be fully displayed, which simplifies the interaction between the user and the electronic device and enhances the operability of the electronic device and makes the user-device interface more efficient (e.g., by enabling the user to more quickly cause the electronic device to display the augmented content or back out of presenting the augmented content), which additionally reduces power usage and improves battery life of the electronic device by enabling the user to use the electronic device more quickly and efficiently.

In some embodiments, while displaying the first augmented content 720a shown in FIG. 7J, the electronic device (e.g., 101) detects (1154), via the gaze tracking device (e.g., 314), that the gaze (e.g., 7161) of the user is directed toward the first augmented content (e.g., 720a).

In some embodiments, after detecting that the gaze (e.g., 7161) of the user is directed toward the first augmented content (e.g., 720a) such as in FIG. 7J, the electronic device (e.g., 101) detects (1156), via the gaze tracking device (e.g., 314), that the gaze of the user is no longer directed toward the first augmented content (e.g., the user looks at a different location in the user interface or looks away from the user interface).

In some embodiments, in response to detecting that the gaze of the user is no longer directed toward the first augmented content (e.g., 720a), the electronic device (e.g., 101) ceases (1158) to display the first augmented content (e.g., 720a).

In some embodiments, the electronic device displays the augmented content until the user looks at the augmented content and then looks away. For example, if the user doesn't look at the augmented content before ceasing to interact with the application displaying the augmented content or the electronic device, the augmented content is still displayed when the user resumes interacting with the application and/or electronic device. However, if the user initiates the interaction with the other content after having already looked at the augmented content, the electronic device optionally ceases to display the augmented content (e.g., in some embodiments, as long as other criteria, if any, for dismissing the augmented criteria have been satisfied). In some embodiments, if the user has not looked at the augmented content and stops interacting with the electronic device, and returns at a later time, the augmented content is still optionally displayed.

The above-described manner of ceasing to display the augmented content in response to detecting the user looking at the augmented content and then looking away enables the electronic device to efficiently dismiss the augmented content, but only when the user has looked at it, which simplifies the interaction between the user and the electronic device and enhances the operability of the electronic device and makes the user-device interface more efficient (e.g., by reducing the inputs needed to cease displaying the augmented content before interacting with a different part of the user interface), which additionally reduces power usage and improves battery life of the electronic device by enabling the user to use the electronic device more quickly and efficiently.

In some embodiments, while displaying the first augmented content (e.g., 720a) shown in FIG. 7J and prior to detecting the gaze (e.g., 7161) of the user directed toward the first augmented content (e.g., 720a), the electronic device detects (1160), via the gaze tracking device (e.g., 314), that the gaze of the user is directed toward a location in the user interface other than the first augmented content (e.g., 720a) (e.g., the user continues to look at the first content that is not the augmented content or looks at a portion of the user interface that includes content other than the first content or the augmented content).

In some embodiments, in response to detecting that the gaze of the user is directed toward the location in the user interface other than the first augmented content (e.g., 720a) without the gaze of the user being directed toward the first augmented content (e.g., 720a), the electronic device (e.g., 101) continues (1162) to display the first augmented content (e.g., 720a) as shown in FIG. 7J.

In some embodiments, the electronic device continues to display the augmented content until the user looks at the augmented content and then looks away, or until other criteria for dismissing the augmented content are satisfied. Optionally, other criteria for dismissing the augmented content are possible. In some embodiments, merely looking at a location of the user interface other than the augmented content does not on its own satisfy the dismissal criteria— but in such embodiments, looking at the augmented content is optionally at least one requirement for the augmented content to be dismissed.

The above-described manner of continuing to display the augmented content while the user is looking away from the augmented content without having looked at the augmented content avoids erroneously dismissing the augmented content, which simplifies the interaction between the user and the electronic device and enhances the operability of the electronic device and makes the user-device interface more efficient (e.g., by reducing the inputs and time needed to re-display the augmented content if it is erroneously dismissed), which additionally reduces power usage and improves battery life of the electronic device by enabling the user to use the electronic device more quickly and efficiently.

In some embodiments, while displaying the first augmented content (e.g., 720a) shown in FIG. 7J, the electronic device (e.g., 101) detects (1164), via the gaze tracking device (e.g., 314), that motion of the gaze of the user indicates that the user is reading the first content (e.g., the electronic device detects, with the gaze tracking device, movement of the user's eyes that is consistent with reading).

In some embodiments, in response to detecting that the motion of the gaze of the user indicates that the user reading the first content, the electronic device (e.g., 101) ceases (1166) to display the first augmented content (e.g., 720a).

In some embodiments, the electronic device detects the reading of the first content before the user has looked at the augmented content; but in some embodiments, the reading is detected after the user has looked at the augmented content.

In some embodiments, the electronic device ceases to display the augmented content in response to detecting the user reading the first content; and in some embodiments, even if the user has not looked at the augmented content, while in other embodiments, the electronic device still requires that the user have looked at the augmented content before the augmented content can be dismissed. In some embodiments, if the user is merely looking at the first content without reading the first content, the augmented content continues to be displayed by the electronic device. Thus, in some embodiments, reading of the first content is required for the augmented content to be dismissed.

The above-described manner of ceasing to display the augmented content in response to detecting the user reading the first content enables the electronic device to efficiently dismiss the augmented content to reduce visual clutter while the user is reading the first content, which simplifies the interaction between the user and the electronic device and enhances the operability of the electronic device and makes the user-device interface more efficient (e.g., by reducing the inputs needed to cease displaying the augmented content to focus on the first content instead), which additionally reduces power usage and improves battery life of the electronic device by enabling the user to use the electronic device more quickly and efficiently.

In some embodiments, while displaying the first augmented content (e.g., 720a) shown in FIG. 7J, the electronic device (e.g., 101) detects (1168) an input directed to a region of user interface other than the first augmented content (e.g., 720a) (e.g., the user reads content displayed in a region other than the first augmented content or performs a different input, such as a backwards navigation input such as described in method 1000).

In some embodiments, in response to detecting the input, the electronic device (e.g., 101) initiates (1170) an animation of ceasing display of the first augmented content (e.g., 720a) (e.g., the augmented content begins to fade and/or shrink and/or move off of the display area).

In some embodiments, while animating the ceasing display of the first augmented content (e.g., 720a) but before ceasing display of the first augmented content (e.g., 720a) (1172), in accordance with a determination that the gaze (e.g., 7161) of the user is directed toward the first augmented content (e.g., 720a) shown in FIG. 7J, the electronic device (e.g., 101) ceases (1174) the animation and reverting display of the first augmented content (e.g., 720a) to an initial state of the first augmented content (e.g., 720a) shown in FIG. 7J (e.g., in response to detecting the user looking at the augmented content, the electronic device optionally reverts the display of the augmented content).

In some embodiments, in accordance with a determination that the gaze of the user is not directed toward the first augmented content (e.g., 720a), the electronic device (e.g., 101) continues (1176) the animation of the ceasing display of the first augmented content (e.g., 720a) (e.g., until the first augmented content ceases to be displayed).

The above-described manner of ceasing the animation of ceasing to display the augmented content in response to detecting the user looking at the augmented content enables the electronic device to quickly and efficiently continue to display the augmented content if the user wishes to look at it and dismiss the augmented content if the user does not wish to look at it, which simplifies the interaction between the user and the electronic device and enhances the operability of the electronic device and makes the user-device interface more efficient (e.g., by providing an efficient way of dismissing the augmented content and preventing accidental dismissal of the augmented content), which additionally reduces power usage and improves battery life of the electronic device by enabling the user to use the electronic device more quickly and efficiently.

In some embodiments, while displaying the first augmented content (e.g., 720a) shown in FIG. 7J, the electronic device (e.g., 101) determines (1178), via the gaze tracking device (e.g., 314), a blink of the user's eyes that satisfies one or more second criteria (e.g., the duration of the blink exceeds a threshold amount of time that is consistent with subconscious blinking). For example, the user's eyes remain closed for at least 0.5 seconds, 0.6 seconds, 0.7 seconds, 0.8 seconds, 0.9 seconds, or 1 second.

In some embodiments, in response to determining that the blink of the user's eyes satisfies the one or more second criteria, the electronic device (e.g., 101) ceases (1180) to display the first augmented content (e.g., 720a). In some embodiments, if the blink does not satisfy the one or more criteria (e.g., the user's eyes are closed for a duration of time that is less than the predetermined threshold), the augmented content continues to be displayed.

The above-described manner of ceasing to display the augmented content in response to a blink that satisfies one or more criteria enables the electronic device to provide an efficient way for the user to cause the electronic device to stop displaying the augmented content, which simplifies the interaction between the user and the electronic device and enhances the operability of the electronic device and makes the user-device interface more efficient (e.g., by reducing the time it takes for the user to dismiss the augmented content), which additionally reduces power usage and improves battery life of the electronic device by enabling the user to use the electronic device more quickly and efficiently.

In some embodiments, aspects/operations of methods 800, 900, 1000, and 1100 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device in communication with a display generation component and a gaze tracking device:

while displaying, via the display generation component, a first user interface on a display, detecting a request to navigate from the first user interface to a second user interface;

in response to the request to navigate from the first user interface to the second user interface, displaying, via the display generation component, the second user interface, wherein the second user interface is a user interface element that is separate from the first user interface;

while displaying, via the display generation component, at a first time, the second user interface separately from the first user interface, detecting a first respective user input that includes movement of a head of a user that does not meet first criteria while a gaze of the user is directed to a respective location other than the second user interface; and in response to detecting the first respective user input:

forgoing navigating from the second user interface back to the first user interface and displaying a first portion of an animated transition between the second user interface and the first user interface;

while displaying, via the display generation component, at a second time, the second user interface separately from the first user interface, detecting a second respective user input that includes movement of the head that meets the first criteria while the gaze of the user is directed to a respective location other than the second user interface; and in response to detecting the second respective user input:

navigating from the second user interface back to the first user interface, including ceasing to display the second user interface as a user interface element that is separate from the first user interface, and displaying the animated transition between the second user interface and the first user interface while navigating from the second user interface back to the first user interface.

2. The method of claim 1, wherein the second user interface is displayed while at least a portion of the first user interface is displayed, the method further comprising:

while displaying the second user interface and the at least the portion of the first user interface, wherein the first user interface is visually deemphasized relative to the second user interface, determining, via the gaze tracking device, that the gaze of the user has moved from the second user interface to the first user interface; and in response to determining that the gaze of the user has moved from the second user interface to the first user interface, reducing an amount of visual deemphasis of the first user interface relative to the second user interface.

3. The method of claim 2, further comprising:

while the gaze of the user is directed to the first user interface and while displaying the first user interface and the second user interface with the reduced amount of visual deemphasis of the first user interface relative to the second user interface, determining, via the gaze tracking device, that the gaze of the user has moved from the first user interface to the second user interface; and in response to determining that the gaze of the user has moved from the first user interface to the second user interface:

displaying the first user interface and the second user interface with the first user interface being visually deemphasized relative to the second user interface.

4. The method of claim 1, wherein a magnitude of the first portion of the animated transition depends on an amount of movement of the head.

5. The method of claim 1, wherein the first portion of the animated transition progresses at a rate and/or direction determined based on a rate and/or direction of movement of the head.

6. The method of claim 1, including in response to detecting an end of the head movement without the head movement meeting the first criteria, display an animated transition from the first user interface being visually emphasized relative to the second user interface to the first user interface being visually deemphasized relative to the second user interface.

7. The method of claim 1, wherein the first criteria include a criterion that requires a tilting movement of the head of the user to a side.

8. The method of claim 1, wherein the first criteria include a criterion that requires a forward movement of the user.

9. The method of claim 1, wherein navigating from the first user interface to the second user interface includes displaying the second user interface overlaid on the first user interface.

10. The method of claim 1, wherein navigating from the first user interface to the second user interface includes deemphasizing the first user interface and, in accordance with a determination that a gaze of the user is directed to the second user interface, emphasizing the second user interface.

11. The method of claim 1, further comprising:

while displaying the second user interface, while a characteristic of the gaze of the user does not meet second criteria or while the head movement of the user does not meet the first criteria, continuing to display the second user interface while changing an appearance of the second user interface based on the gaze of the user or the head movement of the user; and in accordance with a determination that the characteristic of the gaze of the user meets the second criteria and the head movement of the user meets the first criteria, navigating from the second user interface back to the first user interface.

12. The method of claim 11, further comprising:

while displaying the second user interface with the changed appearance of the second user interface, determining, via the gaze tracking device, that the gaze of the user is directed to the second user interface; and in response to determining that the gaze of the user is directed to the second user interface, reverting the appearance of the second user interface to an initial appearance.

13. The method of claim 1, further comprising:

displaying, in the second user interface, text content;

while displaying the text content, detecting a request to cease displaying the text content; and in response to detecting the request to cease displaying the text content:

in accordance with a determination that the text content does not satisfy one or more criteria, ceasing to display the text content; and in accordance with a determination that the text content satisfies the one or more criteria:

in accordance with a determination that the user has read the text content, ceasing to display the text content; and in accordance with a determination that the user has not read the text content, maintaining display of the text content.

14. The method of claim 1, the method further comprising:

displaying, in the second user interface, a notification associated with a respective application;

while displaying the notification associated with the respective application, determining, via the gaze tracking device, that the user has read the notification; and in response to determining that the user has read the notification, displaying, via the display generation component, a user interface of the respective application.

15. The method of claim 1, further comprising:

while determining, via the gaze tracking device, that the gaze of the user is directed toward the second user interface:

in accordance with a determination that the head of the user is in a first position, displaying text content of the second user interface with a first text style; and in accordance with a determination that the head of the user is in a second position, different from the first position, displaying the text content of the second user interface with a second text style, different from the first text style.

16. The method of claim 1, wherein the method further comprises:

in response to detecting the respective user input:

in accordance with a determination that the respective user input includes the gaze of the user being directed to the first user interface without including corresponding head movement:

forgoing navigating from the second user interface back to the first user interface, and altering a visual characteristic other than a location of the first user interface and a visual characteristic other than a location of the second user interface without displaying movement of either the first user interface or second user interface.

17. The method of claim 1, wherein the first criteria include a criterion that is satisfied when the movement of the head of the user includes movement of the head toward the first user interface.

18. The method of claim 1, wherein displaying the first portion of the animated transition between the second user interface and the first user interface includes altering a visual characteristic other than a location of the first user interface and a visual characteristic other than a location of the second user interface.

19. An electronic device, comprising:

one or more processors;

memory; and one or more programs, wherein the one or more programs are stored in the memory and configured to be executed by the one or more processors, the one or more programs including instructions for:

while displaying, via a display generation component, a first user interface on a display, detecting a request to navigate from the first user interface to a second user interface;

in response to the request to navigate from the first user interface to the second user interface, displaying, via the display generation component, the second user interface, wherein the second user interface is a user interface element that is separate from the first user interface;

while displaying, via the display generation component, at a first time, the second user interface separately from the first user interface, detecting a first respective user input that includes movement of a head of a user that does not meet first criteria while a gaze of the user is directed to a respective location other than the second user interface; and in response to detecting the first respective user input:

forgoing navigating from the second user interface back to the first user interface and displaying a first portion of an animated transition between the second user interface and the first user interface;

while displaying, via the display generation component, at a second time, the second user interface separately from the first user interface, detecting a second respective user input that includes movement of the head that meets the first criteria while the gaze of the user is directed to a respective location other than the second user interface; and in response to detecting the second respective user input:

navigating from the second user interface back to the first user interface, including ceasing to display the second user interface as a user interface element that is separate from the first user interface, and displaying the animated transition between the second user interface and the first user interface while navigating from the second user interface back to the first user interface.

20. A non-transitory computer readable storage medium storing one or more programs, the one or more programs comprising instructions, which when executed by one or more processors of an electronic device, cause the electronic device to:

while displaying, via a display generation component, a first user interface on a display, detecting a request to navigate from the first user interface to a second user interface;

in response to the request to navigate from the first user interface to the second user interface, displaying, via the display generation component, the second user interface, wherein the second user interface is a user interface element that is separate from the first user interface;

while displaying, via the display generation component, at a first time, the second user interface separately from the first user interface, detecting a first respective user input that includes movement of a head of a user that does not meet first criteria while a gaze of the user is directed to a respective location other than the second user interface; and in response to detecting the first respective user input:
   forgoing navigating from the second user interface back to the first user interface and displaying a first portion of an animated transition between the second user interface and the first user interface;

while displaying, via the display generation component, at a second time, the second user interface separately from the first user interface, detecting a second respective user input that includes movement of the head that meets the first criteria while the gaze of the user is directed to a respective location other than the second user interface; and in response to detecting the second respective user input:
   navigating from the second user interface back to the first user interface, including ceasing to display the second user interface as a user interface element that is separate from the first user interface, and displaying the animated transition between the second user interface and the first user interface while navigating from the second user interface back to the first user interface.

* * * * *